(12) United States Patent
Zass

(10) Patent No.: US 12,730,962 B2
(45) Date of Patent: Sep. 8, 2026

(54) SYSTEMS AND METHODS FOR GENERATING GRAPHS

(71) Applicant: Ron Zass, Kiryat Tivon (IL)

(72) Inventor: Ron Zass, Kiryat Tivon (IL)

( * ) Notice: Subject to any disclaimer, the term of this patent is extended or adjusted under 35 U.S.C. 154(b) by 110 days.

(21) Appl. No.: 18/593,927

(22) Filed: Mar. 3, 2024

(65) Prior Publication Data

US 2024/0256583 A1 Aug. 1, 2024

Related U.S. Application Data

(60) Provisional application No. 63/525,608, filed on Jul. 7, 2023, provisional application No. 63/467,844, filed on May 19, 2023, provisional application No. 63/461,310, filed on Apr. 23, 2023, provisional application No. 63/458,851, filed on Apr. 12, 2023, provisional application No. 63/458,055, filed on Apr. 7, 2023.

(51) Int. Cl.

| | |
|---|---|
| ***G06F 40/166*** | (2020.01) |
| ***G06F 16/3329*** | (2025.01) |
| ***G06F 16/901*** | (2019.01) |
| ***G06F 40/103*** | (2020.01) |
| ***G06F 40/20*** | (2020.01) |
| ***G06F 40/279*** | (2020.01) |
| ***G06F 40/289*** | (2020.01) |
| ***G06F 40/35*** | (2020.01) |
| ***G06T 7/00*** | (2017.01) |

(52) U.S. Cl.

CPC ........ *G06F 40/166* (2020.01); *G06F 16/3329* (2019.01); *G06F 16/9024* (2019.01); *G06F 40/103* (2020.01); *G06F 40/20* (2020.01); *G06F 40/279* (2020.01); *G06F 40/289* (2020.01); *G06F 40/35* (2020.01); *G06T 7/0002* (2013.01); *G06T 2207/30176* (2013.01)

(58) Field of Classification Search

CPC ...... G06F 40/166; G06F 40/103; G06F 40/20; G06F 40/279; G06F 40/289; G06F 40/35

See application file for complete search history.

(56) References Cited

U.S. PATENT DOCUMENTS

| | | | | |
|---|---|---|---|---|
| 4,305,131 | A | 12/1981 | Best | |
| 6,077,085 | A | 6/2000 | Parry | |
| 6,778,252 | B2 | 8/2004 | Moulton et al. | |
| 8,140,322 | B2 | 3/2012 | Simonsen et al. | |
| 9,148,613 | B1 * | 9/2015 | Goldberg | H04N 21/4316 |
| 9,280,973 | B1 | 3/2016 | Soyannwo et al. | |

(Continued)

*Primary Examiner* — Daniel C Washburn
*Assistant Examiner* — Paul J. Mueller

(57) ABSTRACT

Systems, methods and non-transitory computer readable media for facilitating generation of graphs based on data records through natural language are provided. A selection of a first group of data records of a plurality of data records may be received from an individual. Further, a textual input in a natural language may be received from the individual. The textual input may be analyzed to select a second group of data records of the plurality of data records. The textual input may be analyzed to select a type of graph. The first group of data records and the second group of data records may be used to generate a graph of the selected type of graph. The generated graph may be presented to the individual. An indication of the second group of data records may be presented to the individual.

21 Claims, 25 Drawing Sheets

(56) References Cited

U.S. PATENT DOCUMENTS 9,747,282 B1 8/2017 Baker et al.
9,864,933 B1 1/2018 Cosic
10,360,716 B1 7/2019 van der Meulen et al.
10,387,575 B1* 8/2019 Shen ........................ G06F 40/35
10,423,999 B1 9/2019 Doctor
10,467,792 B1 11/2019 Roche
10,607,134 B1 3/2020 Cosic
10,827,024 B1 11/2020 Schissel et al.
11,024,194 B1 6/2021 Beigman Klebanov
11,140,459 B2 10/2021 Ingel
11,159,597 B2 10/2021 Ingel
11,202,131 B2 12/2021 Zass
11,232,645 B1 1/2022 Roche et al.
11,244,385 B1 2/2022 Fraser
11,520,079 B2 12/2022 Zass
11,966,688 B1 4/2024 Ehrlich
2002/0087317 A1 7/2002 Lee et al.
2002/0161578 A1 10/2002 Saindon et al.
2002/0161579 A1 10/2002 Saindon et al.
2004/0068410 A1 4/2004 Mohamed et al.
2004/0172257 A1 9/2004 Liqin et al.
2004/0186712 A1 9/2004 Coles et al.
2005/0255431 A1 11/2005 Baker
2005/0272013 A1 12/2005 Knight
2006/0285654 A1 12/2006 Nesvadba et al.
2007/0124166 A1 5/2007 Van Luchene
2007/0130529 A1 6/2007 Shrubsole
2007/0208569 A1 9/2007 Subramanian et al.
2007/0220575 A1 9/2007 Cooper et al.
2008/0015968 A1 1/2008 Van Luchene
2008/0195386 A1 8/2008 Proidl
2008/0295130 A1 11/2008 Worthen
2009/0037179 A1 2/2009 Liu et al.
2009/0175596 A1 7/2009 Hirai
2009/0299877 A1* 12/2009 Vadon ..................... G06F 16/26 705/26.1
2010/0082326 A1 4/2010 Bangalore
2010/0100907 A1 4/2010 Chang
2010/0238179 A1 9/2010 Kelly
2011/0064388 A1 3/2011 Brown et al.
2011/0076992 A1 3/2011 Chou
2011/0107286 A1* 5/2011 Batterywala .......... G06F 30/398 716/139
2012/0054619 A1 3/2012 Spooner et al.
2013/0038737 A1 2/2013 Yehezkel et al.
2013/0110513 A1 5/2013 Jhunja et al.
2013/0188862 A1 7/2013 Lievens
2014/0142918 A1 5/2014 Dotterer et al.
2014/0164507 A1 6/2014 Tesch et al.
2014/0303958 A1 10/2014 Lee et al.
2014/0358518 A1 12/2014 Wu et al.
2015/0092007 A1 4/2015 Koborita et al.
2015/0319518 A1 11/2015 Wilson
2015/0356967 A1 12/2015 Byron et al.
2016/0005436 A1 1/2016 Axen et al.
2016/0021334 A1 1/2016 Rossano et al.
2016/0042766 A1 2/2016 Kummer
2016/0049146 A1 2/2016 Chang
2016/0132578 A1 5/2016 Allen
2016/0254795 A1 9/2016 Ballard
2016/0328391 A1 11/2016 Choi
2016/0365087 A1 12/2016 Freud
2017/0004820 A1 1/2017 Lv et al.
2017/0011745 A1 1/2017 Navaratnam
2017/0075877 A1 3/2017 Lepeltier
2017/0076749 A1 3/2017 Kanevsky
2017/0255616 A1 9/2017 Yun et al.
2018/0143809 A1 5/2018 Zang et al.
2018/0174577 A1 6/2018 Jothilingam et al.
2018/0174595 A1 6/2018 Dirac et al.
2018/0253992 A1 9/2018 Koul et al.
2018/0260448 A1 9/2018 Osotio et al.
2018/0322875 A1 11/2018 Adachi
2018/0357215 A1 12/2018 Austin et al.
2018/0374461 A1 12/2018 Serletic
2019/0065478 A1 2/2019 Tsujikawa et al.
2019/0114302 A1 4/2019 Bequet
2019/0164533 A1 5/2019 Lawrenson et al.
2019/0166176 A1 5/2019 Jain et al.
2019/0250891 A1 8/2019 Kumar et al.
2019/0317739 A1 10/2019 Turek et al.
2019/0354592 A1 11/2019 Musham et al.
2019/0361873 A1* 11/2019 Rogynskyy ......... G06F 11/3024
2020/0005796 A1 1/2020 Ziv et al.
2020/0007946 A1 1/2020 Olkha
2020/0042601 A1 2/2020 Doggett
2020/0043112 A1 2/2020 Brinkley, II
2020/0051566 A1 2/2020 Shin
2020/0058289 A1 2/2020 Gabryjelski et al.
2020/0066304 A1 2/2020 Chen
2020/0105245 A1 4/2020 Gupta
2020/0111474 A1 4/2020 Kumar et al.
2020/0143813 A1 5/2020 Nakagawa
2020/0150981 A1 5/2020 Westberg et al.
2020/0159862 A1 5/2020 Kleiner et al.
2020/0174776 A1 6/2020 Vinod et al.
2020/0221176 A1 7/2020 Hwang et al.
2020/0296510 A1 9/2020 Li et al.
2020/0311120 A1 10/2020 Zhao et al.
2021/0019373 A1 1/2021 Freitag
2021/0042110 A1 2/2021 Basyrov et al.
2021/0063363 A1 3/2021 Kaminski et al.
2021/0081101 A1 3/2021 Speare et al.
2021/0097976 A1 4/2021 Chicote et al.
2021/0182468 A1 6/2021 Co et al.
2021/0192824 A1 6/2021 Chen
2021/0224319 A1 7/2021 Ingel
2021/0225365 A1 7/2021 Sinha et al.
2021/0232759 A1 7/2021 Schick et al.
2021/0264369 A1 8/2021 Zass
2021/0271815 A1 9/2021 Li et al.
2021/0279822 A1 9/2021 Bellaish
2021/0287150 A1 9/2021 Zass
2021/0303318 A1 9/2021 Raghavan
2021/0397418 A1 12/2021 Nikumb et al.
2021/0400101 A1 12/2021 Ingel
2022/0070550 A1 3/2022 Ingel
2022/0188513 A1* 6/2022 Kitamura .............. G06F 40/279
2022/0253481 A1* 8/2022 Tory ...................... G06T 11/206
2022/0382524 A1 12/2022 Ansari et al.
2023/0048149 A1 2/2023 Zass
2023/0049015 A1 2/2023 Zass
2023/0052442 A1 2/2023 Zass
2023/0057835 A1 2/2023 Zass
2023/0069088 A1 3/2023 Zass
2023/0095089 A1 3/2023 Kaliyaperumal et al.
2023/0115185 A1 4/2023 Huang et al.
2023/0252224 A1 8/2023 Tran
2023/0418459 A1* 12/2023 Ciminelli .............. G06F 40/253
2024/0054390 A1* 2/2024 Wendt .................... G06N 20/00
2024/0220521 A1 7/2024 Ehrlich
2024/0220714 A1 7/2024 Ehrlich

* cited by examiner

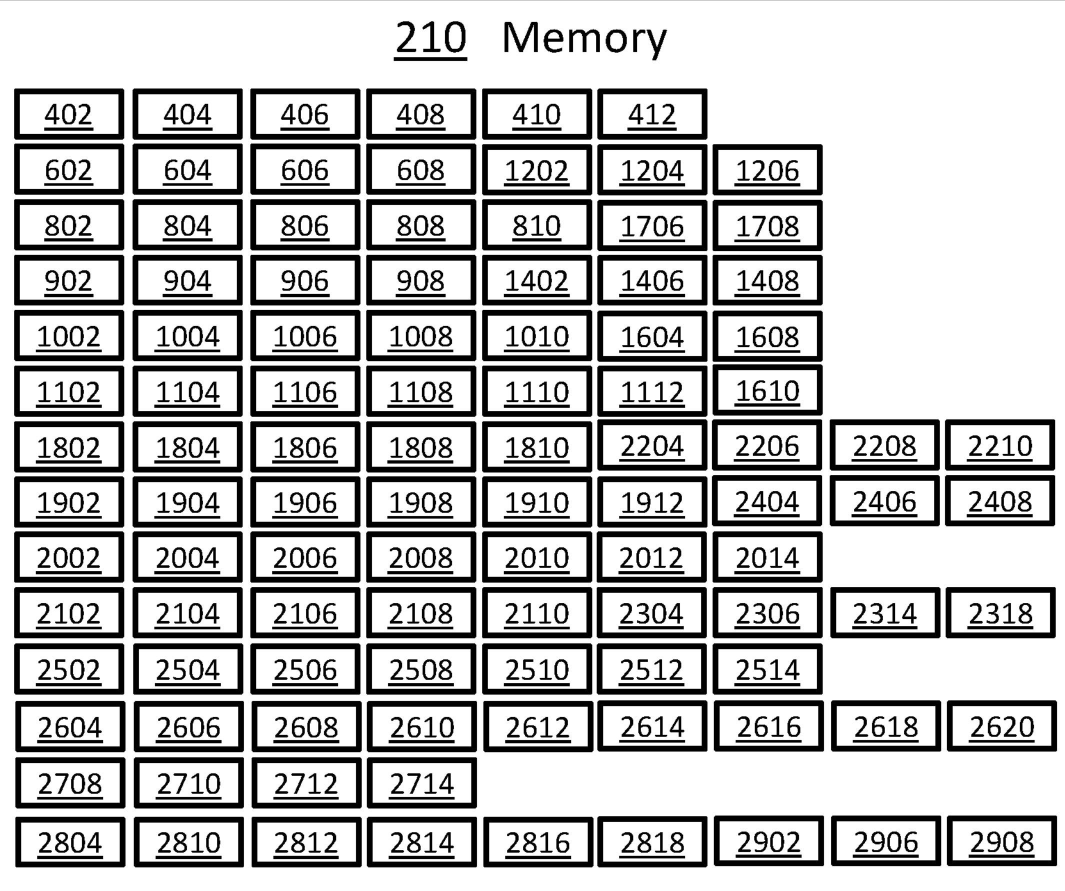

302 Identifying a mathematical object in a particular mathematical space, the mathematical object corresponds to a specific word 304 Calculating a function of two mathematical objects in a particular mathematical space to obtain a particular mathematical object in the particular mathematical space, the particular mathematical object corresponds to a particular word 306 Identifying a mathematical object based on particular information

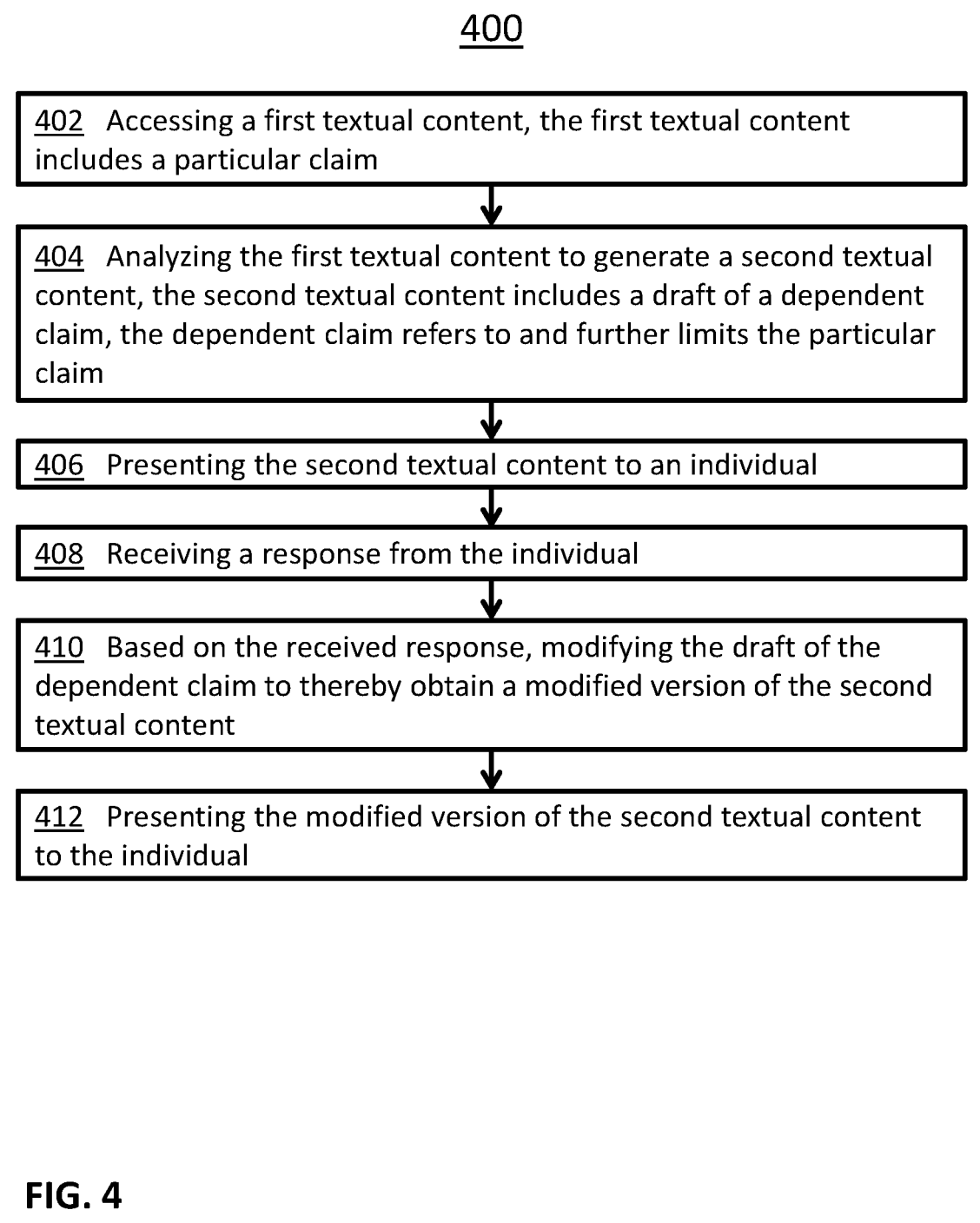

402 Accessing a first textual content, the first textual content includes a particular claim 404 Analyzing the first textual content to generate a second textual content, the second textual content includes a draft of a dependent claim, the dependent claim refers to and further limits the particular claim 406 Presenting the second textual content to an individual 408 Receiving a response from the individual 410 Based on the received response, modifying the draft of the dependent claim to thereby obtain a modified version of the second textual content 412 Presenting the modified version of the second textual content to the individual

FIG. 4

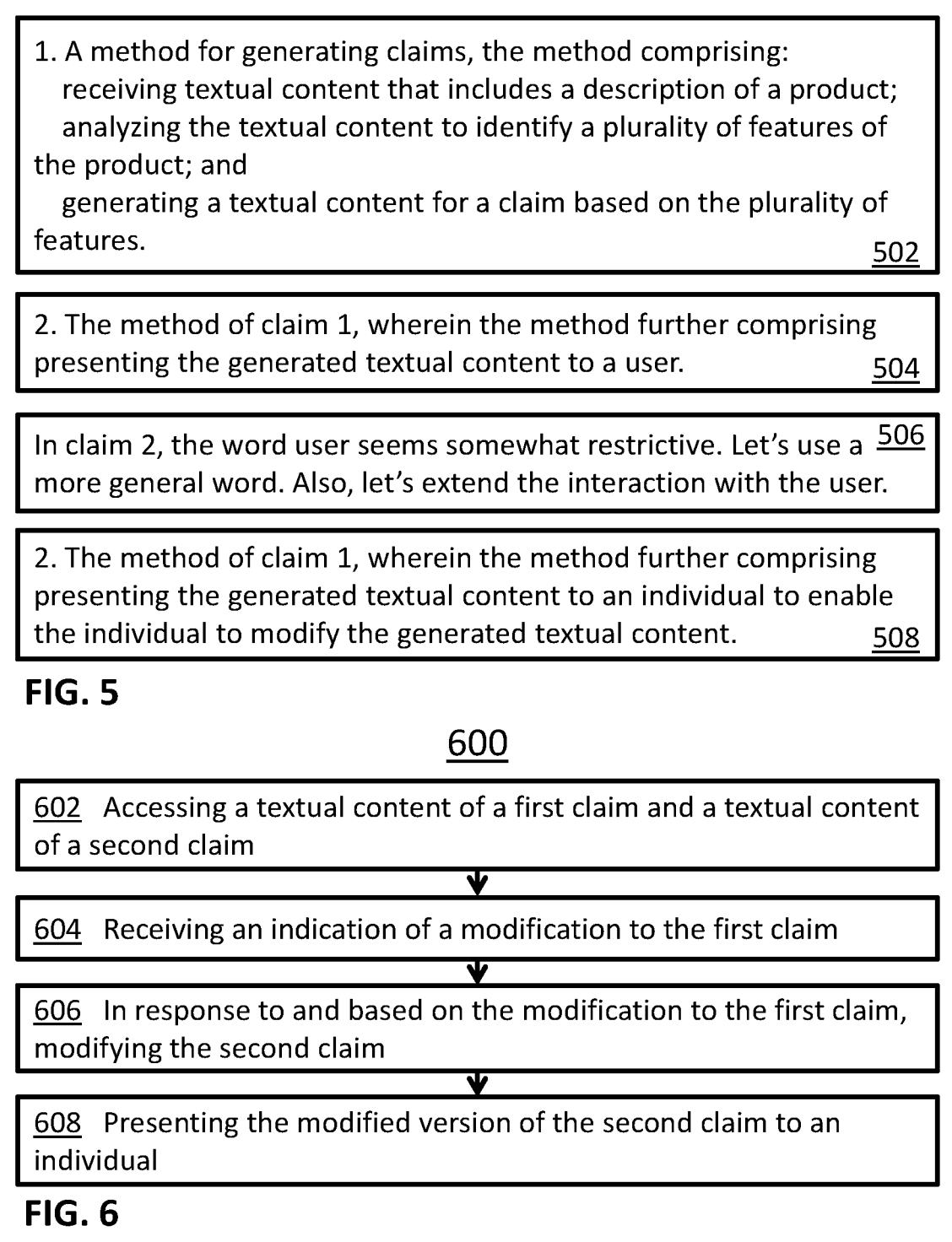

1. A method for generating claims, the method comprising:
receiving textual content that includes a description of a product;
analyzing the textual content to identify a plurality of features of the product; and
generating a textual content for a claim based on the plurality of features.
502

2. The method of claim 1, wherein the method further comprising presenting the generated textual content to a user.
504

In claim 2, the word user seems somewhat restrictive. Let's use a more general word. Also, let's extend the interaction with the user.
506

2. The method of claim 1, wherein the method further comprising presenting the generated textual content to an individual to enable the individual to modify the generated textual content.
508

602 Accessing a textual content of a first claim and a textual content of a second claim 604 Receiving an indication of a modification to the first claim 606 In response to and based on the modification to the first claim, modifying the second claim 608 Presenting the modified version of the second claim to an individual

FIG. 6

| 702A | 702B |
| --- | --- |
| 2. The method of claim 1, wherein the method further comprising presenting the generated textual content to a user. | 2. The method of claim 1, wherein the method further comprising presenting the generated textual content to an individual to enable the individual to modify the generated textual content. |
| 704A<br>3. The method of claim 2, wherein the presentation enables the user to reject the generated textual content. | 704B<br>3. The method of claim 2, wherein the presentation enables the individual to reject the generated textual content. |
| 706A<br>4. The method of claim 3, wherein the presentation enables the user to regenerate the textual content. | 706B<br>4. The method of claim 3, wherein the presentation enables the individual to regenerate the textual content. |
| 708A<br>5. The method of claim 2, wherein the presentation enables the user to modify the generated textual content using a keyboard. | 708B<br>5. The method of claim 2, wherein method further comprising receiving an input from the individual via a keyboard, and modifying the generated textual content based on the input. |

Figure 8:
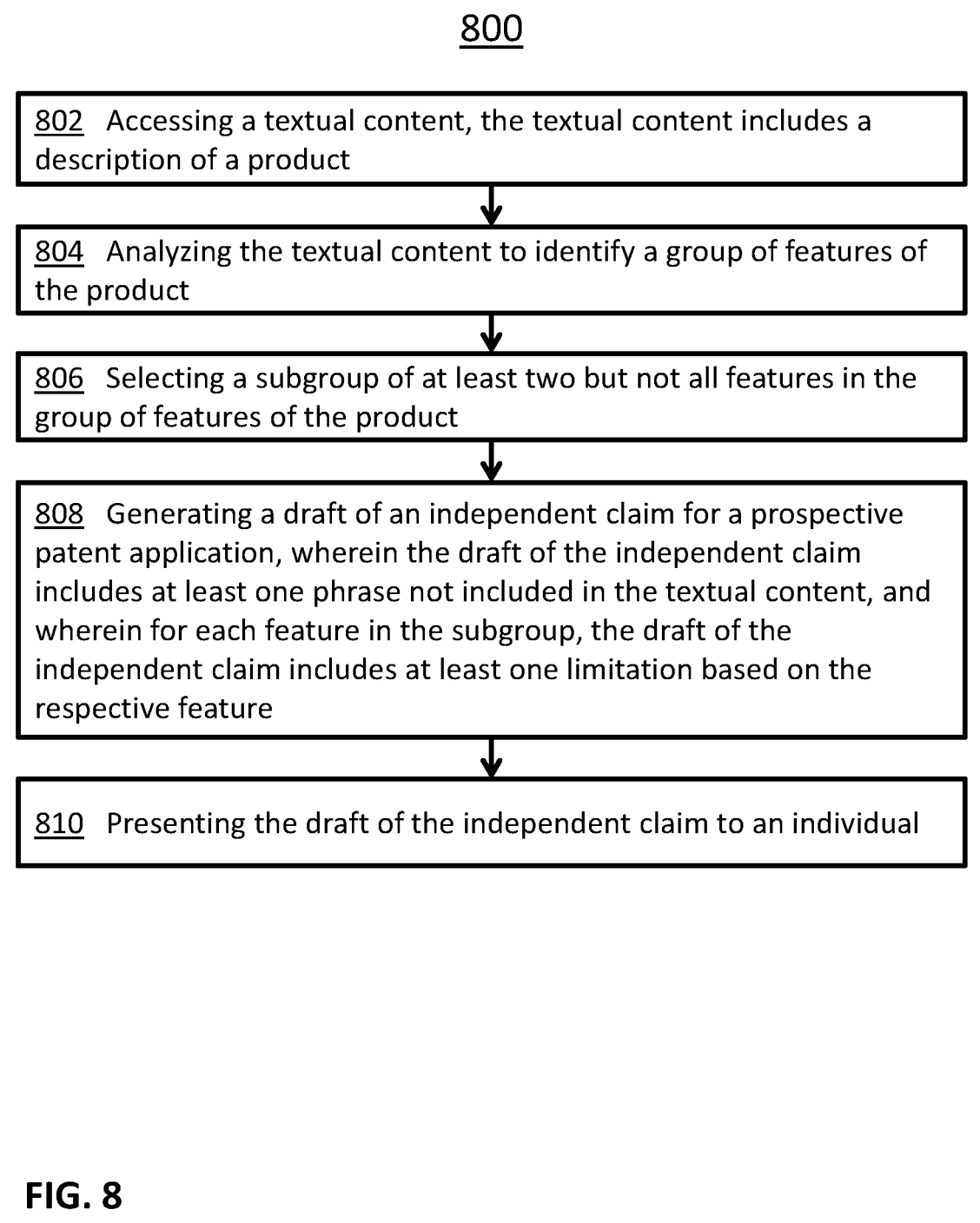

802 Accessing a textual content, the textual content includes a description of a product 804 Analyzing the textual content to identify a group of features of the product 806 Selecting a subgroup of at least two but not all features in the group of features of the product 808 Generating a draft of an independent claim for a prospective patent application, wherein the draft of the independent claim includes at least one phrase not included in the textual content, and wherein for each feature in the subgroup, the draft of the independent claim includes at least one limitation based on the respective feature 810 Presenting the draft of the independent claim to an individual

Figure 9:
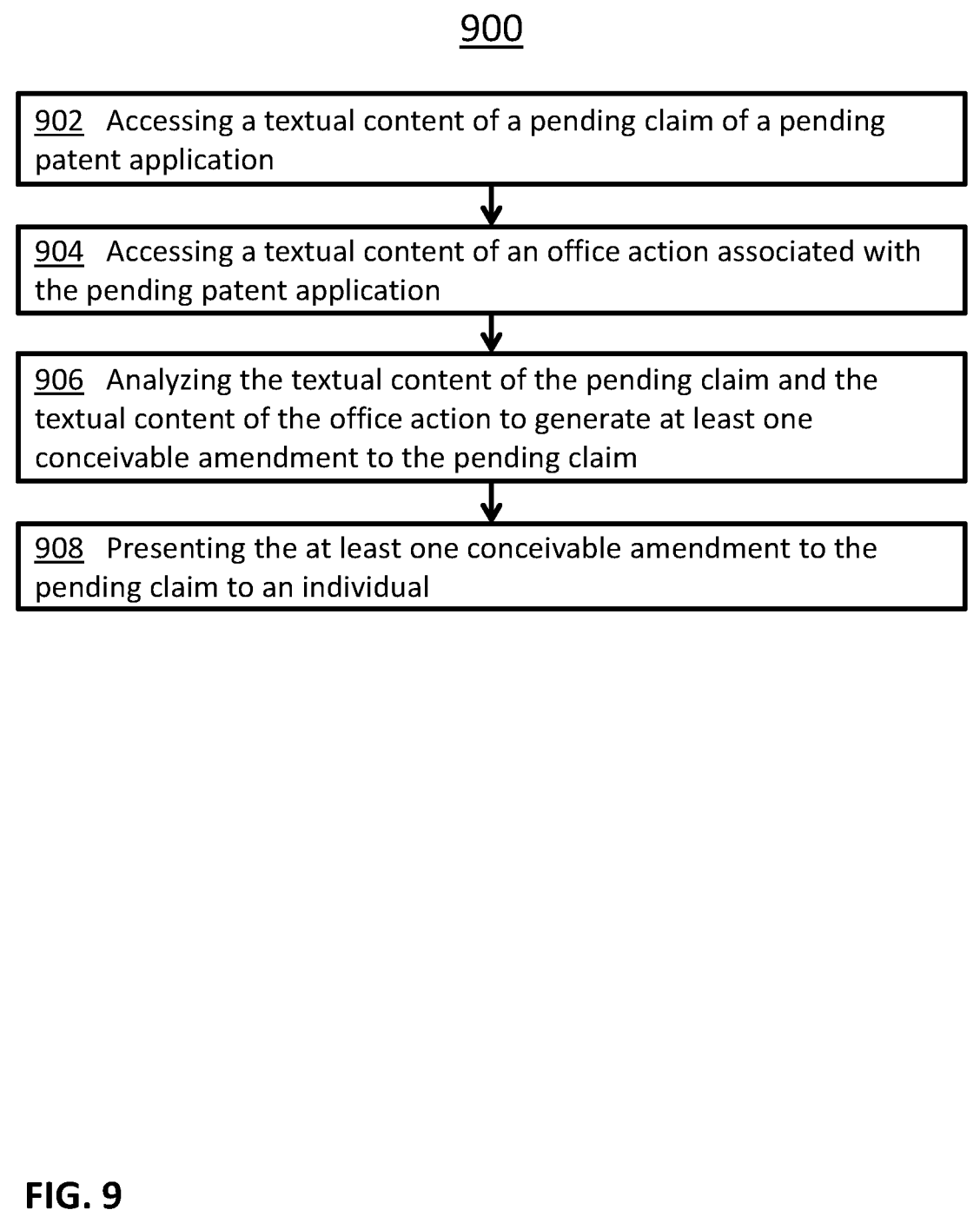

902 Accessing a textual content of a pending claim of a pending patent application 904 Accessing a textual content of an office action associated with the pending patent application 906 Analyzing the textual content of the pending claim and the textual content of the office action to generate at least one conceivable amendment to the pending claim 908 Presenting the at least one conceivable amendment to the pending claim to an individual

Figure 10:
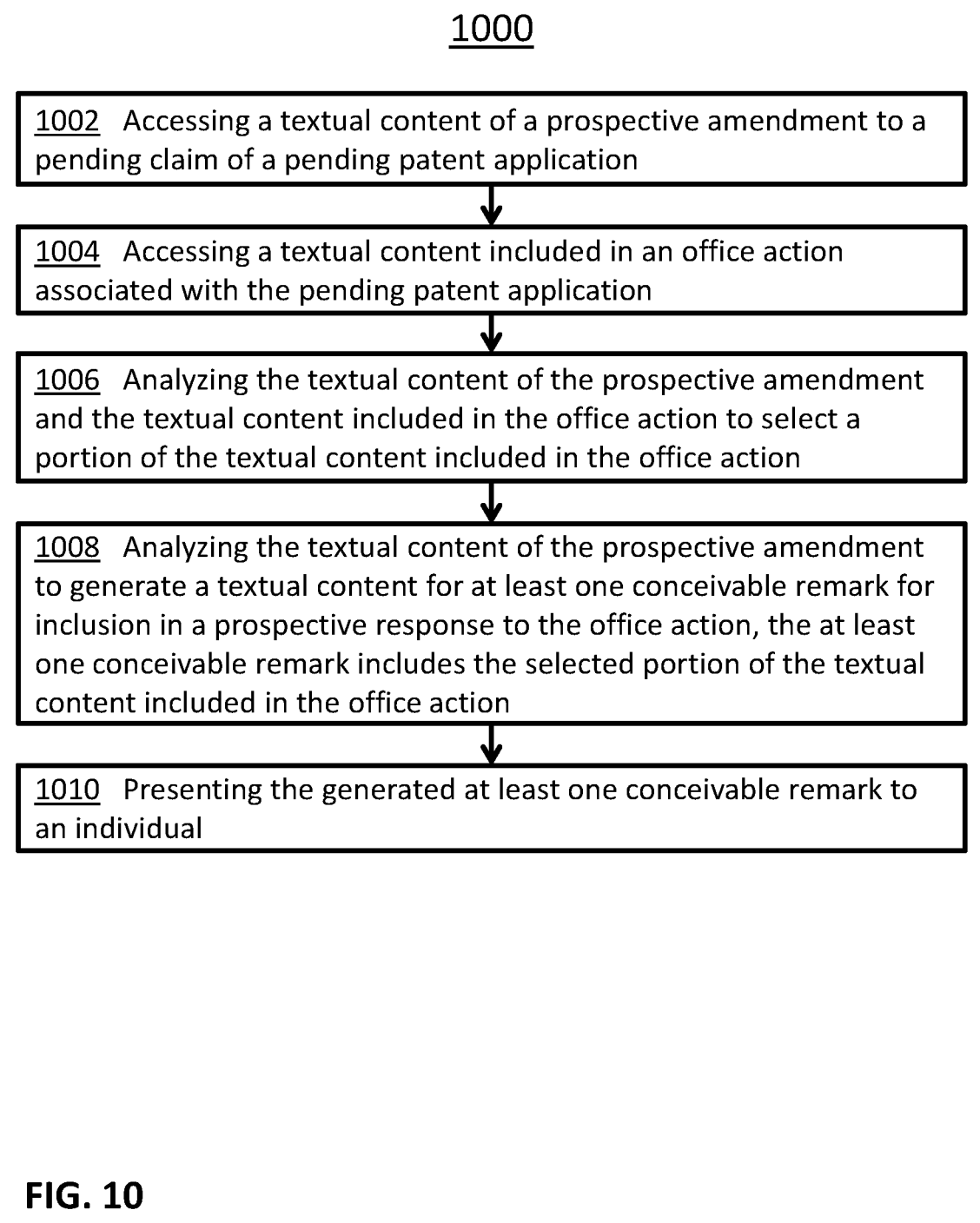

1002 Accessing a textual content of a prospective amendment to a pending claim of a pending patent application 1004 Accessing a textual content included in an office action associated with the pending patent application 1006 Analyzing the textual content of the prospective amendment and the textual content included in the office action to select a portion of the textual content included in the office action 1008 Analyzing the textual content of the prospective amendment to generate a textual content for at least one conceivable remark for inclusion in a prospective response to the office action, the at least one conceivable remark includes the selected portion of the textual content included in the office action 1010 Presenting the generated at least one conceivable remark to an individual

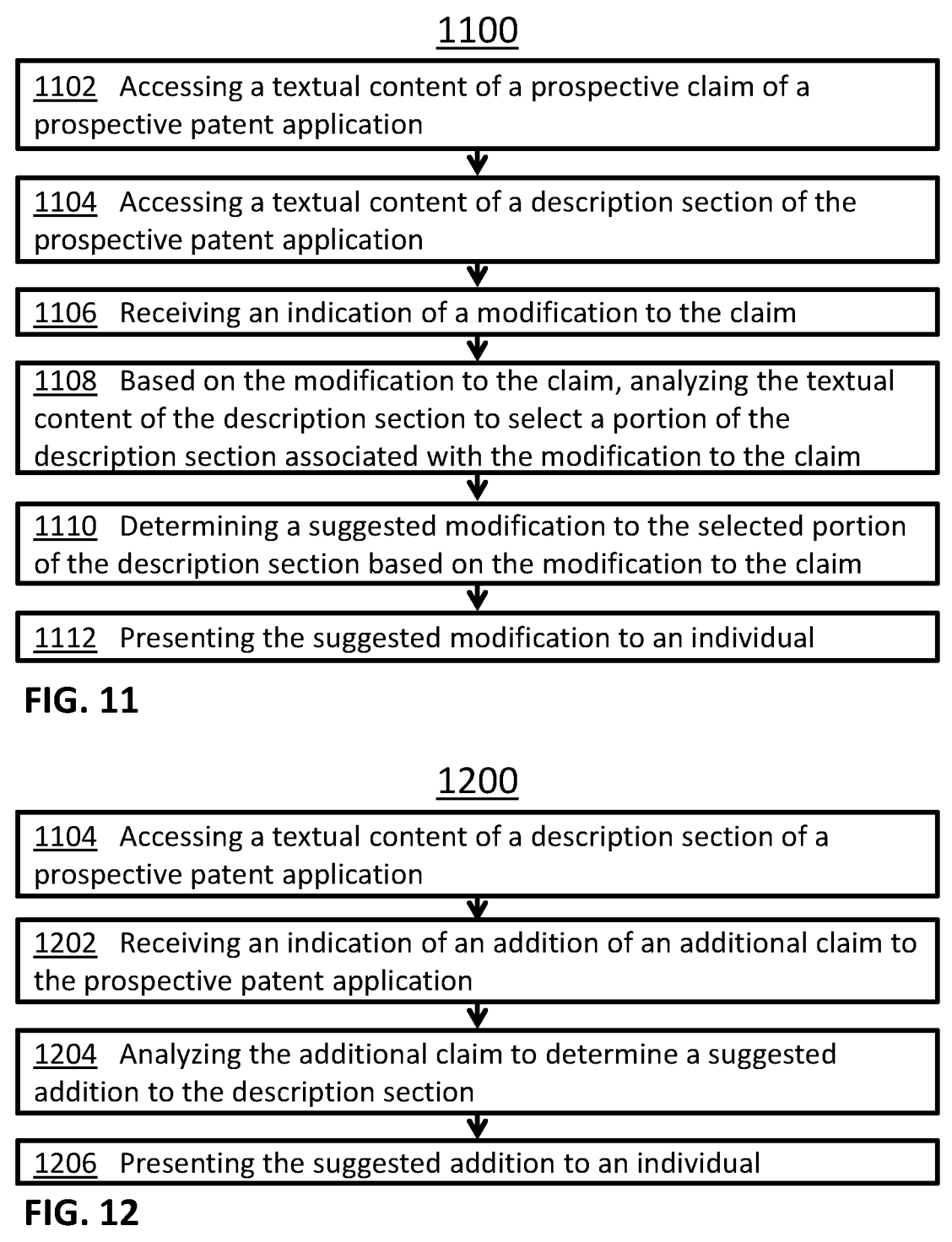

1102 Accessing a textual content of a prospective claim of a prospective patent application 1104 Accessing a textual content of a description section of the prospective patent application 1106 Receiving an indication of a modification to the claim 1108 Based on the modification to the claim, analyzing the textual content of the description section to select a portion of the description section associated with the modification to the claim 1110 Determining a suggested modification to the selected portion of the description section based on the modification to the claim 1112 Presenting the suggested modification to an individual

1104 Accessing a textual content of a description section of a prospective patent application 1202 Receiving an indication of an addition of an additional claim to the prospective patent application 1204 Analyzing the additional claim to determine a suggested addition to the description section 1206 Presenting the suggested addition to an individual

FIG. 12

| 1302 | 1304 |
| --- | --- |
| 2. The method of claim 1, wherein the method further comprising presenting the generated textual content to a user. | 1304A<br>The textual content may be generated based on the inputs. The generated textual content may be presented to a user, for example via a user interface, visually and/or audibly. |
| 1306<br>2. The method of claim 1, wherein the method further comprising presenting the generated textual content to an individual to enable the individual to modify the generated textual content. | 1308<br>The generated textual content may be presented to an individual, for example via a user interface, visually and/or audibly. The presentation may enable the individual to modify the generated textual content. |
| 1310<br>3. The method of claim 1, wherein the inputs includes image data. | 1312<br>The textual content may be generated based on the inputs, such as image data. The generated textual content may be presented to a user, for example via a user interface, visually and/or audibly. |

1402 Accessing a drawing for a prospective patent application

↓

1104 Accessing a textual content of a description section of the prospective patent application

↓

1406 Receiving an indication of a modification to the drawing

↓

1408 In response to and based on the modification to the drawing, analyzing the textual content of the description section to determine a suggested modification to the description section

↓

1112 Presenting the suggested modification to an individual

FIG. 14

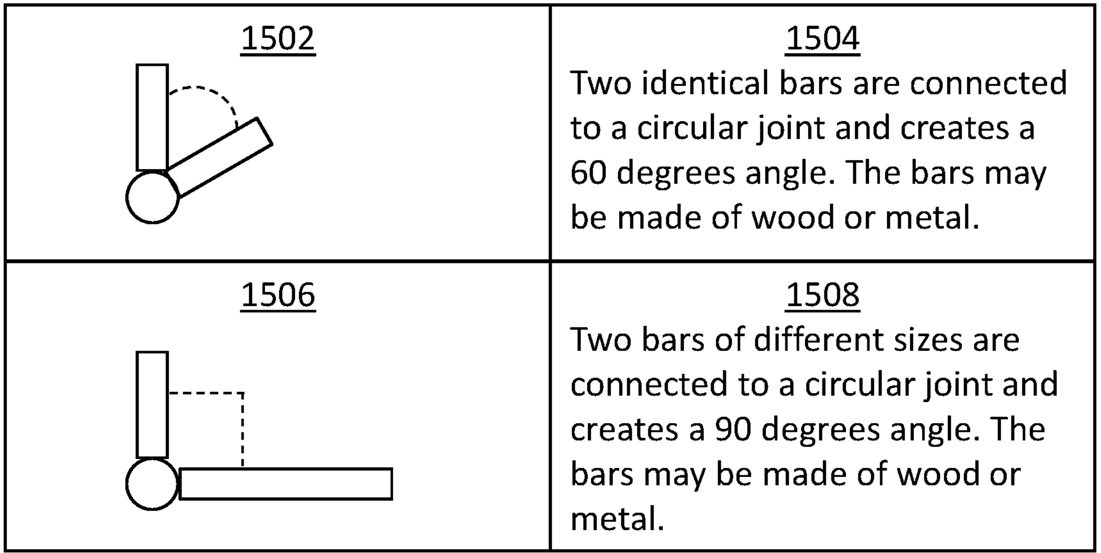

1102 Accessing a textual content of a prospective claim of a prospective patent application

1604 Accessing a visual content of a drawing for the application

1106 Receiving an indication of a modification to the claim

1608 Based on the modification to the prospective claim, analyzing the visual content of the drawing to determine a suggested modification to the drawing 1610 Presenting the suggested modification to an individual

1104 Accessing a textual content of a description section for a prospective patent application

1604 Accessing a visual content of a drawing for the patent

1706 Receiving an indication of a modification to the prospective description section

1708 Based on the modification to the prospective description section, analyzing the visual content of the drawing to determine a suggested modification to the drawing

1610 Presenting the suggested modification to an individual

Figure 18:
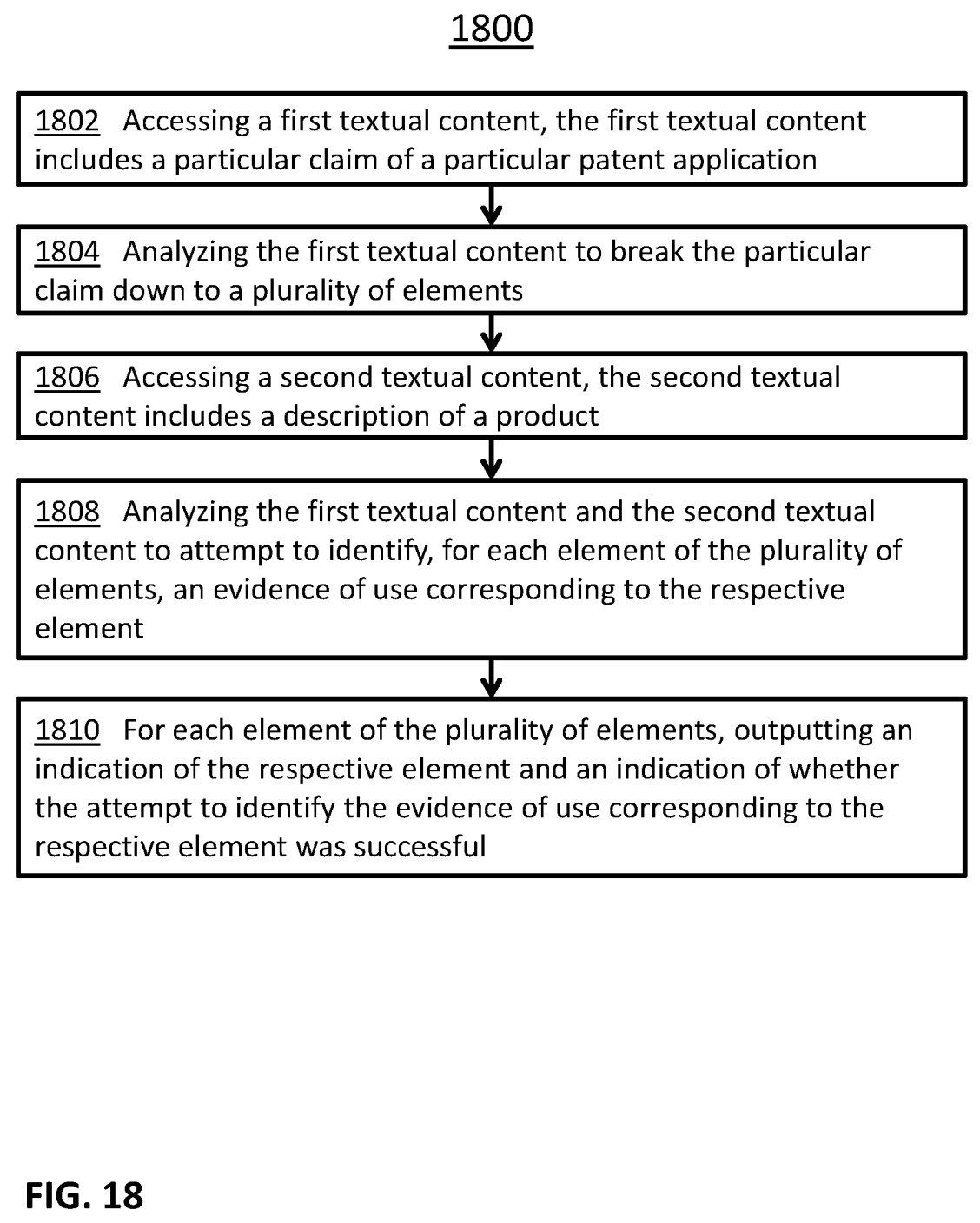

1802 Accessing a first textual content, the first textual content includes a particular claim of a particular patent application 1804 Analyzing the first textual content to break the particular claim down to a plurality of elements 1806 Accessing a second textual content, the second textual content includes a description of a product 1808 Analyzing the first textual content and the second textual content to attempt to identify, for each element of the plurality of elements, an evidence of use corresponding to the respective element 1810 For each element of the plurality of elements, outputting an indication of the respective element and an indication of whether the attempt to identify the evidence of use corresponding to the respective element was successful

Figure 19:
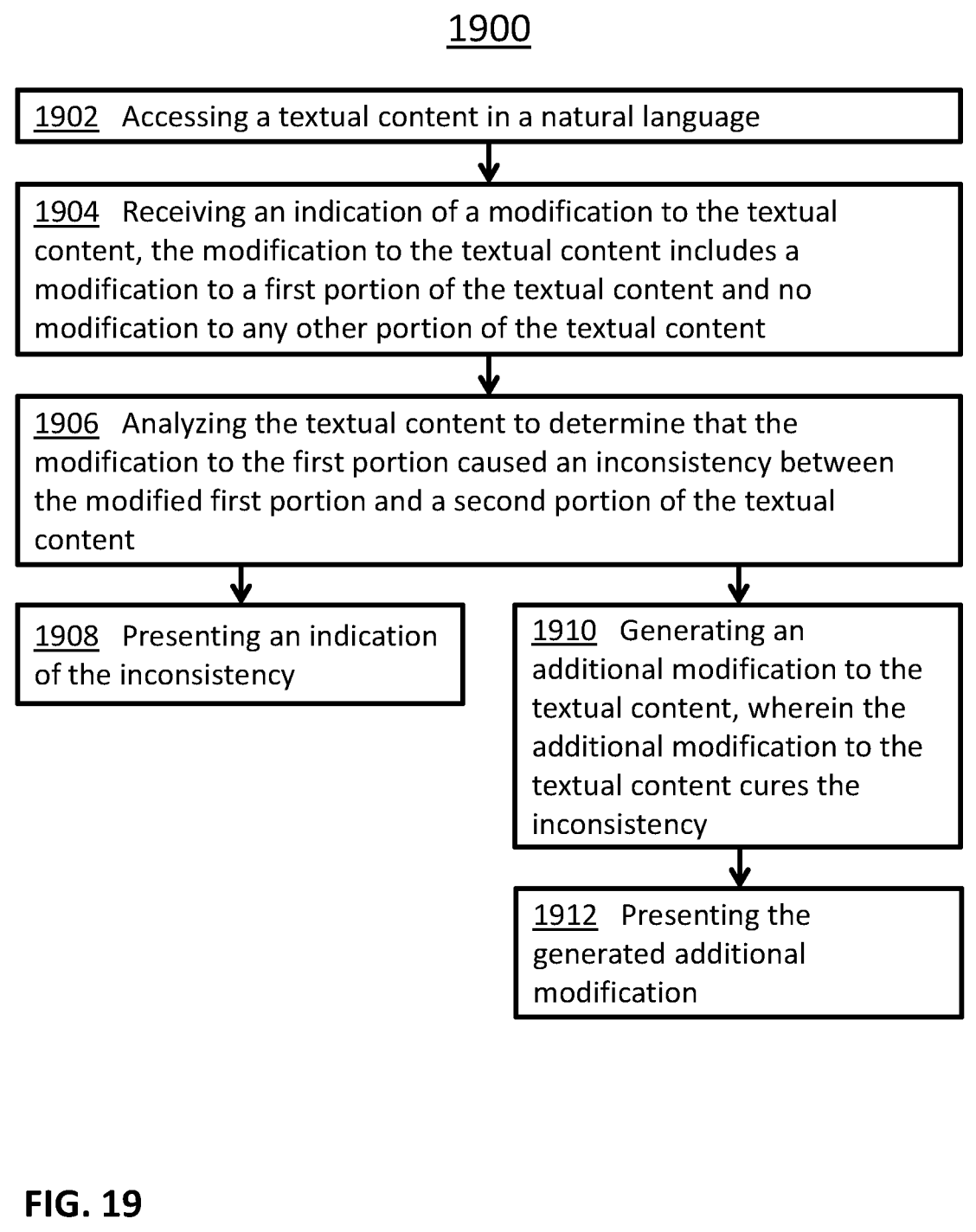

1902 Accessing a textual content in a natural language

1904 Receiving an indication of a modification to the textual content, the modification to the textual content includes a modification to a first portion of the textual content and no modification to any other portion of the textual content 1906 Analyzing the textual content to determine that the modification to the first portion caused an inconsistency between the modified first portion and a second portion of the textual content 1908 Presenting an indication of the inconsistency 1910 Generating an additional modification to the textual content, wherein the additional modification to the textual content cures the inconsistency 1912 Presenting the generated additional modification

Figure 20:
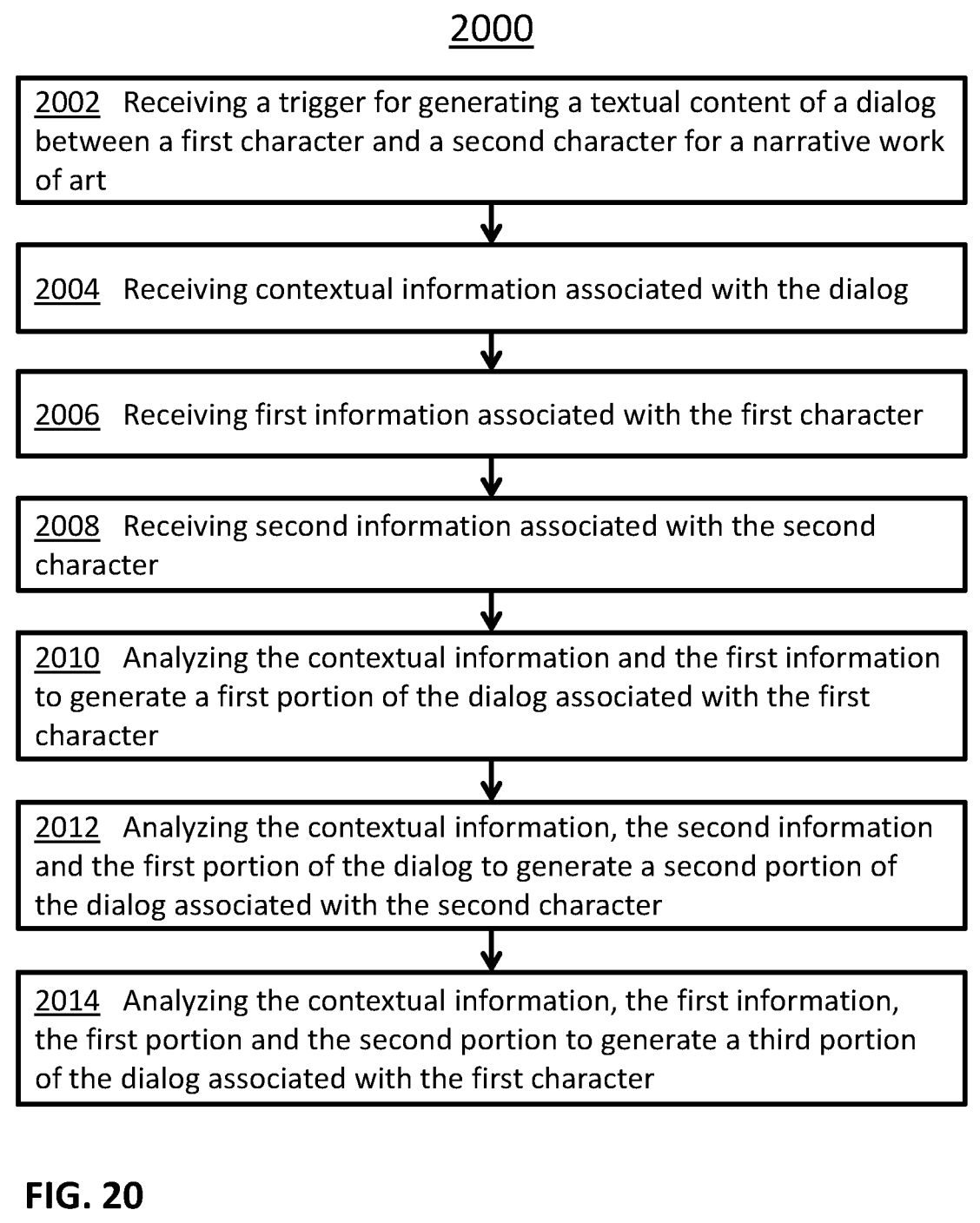

2002 Receiving a trigger for generating a textual content of a dialog between a first character and a second character for a narrative work of art 2004 Receiving contextual information associated with the dialog 2006 Receiving first information associated with the first character 2008 Receiving second information associated with the second character 2010 Analyzing the contextual information and the first information to generate a first portion of the dialog associated with the first character 2012 Analyzing the contextual information, the second information and the first portion of the dialog to generate a second portion of the dialog associated with the second character 2014 Analyzing the contextual information, the first information, the first portion and the second portion to generate a third portion of the dialog associated with the first character

Figures 21, 22:
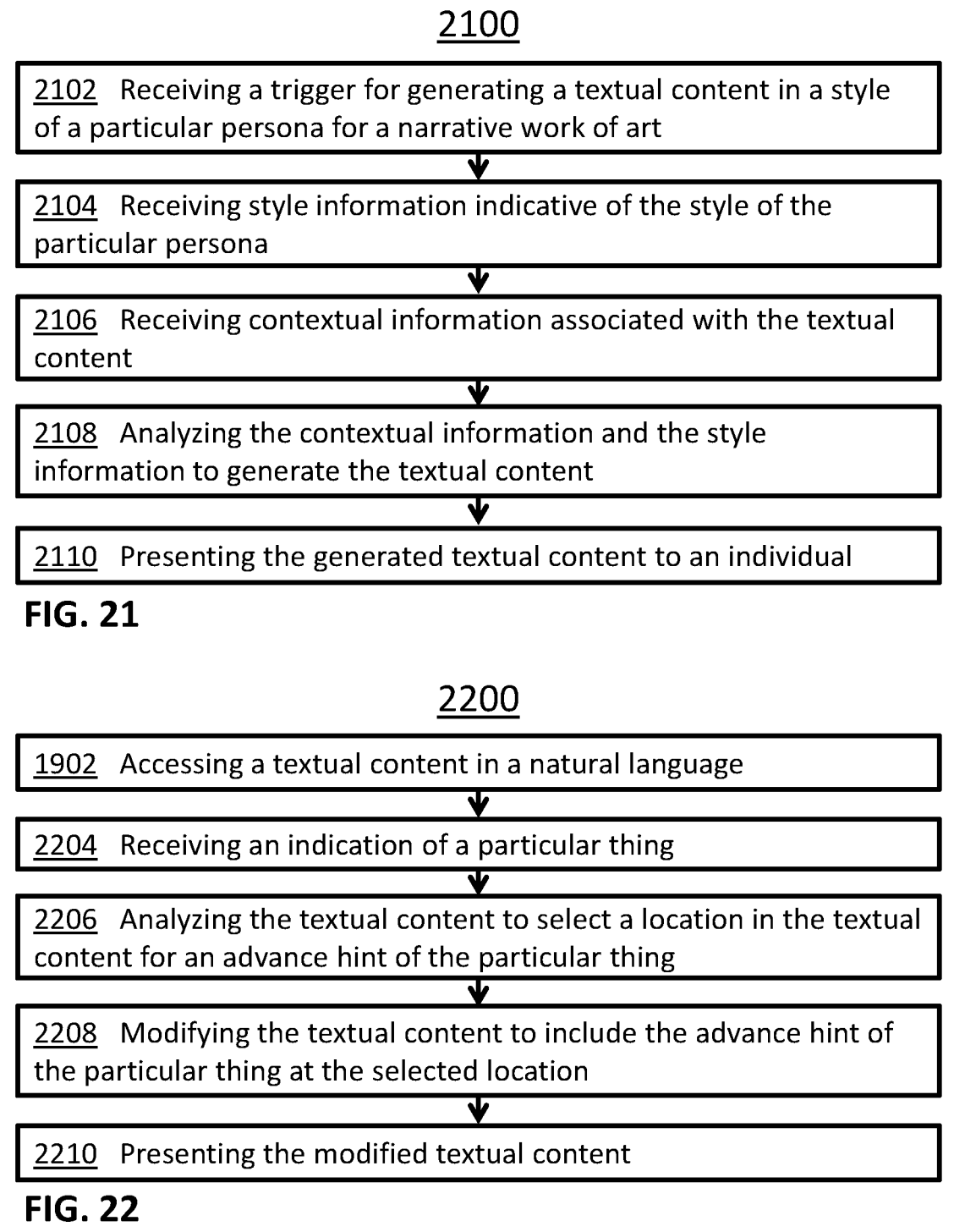

2102 Receiving a trigger for generating a textual content in a style of a particular persona for a narrative work of art 2104 Receiving style information indicative of the style of the particular persona 2106 Receiving contextual information associated with the textual content 2108 Analyzing the contextual information and the style information to generate the textual content 2110 Presenting the generated textual content to an individual

1902 Accessing a textual content in a natural language

2204 Receiving an indication of a particular thing

2206 Analyzing the textual content to select a location in the textual content for an advance hint of the particular thing 2208 Modifying the textual content to include the advance hint of the particular thing at the selected location 2210 Presenting the modified textual content

Figure 23:
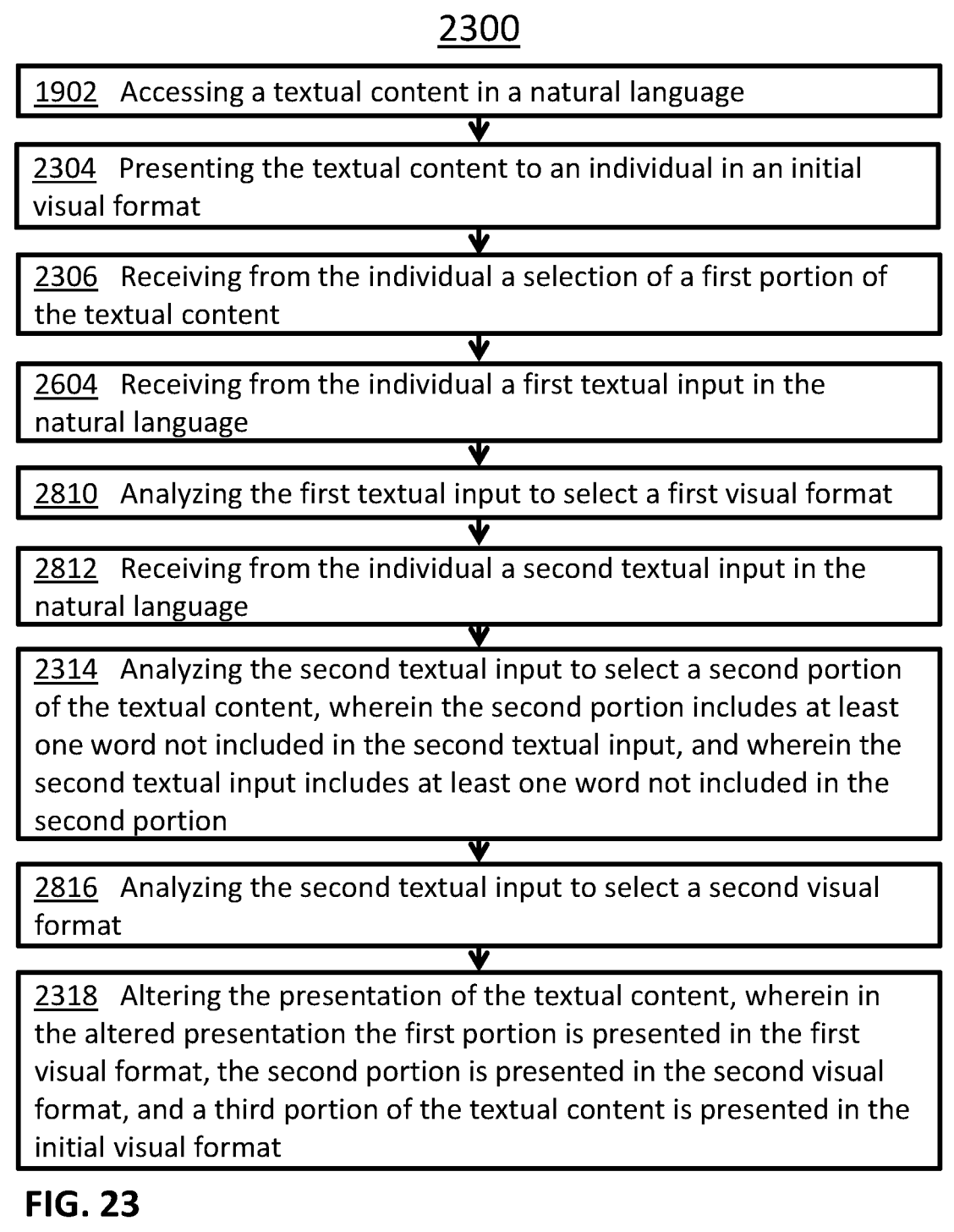

1902 Accessing a textual content in a natural language

2304 Presenting the textual content to an individual in an initial visual format 2306 Receiving from the individual a selection of a first portion of the textual content 2604 Receiving from the individual a first textual input in the natural language 2810 Analyzing the first textual input to select a first visual format 2812 Receiving from the individual a second textual input in the natural language 2314 Analyzing the second textual input to select a second portion of the textual content, wherein the second portion includes at least one word not included in the second textual input, and wherein the second textual input includes at least one word not included in the second portion 2816 Analyzing the second textual input to select a second visual format 2318 Altering the presentation of the textual content, wherein in the altered presentation the first portion is presented in the first visual format, the second portion is presented in the second visual format, and a third portion of the textual content is presented in the initial visual format

Figure 24:
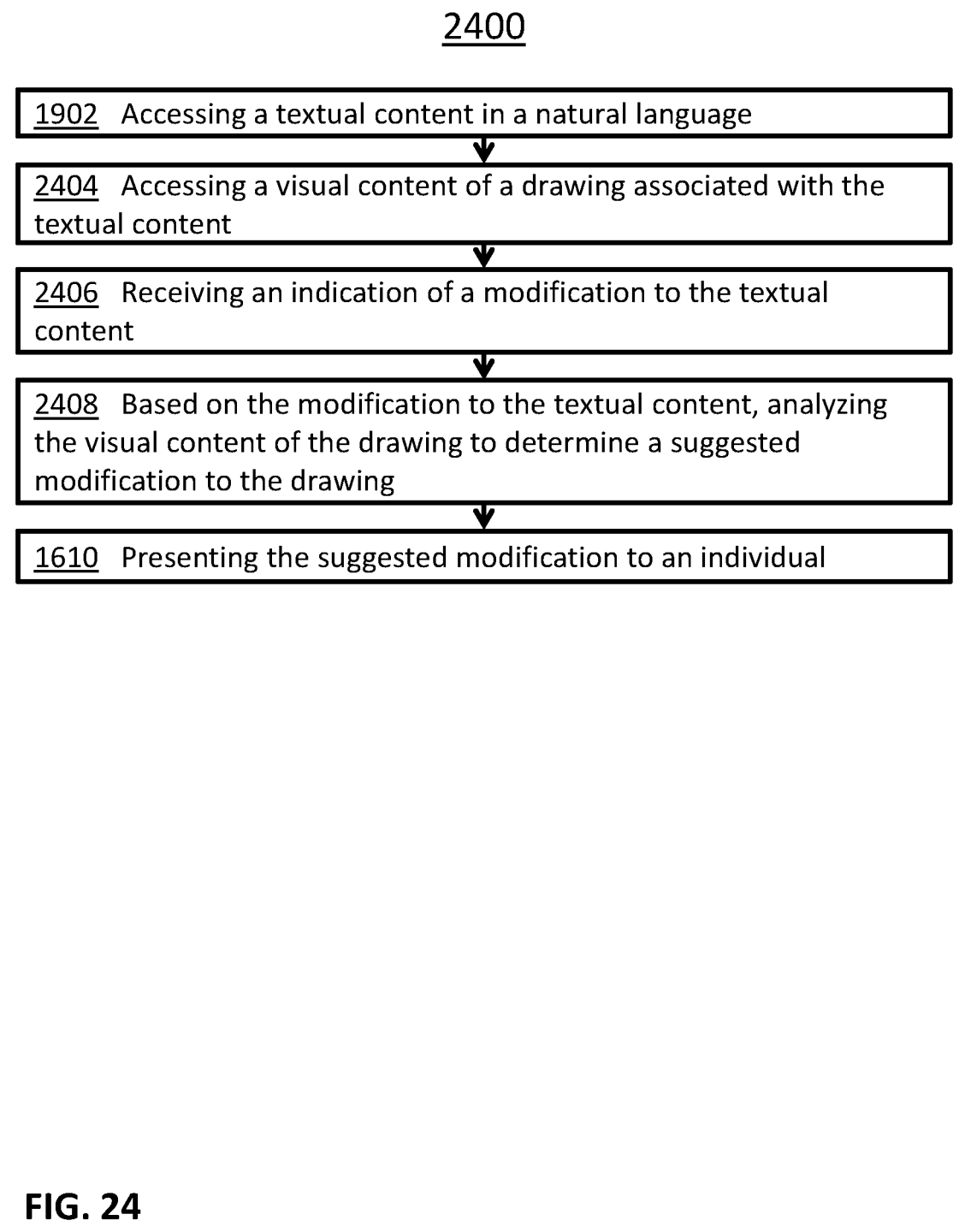

1902 Accessing a textual content in a natural language

2404 Accessing a visual content of a drawing associated with the textual content 2406 Receiving an indication of a modification to the textual content 2408 Based on the modification to the textual content, analyzing the visual content of the drawing to determine a suggested modification to the drawing 1610 Presenting the suggested modification to an individual

2502 Accessing a plurality of data records, each data record of the plurality of data records includes at least a numerical value 2504 Receiving from an individual a selection of a first group of at least one data record of the plurality of data records 2506 Receiving from the individual a textual input in a natural language 2508 Analyzing the selected first group of at least one data record and the textual input to select a second group of at least one data record of the plurality of data records 2510 Presenting an indication of the second group of at least one data record to the individual 2512 Analyzing the second group of at least one data record and the textual input to generate a textual output in the natural language 2514 Presenting the textual output to the individual

2502 Accessing a plurality of data records, each data record of the plurality of data records includes at least a numerical value 2604 Receiving from an individual a first textual input in a natural language 2606 Analyzing the first textual input to identify a particular data record of the plurality of data records 2608 Presenting an indication of the particular data record to the individual 2610 Based on the first textual input and on the particular data record, generating a first textual output in the natural language 2612 Presenting the first textual output to the individual 2614 After presenting the first textual output to the individual, receiving from the individual a second textual input in the natural language 2616 Analyzing the second textual input and the identified particular data record to cause a modification to the identified particular data record 2618 Generating a second textual output in the natural language, the second textual output refers to the modification to the identified particular data record 2620 Presenting the second textual output to the individual

2502 Accessing a plurality of data records, each data record of the plurality of data records includes at least a numerical value 2804 Presenting the plurality of data records to an individual in an initial visual format 2504 Receiving from the individual a selection of a first group of at least one data record of the plurality of data records 2604 Receiving from the individual a first textual input in a natural language 2810 Analyzing the first textual input to select a first visual format 2812 Receiving from the individual a second textual input in the natural language 2814 Analyzing the second textual input to select a second group of at least one data record of the plurality of data records 2816 Analyzing the second textual input to select a second visual format 2818 Altering the presentation of the plurality of data records, wherein in the altered presentation all data records of the first group are presented in the first visual format, all data records of the second group are presented in the second visual format, and all data records of a third group of at least one data record of the plurality of data records are presented in the initial visual format

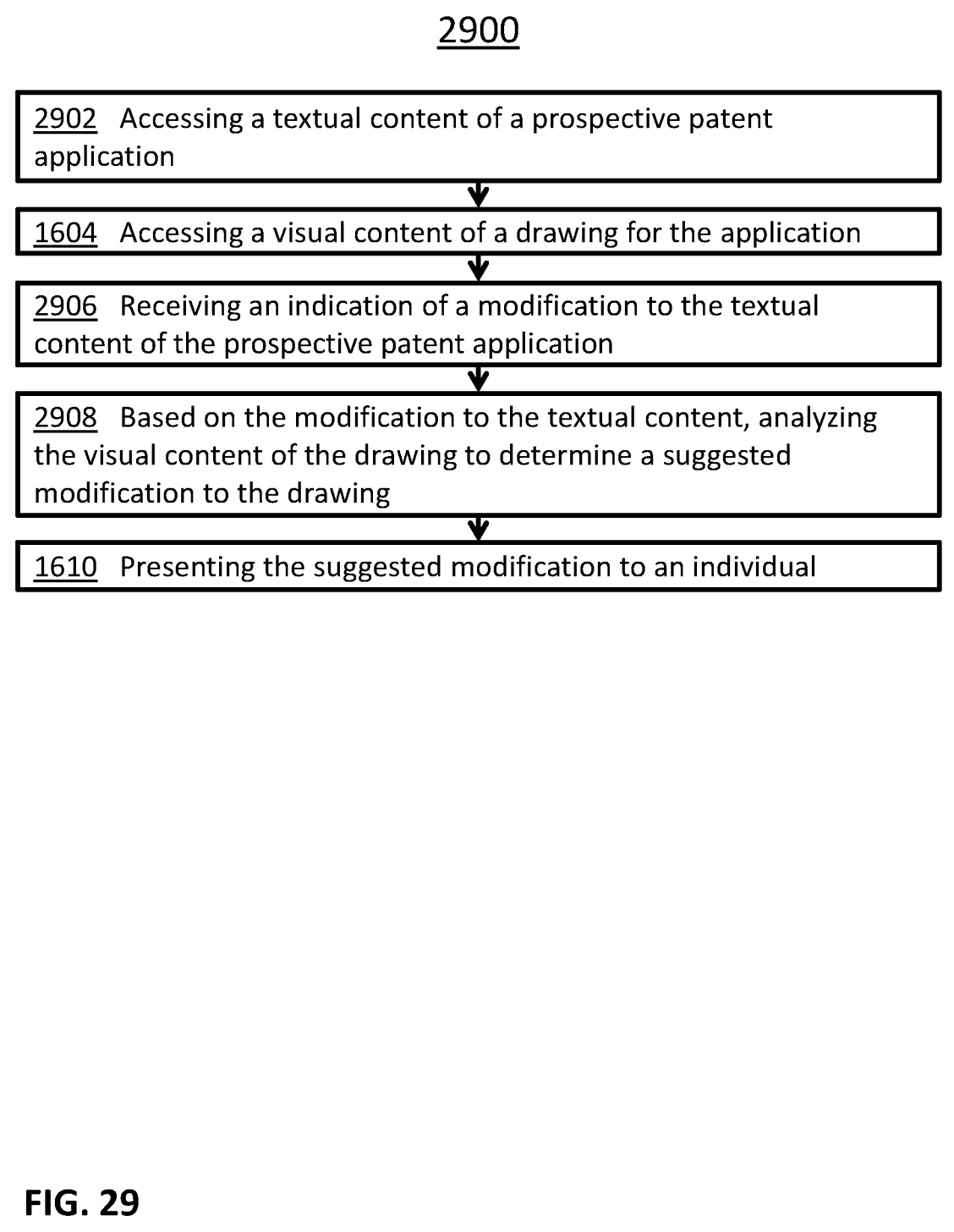

2902 Accessing a textual content of a prospective patent application

1604 Accessing a visual content of a drawing for the application

2906 Receiving an indication of a modification to the textual content of the prospective patent application 2908 Based on the modification to the textual content, analyzing the visual content of the drawing to determine a suggested modification to the drawing 1610 Presenting the suggested modification to an individual

FIG. 29

SYSTEMS AND METHODS FOR GENERATING GRAPHS

CROSS REFERENCES TO RELATED APPLICATIONS

This application claims the benefit of priority of U.S. Provisional Patent Application No. 63/458,055, filed on 2023 Apr. 7, U.S. Provisional Patent Application No. 63/458,851, filed on 2023 Apr. 12, U.S. Provisional Patent Application No. 63/461,310, filed on 2023 Apr. 23, U.S. Provisional Patent Application No. 63/467,844, filed on 2023 May 19, and U.S. Provisional Patent Application No. 63/525,608, filed on 2023 Jul. 7, the disclosures of which incorporated herein by reference in their entirety.

BACKGROUND

Technological Field

The disclosed embodiments generally relate to systems and methods for generating graphs. More particularly, the disclosed embodiments relate to systems and methods for generating graphs based on data records.

Background Information

Manual generation of textual content is time consuming, and the generation of high-quality textual content that meet certain requirements requires talent and expertise. As the amount of details that a human editor may consider at a single time is limited, maintaining high-quality when working on large textual contents in general, and on textual contents that are associated to other documents (such as drawings) may be challenging and error-prone.

SUMMARY

In some examples, systems, methods and non-transitory computer readable media for analyzing claims to generate dependent claims are provided. In some examples, a first textual content may be accessed. The first textual content may include a particular claim. The first textual content may be analyzed to generate a second textual content. The second textual content may include a draft of a dependent claim. The dependent claim may refer to and further limit the particular claim. Further, the second textual content may be presented to an individual. Further, a response from the individual may be received. Further, based on the received response, the draft of the dependent claim may be modified to thereby obtain a modified version of the second textual content. Further, the modified version of the second textual content may be presented to the individual.

In some examples, systems, methods and non-transitory computer readable media for modifying claims based on changes to other claims are provided. In some examples, a textual content of a first claim and a textual content of a second claim may be accessed. Further, an indication of a modification to the first claim may be received. In response to and based on the modification to the first claim, the second claim may be modified to obtain a modified version of the second claim. The modified version of the second claim may be presented to an individual.

In some examples, systems, methods and non-transitory computer readable media for analyzing product description to generate claims are provided. In some examples, a textual content may be accessed. The textual content may include a description of a product. The textual content may be analyzed to identify a group of features of the product. A subgroup of at least two but not all features in the group of features of the product may be selected. A draft of an independent claim for a prospective patent application may be generated. The draft of the independent claim may include at least one phrase not included in the textual content. For each feature in the subgroup, the draft of the independent claim may include at least one limitation based on the respective feature. The draft of the independent claim may be presented to an individual.

In some examples, systems, methods and non-transitory computer readable media for proposing amendments to claims based on office actions are provided. In some examples, a textual content of a pending claim of a pending patent application may be accessed. Further, a textual content of an office action associated with the pending patent application may be accessed. The textual content of the pending claim and the textual content of the office action may be analyzed to generate at least one conceivable amendment to the pending claim. The at least one conceivable amendment to the pending claim may be presented to an individual.

In some examples, systems, methods and non-transitory computer readable media for generating remarks based on amendments to claims are provided. In some examples, a textual content of a prospective amendment to a pending claim of a pending patent application may be accessed. Further, a textual content included in an office action associated with the pending patent application may be accessed. The textual content of the prospective amendment and the textual content included in the office action may be analyzed to select a portion of the textual content included in the office action. Further, the textual content of the prospective amendment may be analyzed to generate a textual content for at least one conceivable remark for inclusion in a prospective response to the office action. The at least one conceivable remark may include the selected portion of the textual content included in the office action. The generated at least one conceivable remark may be presented to an individual.

In some examples, systems, methods and non-transitory computer readable media for modifying description based on changes to claims are provided. In some examples, a textual content of a prospective claim of a prospective patent application may be accessed. Further, a textual content of a description section of the prospective patent application may be accessed. An indication of a modification to the prospective claim may be received. Based on the modification to the prospective claim, the textual content of the description section may be analyzed to select a portion of the description section associated with the modification to the prospective claim. A suggested modification to the selected portion of the description section may be determined based on the modification to the prospective claim. The suggested modification may be presented to an individual.

In some examples, systems, methods and non-transitory computer readable media for modifying description based on additions of claims are provided. In some examples, a textual content of a description section of a prospective patent application may be accessed. An indication of an addition of an additional claim to the prospective patent application may be received. The additional claim may be analyzed to determine a suggested addition to the description section. The suggested addition may be presented to an individual.

In some examples, systems, methods and non-transitory computer readable media for modifying description based on changes to drawings are provided. In some examples, a drawing for a prospective patent application may be accessed. Further, a textual content of a description section of the prospective patent application may be accessed. An indication of a modification to the drawing may be received. In response to and based on the modification to the drawing, the textual content of the description section may be analyzed to determine a suggested modification to the description section. The suggested modification may be presented to an individual.

In some examples, systems, methods and non-transitory computer readable media for modifying drawings based on changes to prospective patent applications. In some examples, a textual content of a prospective patent application may be accessed. Further, a visual content of a drawing for the prospective patent application may be accessed. Further, an indication of a modification to the textual content of the prospective patent application may be received. Based on the modification to the textual content, the visual content of the drawing may be analyzed to determine a suggested modification to the drawing. Further, the suggested modification may be presented to an individual.

In some examples, systems, methods and non-transitory computer readable media for modifying drawings based on changes to claims are provided. In some examples, a textual content of a prospective claim of a prospective patent application may be accessed. Further, a visual content of a drawing for the prospective patent application may be accessed. Further, an indication of a modification to the prospective claim may be received. Based on the modification to the prospective claim, the visual content of the drawing may be analyzed to determine a suggested modification to the drawing. Further, the suggested modification may be presented to an individual.

In some examples, systems, methods and non-transitory computer readable media for modifying drawings based on changes to descriptions are provided. In some examples, a textual content of a description section for a prospective patent application may be accessed. Further, a visual content of a drawing for the patent application may be accessed. An indication of a modification to the description section may be received. Based on the modification to the description section, the visual content of the drawing may be analyzed to determine a suggested modification to the drawing. Further, the suggested modification may be presented to an individual.

In some examples, systems, methods and non-transitory computer readable media for analyzing claims and product descriptions are provided. In some examples, a first textual content may be accessed. The first textual content may include a particular claim of a particular patent application. The first textual content may be analyzed to break the particular claim to a plurality of elements. Further, a second textual content may be accessed. The second textual content may include a description of a product. The first textual content and the second textual content may be analyzed to attempt to identify, for each element of the plurality of elements, an evidence of use corresponding to the respective element. Further, for each element of the plurality of elements, an indication of the respective element and an indication of whether the attempt to identify the evidence of use corresponding to the respective element was successful may be outputted.

In some examples, systems, methods and non-transitory computer readable media for maintaining consistency of textual contents are provided. In some examples, a textual content in a natural language may be accessed. Further, an indication of a modification to the textual content may be received. The modification to the textual content may include a modification to a first portion of the textual content and no modification to any other portion of the textual content. Further, the textual content may be analyzed to determine that the modification to the first portion caused an inconsistency between the modified first portion and a second portion of the textual content. Further, an indication of the inconsistency may be presented.

In some examples, systems, methods and non-transitory computer readable media for generating dialogs for narrative works of art are provided. In some examples, a trigger for generating a textual content of a dialog between a first character and a second character for a narrative work of art may be received. Further, contextual information associated with the dialog may be received. Further, first information associated with the first character may be received. Further, second information associated with the second character may be received. The contextual information and the first information may be analyzed to generate a first portion of the dialog associated with the first character. The contextual information, the second information and the first portion of the dialog may be analyzed to generate a second portion of the dialog associated with the second character. The contextual information, the first information, the first portion and the second portion may be analyzed to generate a third portion of the dialog associated with the first character.

In some examples, systems, methods and non-transitory computer readable media for generating text in a style of a persona for a narrative work of art are provided. In some examples, a trigger for generating a textual content in a style of a particular persona for a narrative work of art may be received. Further, style information indicative of the style of the particular persona may be received. Further, contextual information associated with the textual content may be received. Further, the contextual information and the style information may be analyzed to generate the textual content. Further, the generated textual content may be presented to an individual.

In some examples, systems, methods and non-transitory computer readable media for including foreshadowing in a narrative work of art are provided. In some examples, a textual content in a natural language may be accessed. Further, an indication of a particular thing may be received. Further, the textual content may be analyzed to select a location in the textual content for an advance hint of the particular thing. Further, the textual content may be modified to include the advance hint of the particular thing at the selected location. Further, the modified textual content may be presented.

In some examples, systems, methods and non-transitory computer readable media for facilitating visual formatting of text through natural language are provided. In some examples, a textual content in a natural language may be accessed. The textual content may be presented to an individual in an initial visual format. Further, a selection of a first portion of the textual content may be received from the individual. Further, a first textual input in the natural language may be received from the individual. The first textual input may be analyzed to select a first visual format. Further, a second textual input in the natural language may be received from the individual. The second textual input may be analyzed to select a second portion of the textual content. The second portion may include at least one word not included in the second textual input. The second textual input may include at least one word not included in the second portion. The second textual input may be analyzed to select a second visual format. Further, the presentation of the textual content may be altered. In the altered presentation, the first portion may be presented in the first visual format, the second portion may be presented in the second visual format, and a third portion of the textual content may be presented in the initial visual format.

In some examples, systems, methods and non-transitory computer readable media for modifying drawings based on changes to textual contents are provided. In some examples, a textual content in a natural language may be accessed. Further, a visual content of a drawing associated with the textual content may be accessed. An indication of a modification to the textual content may be received. Based on the modification to the textual content, the visual content of the drawing may be analyzed to determine a suggested modification to the drawing. The suggested modification may be presented to an individual.

In some examples, systems, methods and non-transitory computer readable media for analyzing, modifying and visualizing data through natural language are provided.

In some examples, systems, methods and non-transitory computer readable media for analyzing data records through natural language are provided. In some examples, a plurality of data records may be accessed. Each data record of the plurality of data records may include at least a respective numerical value. Further, a selection of a first group of at least one data record of the plurality of data records may be receive from an individual. Further, a textual input in a natural language may be received from the individual. The selected first group of at least one data record and the textual input may be analyzed to select a second group of at least one data record of the plurality of data records. An indication of the second group of at least one data record may be presented to the individual. Further, the second group of at least one data record and the textual input may be analyzed to generate a textual output in the natural language. Further, the textual output may be presented to the individual.

In some examples, systems, methods and non-transitory computer readable media for modifying data records through natural language are provided. In some examples, a plurality of data records may be accessed. Each data record of the plurality of data records may include at least a respective numerical value. Further, a first textual input in a natural language may be received from an individual. The first textual input may be analyzed to identify a particular data record of the plurality of data records. An indication of the particular data record may be presented to the individual. Based on the first textual input and on the particular data record, a first textual output in the natural language may be generated. The first textual output may be presented to the individual. After presenting the first textual output to the individual, a second textual input in the natural language may be received from the individual. The second textual input and the identified particular data record may be analyzed to cause a modification to the identified particular data record. Further, a second textual output in the natural language may be generated. The second textual output may refer to the modification to the identified particular data record. The second textual output may be presented to the individual.

In some examples, systems, methods and non-transitory computer readable media for facilitating generation of graphs based on data records through natural language are provided. In some examples, a plurality of data records may be accessed. Each data record of the plurality of data records may include at least a respective numerical value. A selection of a first group of at least one data record of the plurality of data records may be received from an individual. Further, a textual input in a natural language may be received from the individual. The textual input may be analyzed to select a second group of at least one data record of the plurality of data records. The textual input may be analyzed to select a type of graph. The first group of at least one data record and the second group of at least one data record may be used to generate a graph of the selected type of graph. The generated graph may be presented to the individual. An indication of the second group of at least one data record may be presented to the individual.

In some examples, systems, methods and non-transitory computer readable media for facilitating visual formatting of data records through natural language are provided. In some examples, a plurality of data records may be accessed. Each data record of the plurality of data records may include at least a respective numerical value. The plurality of data records may be presented to an individual in an initial visual format. Further, a selection of a first group of at least one data record of the plurality of data records may be received from the individual. Further, a first textual input in a natural language may be received from the individual. The first textual input may be analyzed to select a first visual format. Further, a second textual input in the natural language may be received from the individual. The second textual input may be analyzed to select a second group of at least one data record of the plurality of data records. The second textual input may be analyzed to select a second visual format. Further, the presentation of the plurality of data records may be altered. In the altered presentation, all data records of the first group may be presented in the first visual format, all data records of the second group may be presented in the second visual format, and all data records of a third group of at least one data record of the plurality of data records may be presented in the initial visual format.

BRIEF DESCRIPTION OF THE DRAWINGS

FIG. 3 is a block diagram illustrating an exemplary embodiment of a memory containing software modules, consistent with some embodiments of the present disclosure.

FIG. 4 is a flowchart of an exemplary method for analyzing claims to generate dependent claims, consistent with some embodiments of the present disclosure.

FIG. 5 is an illustration of example textual contents of claims and prompts, consistent with some embodiments of the present disclosure.

FIG. 6 is a flowchart of an exemplary method for modifying claims based on changes to other claims, consistent with some embodiments of the present disclosure.

FIG. 7 is an illustration of example textual contents of claims and modified claims, consistent with some embodiments of the present disclosure.

FIG. 8 is a flowchart of an exemplary method for analyzing product description to generate claims, consistent with some embodiments of the present disclosure.

FIG. 9 is a flowchart of an exemplary method for proposing amendments to claims based on office actions, consistent with some embodiments of the present disclosure.

FIG. 10 is a flowchart of an exemplary method for generating remarks based on amendments to claims, consistent with some embodiments of the present disclosure.

FIG. 11 is a flowchart of an exemplary method for modifying description based on changes to claims, consistent with some embodiments of the present disclosure.

FIG. 12 is a flowchart of an exemplary method for modifying description based on additions of claims, consistent with some embodiments of the present disclosure.

FIG. 13 is an illustration of example textual contents of claims, modified claims, description sections and modified description sections, consistent with some embodiments of the present disclosure.

FIG. 14 is a flowchart of an exemplary method for modifying description based on changes to drawings, consistent with some embodiments of the present disclosure.

FIG. 15 is an illustration of example visual content of a drawing, a visual content of a modified version of the drawing, a portion of a description section and a modified portion of the description section, consistent with some embodiments of the present disclosure.

FIG. 16 is a flowchart of an exemplary method for modifying drawings based on changes to claims, consistent with some embodiments of the present disclosure.

FIG. 17 is a flowchart of an exemplary method for modifying drawings based on changes to descriptions, consistent with some embodiments of the present disclosure.

FIG. 18 is a flowchart of an exemplary method for analyzing claims and product descriptions, consistent with some embodiments of the present disclosure.

FIG. 19 is a flowchart of an exemplary method for maintaining consistency of textual contents, consistent with some embodiments of the present disclosure.

FIG. 20 is a flowchart of an exemplary method for generating dialogs for narrative works of art, consistent with some embodiments of the present disclosure.

FIG. 21 is a flowchart of an exemplary method for generating text in a style of a persona for a narrative work of art, consistent with some embodiments of the present disclosure.

FIG. 22 is a flowchart of an exemplary method for including foreshadowing in a narrative work of art, consistent with some embodiments of the present disclosure.

FIG. 23 is a flowchart of an exemplary method for facilitating visual formatting of text through natural language, consistent with some embodiments of the present disclosure.

FIG. 24 is a flowchart of an exemplary method for modifying drawings based on changes to textual contents, consistent with some embodiments of the present disclosure.

FIG. 25 is a flowchart of an exemplary method for analyzing data records through natural language, consistent with some embodiments of the present disclosure.

FIG. 26 is a flowchart of an exemplary method for modifying data records through natural language, consistent with some embodiments of the present disclosure.

FIG. 27 is a flowchart of an exemplary method for facilitating generation of graphs based on data records through natural language, consistent with some embodiments of the present disclosure.

FIG. 28 is a flowchart of an exemplary method for facilitating visual formatting of data records through natural language, consistent with some embodiments of the present disclosure.

FIG. 29 is a flowchart of an exemplary method for modifying drawings based on changes to prospective patent applications, consistent with some embodiments of the present disclosure.

DESCRIPTION

Figure 1A:
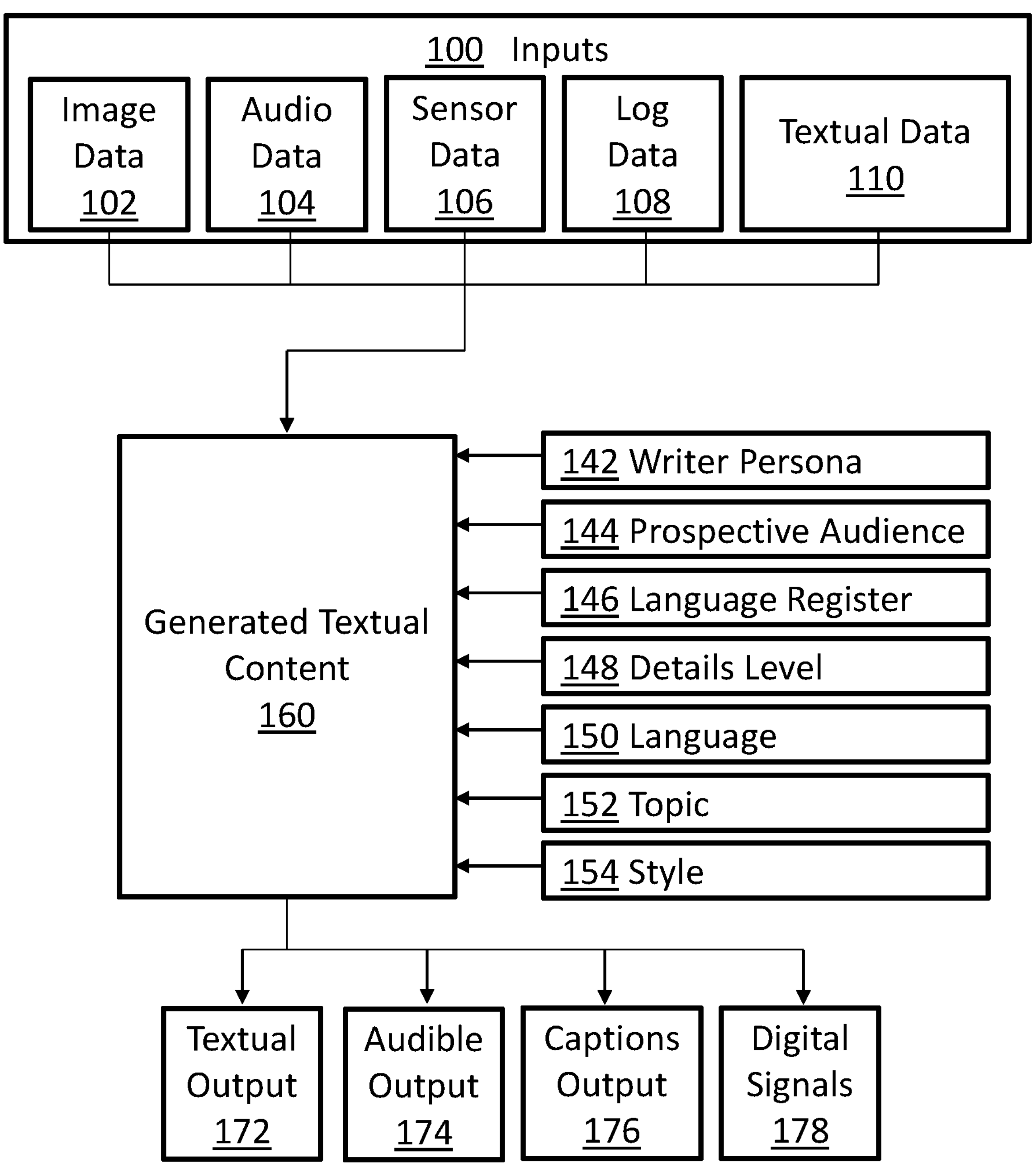
FIG. 1A is a block diagram illustrating some possible flows of information, consistent with some embodiments of the present disclosure.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", "presenting", "causing", "using", "basing", "halting" or the like, include action and/or processes of a computer that manipulate and/or transform data into other data, said data represented as physical quantities, for example such as electronic quantities, and/or said data representing the physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus, the appearance of the phrase "one case", "some cases", "other cases" or variants thereof does not necessarily refer to the same embodiment(s). As used herein, the term "and/or" includes any and all combinations of one or more of the associated listed items.

As used herein, the phrase "may not" means "might not". It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

In embodiments of the presently disclosed subject matter, one or more stages illustrated in the figures may be executed in a different order and/or one or more groups of stages may be executed simultaneously. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is a block diagram illustrating some possible flows of information consistent with some embodiments of the present disclosure. In this example, inputs 100 may comprise at least one of image data 102, audio data 104, sensor data 106, log data 108 or textual data 110. In other examples, the inputs 100 may include any other type of information. In one example, inputs 100 may comprise information encoded in a digital format and/or in a digital signal. Some non-limiting examples of image data 102 and of analysis of such image data are described below. Some non-limiting examples of audio data 104 and of analysis of such audio data are described below. In some examples, sensor data 106 may include any data or signals captured using a physical sensor from an environment. Some non-limiting examples of such sensors may include image sensors (such as image sensor 260), audio sensors (such as audio sensors 250), motion sensors (such as motion sensor 270), positioning sensors (such as positioning sensors 275), touch sensors, proximity sensors, chemical sensors, temperature sensors, barometers, and so forth. In some examples, log data 108 may include any information recording activities. Some non-limiting examples of such log data may include a digital log file, a hardcopy log file, a handwritten log, an audio log recorded using at least one audio sensor, a visual log or a video log recorded using at least one image sensor, and so forth. In one example, log data 108 may be generated by a computing device, such as apparatus 200, when a processor (such as processing unit 220) of the computing device executes instructions that causes the processor to perform operations for creating the log, and the log may include entries recording activities performed by the processor and/or activities observed by the computing device. In some examples, textual data 110 may include any textual information, such as textual content in natural language, source code, formatted text records, and so forth. For example, textual data 110 may include an encoding of textual content in digital format, an encoding of textual content in analog format, a hardcopy, and so forth. In the example of FIG. 1A, any one of inputs 100, alone or in combination, may be analyzed or otherwise used.

In some examples, an indication of a writer persona, such as writer persona 142, may be obtained. For example, the indication of the writer persona may include or enable access to information related to the writer persona. For example, information related to the writer persona may be read from memory (such as memory 210), may be received from an external computing device (for example, using a digital communication device), may be determined based on an analysis of historic contents (such as historic textual contents, historic patents, historic visual contents, historic auditory content, historic contents generated by the writer persona, historic contents liked by the writer persona, etc.) associated with the writer persona, may be received from an individual (for example, via a user interface), and so forth. For example, the information related to the writer persona may include at least a portion of historic contents associated with the writer persona, may include an indication of words and/or phrases associated with the writer persona (for example, words and/or phrases commonly used by the writer persona), may include an indication of symbols and/or analogs associated with the writer persona (for example, symbols and/or analogs commonly used by the writer persona), may include an indication of interest areas of the writer persona, may include an indication of a language register associated with the writer persona, may include an indication of one or more languages associated with the writer persona, may include an indication of a style (such as style 154, a writing style, a drawing style, etc.) associated with the writer persona, and so forth.

In some examples, an indication of a prospective audience, such as prospective audience 144, may be obtained. For example, the indication of the prospective audience may include or enable access to information related to the prospective audience. For example, information related to the prospective audience may be read from memory (such as memory 210), may be received from an external computing device (for example, using a digital communication device), may be determined based on an analysis of historic contents (such as historic textual contents, historic patents, historic visual contents, historic auditory content, etc.) associated with the prospective audience, may be received from an individual (for example, via a user interface), and so forth. For example, the information related to the prospective audience may include at least a portion of historic contents associated with the prospective audience (for example, historic contents consumed or liked by the prospective audience), may include an indication of words and/or phrases associated with the prospective audience (for example, words and/or phrases commonly heard or read by the prospective audience), may include an indication of one or more languages associated with the prospective audience, may include an indication of a style (such as style 154, a writing style, a drawing style, a style that the prospective audience is used to, a style that the prospective audience is susceptible to, etc.) associated with the prospective audience, and so forth.

In some examples, an indication of a language register, such as language register 146, may be obtained. For example, the indication of the language register may include or enable access to information related to the language register. For example, information related to the language register may be read from memory (such as memory 210), may be received from an external computing device (for example, using a digital communication device), may be determined based on an analysis of selected historic contents (such as historic textual contents, historic patents, historic auditory content, etc.), may be received from an individual (for example, via a user interface), and so forth. For example, the information related to the language register may include words associated with the language register, may include expressions or analogs associated with the language register, may include statistical information related to words and/or expressions, and so forth.

In some examples, an indication of a level of details, such as details level 148, may be obtained. For example, the indication of the level of details may be read from memory (such as memory 210), may be received from an external computing device (for example, using a digital communication device), may be determined based on an analysis of historic contents (such as historic textual contents, historic patents, historic visual contents, historic auditory content, etc.) associated with the level of details, may be received from an individual (for example, via a user interface), and so forth. For example, the indication of the level of details may be a discrete value (for example, 'high', 'medium', 'low', '4 out of 5') may be continuous (for example, a number in a continuous range of numbers), may include examples, and so forth.

In some examples, an indication of a language, such as language 150, may be obtained. For example, the indication of the language may be read from memory (such as memory 210), may be received from an external computing device (for example, using a digital communication device), may be determined based on an analysis of historic contents (such as historic textual contents, historic patents, historic auditory content, etc.), may be received from an individual (for example, via a user interface), and so forth. Some non-limiting examples of such indication of a language may include 'English-US', 'English-UK', 'Spanish', 'French', and so forth.

In some examples, an indication of a topic, such as topic 152, may be obtained. For example, the indication of the topic may include or enable access to information related to the topic. For example, information related to the topic may be read from memory (such as memory 210), may be received from an external computing device (for example, using a digital communication device), may be determined based on an analysis of historic contents (such as historic textual contents, historic patents, historic visual contents, historic auditory content, etc.) associated with the topic, may be received from an individual (for example, via a user interface), and so forth. For example, the information related to the topic may include at least a portion of historic contents associated with the topic, may include an indication of words and/or phrases associated with the topic (for example, words and/or phrases commonly used in contents associated with the topic), may include a language register corresponding to the topic (for example, using different language registers to report a funeral of a king and to share a joke about the king), may include an indication of a style (such as style 154, a writing style, a drawing style, etc.) corresponding with the topic, and so forth. In some examples, image data may be analyzed to determine an indication of the topic associated with the generated textual content. For example, a classification model may be used to classify the image data to a class of a plurality of alternative class, each alternative class may be associated with a topic, and thereby the topic may be determined from the classification. In some examples, audio data may be analyzed to determine an indication of the topic associated with the generated textual content. For example, a classification model may be used to classify the audio data to a class of a plurality of alternative class, each alternative class may be associated with a topic, and thereby the topic may be determined from the classification.

In some examples, an indication of a style, such as style 154, may be obtained. For example, the indication of the style may include or enable access to information related to the style. For example, information related to the style may be read from memory (such as memory 210), may be received from an external computing device (for example, using a digital communication device), may be determined based on an analysis of selected historic contents (such as historic textual contents, historic patents, historic visual contents, historic auditory content, etc.), may be received from an individual (for example, via a user interface), and so forth. For example, the information related to the style may include an indication of a language register (such as language register 146), may include an indication of a level of details (such as details level 148), may include an indication of a tendency to ramble, may include an indication of an affinity to specific topics, may include an indication of an affinity to specific sentence structures, may include statistical information related to lengths of sentences, and so forth. For example, style 154 may be a writing style, may be a drawing style, and so forth.

In some examples, language register 146, details level 148, language 150 or style 154 may be determined based on writer persona 142. For example, historic contents (such as historic textual contents, historic patents, historic visual contents, historic auditory content, etc.) associated with the writer persona may be analyzed, for example using a machine learning model, to determine the language register, level of details, language and/or style. The machine learning model may be a machine learning model trained using training examples to identify language registers, levels of details, languages and/or styles based on contents. An example of such training example may include a sample content, together with a label indicative of language register, level of details, language and/or style associated with the sample content. In some examples, information related to writer persona 142 may include an indication of language register, level of details, language and/or style, and the information may be obtained as described above. In some examples, language register 146, details level 148, language 150 or style 154 may be determined based on prospective audience 144. For example, historic contents (such as historic textual contents, historic patents, historic visual contents, historic auditory content, etc.) associated with the prospective audience may be analyzed, for example using said machine learning model, to determine the language register, level of details, language and/or style. In some examples, information related to prospective audience 144 may include an indication of language register, level of details, language and/or style, and the information may be obtained as described above.

In the example of FIG. 1A, any input of inputs 110, alone or in combination with other inputs and/or information, may be used to generate textual content (for example as described herein), and thereby obtaining generated textual content 160.

In some examples, the generation of textual content 160 may be further based on at least one of writer persona 142, prospective audience 144, language register 146, details level 148, language 150, topic 152 or style 154. In one example, textual content 160 may be generated in a style associated with writer persona 142, may include details that has high correlation with writer persona 142 (for example, are close to an interest area of writer persona 142), may include symbols or analogs that are common for writer persona 142, and so forth. In one example, textual content 160 may be generated in a style associated with prospective audience 144 (for example, a style that prospective audience 144 is used to, a style that prospective audience 144 is susceptible to, etc.), may include details that has high correlation with prospective audience 144 (for example, are of interest to prospective audience 144, etc.), may include symbols or analogs that prospective audience 144 is familiar with, and so forth. In one example, textual content 160 may be generated in language register 146, may include words associated with language register 146, may include expressions or analogs associated with language register 146, may be in style 154, and so forth. For example, language register 146 may be selected based on at least one of writer persona 142 or prospective audience 144. In one example, the amount and/or granularity of details included in generated textual content 160 may be determined based on details level 148. In one example, the language of generated textual content 160 may be selected based on language 150. In one example, which details to include in generated textual content 160 and which details to leave out of generated textual content 160 may be determined based on the affinity of the details to topic 152. In some examples, generated textual content 160 may include at least one of a text, a digital encoding of a text, or an analog encoding of the text. In some examples, a textual content (such as textual content 160) may be generated in a particular style. For example, in a particular style selected by an individual, in a particular style associated with a writer persona, in a particular style associated with a prospective audience, in a particular style selected based on input data, and so forth. For example, a style may include at least one of an affinity to usage of specific words and/or expressions, a length of sentences and/or paragraphs, a language register, a selection of topics, a degree of sarcasm, or a degree of humor. In one example, a particular generative model associated with the particular style may be selected of a plurality of alternative generative models, and the textual content may be generated using the particular generative model, thereby generating the textual content in the particular style. In another example, information associated with the style may be used as input to a generative model to cause the generative model to generate the textual content in the particular style.

In the example of FIG. 1A, one or more outputs may be provided based on generated textual content 160. For example, the one or more outputs may include at least one of textual output 172 including at least part of generated textual content 160, visual presentation of at least part of generated textual content 160, audible output 174 presenting at least part of generated textual content 160, captions output 176 presenting at least part of generated textual content 160 as captions over another media (such as an image or a video), or digital signals 178 encoding at least part of generated textual content 160.

Figure 1B:
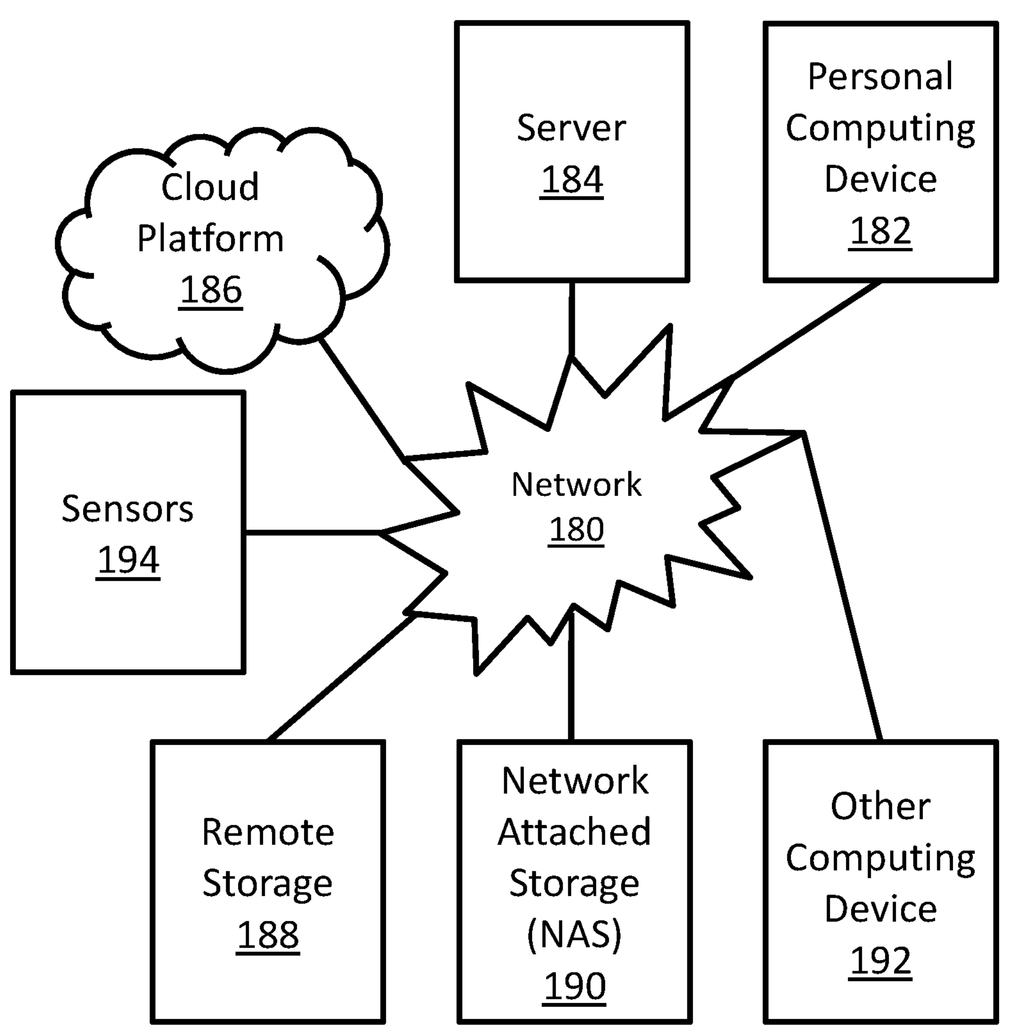
FIG. 1B is a block diagram illustrating a possible implementation of a communicating system, consistent with some embodiments of the present disclosure.

FIG. 1B is a block diagram illustrating a possible implementation of a communicating system consistent with some embodiments of the present disclosure. In this example, apparatuses may communicate using communication network 180 or directly with each other. Some non-limiting examples of such apparatuses may include at least one of personal computing device 182 (such as a mobile phone, smartphone, tablet, personal computer, smartwatch, etc.), server 184, cloud platform 186, remote storage 188 and network attached storage (NAS) 190, other computing devices 192, or sensors 194. Some non-limiting examples of communication network 180 may include digital communication network, analog communication network, the Internet, phone networks, cellular networks, satellite communication networks, private communication networks, virtual private networks (VPN), and so forth. FIG. 1B illustrates a possible implementations of a communication system. In some embodiments, other communication systems that enable communication between apparatuses may be used. Some non-limiting examples of sensors 194 may include at least one of a remote sensor, a sensor integrated in a computing device, image sensors (such as image sensor 260), audio sensors (such as audio sensors 250), motion sensors (such as motion sensor 270), positioning sensors (such as positioning sensors 275), touch sensors, proximity sensors, chemical sensors, temperature sensors, barometers, and so forth.

Figure 2A:
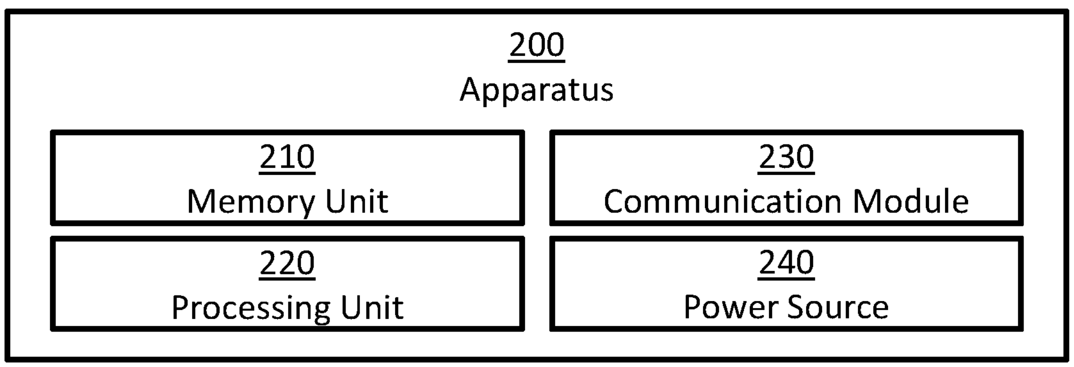
FIGS. 2A and 2B are block diagrams illustrating some possible implementations of an apparatus, consistent with some embodiments of the present disclosure.
Figure 2B:
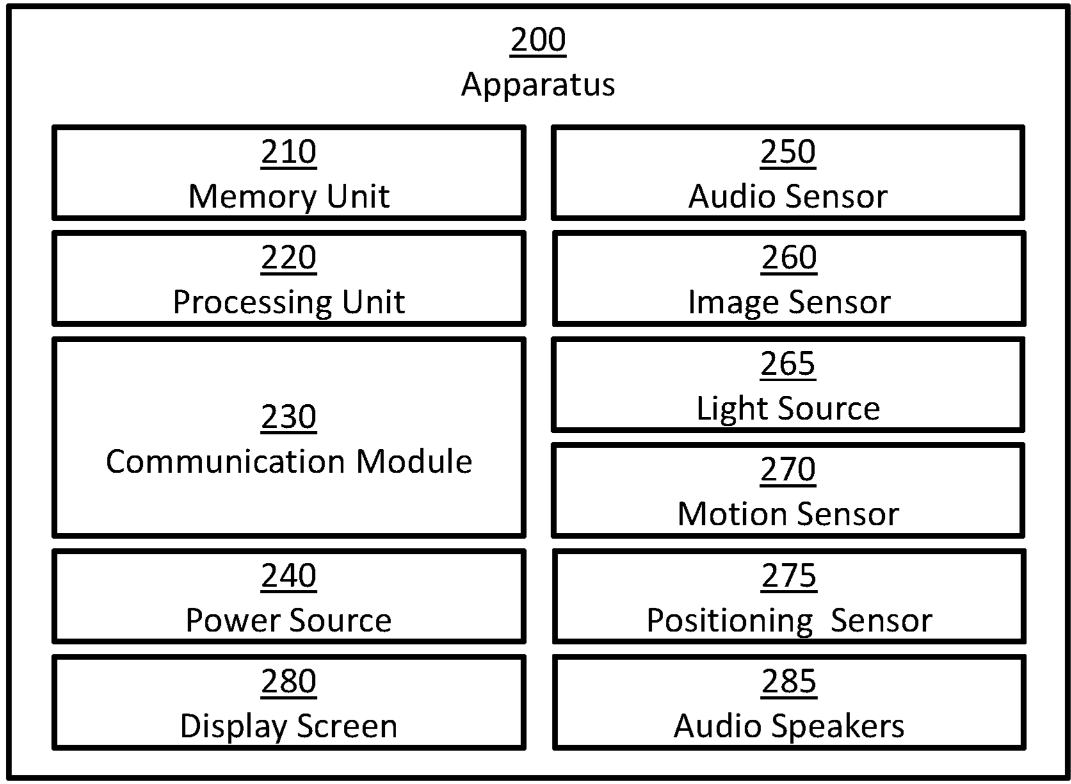

FIG. 2A is a block diagram illustrating a possible implementation of apparatus 200. In this example, apparatus 200 may comprise: one or more memory units 210, one or more processing units 220, and one or more image sensors 260. In some implementations, apparatus 200 may comprise additional components, while some components listed above may be excluded. FIG. 2B is a block diagram illustrating a possible implementation of apparatus 200. In this example, apparatus 200 may comprise: one or more memory units 210, one or more processing units 220, one or more communication modules 230, one or more power sources 240, one or more audio sensors 250, one or more image sensors 260, one or more light sources 265, one or more motion sensors 270, and one or more positioning sensors 275. In some implementations, apparatus 200 may comprise additional components, while some components listed above may be excluded. For example, in some implementations apparatus 200 may also comprise at least one of the following: one or more barometers; one or more user input devices; one or more output devices; and so forth. In another example, in some implementations at least one of the following may be excluded from apparatus 200: memory units 210, communication modules 230, power sources 240, audio sensors 250, image sensors 260, light sources 265, motion sensors 270, and positioning sensors 275. In some embodiments, apparatus 200 may be included and/or may be used as a personal computing device (such as personal computing device 182), a personal computer, a tablet, a mobile phone, a smartphone, a smartwatch, a computing device, a wearable computing device, a head-mounted computing device, a server (such as server 184), a computational node of a cloud platform (for example, of cloud platform 186), a router, a remote storage unit (such as remote storage 188), NAS (such as NAS 190), a sensor (such as sensors 194), and so forth.

In some embodiments, one or more power sources 240 may be configured to power apparatus 200. Possible implementation examples of power sources 240 may include: one or more electric batteries; one or more capacitors; one or more connections to external power sources; one or more power convertors; any combination of the above; and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible implementation examples of the processing units 220 may include: one or more single core processors, one or more multicore processors; one or more controllers; one or more application processors; one or more system on a chip processors; one or more central processing units; one or more graphical processing units; one or more neural processing units; any combination of the above; and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors 250; image sensors 260; motion sensors 270; positioning sensors 275; chemical sensors; temperature sensors; barometers; and so forth.

In some embodiments, the one or more audio sensors 250 may be configured to capture audio by converting sounds to digital information. Some examples of audio sensors 250 may include: microphones, unidirectional microphones, bidirectional microphones, cardioid microphones, omnidirectional microphones, onboard microphones, wired microphones, wireless microphones, any combination of the above, and so forth. In some examples, the captured audio may be stored in memory units 210. In some additional examples, the captured audio may be transmitted using communication modules 230, for example to other computerized devices. In some examples, processing units 220 may control the above processes. For example, processing units 220 may control at least one of: capturing of the audio; storing the captured audio; transmitting of the captured audio; and so forth. In some cases, the captured audio may be processed by processing units 220. For example, the captured audio may be compressed by processing units 220; possibly followed: by storing the compressed captured audio in memory units 210; by transmitted the compressed captured audio using communication modules 230; and so forth. In another example, the captured audio may be processed using speech recognition algorithms. In another example, the captured audio may be processed using speaker recognition algorithms.

In some embodiments, the one or more image sensors 260 may be configured to capture visual information by converting light to: images; sequence of images; videos; 3D images; sequence of 3D images; 3D videos; and so forth. In some examples, the captured visual information may be stored in memory units 210. In some additional examples, the captured visual information may be transmitted using communication modules 230, for example to other computerized devices. In some examples, processing units 220 may control the above processes. For example, processing units 220 may control at least one of: capturing of the visual information; storing the captured visual information; transmitting of the captured visual information; and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum. In some examples, image sensors 260 may capture light emitted by light sources 265, for example in order to capture 3D images and/or 3D videos using active stereo method.

In some embodiments, the one or more motion sensors 270 may be configured to perform at least one of the following: detect motion of objects in the environment of apparatus 200; measure the velocity of objects in the environment of apparatus 200; measure the acceleration of objects in the environment of apparatus 200; detect motion of apparatus 200; measure the velocity of apparatus 200; measure the acceleration of apparatus 200; and so forth. In some implementations, the one or more motion sensors 270 may comprise one or more accelerometers configured to detect changes in proper acceleration and/or to measure proper acceleration of apparatus 200. In some implementations, the one or more motion sensors 270 may comprise one or more gyroscopes configured to detect changes in the orientation of apparatus 200 and/or to measure information related to the orientation of apparatus 200. In some implementations, motion sensors 270 may be implemented using image sensors 260, for example by analyzing images captured by image sensors 260 to perform at least one of the following tasks: track objects in the environment of apparatus 200; detect moving objects in the environment of apparatus 200; measure the velocity of objects in the environment of apparatus 200; measure the acceleration of objects in the environment of apparatus 200; measure the velocity of apparatus 200, for example by calculating the egomotion of image sensors 260; measure the acceleration of apparatus 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of apparatus 200, to detect changes in the position of apparatus 200, and/or to measure the position of apparatus 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, the one or more chemical sensors may be configured to perform at least one of the following: measure chemical properties in the environment of apparatus 200; measure changes in the chemical properties in the environment of apparatus 200; detect the present of chemicals in the environment of apparatus 200; measure the concentration of chemicals in the environment of apparatus 200. Examples of such chemical properties may include: pH level, toxicity, temperature, and so forth. Examples of such chemicals may include: electrolytes, particular enzymes, particular hormones, particular proteins, smoke, carbon dioxide, carbon monoxide, oxygen, ozone, hydrogen, hydrogen sulfide, and so forth. In some examples, information captured using chemical sensors may be stored in memory units 210, may be processed by processing units 220, may be transmitted and/or received using communication modules 230, and so forth.

In some embodiments, the one or more temperature sensors may be configured to detect changes in the temperature of the environment of apparatus 200 and/or to measure the temperature of the environment of apparatus 200. In some examples, information captured using temperature sensors may be stored in memory units 210, may be processed by processing units 220, may be transmitted and/or received using communication modules 230, and so forth.

In some embodiments, the one or more barometers may be configured to detect changes in the atmospheric pressure in the environment of apparatus 200 and/or to measure the atmospheric pressure in the environment of apparatus 200. In some examples, information captured using the barometers may be stored in memory units 210, may be processed by processing units 220, may be transmitted and/or received using communication modules 230, and so forth.

In some embodiments, the one or more user input devices may be configured to allow one or more users to input information. In some examples, user input devices may comprise at least one of the following: a keyboard, a mouse, a touch pad, a touch screen, a joystick, a microphone, an image sensor, and so forth. In some examples, the user input may be in the form of at least one of: text, sounds, speech, hand gestures, body gestures, tactile information, and so forth. In some examples, the user input may be stored in memory units 210, may be processed by processing units 220, may be transmitted and/or received using communication modules 230, and so forth.

In some embodiments, the one or more user output devices may be configured to provide output information to one or more users. In some examples, such output information may comprise of at least one of: notifications, feedbacks, reports, and so forth. In some examples, user output devices may comprise at least one of: one or more audio output devices; one or more textual output devices; one or more visual output devices; one or more tactile output devices; and so forth. In some examples, the one or more audio output devices may be configured to output audio to a user, for example through: a headset, a set of speakers, and so forth. In some examples, the one or more visual output devices may be configured to output visual information to a user, for example through: a display screen, an augmented reality display system, a printer, a LED indicator, and so forth. In some examples, the one or more tactile output devices may be configured to output tactile feedbacks to a user, for example through vibrations, through motions, by applying forces, and so forth. In some examples, the output may be provided: in real time, offline, automatically, upon request, and so forth. In some examples, the output information may be read from memory units 210, may be provided by a software executed by processing units 220, may be transmitted and/or received using communication modules 230, and so forth.

FIG. 3 is a block diagram illustrating an exemplary embodiment of a memory 210 containing software modules. In this example, memory 210 contains software modules 302, 304, 306, 402, 404, 406, 408, 410, 412, 602, 604, 606, 608, 802, 804, 806, 808, 810, 902, 904, 906, 908, 1002, 1004, 1006, 1008, 1010, 1102, 1104, 1106, 1108, 1110, 1112, 1202, 1204, 1206, 1402, 1406, 1408, 1604, 1608, 1610, 1706, 1708, 1802, 1804, 1806, 1808, 1810, 1902, 1904, 1906, 1908, 1910, 1912, 2002, 2004, 2006, 2008, 2010, 2012, 2014, 2102, 2104, 2106, 2108, 2110, 2204, 2206, 2208, 2210, 2304, 2306, 2314, 2318, 2404, 2406, 2408, 2502, 2504, 2506, 2508, 2510, 2512, 2514, 2604, 2606, 2608, 2610, 2612, 2614, 2616, 2618, 2620, 2708, 2710, 2712, 2714, 2804, 2810, 2812, 2814, 2816, 2818, 2902, 2906 and/or 2908. In other examples, memory 210 may contain additional modules or fewer modules. The modules are described in more details below. In one example, at least one of these modules may include data and/or computer implementable instructions that when executed by at least one processor (such as processing units 220) may cause the at least one processor to perform operations for carrying out actions corresponding to at least one of these modules. Any one of these modules may be executed alone or in combination with other modules. In particular, any one of these modules may be used as a step in a method, for example as described below. Further, any step in the methods described below may be used independently of the method as a module. It is understood that herein any reference to a step may equally refer to a module and vice versa. In one example, a system may comprise at least one processing unit (such as processing units 220) configured to perform operations for carrying out actions corresponding to at least one of these modules.

In some examples, module 302 may comprise identifying a mathematical object in a particular mathematical space. The mathematical object may correspond to a specific word. In one example, the mathematical object may be determined based on the specific word. For example, a function or an injective function mapping words to mathematical object in the particular mathematical space may be used based on the specific word to obtain the mathematical object corresponding to the specific word. For example, a word2vec or a Global Vectors for Word Representation (GloVe) algorithm may be used to obtain the function. In another example, a word embedding algorithm may be used to obtain the function.

In some examples, module 304 may comprise calculating a function of two mathematical objects in a particular mathematical space to obtain a particular mathematical object in the particular mathematical space. In one example, module 304 may comprise calculating a function of a plurality of mathematical objects (such as two mathematical objects, three mathematical objects, four mathematical objects, more than four mathematical objects, etc.) in a particular mathematical space to obtain a particular mathematical object in the particular mathematical space. In one example, module 304 may comprise calculating a function of at least one mathematical object (such as a single mathematical object, two mathematical objects, three mathematical objects, four mathematical objects, more than four mathematical objects, etc.) in a particular mathematical space and/or at least one numerical value (such as a single numerical value, two numerical values, three numerical values, four numerical values, more than four numerical values, etc.) to obtain a particular mathematical object in the particular mathematical space. In one example, the particular mathematical object may correspond to a particular word. Some non-limiting examples of such function may include a linear function, a non-linear function, a polynomial function, an exponential function, a logarithmic function, a continuous function, a discontinuous function, and so forth. In one example, the particular word may be determined based on the particular mathematical object. For example, the injective function described in relation to module 302 may be used to determine the particular word corresponding to the particular mathematical object.

In some examples, module 306 may comprise identifying a mathematical object based on particular information. For example, the particular information may be or include a word, and module 306 may use module 302 to identify the mathematical object based on the word. In another example, the particular information may be or include the mathematical object, and module 306 may simply access the particular information to obtain the mathematical object. In yet another example, the particular information may be or include a numerical value, and module 306 may calculate a function of the numerical value to obtain the mathematical object. Some non-limiting examples of such function may include a linear function, a non-linear function, a polynomial function, an exponential function, a logarithmic function, a continuous function, a discontinuous function, and so forth. In some examples, the particular information may be or include at least one sentence in a natural language, and module 306 may use a text embedding algorithm to obtain the mathematical object. In some examples, module 306 may use a machine learning model to analyze the particular information to determine the mathematical object. The machine learning model may be a machine learning model trained using training examples to determine mathematical objects based on information. An example of such training example may include sample information, together with a label indicative of a mathematical object.

In some embodiments, a method (such as methods 400, 600, 800, 900, 1000, 1100, 1200, 1400, 1600, 1700, 1800, 1900, 2000, 2100, 2200, 2300, 2400, 2500, 2600, 2700, 2800 or 2900) may comprise of one or more steps. In some examples, these methods, as well as all individual steps therein, may be performed by various aspects of apparatus 200, of a computerized device, and so forth. For example, a system comprising of at least one processor, such as processing units 220, may perform any of these methods as well as all individual steps therein, for example by processing units 220 executing software instructions stored within memory units 210 to perform operations corresponding to the steps. In some examples, these methods, as well as all individual steps therein, may be performed by a dedicated hardware. In some examples, computer readable medium, such as a non-transitory computer readable medium, may store data and/or computer implementable instructions that when executed by at least one processor causes the at least one processor to perform operations for carrying out at least one of these methods as well as all individual steps therein and/or at least one of these steps. In some examples, a system may comprise at least one processing unit (such as processing units 220) configured to perform operations for carrying out at least one of these methods as well as all individual steps therein and/or at least one of these steps. Some non-limiting examples of possible execution manners of a method may include continuous execution (for example, returning to the beginning of the method once the method normal execution ends), periodically execution, executing the method at selected times, execution upon the detection of a trigger (some non-limiting examples of such trigger may include a trigger from a user, a trigger from another process, a trigger from an external computing device, etc.), and so forth.

In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and so forth. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by an process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs, for example in the cases described below. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, generative models may be configured to generate new content, such as textual content, visual content, auditory content, graphical content, and so forth. In some examples, generative models may generate new content without input. In other examples, generative models may generate new content based on an input. In one example, the new content may be fully determined from the input, where every usage of the generative model with the same input will produce the same new content. In another example, the new content may be associated with the input but not fully determined from the input, where every usage of the generative model with the same input may product a different new content that is associated with the input. In some examples, a generative model may be a result of training a machine learning generative algorithm with training examples. An example of such training example may include a sample input, together with a sample content associated with the sample input. Some non-limiting examples of such generative models may include Deep Generative Model (DGM), Generative Adversarial Network model (GAN), auto-regressive model, Variational AutoEncoder (VAE), transformers based generative model, artificial neural networks based generative model, hard-coded generative model, and so forth.

A Large Language Model (LLM) is a generative language model with a large number of parameters (usually billions or more) trained on large corpus of unlabeled data (usually trillions of words or more) in a self-supervised learning scheme and/or a semi-supervised learning scheme. While models trained using a supervised learning scheme with label data are fitted to the specific tasks they were trained for, LLM can handle wide range of tasks that the model was never specifically trained for, including ill-defined tasks. It is common to provide LLM with instructions in natural language, sometimes referred to as prompts. For example, to cause a LLM to count the number of people that objected to a proposed plan in a meeting, one might use the following prompt, 'Please read the meeting minutes. Of all the speakers in the meeting, please identify those who objected to the plan proposed by Mr. Smith at the beginning of the meeting. Please list their names, and count them.' Further, after receiving a response from the LLM, it is common to refine the task or to provide subsequent tasks in natural language. For example, 'Also count for each of these speakers the number of words said', 'Of these speakers, could you please identify who is the leader?' or 'Please summarize the main objections'. LLM may generate textual outputs in natural language, or in a desired structured format, such as a table or a formal language (such as a programming language, a digital file format, and so forth). In many cases, a LLM may be part of a multimodal model, allowing the model to analyze both textual inputs as well as other kind of inputs (such as images, videos, audio, sensor data, telemetries, and so forth) and/or to generate both textual outputs as well as other kinds of outputs (such as images, videos, audio, telemetries, and so forth).

Some non-limiting examples of audio data (such as audio data 104) may include audio recordings, audio stream, audio data that includes speech, audio data that includes music, audio data that includes ambient noise, digital audio data, analog audio data, digital audio signals, analog audio signals, mono audio data, stereo audio data, surround audio data, audio data captured using at least one audio sensor (such as audio sensor 250), audio data generated artificially, and so forth. In one example, audio data may be generated artificially from textual content, for example using text-to-speech algorithms. In another example, audio data may be generated using a generative machine learning model. In some embodiments, analyzing audio data (for example, by the methods, steps and modules described herein) may comprise analyzing the audio data to obtain a preprocessed audio data, and subsequently analyzing the audio data and/or the preprocessed audio data to obtain the desired outcome. One of ordinary skill in the art will recognize that the followings are examples, and that the audio data may be preprocessed using other kinds of preprocessing methods. In some examples, the audio data may be preprocessed by transforming the audio data using a transformation function to obtain a transformed audio data, and the preprocessed audio data may comprise the transformed audio data. For example, the transformation function may comprise a multiplication of a vectored time series representation of the audio data with a transformation matrix. For example, the transformation function may comprise convolutions, audio filters (such as low-pass filters, high-pass filters, band-pass filters, all-pass filters, etc.), linear functions, nonlinear functions, and so forth. In some examples, the audio data may be preprocessed by smoothing the audio data, for example using Gaussian convolution, using a median filter, and so forth. In some examples, the audio data may be preprocessed to obtain a different representation of the audio data. For example, the preprocessed audio data may comprise: a representation of at least part of the audio data in a frequency domain; a Discrete Fourier Transform of at least part of the audio data; a Discrete Wavelet Transform of at least part of the audio data; a time/frequency representation of at least part of the audio data; a spectrogram of at least part of the audio data; a log spectrogram of at least part of the audio data; a Mel-Frequency Spectrum of at least part of the audio data; a sonogram of at least part of the audio data; a periodogram of at least part of the audio data; a representation of at least part of the audio data in a lower dimension; a lossy representation of at least part of the audio data; a lossless representation of at least part of the audio data; a time order series of any of the above; any combination of the above; and so forth. In some examples, the audio data may be preprocessed to extract audio features from the audio data. Some non-limiting examples of such audio features may include: auto-correlation; number of zero crossings of the audio signal; number of zero crossings of the audio signal centroid; MP3 based features; rhythm patterns; rhythm histograms; spectral features, such as spectral centroid, spectral spread, spectral skewness, spectral kurtosis, spectral slope, spectral decrease, spectral roll-off, spectral variation, etc.; harmonic features, such as fundamental frequency, noisiness, inharmonicity, harmonic spectral deviation, harmonic spectral variation, tristimulus, etc.; statistical spectrum descriptors; wavelet features; higher level features; perceptual features, such as total loudness, specific loudness, relative specific loudness, sharpness, spread, etc.; energy features, such as total energy, harmonic part energy, noise part energy, etc.; temporal features; and so forth. In some examples, analyzing the audio data may include calculating at least one convolution of at least a portion of the audio data, and using the calculated at least one convolution to calculate at least one resulting value and/or to make determinations, identifications, recognitions, classifications, and so forth.

In some embodiments, analyzing audio data (for example, by the methods, steps and modules described herein) may comprise analyzing the audio data and/or the preprocessed audio data using one or more rules, functions, procedures, artificial neural networks, speech recognition algorithms, speaker recognition algorithms, speaker diarization algorithms, audio segmentation algorithms, noise cancelling algorithms, source separation algorithms, inference models, and so forth. Some non-limiting examples of such inference models may include: an inference model preprogrammed manually; a classification model; a data regression model; a result of training algorithms, such as machine learning algorithms and/or deep learning algorithms, on training examples, where the training examples may include examples of data instances, and in some cases, a data instance may be labeled with a corresponding desired label and/or result; and so forth.

Some non-limiting examples of image data (such as image data 102) may include one or more images, grayscale images, color images, series of images, 2D images, 3D images, videos, 2D videos, 3D videos, frames, footages, or data derived from other image data. In some embodiments, analyzing image data (for example by the methods, steps and modules described herein) may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

In some embodiments, analyzing image data (for example by the methods, steps and modules described herein) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two dimensional array of pixel values. In one example, calculating a convolution of an image may include calculating a two dimensional convolution on one or more components of the image. In another example, calculating a convolution of an image may include stacking arrays from different components to create a three dimensional array, and calculating a three dimensional convolution on the resulting three dimensional array. In some examples, a video may comprise one or more components (such as color components, depth component, etc.), and each component may include a three dimensional array of pixel values (with two spatial axes and one temporal axis). In one example, calculating a convolution of a video may include calculating a three dimensional convolution on one or more components of the video. In another example, calculating a convolution of a video may include stacking arrays from different components to create a four dimensional array, and calculating a four dimensional convolution on the resulting four dimensional array. In some examples, audio data may comprise one or more channels, and each channel may include a stream or a one-dimensional array of values. In one example, calculating a convolution of audio data may include calculating a one dimensional convolution on one or more channels of the audio data. In another example, calculating a convolution of audio data may include stacking arrays from different channels to create a two dimensional array, and calculating a two dimensional convolution on the resulting two dimensional array.

Some non-limiting examples of a mathematical object in a mathematical space may include a mathematical point in the mathematical space, a group of mathematical points in the mathematical space (such as a region, a manifold, a mathematical subspace, etc.), a mathematical shape in the mathematical space, a numerical value, a vector, a matrix, a tensor, a function, and so forth. Another non-limiting example of a mathematical object is a vector, wherein the dimension of the vector may be at least two (for example, exactly two, exactly three, more than three, and so forth). Some non-limiting examples of a phrase may include a phrase of at least two words, a phrase of at least three words, a phrase of at least five words, a phrase of more than ten words, and so forth.

In some examples, a word or a phrase may be selected based on inputs, for example as described above. Further, the selected word or the selected phrase may be added to a textual content, for example in the cases described below. In some examples, a function of at least part of the inputs (and/or of other inputs) may be calculated to select a non-negative integer n. Further, the selected word or the selected phrase may be added to the textual content between the n-th and the (n+1)-th words of the textual content. In some other examples, a machine learning model may be trained using training examples to add words and/or phrases to textual contents based on data. An example of such training example may include a sample data, a sample textual content, and a sample word and/or a sample phrase together with a sample modification to the sample textual content including an addition of the sample word and/or the sample phrase to the sample textual content. The trained machine learning model may be used to add the selected word or the selected phrase to the textual content based on the inputs.

It is understood that generating (or determining or the like) text and adding (or inserting, modifying to include, or the like) it to a textual content may be either done sequentially (first generating the text, and only then adding it to the textual content) or simultaneously (generating the text directly into the textual content). It is understood that a description of one is only provided as an example, and that in any case where the sequential implementation is described, the simultaneous is implied and may be equally used, and vice versa. It is understood that in all cases where two steps are described, first generating (or the like) and then adding (or the like), generating the text directly into the textual content is also disclosed. It is understood that in all cases where generating the text directly into the textual content is described, two steps (generating and then adding) is also disclosed.

FIG. 4 is a flowchart of an exemplary method 400 for analyzing data to generate a textual content reporting objects. In this example, method 400 may comprise accessing a first textual content (step 402), the first textual content may include a particular claim; analyzing the first textual content to generate a second textual content (step 404), the second textual content may include a draft of a dependent claim, the dependent claim may refer to and further limits the particular claim; presenting the second textual content to an individual (step 406); receiving a response from the individual (step 408); based on the received response, modifying the draft of the dependent claim to thereby obtain a modified version of the second textual content (step 410); and presenting the modified version of the second textual content to the individual (step 412). In other examples, method 400 may include additional steps or fewer steps. In other examples, one or more steps of method 400 may be executed in a different order and/or one or more groups of steps may be executed simultaneously. In one example, the particular claim may be an independent claim. In one example, the particular claim may be a dependent claim. In one example, the particular claim and/or the dependent claim may be claims of a prospective patent application. In one example, the particular claim may be a claim of a pending patent application, and the dependent claim may be a claim for a prospective amendment to the patent application.

In some examples, step 402 may comprise accessing a first textual content. The first textual content may include a particular claim. Some non-limiting examples of such particular claim may include an independent claim, a dependent claim, a method claim, an apparatus claim, a device claim, a system claim, an article claim, a composition claim, a non-transitory computer readable media claim, a product claim, a process claim, a use claim, 502, 504, 508, and so forth. In some examples, accessing the first textual content by step 402 may comprise reading the first textual content from memory, may comprise receiving the first textual content from an external computing device (for example, via a digital communication device), may comprise receiving the first textual content from a person (for example, via a user interface), may comprise accessing the first textual content in an electronic document, and so forth.

In some examples, step 404 may comprise analyzing a first textual content (such as a first textual content that includes a particular claim, the first textual content accessed by Step 402, etc.) to generate a second textual content. The second textual content may include a draft of a dependent claim. The dependent claim may refer to and further limits the particular claim. In some examples, analyzing the first textual content to generate the second textual content by Step 404 may comprise using a machine learning model to analyze the first textual content and generate the second textual content. For example, the machine learning model may be a machine learning model trained using training examples to generate dependent claims of other claims based on the other claims. An example of such training example may include a sample claim, together with a sample dependent claim that refers to and further limit the sample claim. In one example, the draft of the dependent claim generated by step 404 may be based on a position of at least one of a semicolon or a comma in the particular claim accessed by step 402. In one example, the draft of the dependent claim generated by step 404 may be based on whether a particular punctuation mark in the particular claim accessed by step 402 is a semicolon or a comma.

In some examples, step 404 may identify a first mathematical object in a particular mathematical space, wherein the first mathematical object may correspond to a first word in the particular claim, for example as using module 302. Further, step 404 may identify a second mathematical object in the particular mathematical space, wherein the second mathematical object may correspond to a second word in the particular claim, for example as using module 302. Further, step 404 may calculate a function of the first mathematical object and the second mathematical object to obtain a third mathematical object in the particular mathematical space, wherein the third mathematical object may correspond to a third word, and wherein the third word is not included in the particular claim, for example using module 304. Further, step 404 may include the third word in the draft of the dependent claim.

In some examples, step 404 may receive an indication of a particular style (such as style 154), for example as described above in relation to style 154. Further, step 404 may base the generation of the second textual content on the particular style. For example, step 404 may use a LLM to analyze a textual description of the style and the first textual content to generate the second textual content in the particular style.

In some examples, the particular claim accessed by step 402 may limit an element to be one of a plurality of alternatives. Further, step 404 may analyze the first textual content accessed by Step 402 to select a particular alternative of the plurality of alternatives. For example, the particular alternative may be selected randomly, may be selected based on the plurality of alternatives, and so forth. Further, the draft of the dependent claim generated by step 404 may limit the element to be the particular alternative.

In some examples, step 404 may access a third textual content. Further, step 404 may analyze the first textual content and the third textual content to generate the second textual content. In one example, the second textual content may include at least one word not included in any one of the first textual content or the third textual content. In one example, a machine learning model may be trained using training examples to generate dependent claims from other claims and other textual contents. An example of such training example may include a sample claim and a sample textual content, together with a sample dependent claim that further limits the sample claim. The trained machine learning model may be used to analyze the first textual content and the third textual content to generate the second textual content. In one example, the third textual content may include at least part of a text of a description section associated with a patent application associated with the particular claim. In another example, the third textual content may be a textual input in a natural language received from the individual. In yet another example, the particular claim accessed by step 402 may be a claim of a pending patent application, the dependent claim of step 404 may be a claim for a prospective amendment to the patent application, and the third textual content may include at least part of a text of an office action associated with the pending patent application.

In some examples, step 406 may comprise presenting the second textual content (generated by Step 404) to an individual. For example, presenting the second textual content to the individual by step 406 may comprise presenting the second textual content via a user interface, may comprise presenting the second textual content in an electronic document (for example, the same electronic document described above in relation to step 402), may comprise presenting the second textual content visually, may comprise presenting the second textual content audibly, may comprise presenting the second textual content textually, and so forth.

In some examples, step 408 may comprise receiving a response from an individual, for example receiving a response from the individual of step 406 to the presentation of step 406. For example, step 408 may receive the response from the individual via a user interface. Some non-limiting examples of such response may comprise a selection in a user interface, an input received using an input device (such as a keyboard, a pointing device, a touchpad, a microphone, a camera, etc.), via an electronic document (for example, the same electronic document described above in relation to step 406), a textual response, a speech command, a gesture, and so forth. In one example, the response may include an indication of a portion of the second textual content presented to the individual by step 406. In one example, the response may include edits to the second textual content presented to the individual by step 406. In one example, the response received from the individual by step 408 may include edits to the draft of the dependent claim using a user interface for text editing.

In some examples, step 410 may comprise, based on the response received by Step 408, modifying the draft of the dependent claim (generated by step 404) to thereby obtain a modified version of the second textual content. In one example, when the received response is a first response, the modified version of the second textual content is one version, and when the received response is a second response, the modified version of the second textual content is another version. In one example, step 410 may use a machine learning model to analyze the dependent claim generated by step 404 and the response received by Step 408 to generate the modified version of the second textual content. The machine learning model may be a machine learning model trained using training examples to modify dependent claims based on inputs. An example of such training example may include a sample draft of a sample dependent claim and a sample input, together with a sample modification to the sample draft of the sample dependent claim.

In some examples, step 410 may further comprise modifying the particular claim accessed by step 402 to account for the modification to the draft of the dependent claim, for example using step 606 or as described below in relation to method 600. For example, the modification to the draft of the dependent claim may include a replacement of a first noun with a second noun, and the modification to the particular claim may include replacement of the first noun with the second noun. In another example, the modification to the draft of the dependent claim may include an addition of a limitation originally included in the particular claim, and the modification to the particular claim may include removal of the limitation.

In some examples, the response received from the individual by Step 408 may include a textual input in a natural language received from the individual. The textual input may be indicative of a desire of the individual to modify the draft of the dependent claim. In one example, the modified version of the second textual content obtained by step 410 may include at least one word (or in other examples, at least three words, at least five words, at least ten words, etc.) not included in any one of the draft of the dependent claim, the particular claim or the textual input. In one example, the textual input may include an adjective (for example, 'restrictive' in 506), and step 410 may modify the draft of the dependent claim based on the adjective (for example, replacing the word 'user' in 504 with the word 'individual' in 508). In another example, the textual input may include a verb (for example, 'extend' in 506), and step 410 may modify the draft of the dependent claim based on the verb (for example, adding 'to enable the individual to modify the generated textual content' in 508). In some examples, step 410 may identify a first mathematical object in a particular mathematical space, wherein the first mathematical object may correspond to a word in the textual input, for example using module 302. Further, step 410 may identify a second mathematical object in the particular mathematical space, wherein the second mathematical object may correspond to a word in the draft of the dependent claim generated by step 404, for example using module 302. Further, step 410 may calculate a function of the first mathematical object and the second mathematical object to obtain a third mathematical object in the particular mathematical space, wherein the third mathematical object may correspond to a third word, for example using module 304. In one example, the third word is not included in any one of the draft of the dependent claim, the particular claim or the textual input. Further, step 410 may include the third word in the modified version of the second textual content.

In some examples, the draft of the dependent claim generated by step 404 may include a first limitation and a second limitation not included in the particular claim accessed by step 402. Further, the response received by step 408 may include a textual input in a natural language that indicates a desire of the individual to remove the second limitation. Further, the modified version of the second textual content obtained by step 410 may include the first limitation but not the second limitation.

In some examples, the draft of the dependent claim generated by step 404 may include a first limitation not included in the particular claim accessed by step 402. Further, the response received by step 408 may include a textual input in a natural language that indicates a desire of the individual to add a second limitation not included in any one of the particular claim of the draft of the dependent claim. Further, the modified version of the second textual content obtained by step 410 may include the first limitation and the second limitation.

In some examples, the draft of the dependent claim generated by step 404 may include at least two limitations not included the particular claim accessed by step 402. Further, the response received by step 408 may include a textual input in a natural language that indicates a desire of the individual to broaden the dependent claim. Further, a particular limitation of the at least two limitations may be selected. For example, the particular limitation may be selected randomly, may be selected based on an analysis of the textual input, may be selected based on the at least two limitations, and so forth. Further, step 410 may remove the particular limitation from the draft of the dependent claim while keeping all other limitations of the at least two limitations to obtain the modified version of the second textual content.

In some examples, the draft of the dependent claim generated by step 404 may include a particular limitation not included the particular claim accessed by step 402. Further, the response received by step 408 may include a textual input in a natural language that indicates a desire of the individual to narrow the dependent claim. Further, an additional limitation may be selected, wherein the additional limitation is not included in any one of the first textual content or the draft of the dependent claim. For example, the additional limitation may be selected may be selected randomly, may be selected based on an analysis of the textual input, may be selected based on priorities assigned to limitations, and so forth. Further, step 410 may add the additional limitation to the draft of the dependent claim while keeping the particular limitation to obtain the modified version of the second textual content.

In some examples, the draft of the dependent claim generated by step 404 may include a first limitation not included the particular claim accessed by step 402. Further, a draft of a second dependent claim may include a second limitation not included the particular claim accessed by step 402. Further, the response received by step 408 may include a textual input in a natural language that indicates a desire of the individual to merge the dependent claim and the second dependent claim. Further, step 410 may add the second limitation to the draft of the dependent claim while keeping the first limitation to obtain the modified version of the second textual content. In one example, the second dependent claim may refer to and further limit the particular claim. In one example, the second dependent claim may refer to and further limit the dependent claim.

In some examples, the draft of the dependent claim generated by step 404 may include a first limitation and a second limitation not included the particular claim accessed by step 402. Further, the response received by step 408 may include a textual input in a natural language that indicates a desire of the individual to split the dependent claim. Further, step 410 may remove the second limitation from the draft of the dependent claim while keeping the first limitation to obtain the modified version of the second textual content. Further, step 410 may generate a draft of a second dependent claim, wherein the draft of the second dependent claim may include the second limitation but not the first limitation. In one example, the second dependent claim may refer to and further limit the particular claim. In one example, the second dependent claim may refer to and further limit the dependent claim.

In some examples, the particular claim accessed by step 402 may include a noun. Further, step 404 may select a particular adjective based on the noun. The particular adjective may not be included in the first textual content. For example, step 404 may access a data-structure associating nouns with adjectives based on the noun to select the particular adjective. In another example, step 404 may analyze at least part of a text of a description section associated with a patent application associated with the particular claim to identify an adjective adjacent to the noun in the description section, thereby selecting the particular adjective. Further, step 404 may include the particular adjective and the noun in the draft of the dependent claim, wherein the particular adjective may be adjacent to the noun in the draft of the dependent claim. In some examples, the response received by step 408 may include a textual input in a natural language that indicates a desire of the individual to replace the particular adjective. Further, step 410 may select an alternative adjective based on the noun, wherein the alternative adjective may not be included in any one of the first textual content, the received response or the draft of the dependent claim. Further, step 410 may replace the particular adjective with the alternative adjective in the draft of the dependent claim to obtain the modified version of the second textual content.

In some examples, the particular claim accessed by step 402 may include a verb. Further, step 404 may select a particular adverb based on the verb. The particular adverb may not be included in the first textual content. For example, step 404 may access a data-structure associating verbs with adverbs based on the verb to select the particular adverb. In another example, step 404 may analyze at least part of a text of a description section associated with a patent application associated with the particular claim to identify an adverb adjacent to the verb in the description section, thereby selecting the particular adverb. Further, step 404 may include the particular adverb and the verb in the draft of the dependent claim, wherein the particular adverb may be adjacent to the verb in the draft of the dependent claim. In some examples, the response received by step 408 may include a textual input in a natural language that indicates a desire of the individual to replace the particular adverb. Further, step 410 may select an alternative adverb based on the verb, wherein the alternative adverb may not be included in any one of the first textual content, the received response or the draft of the dependent claim. Further, step 410 may replace the particular adverb with the alternative adverb in the draft of the dependent claim to obtain the modified version of the second textual content.

In some examples, the particular claim accessed by step 402 may refer to an object. Further, step 404 may select a particular configuration of a plurality of alternative configurations associated with the object. The particular claim may include no reference to the particular configuration. For example, step 404 may access a data-structure associating objects with alternative configurations based on the object to obtain the plurality of alternative configurations. In another example, step 404 may analyze at least part of a text of a description section associated with a patent application associated with the particular claim to obtain the plurality of alternative configurations. In one example, the particular configuration may be selected randomly, may be selected based on an analysis of the particular claim, and so forth. Further, step 404 may include a reference to the object and a reference to the particular configuration in the draft of the dependent claim. For example, the reference to the particular configuration may include text that specifies the particular configuration. In some examples, the response received by step 408 may include a textual input in a natural language that indicates a desire of the individual to replace the particular configuration. Further, step 410 may select an alternative configuration of the plurality of alternative configurations associated with the object, wherein the alternative configuration may differ from the particular configuration. In one example, the alternative configuration may be selected randomly, may be selected based on an analysis of the particular claim, may be selected based on an analysis of the textual input, may be selected based on the particular configuration, and so forth. Further, step 410 may replace the particular configuration with the alternative configuration in the draft of the dependent claim to obtain the modified version of the second textual content.

In some examples, the response received from the individual by step 408 may be indicative of a particular style (such as style 154). For example, the response may include a selection of a style from a plurality of alternative styles, for example using a user interface. In another example, the response may include textual input in a natural language indicative of the particular style, and the textual input may be analyzed to determine the particular style, for example using a LLM. Further, modifying the draft of the dependent claim by step 410 may include modifying a style of the draft to the particular style. For example, step 410 may use a LLM to analyze the second textual content generated by step 404 and the particular style and generate the modified version of the second textual content.

In some examples, step 412 may comprise presenting the modified version of the second textual content (obtained by step 410) to an individual (for example, to the individual of step 406 and/or step 408). For example, presenting the modified version of the second textual content to the individual may comprise presenting the modified version of the second textual content via a user interface, may comprise presenting the modified version of the second textual content in an electronic document (for example, the same electronic document described above in relation to step 402 and/or step 406 and/or step 408), may comprise presenting the modified version of the second textual content visually, may comprise presenting the modified version of the second textual content audibly, may comprise presenting the modified version of the second textual content textually, and so forth. In some examples, the presentation of the modified version of the second textual content by step 412 may enable the individual to edit the modified version of the second textual content.

FIG. 5 is an illustration of example textual contents of claims and prompts. 502 is an example of a claim. In one example, the textual content of the sample claim presented in figure item 502 may be accessed using 402. While the illustrated claim is an independent claim, it is appreciated that 502 may equally be a dependent claim. While the illustrated claim is a method claim, it is appreciated that 502 may equally be of any other category, such as apparatus, device, system, article, composition, non-transitory computer readable media, product, process, use, and so forth. 504 is an example draft of a dependent claim of the sample claim presented in figure item 502. In one example, draft 504 may be generated using 404, for example by analyzing the sample claim presented in figure item 502. In other examples, draft 506 may be received from an individual, may be accessed in a memory, may be received from an external computing device, and so forth. 506 is an example a textual input in a natural language indicative of a desire of an individual to modify draft 504. In this example, textual input 506 may be 'In claim 2, the word user seems somewhat restrictive. Let's use a more general word. Also, let's extend the interaction with the user.' In one example, textual input 506 may be received from the individual using 408. 508 is a second example draft of a dependent claim of the sample claim presented in figure item 502. In this example, draft 508 may be generated using 410 by altering draft 504 based on an analysis of textual input 506.

FIG. 6 is a flowchart of an exemplary method 600 for modifying claims based on changes to other claims. In this example, method 600 may comprise accessing a textual content of a first claim and a textual content of a second claim (step 602); receiving an indication of a modification to the first claim (step 604); in response to and based on the modification to the first claim, modifying the second claim to obtain a modified version of the second claim (step 606); and presenting the modified version of the second claim to an individual (step 608). In other examples, method 600 may include additional steps or fewer steps. In other examples, one or more steps of method 600 may be executed in a different order and/or one or more groups of steps may be executed simultaneously.

In some examples, step 602 may comprise accessing a textual content of a first claim and a textual content of a second claim. Some non-limiting examples of such claims may include an independent claim, a dependent claim, a method claim, an apparatus claim, a device claim, a system claim, an article claim, a composition claim, a non-transitory computer readable media claim, a product claim, a process claim, a use claim, 502, 504, 508, and so forth. In one example, the first claim and the second claim may be of a same category of claims. In another example, the first claim and the second claim may be of different categories of claims. In some examples, accessing the textual content of the first claim and/or the textual content of the second claim by step 602 may comprise reading at least part of the textual contents from memory, may comprise receiving at least part of the textual contents from an external computing device (for example, via a digital communication device), may comprise receiving at least part of the textual contents from a person (for example, via a user interface), may comprise accessing at least part of the textual contents in an electronic document, and so forth. In one example, the second claim may refer to and further limit the first claim. In one example, the first claim may refer to and further limit the second claim. In one example, both the first claim and the second claim may be independent claims. In one example, both the first claim and the second claim may be dependent claims (for example, both claims may refer and further limit a third claim). In one example, the first claim and the second claim may be claims of a prospective patent application. In one example, the first claim and the second claim may be claims of a pending patent application. Further, the modified first claim and the modified version of the second claim may be claims for a prospective amendment to the patent application.

In some examples, step 604 may comprise receiving an indication of a modification to the first claim of step 602. For example, receiving the indication by step 604 may comprise reading the indication from memory, may comprise receiving the indication from an external computing device (for example, via a digital communication device), may comprise receiving the indication from a person (for example, via a user interface), may comprise determining the indication by monitoring an electronic document that includes the first claim, and so forth. In one example, the modification to the first claim may be a modification made by the individual. In one example, the modification to the first claim may be a modification made using a machine learning model. In one example, the modification to the first claim may be a modification triggered by the individual. In one example, the modification to the first claim may be a modification triggered by a modification to a third claim. The third claim may differ from the first claim and the second claim.

In some examples, step 606 may comprise, in response to and based on the modification to the first claim, modifying the second claim to obtain a modified version of the second claim. In some examples, step 606 may comprise using a machine learning model to analyze the second claim and the modification to the first claim to generate the modified version of the second claim. For example, the machine learning model may be a machine learning model trained using training examples to generate modified versions of claims based on the claims and on modifications to other claims. An example of such training example may include a first sample claim and a sample modification to a second sample claim, together with a sample modified version of the second sample claim.

In some examples, step 606 may identify a first mathematical object, wherein the first mathematical object may correspond to a first word, and wherein the first word may be a word included in the modified first claim but not in the first claim, for example using module 302. Further, step 606 may identify a second mathematical object, wherein the second mathematical object may correspond to a second word, and wherein the second word may be included in the second claim, for example using module 302. Further, step 606 may calculate a function of the first mathematical object and the second mathematical object to obtain a third mathematical object, for example using module 304, wherein the third mathematical object may correspond to a third word, and wherein the third word is not included in any one of the first claim, the modified first claim or the second claim. Further, step 606 may add the third word to the second claim to obtain the modified version of the second claim. In one example, step 606 may determine the position in the second claim for the addition of the third word based on the first mathematical object and/or the second mathematical object. In one example, step 606 may determine the position in the second claim for the addition of the third word based on the third word and on a parts-of-speech analysis of the second claim.

In some examples, step 606 may access a particular textual content. Further, step 606 may further base the modification to the second claim on an analysis of the particular textual content. For example, a machine learning model may be trained using training examples to generate modified versions of claims based on the claims, on modifications to other claims and on other textual contents. An example of such training example may include a first sample claim, a sample modification to a second sample claim and a sample textual content, together with a sample modified version of the second sample claim. Step 606 may use the trained machine learning model to analyze the second claim, the modification to the first claim and the particular textual content to generate the modified version of the second claim. In one example, the particular textual content may include at least part of a text of a description section associated with a patent application associated with the particular claim. In one example, the particular textual content may be a textual content in a natural language received from the individual. In one example, the first claim and the second claim may be claims of a pending patent application. Further, the modified first claim and the modified version of the second claim may be claims for a prospective amendment to the patent application. Further, the particular textual content may include at least part of a text of an office action associated with the pending patent application.

In some examples, the modification to the first claim of step 604 may include a replacement of a first word in the first claim with a second word. The first word may be included in the second claim. Further, the modifying the second claim by step 606 may include replacing the first word in the second claim with the second word. In one example, the first word and the second word may be nouns. In one example, the first word and the second word may be verbs. In one example, the first word and the second word may be adjectives. In one example, the first word and the second word may be of the same part-of-speech. In one example, the first word and the second word may be of different parts-of-speech.

In some examples, the modification to the first claim of step 604 may include a replacement of a first word in the first claim with a second word. A third word may be included in the second claim. Further, step 606 may select a fourth word based on the second word and the third word. For example, a data-structure associating pairs of words with other words may be accessed based on the second word and the third word to select the fourth word. Further, the modifying the second claim by step 606 may include replacing the third word in the second claim with the fourth word. The third word may differ from the first word. The fourth word may differ from the second word. In one example, the third word and the second word may be the same word. In one example, the third word and the second word may be different words. In one example, the first word and the second word may be nouns, and the third word and the fourth word may be adjectives. In one example, the first word and the second word may be verbs, and the third word and the fourth word may be adverbs. In some examples, step 606 may use a machine learning model to select the fourth word based on the second word and the third word. The machine learning model may be a model trained using training examples to select words based on other words. An example of such training example may include a sample plurality of words, together with a label indicative of a sample selection of a word not included in the sample plurality. In some examples, step 606 may identify a first mathematical object in a particular mathematical space, wherein the first mathematical object may correspond to the first word, for example using module 302. Further, step 606 may identify a second mathematical object in the particular mathematical space, wherein the second mathematical object may correspond to the second word, for example using module 302. Further, step 606 may identify a third mathematical object in the particular mathematical space, wherein the third mathematical object may correspond to the third word, for example using module 302. Further, step 606 may calculate a function of the first mathematical object, the second mathematical object and the third mathematical object to obtain a fourth mathematical object in the particular mathematical space. Some non-limiting examples of such function may include a linear function, a non-linear function, a polynomial function, an exponential function, a logarithmic function, a continuous function, a discontinuous function, and so forth. Further, step 606 may select the fourth word based on the fourth mathematical object, for example as described above in relation to module 304.

In some examples, the modification to the first claim of step 604 may include an addition of a particular word to the first claim, wherein the particular word may also be included in the second claim. Further, the modifying the second claim by step 606 may include removing the particular word from the second claim. In some examples, the modification to the first claim of step 604 may include an addition of a particular phrase to the first claim. The particular phrase may also be included in the second claim. Further, the modifying the second claim by step 606 may include removing the particular phrase from the second claim.

In some examples, the modification to the first claim of step 604 may include an addition of a particular word to the first claim, wherein the particular word is not included in the second claim. Further, the modifying the second claim by step 606 may include adding the particular word to the second claim. In some examples, the modification to the first claim of step 604 may include an addition of a particular phrase to the first claim, wherein the particular phrase is not included in the second claim. Further, the modifying the second claim may include adding the particular phrase to the second claim.

In some examples, the modification to the first claim of step 604 may include an addition of a particular word to the first claim, wherein the particular word may also be included in the second claim. Further, the modifying the second claim by step 606 may include modifying the second claim to overcome an antecedent basis issue. In some examples, the modification to the first claim of step 604 may include an addition of a particular phrase to the first claim, wherein the particular phrase may also be included in the second claim.

Further, the modifying the second claim by step 606 may include modifying the second claim to overcome an antecedent basis issue.

In some examples, the modification to the first claim of step 604 may include a removal of a particular word from the first claim, wherein the particular word is not included in the second claim. Further, the modifying the second claim by step 606 may include adding the particular word to the second claim. In some examples, the modification to the first claim of step 604 may include a removal of a particular phrase from the first claim, wherein the particular phrase is not included in the second claim. Further, the modifying the second claim by step 606 may include adding the particular phrase to the second claim.

In some examples, the modification to the first claim of step 604 may include a removal of a particular word from the first claim, wherein the particular word may also be included in the second claim. Further, the modifying the second claim by step 606 may include removing the particular word from the second claim. In some examples, the modification to the first claim of step 604 may include a removal of a particular phrase from the first claim, wherein the particular phrase may also be included in the second claim. Further, the modifying the second claim by step 606 may include removing the particular phrase from the second claim.

In some examples, the modification to the first claim of step 604 may include a removal of a particular word from the first claim, wherein the particular word may also be included in the second claim. Further, the modifying the second claim may include modifying the second claim to overcome an antecedent basis issue. In some examples, the modification to the first claim of step 604 may include a removal of a particular phrase from the first claim, wherein the particular phrase may also be included in the second claim. Further, the modifying the second claim may include modifying the second claim to overcome an antecedent basis issue.

In some examples, the second claim may include a particular limitation. Further, the modification to the first claim of step 604 may include an addition of the particular limitation to the first claim. Further, the modifying the second claim by step 606 may include removing the particular limitation from the second claim.

In some examples, the modification to the first claim of step 604 may include a removal of the particular limitation from the first claim. Further, the modifying the second claim by step 606 may include adding the particular limitation to the second claim.

In some examples, the modification to the first claim of step 604 may include an addition of the particular limitation to the first claim. Further, the modifying the second claim by step 606 may include adding the particular limitation to the second claim.

In some examples, the modification to the first claim of step 604 may include a removal of the particular limitation from the first claim. Further, the modifying the second claim by step 606 may include removing the particular limitation from the second claim.

In some examples, the modification to the first claim of step 604 may include an addition of a noun to the first claim. Further, step 606 may select a particular adjective based on the noun. For example, step 606 may access a data-structure associating nouns with adjectives based on the noun to select the particular adjective. The particular adjective may not be included in the first claim. Further, the modifying the second claim by step 606 may include adding the particular adjective and the noun to the second claim, wherein the particular adjective may be adjacent to the noun in the modified version of the second claim.

In some examples, the modification to the first claim of step 604 may include an addition of a verb to the first claim. Further, step 606 may select a particular adverb based on the verb. For example, step 606 may access a data-structure associating verbs with adverbs based on the verb to select the particular adverb. The particular adverb may not be included in the first claim. Further, the modifying the second claim by step 606 may include adding the particular adverb and the verb to the second claim, and wherein the particular adverb may be adjacent to the verb in the modified version of the second claim.

In some examples, the modification to the first claim of step 604 may include an addition of a reference to an object to the first claim. Further, step 606 may select a particular configuration based on the object. For example, step 606 may access a data-structure associating objects with configurations based on the object to obtain the particular configuration. In another example, step 606 may analyze at least part of a text of a description section associated with a patent application associated with the first claim to obtain the particular configuration. Further, the modifying the second claim by step 606 may include adding a reference to the object and a reference to the particular configuration to the second claim. In one example, a reference to the object may include text that specifies the object. In one example, a reference to the particular configuration may include text that specifies the particular configuration.

In some examples, step 606 may receive an indication of a particular style (such as style 154), for example as described above in relation to style 154. Further, step 606 may base the modifying the second claim on the particular style. For example, step 606 may use a LLM to analyze a textual description of the style and the modification to the first claim to generate the modified version of the second claim in the particular style.

In some examples, step 608 may comprise presenting the modified version of the second claim obtained by step 606 to an individual. For example, presenting the modified version of the second claim to the individual may comprise presenting the modified version of the second claim via a user interface, may comprise presenting the modified version of the second claim in an electronic document (for example, the same electronic document described above in relation to step 602 and/or step 604), may comprise presenting the modified version of the second claim visually, may comprise presenting the modified version of the second claim audibly, may comprise presenting the modified version of the second claim textually, and so forth. In some examples, the presentation of the modified version of the second claim by step 608 may enable the individual to edit the modified version of the second claim.

FIG. 7 is an illustration of example textual contents of claims and modified claims. In some examples, the textual content of claim 2 in 702A and the textual content of claim 3 in 704A may be accessed by step 602. Further, an indication of a modification of to claim 2 to the textual content in 702B may be received by step 604. Further, in response to the modification of claim 2, step 606 may modify claim 3 to the modified version shown in 704B. In this example, in response to a replacement of the word 'user' with the word 'individual' in claim 2, step 606 replaced the word 'user' with the word 'individual' in claim 3. The modification to claim 2 may be a modification made by a person, made by an automatic process (for example, using method 400), and so forth. In some examples, the textual content of claim 3 in 704A and the textual content of claim 4 in 706A may be accessed by step 602. Further, claim 3 may be modified as described above, and an indication of a modification of to claim 3 to the textual content in 704B may be received by step 604. Further, in response to the modification of claim 3, step 606 may modify claim 4 to the modified version shown in 706B. In this example, in response to a replacement of the word 'user' with the word 'individual' in claim 3, step 606 replaced the word 'user' with the word 'individual' in claim 4. In some examples, the textual content of claim 2 in 702A and the textual content of claim 5 in 708A may be accessed by step 602. Further, an indication of a modification of to claim 2 to the textual content in 702B may be received by step 604. Further, in response to the modification of claim 2, step 606 may modify claim 5 to the modified version shown in 708B. In this example, in response to an addition to claim 2 of a limitation that was originally included in claim 5, step 606 removes the limitation from claim 5. Further in response to the modification of claim 2, step 606 adds additional subject matter to claim 5.

FIG. 8 is a flowchart of an exemplary method 800 for analyzing product description to generate claims. In this example, method 800 may comprise accessing a textual content (step 802), the textual content may include a description of a product; analyzing the textual content to identify a group of features of the product (step 804); selecting a subgroup of at least two but not all features in the group of features of the product (step 806); generating a draft of an independent claim for a prospective patent application (step 808), wherein the draft of the independent claim may include at least one phrase not included in the textual content, and wherein for each feature in the subgroup, the draft of the independent claim may include at least one limitation based on the respective feature; and presenting the draft of the independent claim to an individual (step 810). In other examples, method 800 may include additional steps or fewer steps. In other examples, one or more steps of method 800 may be executed in a different order and/or one or more groups of steps may be executed simultaneously. In some examples, the product may be a prospective product. In some examples, the product may be a product already built and/or sold.

In some examples, step 802 may comprise accessing a textual content. The textual content may include a description of a product. In some examples, accessing the textual content by step 802 may comprise reading the textual content from memory, may comprise receiving the textual content from an external computing device (for example, via a digital communication device), may comprise receiving the textual content from a person (for example, via a user interface), may comprise accessing the textual content in an electronic document, and so forth. In one example, the textual content accessed by step 802 may be at least part of a description section of the prospective patent application. In one example, the textual content accessed by step 802 may be at least part of a product requirements document associated with the product. In one example, the textual content accessed by step 802 may be at least part of a manual associated with the product. In one example, the textual content accessed by step 802 may be at least part of a marketing material associated with the product. In some examples, the prospective patent application may claim priority to, may be a continuation of, may be a continuation in part of, or may be a divisional of a particular patent application, and the textual content accessed by step 802 may be at least part of a description section of the particular patent application. In some examples, the textual content accessed by step 802 may be a textual content in a natural language. In some examples, the textual content accessed by step 802 may be a source code associated with the product.

In some examples, step 804 may comprise analyzing a textual content (such as the textual content accessed by step 802) to identify a group of features of a product (such as the product of step 802). In some examples, the analyzing the textual content by step 804 to identify the group of features of the product may include using a machine learning model to analyze the textual content to identify the group of features of the product. The machine learning model may be a machine learning model trained using training examples to identify features of products from descriptions of the products. An example of such training example may include a sample description of a sample product, together with a label indicative of a sample group of features of the sample product.

In some examples, step 806 may comprise selecting a subgroup of at least two but not all features in the group of features of the product identified by step 804. In some examples, the selecting the subgroup of at least two but not all features in the group of features of the product by step 806 may include using a machine learning model to select the subgroup of at least two but not all features in the group of features of the product. The machine learning model may be a machine learning model trained using training examples to select subgroups of groups of features. An example of such training example may include a sample group of sample features of a sample product, together with a sample selection of a subgroup of the sample group.

In some examples, for each feature in the group of features, an essentiality level for the respective feature may be determined. Further, step 806 may base the selection of the subgroup on the determined essentiality levels. For example, the subgroup selected by step 806 may include all features corresponding to an essentiality level higher than a selected threshold. In another example, the subgroup selected by step 806 may include a fixed number of features corresponding to the highest essentiality levels. In some examples, the textual content may be analyzed to determine the essentiality level for a particular feature of the group of features. For example, a machine learning model may be trained to determine essentiality levels for features based on textual contents. An example of such training example may include a sample textual content and a sample indication of a feature of a sample product, together with a sample essentiality level for the sample feature. The trained machine learning model may be used to analyze the textual content to determine the essentiality level for the particular feature.

In some examples, at least one prior art document may be accessed. For example, the at least one prior art document may be read from memory, may be accessed using an external computing device (for example, using a digital communication device), and so forth. Further, for each feature in the group of features, the at least one prior art document may be analyzed to determine a novelty level for the respective feature. Further, step 806 may base the selection of the subgroup on the determined novelty levels. For example, the subgroup selected by step 806 may include all features corresponding to a novelty level higher than a selected threshold. In another example, the subgroup selected by step 806 may include a fixed number of features corresponding to the highest novelty levels. In some examples, the analyzing the at least one prior art document to determine a novelty level for a particular feature may comprise analyzing the at least one prior art document using a machine learning model to determine the novelty level for the particular feature. The machine learning model may be a machine learning model trained using training examples to determine novelty levels for features based on prior art documents. An example of such training example may include sample prior art documents and a sample indication of a feature of a sample product, together with a sample novelty level for the sample feature. In some examples, the textual content accessed by step 802 may be analyzed to select the at least one prior art document of a plurality of alternative documents, wherein the plurality of alternative documents may include at least one document not included in the at least one prior art document. For example, the plurality of alternative documents may be a plurality of documents in an electronic repository of documents. In another example, the plurality of alternative documents may be a plurality of patent publications. In yet another example, the plurality of alternative documents may be a plurality of documents found using a web crawler. In one example, a machine learning model may be trained using training examples to select prior art documents of a plurality of alternative documents based on textual contents. An example of such training example may include a sample a plurality of alternative documents and a sample textual content, together with a label indicative of a sample selection of prior art documents of a plurality of alternative documents. The trained machine learning model may be used to analyze the textual content accessed by step 802 to select the at least one prior art document of the plurality of alternative documents.

In some examples, step 808 may comprise generating a draft of an independent claim for a prospective patent application. The draft of the independent claim may include at least one phrase not included in the textual content accessed by step 802. For each feature in the subgroup selected by step 806, the draft of the independent claim may include at least one limitation based on the respective feature. In some examples, generating the draft of the independent claim by step 806 may include using a machine learning model to generate the draft of the independent claim that includes the limitations based on the features in the subgroup. The machine learning model may be a machine learning model trained using training examples to generate independent claims based on selected features. An example of such training example may include a sample plurality of features of a sample product, together with a sample independent claim including a limitation for each feature of the sample plurality of features.

In some examples, step 808 may identify a first mathematical object in a particular mathematical space, wherein the first mathematical object may correspond to a first word in the textual content, for example using module 302. Further, step 808 may identify a second mathematical object in the particular mathematical space, wherein the second mathematical object may correspond to a second word in the textual content, for example using module 302. Further, step 808 may calculate a function of the first mathematical object and the second mathematical object to obtain a third mathematical object in the particular mathematical space, wherein the third mathematical object may correspond to a third word, and wherein the third word may not be included in the textual content, for example using module 304. Further, step 808 may include the third word in the draft of the independent claim.

In some examples, step 808 may receive an indication of a particular style (such as style 154), for example as described above in relation to style 154. Further, step 808 may base the generating the draft of the independent claim on the particular style. For example, step 808 may use a LLM to analyze a textual description of the style and a description (a textual description, a visual description, etc.) of each feature in the subgroup of at least two but not all features to generate the modified version of the second claim in the particular style.

In some examples, step 810 may comprise presenting the draft of the independent claim generated by step 808 to an individual. For example, presenting the draft to the individual may comprise presenting the draft via a user interface, may comprise presenting the draft in an electronic document, may comprise presenting the draft visually, may comprise presenting the draft audibly, may comprise presenting draft textually, and so forth. In some examples, the presentation of the draft by step 810 may enable the individual to modify the draft.

In some examples, a visual content associated with the product may be accessed. For example, the visual content may be read from memory, may be received from an external computing device (for example, via a digital communication device), may be captured using at least one image sensor, and so forth. For example, the visual content may include an image of the product and/or a video of the product and/or illustration of the product. In one example, the visual content may be an image, a video and/or an illustration of at least part of the product (for example, of at least part of an internal part of the product, of at least part of the exterior surface of the product, and so forth). In one example, the visual content may be an illustration of a usage procedure associated with the product. In one example, the visual content may be an illustration of assembly instructions associated with the product. In one example, the visual content may be a video depicting usage of the product. In some examples, step 804 may analyze the textual content and/or the visual content to identify the group of features of the product. For example, step 804 may use a multimodal model to analyze the textual content and/or the visual content to identify the group of features of the product. In one example, step 804 may use a machine learning model to analyze the textual content and/or the visual content to identify the group of features of the product. The machine learning model may be a machine learning model trained using training examples to identify features of products from images and/or textual description of products. An example of such training example may include a sample image of a sample product and/or a sample textual description of the sample product, together with a label indicative of sample features of the sample product.

In some examples, a visual content associated with the product may be accessed, for example as described above. Further, a first mathematical object in a particular mathematical space may be identified, wherein the first mathematical object may correspond to a particular word in the textual content, for example using module 302. Further, a convolution of at least part of the visual content may be calculated to determine a second mathematical object. Further, a function of the first mathematical object and the second mathematical object may be calculated to obtain a third mathematical object in the particular mathematical space, wherein the third mathematical object may correspond to a specific word, and wherein the specific word may not be included in the textual content, for example using module 304. Further, step 808 may include the specific word in the draft of the independent claim.

In some examples, a textual input in a natural language may be received from the individual. For example, the textual input may be read from memory, may be received via an external computing device (for example, via a digital communication device), may be received via a user interface, may be received using an input device (such as a keyboard, a touchscreen, a microphone and a speech recognition algorithm, etc.), and so forth. Step 804 may analyze the textual content and/or the textual input to identify the group of features of the product. For example, the product may have a plurality of different usages, the textual input may be indicative of a specific usage of the product, and step 804 may include in the group features associated with the specific usage while excluding from the group features associated with other usages of the product. In another example, the textual input may be indicative of an instruction from the individual. In one example, step 804 may use a machine learning model to analyze the textual content and/or the textual input to identify the group of features of the product. The machine learning model may be a machine learning model trained using training examples to identify features of products from textual description of products and/or textual inputs. An example of such training example may include a sample textual description of the sample product and/or a sample textual input, together with a label indicative of sample features of the sample product.

In some examples, a textual input in a natural language may be received from the individual, for example as described above. Further, a first mathematical object in a particular mathematical space may be identified, wherein the first mathematical object may correspond to a particular word in the textual content, for example using module 302. Further, a second mathematical object in the particular mathematical space may be identified, wherein the second mathematical object may correspond to a particular word in the textual input, for example using module 302. Further, a function of the first mathematical object and the second mathematical object may be calculated to obtain a third mathematical object in the particular mathematical space, wherein the third mathematical object may correspond to a specific word, and wherein the specific word may not be included in the textual content, for example using module 304. Further, step 808 may include the specific word in the draft of the independent claim.

In some examples, based on a particular feature of the group of features of the product identified by step 804, a specific feature not included in the group of features and not described in the textual content accessed by step 802 may be identified. Further, step 808 may include a limitation based on the specific feature in the draft of the independent claim. For example, the particular feature may be an object of a specific type, and the specific feature may include an object of a specific subtype of the specific type, wherein the specific subtype is not included in the textual content accessed by step 802. For example, a data-structure associating types with subtypes may be accessed based on the specific type to obtain the specific subtype. In this example, the limitation based on the specific feature may be a limitation of the object to be of the specific subtype. In one example, the particular feature may be 'the presentation of the textual content enables the individual to edit the textual content'. Based on the particular feature, other features that may not be described in the textual content accessed by step 802 may be identified, such as 'the presentation of the textual content enables the individual to edit the textual content using a keyboard' and 'the presentation of the textual content enables the individual to edit the textual content using voice commands', for example based on general association of text editing with at least one of a keyboard or voice commands. Further, an analysis of a prior art document may indicate that both 'the presentation of the textual content enables the individual to edit the textual content' and 'the presentation of the textual content enables the individual to edit the textual content using a keyboard' are not novel, but that 'the presentation of the textual content enables the individual to edit the textual content using voice commands' is novel. Further, the 'using voice commands' limitation may be included in the draft of the independent claim.

In some examples, a possible implementation detail of a particular feature of the group of features of the product may be determined, wherein the possible implementation detail may not be described in the textual content accessed by step 802. Further, step 808 may include a limitation based on the possible implementation detail in the draft of the independent claim. For example, the particular feature may be a specific capability of the product, and the possible implementation detail may include a possible specific implementation detail of the product that support the specific capability, wherein the specific implementation detail of the product is not described in the textual content accessed by step 802. For example, a data-structure associating capabilities with possible implementation details may be accessed based on the specific capability to obtain the specific implementation detail. In some examples, at least two alternative possible implementation details of a particular feature of the group of features of the product may be determined, wherein no one of the at least two alternative possible implementation details is described in the textual content accessed by step 802. For example, a data-structure associating features with possible implementation details may be accessed based on the particular feature to obtain the at least two alternative possible implementation details. Further, a particular implementation detail may be selected from the at least two alternative possible implementation details. Further, step 808 may include a limitation based on the particular implementation detail in the draft of the independent claim. In one example, the particular feature may be 'measuring pressure'. Based on the particular feature, possible implementation details that are not described in the textual content accessed by step 802, such as 'measuring pressure using a strain gauge' and 'measuring pressure using a piezoelectric sensor', for example based on general association of pressure measuring with different types of pressure measuring sensors. Further, an analysis of a prior art document may indicate that both 'measuring pressure' and 'measuring pressure using a strain gauge' are not novel, but that 'measuring pressure using a piezoelectric sensor' is novel. Further, the 'using a strain gauge' limitation may be included in the draft of the independent claim.

In some examples, a second subgroup of at least one but not all features in the group of features of the product identified by step 804 may be selected. The first subgroup selected by step 806 and the second subgroup may have no feature in common. Further, a draft of a dependent claim for the prospective patent application of step 808 may be generated. The dependent claim may refer to and further limit the independent claim generated by step 808. For each feature in the second subgroup, the draft of the dependent claim may include at least one limitation based on the respective feature. Further, the draft of the dependent claim may be presented to the individual. In some examples, selecting the second subgroup may include using a machine learning model to select the second subset, for example using the machine learning model described above in relation to step 806 with a set of all features included in the group of features of the product but not in the subset selected by step 806 instead of the group of features of the product. In some examples, generating the draft of the dependent claim may include using a machine learning model to generate the draft of the dependent claim that includes the limitations based on the features in the second subgroup, for example using the machine learning model described above in relation to step 808. In some examples, the draft of the dependent claim may be presented together with the draft of the independent claim generated by step 808. In some examples, presenting the draft of the dependent claim may include presenting the draft via a user interface, may comprise presenting the draft in an electronic document, may comprise presenting the draft visually, may comprise presenting the draft audibly, may comprise presenting draft textually, and so forth. In some examples, the presentation of the draft may enable the individual to modify the draft.

In one non-limiting example, the description of the product included in the textual content accessed by step 802 may be 'The Omna is a groundbreaking household appliance. Cleaning the floor, the windows the walls and the dishes, this is the last cleaning appliance you will ever need. The Omna's steam is so versatile, it can just clean anything. It telescopic tube can be selectively attached to different attachments. Use the nozzle attachment to clean your dishes. Use the brush attachment to clean rugs.' Further, step 804 may analyze this textual content to identify the following features, 'an appliance', 'telescopic tube', 'a nozzle selectively attached to the telescopic tube', 'a brush selectively attached to telescopic tube', 'cleaning floors', 'cleaning walls', 'cleaning windows', 'cleaning dishes', and 'cleaning rugs'. Further, step 806 may select the following features, 'named Omna', 'an appliance', 'cleaning floors', 'selectively attached to a nozzle', and 'selectively attached to a brush'. Further, step 808 may generate the following independent claim, 'An appliance for cleaning floors, comprising a telescopic tube selectively attached to at least one of a nozzle or a brush.' Further, step 810 may present this independent claim to an individual.

FIG. 9 is a flowchart of an exemplary method 900 for proposing amendments to claims based on office actions. In this example, method 900 may comprise accessing a textual content of a pending claim of a pending patent application (step 902); accessing a textual content of an office action associated with the pending patent application (step 904); analyzing the textual content of the pending claim and the textual content of the office action to generate at least one conceivable amendment to the pending claim (step 906); and presenting the at least one conceivable amendment to the pending claim to an individual (step 908). In other examples, method 900 may include additional steps or fewer steps. In other examples, one or more steps of method 900 may be executed in a different order and/or one or more groups of steps may be executed simultaneously.

In some examples, step 902 may comprise accessing a textual content of a pending claim of a pending patent application. In some examples, accessing the textual content by step 902 may comprise reading the textual content from memory, may comprise receiving the textual content from an external computing device (for example, via a digital communication device), may comprise receiving the textual content from a person (for example, via a user interface), may comprise accessing the textual content in an electronic document, and so forth.

In some examples, step 904 may comprise accessing a textual content of an office action associated with the pending patent application. In some examples, accessing the textual content by step 904 may comprise reading the textual content from memory, may comprise receiving the textual content from an external computing device (for example, via a digital communication device), may comprise receiving the textual content from a person (for example, via a user interface), may comprise accessing the textual content in an electronic document, and so forth.

In some examples, step 906 may comprise analyzing the textual content of the pending claim accessed by step 902 and the textual content of the office action accessed by step 904 to generate at least one conceivable amendment to the pending claim of step 902. In one example, the analyzing the textual content of the pending claim and the textual content of the office action to generate the at least one conceivable amendment to the pending claim by step 906 may comprise using a machine learning model to analyze the textual content of the pending claim and the textual content of the office action to generate the at least one conceivable amendment to the pending claim. The machine learning model may be a machine learning model trained using training examples to generate conceivable amendments to claims based on the claims and on office actions. An example of such training example may include a sample claim and a sample office action associated with the sample claim, together with sample conceivable amendment to the sample claim. In some examples, the pending claim may include a noun, and the at least one conceivable amendment may include and addition of an adjective adjacent to the noun. In some examples, the pending claim may include a verb, and the at least one conceivable amendment may include an addition of an adverb adjacent to the verb.

In some examples, step 906 may identify a first mathematical object in a particular mathematical space, wherein the first mathematical object may correspond to a specific word in the textual content of the pending claim, for example using module 302. Further, step 906 may identify a second mathematical object in the particular mathematical space, wherein the second mathematical object may correspond to a word in the textual content of the office action, for example using module 302. In some examples, step 906 may calculate a function of the first mathematical object and the second mathematical object to obtain a third mathematical object in the particular mathematical space, wherein the third mathematical object may correspond to a particular word, and wherein the particular word may not be included in any one of the pending claim or the office action, for example using module 904. Further, step 906 may include an addition of the particular word to the pending claim in the at least one conceivable amendment to the pending claim. In some examples, step 906 may select, based on the first mathematical object and the second mathematical object, a particular word from the textual content of the pending claim, wherein the particular word may differ from the specific word. Further, step 906 may include a deletion of the particular word from the pending claim in the at least one conceivable amendment to the pending claim. For example, a machine learning model may be trained using training examples to select words of sentences based on mathematical objects. An example of such training example may include a sample pair of mathematical objects and a sample sentence, together with a sample selection of words of the sample sentence. Step 906 may use the trained machine learning model to select the particular word from the textual content of the pending claim based on the first mathematical object and the second mathematical object. In another example, step 906 may calculate a function of the first mathematical object and the second mathematical object to obtain a non-negative integer value n, and may select the n-th word of the textual content of the pending claim as the particular word.

In some examples, step 906 may analyze the textual content of the office action accessed by step 904 to determine that the office action includes a rejection of the pending claim due to an antecedent basis issue. Further, step 906 may analyze the textual content of the pending claim accessed by step 902 to generate the at least one conceivable amendment to the pending claim, wherein the at least one conceivable amendment to the pending claim may overcome the antecedent basis issue. In some examples, a machine learning model may be trained using training examples to identify in office actions rejections of pending claims due to antecedent basis issues. An example of such training example may include a sample office action, together with a label indicating that the sample office action includes a rejection of a sample pending claim due to antecedent basis issue. Another example of such training example may include a sample office action, together with a label indicating that the sample office action includes no rejections due to antecedent basis issues. Step 906 may use the machine learning model to analyze the textual content of the office action accessed by step 904 to determine that the office action includes the rejection of the pending claim due to the antecedent basis issue. In some examples, a machine learning model may be trained using training examples to generate amendments to claims that overcomes antecedent basis issues. An example of such training example may include a sample claim with a sample antecedent basis issue, together with a sample amendment to the sample claim that overcomes the sample antecedent basis issue. Step 906 may use the trained machine learning model to analyze the textual content of the pending claim accessed by step 902 to generate the at least one conceivable amendment that overcomes the antecedent basis issue.

In some examples, step 906 may analyze the textual content of the office action accessed by step 904 to determine that the office action includes a rejection of the pending claim due to a typographical error. Further, step 906 may analyze the textual content of the pending claim accessed by step 902 to generate the at least one conceivable amendment to the pending claim, for example using a spell checker, wherein the at least one conceivable amendment to the pending claim may correct the typographical error. In some examples, a machine learning model may be trained using training examples to identify in office actions rejections of pending claims due to typographical errors. An example of such training example may include a sample office action, together with a label indicating that the sample office action includes a rejection of a sample pending claim due to a sample typographical error. Another example of such training example may include a sample office action, together with a label indicating that the sample office action includes no rejections due to typographical errors. Step 906 may use the machine learning model to analyze the textual content of the office action accessed by step 904 to determine that the office action includes the rejection of the pending claim due to the typographical error.

In some examples, step 906 may analyze the textual content of the office action accessed by step 904 to determine that the office action includes a rejection of the pending claim based on at least one prior art document. For example, a machine learning model may be trained using training examples to identify in office actions rejections of pending claims due to prior art documents and/or the prior art documents. An example of such training example may include a sample office action, together with a label indicating that the sample office action includes a rejection of a sample pending claim due to one or more sample prior art documents and/or a label indicating the one or more sample prior art documents. Another example of such training example may include a sample office action, together with a label indicating that the sample office action includes no rejections due to prior art documents. Step 906 may use the machine learning model to analyze the textual content of the office action accessed by step 904 to determine that the office action includes the rejection of the pending claim based on the at least one prior art document. Further, step 906 may access a textual content included in the at least one prior art document. For example, the textual content included in the at least one prior art document may be read from memory, may be accessed via an external computing device (for example, via a digital communication device), may be accessed in electronic documents, and so forth. Further, step 906 may analyze the textual content of the pending claim accessed by step 902 and the textual content included in the at least one prior art document to generate the at least one conceivable amendment to the pending claim, wherein the at least one conceivable amendment to the pending claim may distinguish the pending claim from the at least one prior art document. For example, the pending claim may include a particular object of a particular type, the at least one prior art document may describe objects of a first subtype of the particular type but fail to mention a second subtype of the particular type, and the at least one conceivable amendment generated by step 906 may limit the object to be of the second subtype. In another example, the pending claim may include a particular tool, the at least one prior art document may describe the particular tool but fail to mention a particular use of the tool, and the at least one conceivable amendment generated by step 906 may add a limitation based on the particular use to the pending claim. In some examples, step 906 may analyze the textual content of the pending claim, the textual content included in the at least one prior art document and a textual content included in a description section of the pending patent application to identify a feature described in the description section of the pending patent application and not described in the at least one prior art document. Further, step 906 may include an addition of a limitation corresponding to the identified feature in the at least one conceivable amendment to the pending claim.

In some examples, step 906 may analyze the textual content of the office action accessed by step 904 to determine that the office action includes an indication that a particular claim of the pending patent application includes an allowable subject matter, wherein the particular claim may refer to and further limit the pending claim. For example, a machine learning model may be trained using training examples to identify in office actions indications that claims includes allowable subject matter. An example of such training example may include a sample office action, together with a label indicating that the sample office action indicates that a sample claim includes a sample allowable subject matter. Step 906 may use the machine learning model to analyze the textual content of the office action accessed by step 904 to determine that the office action includes the indication that the particular claim of the pending patent application includes the allowable subject matter. Further, step 906 may analyze the textual content of the pending claim accessed by step 902 and a textual content of the particular claim to generate the at least one conceivable amendment to the pending claim, wherein the at least one conceivable amendment to the pending claim may add a limitation of the particular claim to the pending claim. For example, step 906 may use a template to integrate the limitation into the pending claim. In some examples, step 906 may further analyze the textual content of the particular claim to generate at least one conceivable amendment to the particular claim, wherein the at least one conceivable amendment to the particular claim may remove the limitation from the particular claim. Further, the at least one conceivable amendment to the particular claim may be presented to the individual. In some examples, method 900 may include canceling or withdrawing of the particular claim in a prospective response to the office action.

In some examples, step 906 may analyze the textual content of the pending claim, the textual content of the office action and a textual content of a description section of the pending patent application to select at least one phrase from the textual content of the description section of the pending patent application, wherein the selected at least one phrase is not included in any one of the pending claim or the office action. For example, a machine learning model may be trained using training examples to select phrases from descriptions based on pending claims, office actions and the descriptions. An example of such training example may include a sample claim, a sample office action and a sample description section, together with a label indicating a sample selection of phrases of the sample description section. Step 906 may use the trained machine learning model to analyze the textual content of the pending claim, the textual content of the office action and the textual content of the description section to select the at least one phrase from the textual content of the description section. In some examples, step 906 may include an addition of the selected at least one phrase in the at least one conceivable amendment to the pending claim.

In some examples, the pending claim of step 902 may include a noun. Further, step 906 may analyze a textual content of a description section of the pending patent application to identify an adjective associated with the noun in the description section of the pending patent application. Further, step 906 may include an addition of the identified adjective adjacent to the noun in the at least one conceivable amendment to the pending claim.

In some examples, the generation of the at least one conceivable amendment to the pending claim by step 906 may be further based on an analysis of a textual content of a second office action associated with the pending patent application, wherein the second office action may predate the office action of step 904. In one non-limiting example, the second office action may include an identical or similar rejection of the pending claim as the office action of step 904. The office action of step 904 may further include a response to an argument made after and/or in response to the second office action. Further, the at least one conceivable amendment may include a more aggressive amendment due to the stickiness of the rejection.

In some examples, the generation of the at least one conceivable amendment to the pending claim by step 906 may be further based on an analysis of a textual content of a particular amendment to the pending patent application, wherein the particular amendment may predate the office action. In one non-limiting example, the particular amendment to the pending patent application may include a particular amendment to the pending claim. The office action may further include a rejection that interprets the particular amendment in a particular way, and the at least one conceivable amendment may interprets the particular amendment in a different way.

In some examples, the pending claim of step 902 may include a verb. Further, step 906 may analyze a textual content of a description section of the pending patent application to identify an adverb associated with the verb in the description section of the pending patent application. Further, step 906 may include an addition of the identified adverb adjacent to the verb in the at least one conceivable amendment to the pending claim.

In some examples, a textual input in a natural language may be received from the individual, for example as described above. Further, step 906 may analyze the textual content of the pending claim, the textual content of the office action and the textual input to generate the at least one conceivable amendment to the pending claim, wherein the at least one conceivable amendment to the pending claim may include at least one word not included in any one of the pending claim, the office action or the textual input. For example, the textual input may be indicative of a desire of the individual to have an aggressive amendment, and in response step 906 may generate an aggressive amendment to the pending claim. In another example, the textual input may be indicative of a desire of the individual to have a minimal amendment, and in response step 906 may generate a minimal amendment to the pending claim. In yet another example, a first claim and a second claim of the pending patent application may each refer and further limit the pending claim. Further, the office action may indicate that the first claim includes a first allowable subject matter and that the second claim includes a second allowable subject matter. Further, the textual input may indicate that the individual prefers the first allowable subject matter over the second allowable subject matter. In response to the textual input, the at least one conceivable amendment may include an addition of the first allowable subject matter to the pending claim.

In some examples, step 906 may receive an indication of a particular style (such as style 154), for example as described above in relation to style 154. Further, step 906 may base the generation of the at least one conceivable amendment to the pending claim on the particular style. For example, step 906 may use a LLM to analyze a textual description of the style, the textual content of the pending claim and the textual content of the office action to generate the at least one conceivable amendment to the pending claim in the particular style.

In some examples, step 908 may comprise presenting to an individual the at least one conceivable amendment to the pending claim generated by step 906. For example, presenting the at least one conceivable amendment to the individual may comprise presenting the at least one conceivable amendment via a user interface, may comprise presenting the at least one conceivable amendment in an electronic document, may comprise presenting the at least one conceivable amendment visually, may comprise presenting the at least one conceivable amendment audibly, may comprise presenting the at least one conceivable amendment textually, and so forth. In some examples, the presentation of the at least one conceivable amendment by step 908 may enable the individual to modify the at least one conceivable amendment. In some examples, the presentation of the at least one conceivable amendment by step 908 may enable the individual to reject the at least one conceivable amendment. In some examples, the at least one conceivable amendment may be the at least two conceivable amendments, the presentation of the at least two conceivable amendments by step 908 may enable the individual to select a particular conceivable amendment of the at least two conceivable amendments.

In some examples, step 906 may further generate, based on the at least one conceivable amendment to the pending claim, at least one conceivable amendment to a second pending claim, for example using method 600. The second pending claim may refer to and further limit the pending claim. Further, the at least one conceivable amendment to the second pending claim may be presented to the individual. For example, step 908 may present the at least one conceivable amendment to the second pending claim simultaneously with the presentation of the at least one conceivable amendment to the pending claim generated by step 906.

In some examples, after step 908 presents the at least one conceivable amendment to the pending claim, a response may be received from the individual, for example as described above in relation to step 408. Further, based on the received response, the at least one conceivable amendment may be modified to thereby obtain a modified version of the at least one conceivable amendment, for example as described above in relation to step 410. Further, the modified version of the at least one conceivable amendment may be presented to the individual, for example as described above in relation to step 908 and/or to step 412.

In some examples, a textual content of a description section of the pending patent application of method 900 may be analyzed to identify a portion of the description section of the pending patent application associated with the at least one conceivable amendment to the pending claim generated by step 906. For example, the identified portion of the description section may include support for the at least one conceivable amendment. In another example, the identified portion of the description section may include a definition or a reference to a term added to the pending claim by the at least one conceivable amendment. In one example, a machine learning model may be trained using training examples to identify portions of description sections associated with amendments. An example of such training example may include a sample amendment and a sample description section, together with a label indicative of a portion of the sample description section associated with the sample amendment. The trained machine learning model may be used to analyze the textual content of the description section of the pending patent application to identify the portion of the description section of the pending patent application associated with the at least one conceivable amendment to the pending claim generated by step 906. In some examples, an indication of the identified portion of the description section of the pending patent application may be presented to the individual. For example, the presented indication may include a page number and/or an indication of a column and/or a paragraph number and/or a line number indicative of the identified portion. In another example, the presented indication may include a citation of text included in the identified portion. In yet another example, the presented indication may include a graphical indication of the portion in a presentation of the description section (or a graphical indication of the portion in a presentation of a larger part of the description section that includes the identified portion).

In some examples, based on the at least one conceivable amendment to the pending claim (generated by step 906), a textual content for at least one conceivable remark for inclusion in a prospective response to the office action may be generated. For example, a LLM may be used to read the at least one conceivable amendment to the pending claim and generate the textual content for at least one conceivable remark. Further, the at least one conceivable remark may be presented to the individual. For example, the at least one conceivable remark may be presented in a draft of the prospective response to the office action. In another example, the presentation of the at least one conceivable remark may enable the individual to reject the at least one conceivable remark. In yet another example, the presentation of the at least one conceivable remark may enable the individual to alter the at least one conceivable remark.

FIG. 10 is a flowchart of an exemplary method 1000 for generating remarks based on amendments to claims. In this example, method 1000 may comprise accessing a textual content of a prospective amendment to a pending claim of a pending patent application (step 1002); accessing a textual content included in an office action associated with the pending patent application (step 1004); analyzing the textual content of the prospective amendment and the textual content included in the office action to select a portion of the textual content included in the office action (step 1006); analyzing the textual content of the prospective amendment to generate a textual content for at least one conceivable remark for inclusion in a prospective response to the office action, the at least one conceivable remark includes the selected portion of the textual content included in the office action (step 1008); and presenting the generated at least one conceivable remark to an individual (step 1010). In other examples, method 1000 may include additional steps or fewer steps. In other examples, one or more steps of method 1000 may be executed in a different order and/or one or more groups of steps may be executed simultaneously.

In some examples, step 1002 may comprise accessing a textual content of a prospective amendment to a pending claim of a pending patent application. In some examples, accessing the textual content by step 1002 may comprise reading the textual content from memory, may comprise receiving the textual content from an external computing device (for example, via a digital communication device), may comprise receiving the textual content from a person (for example, via a user interface), may comprise accessing the textual content in an electronic document, and so forth.

In some examples, step 1004 may comprise accessing a textual content included in an office action associated with the pending patent application. In some examples, accessing the textual content by step 1002 may comprise reading the textual content from memory, may comprise receiving the textual content from an external computing device (for example, via a digital communication device), may comprise receiving the textual content from a person (for example, via a user interface), may comprise accessing the textual content in an electronic document, and so forth.

In some examples, step 1006 may comprise analyzing the textual content of the prospective amendment (accessed by step 1002) and the textual content included in the office action (accessed by step 1004) to select a portion of the textual content included in the office action. In some examples, the analyzing the textual content of the prospective amendment and the textual content included in the office action to select the portion of the textual content included in the office action by step 1006 may comprise using a machine learning model to analyze the textual content of the prospective amendment and the textual content included in the office action to select the portion of the textual content included in the office action. The machine learning model may be a machine learning model trained using training examples to select portions of office actions based on prospective amendments. An example of such training example may include a sample prospective amendment and a sample office action, together with a sample selection of a sample portion of the sample office action. In some examples, the portion of the textual content selected by step 1006 may include an assertion regarding the pending claim (for example, an assertion made by the office and/or by an examiner regarding the pending claim).

In some examples, step 1006 may identify a first mathematical object in a particular mathematical space, wherein the first mathematical object may correspond to a word in the textual content of the prospective amendment to the pending claim, for example using module 302. Further, step 1006 may identify a second mathematical object in the particular mathematical space, wherein the second mathematical object may correspond to a word in the textual content included in the office action, for example using module 302. Further, step 1006 may base the selection of the portion of the textual content included in the office action on the first mathematical object and the second mathematical object. For example, step 1006 may calculate a first function of the first mathematical object and the second mathematical object to obtain a first non-negative integer n, may calculate a second function of the first mathematical object and the second mathematical object to obtain a second non-negative integer m, and may select the portion of the textual content between the n-th word and the m-th word.

In some examples, step 1008 may comprise analyzing the textual content of the prospective amendment (accessed by step 1002) to generate a textual content for at least one conceivable remark for inclusion in a prospective response to the office action. The at least one conceivable remark may include the portion of the textual content included in the office action selected by step 1006. For example, the analyzing the textual content of the prospective amendment to generate the textual content for the at least one conceivable remark by step 1008 may comprise using a machine learning model to analyze the textual content of the prospective amendment to generate the textual content for the at least one conceivable remark. In one example, the machine learning model may be a machine learning model trained using training examples to generate remarks based on prospective amendments. An example of such training example may include a sample prospective amendment, together with a sample remark associated with the sample prospective amendment. The sample remark may include a placeholder for a portion of an office action, the remark generated by step 1008 may include a placeholder for a portion of an office action, and step 1008 may insert the portion of the textual content included in the office action selected by step 1006 into the remark generated by the machine learning model. In another example, the machine learning model may be a machine learning model trained using training examples to generate remarks based on prospective amendments and selected portions of office actions. An example of such training example may include a sample prospective amendment and a sample portion of a sample office action, together with a sample remark associated with the sample prospective amendment that includes textual content of the sample portion. In some examples, step 1008 may analyze the textual content of the prospective amendment using a LLM to generate the textual content for at least one conceivable remark.

In some examples, step 1008 may identify a first mathematical object in a particular mathematical space, wherein the first mathematical object may correspond to a word in the textual content of the prospective amendment to the pending claim, for example using module 302. Further, step 1008 may identify a second mathematical object in the particular mathematical space, wherein the second mathematical object may correspond to a word in the textual content included in the office action, for example using module 302. Further, step 1008 may calculate a function of the first mathematical object and the second mathematical object to obtain a third mathematical object in the particular mathematical space, wherein the third mathematical object may correspond to a particular word, and wherein the particular word may not be included in any one of the prospective amendment to the pending claim or the office action, for example using module 304. Further, step 1008 may include the particular word in the at least one conceivable remark.

In some examples, the textual content for the at least one conceivable remark generated by step 1008 may include an indication of a portion of a patent law, such as an indication of a section of the Title 35 of the United States Code. In some examples, the textual content for the at least one conceivable remark generated by step 1008 may include an indication of a regulation, such as a portion of the Title 37 of the Code of Federal Regulations. In some examples, the textual content for the at least one conceivable remark generated by step 1008 may include an indication of a patent examination guideline, such as an indication to a guideline or procedure in the Manual of Patent Examining Procedure (MPEP). In some examples, the textual content for the at least one conceivable remark generated by step 1008 may include an indication of a legal case and/or a court decision. For example, a machine learning model may be trained using training examples to identify portions of patent laws, regulations, guidelines and/or legal cases and/or court decisions relevant to claims and/or amendments and/or office actions. An example of such training example may include a sample claim and/or a sample amendment and/or a sample office action, together with a label indicating a portion of a patent law and/or a regulation and/or a guideline and/or a legal case and/or a court decision relevant to the sample claim and/or the sample amendment and/or the sample office action. The trained machine learning model may be used to analyze the textual content of the prospective amendment (accessed by step 1002) to identify the portion of the patent law and/or the regulation and/or the patent examination guideline and/or the legal case and/or the court decision. In some examples, the textual content for the at least one conceivable remark generated by step 1008 may include an indication of an interview associated with the pending patent application. For example, step 1008 may use a LLM to analyze an interview summary of an examiner interview associated with the pending patent application to include text indicating the interview for inclusion in the at least one conceivable remark.

In some examples, a textual input in a natural language may be received from the individual, for example as described above. Further, step 1008 may analyze the textual content of the prospective amendment and the textual input to generate the textual content for at least one conceivable remark. For example, the textual input may indicate a desire of the individual to refer to a specific element (such as a portion of a patent law and/or a regulation and/or a patent examination guideline and/or a legal case and/or a court decision and/or an examiner interview and/or a prior art document, etc.), and step 1008 may use a LLM to analyze the textual input and the prospective amendment to generate the textual content for at least one conceivable remark. In another example, the textual input may indicate a desire of the individual to show gratitude, and the at least one conceivable remark may thank the examiner.

In some examples, step 1008 may analyze the textual content of the prospective amendment accessed by step 1002 and a textual content of a second claim of the pending patent application to determine that a limitation of the prospective amendment is a limitation of the second claim. For example, a machine learning model may be trained using training examples to determine whether two claims include the same limitation. An example of such training example may include a sample first claim and a sample second claim, together with a label indicating whether the first and second sample claims includes a same or equivalent limitation and/or a label indicating the equivalent limitations in the two claims. Step 1008 may analyze the textual content of the prospective amendment and the textual content of the second claim to determine that the limitation of the prospective amendment is equivalent to the limitation of the second claim. Further, in response to the determination that the limitation of the prospective amendment is the limitation of the second claim, step 1008 may include an indication of the second claim in the at least one conceivable remark. For example, the indication of the second claim may include a number of the second claim, may include a status of the second claim after the prospective response to the office action, may include a citation of text included in the second claim, and so forth.

In some examples, step 1008 may analyze the textual content included in the office action accessed by step 1004 to determine that the office action includes a rejection of the pending claim based on at least one prior art document, for example as described above in relation to step 906. Further, step 1008 may include an indication of the at least one prior art document in the at least one conceivable remark. For example, the indication of the at least one prior art document may include a patent application number of the at least one prior art document, a publication number of the at least one prior art document, a patent number of the at least one prior art document, a name of an author of the at least one prior art document, a title of the at least one prior art document, an indication of a portion of the at least one prior art document (such as a page number and/or an indication of a column and/or a paragraph number and/or a line number), a citation from the at least one prior art document, and so forth. In some examples, the textual content of the prospective amendment and a textual content included in the at least one prior art document may be analyzed to identify at least one limitation added to the pending claim by the prospective amendment, wherein the at least one limitation is at least one of not disclosed, not taught or not suggested by the at least one prior art document. Further, step 1008 may include in the at least one conceivable remark an indication that the at least one limitation is at least one of not disclosed, not taught or not suggested by the at least one prior art document. For example, a machine learning model may be trained to identify limitations in claims that are not disclosed, not taught and/or not suggested by selected prior art documents. An example of such training example may include a sample prior art document and a sample claim including a plurality of sample limitations, together with a label indicating at least one sample limitation of the plurality of sample limitations that are not disclosed, not taught and not suggested by the sample prior art document. The trained machine learning model may be used to analyze the prospective amendment and the at least one prior art document to identify the at least one limitation added to the pending claim by the prospective amendment that is at least one of not disclosed, not taught or not suggested by the at least one prior art document. In some examples, a textual content included in the at least one prior art document may be analyzed to identify at least one feature that is at least one of disclosed, taught or suggested by the at least one prior art document, for example as described above in relation to step 804. Further, step 1008 may include in the at least one conceivable remark an indication that the at least one feature is at least one of disclosed, taught or suggested by the at least one prior art document. For example, the indication may be an indication in a natural language generated using a LLM. In some examples, the portion of the textual content selected by step 1006 may include an assertion regarding the at least one prior art document. Further, step 1008 may include textual content in natural language referring to this assertion.

In some examples, the pending claim may include a noun, the prospective amendment to the pending claim may include an addition of a first adjective adjacent to the noun, and the textual content for the at least one conceivable remark generated by step 1008 may include a second adjective adjacent to the noun. The second adjective may not be included in any one of the pending claim or the prospective amendment to the pending claim. In one example, a textual content included in at least one prior art document may be analyzed to select the second adjective, for example based on the at least one prior art document including the second adjective adjacent to the noun. The at least one prior art document may be identified by analyzing the office action, for example as described above in relation to step 906.

In some examples, the pending claim may include a verb, the prospective amendment to the pending claim may include an addition of a first adverb adjacent to the verb, and the textual content for the at least one conceivable remark generated by step 1008 may include a second adverb adjacent to the verb. The second adverb may not be included in any one of the pending claim or the prospective amendment to the pending claim. In one example, a textual content included in at least one prior art document may be analyzed to select the second adverb, for example based on the at least one prior art document including the second adverb adjacent to the verb. The at least one prior art document may be identified by analyzing the office action, for example as described above in relation to step 906.

In some examples, step 1008 may receive an indication of a particular style (such as style 154), for example as described above in relation to style 154. Further, step 1008 may base the generation of the textual content for the at least one conceivable remark on the particular style. For example, step 1008 may use a LLM to analyze a textual description of the style and the textual content of the prospective amendment to generate the textual content for the at least one conceivable remark in the particular style.

In some examples, step 1010 may comprise presenting the generated at least one conceivable remark to an individual. For example, presenting the generated at least one conceivable remark to the individual may comprise presenting the generated at least one conceivable remark via a user interface, may comprise presenting the generated at least one conceivable remark in an electronic document, may comprise presenting the generated at least one conceivable remark visually, may comprise presenting the generated at least one conceivable remark audibly, may comprise presenting the generated at least one conceivable remark textually, and so forth. In some examples, the presentation of the generated at least one conceivable remark by step 1010 may enable the individual to modify the generated at least one conceivable remark. In some examples, the presentation of the generated at least one conceivable remark by step 1010 may enable the individual to reject the generated at least one conceivable remark.

In some examples, a textual content of a description section of the pending patent application may be analyzed to identify a portion of the description section of the pending patent application associated with the prospective amendment to the pending claim of step 1002. For example, a machine learning model may be trained using training examples to select portions of description sections based on prospective amendments. An example of such training example may include a sample prospective amendment and a sample description section, together with a sample selection of a sample portion of the sample description section. The trained machine learning model may be used to analyze the textual content of the prospective amendment accessed by step 1002 and the textual content of the description section of the pending patent application to identify the portion of the description section of the pending patent application associated with the prospective amendment. In one example, the identified portion of the description section of the pending patent application may include a support for the prospective amendment. In another example, the identified portion of the description section may include a definition or a reference to a term added to the pending claim by the prospective amendment. In some examples, step 1008 may include an indication of the identified portion of the description section of the pending patent application in the at least one conceivable remark. For example, the indication may include a page number and/or an indication of a column and/or a paragraph number and/or a line number indicative of the identified portion. In another example, the indication may include a citation of text included in the identified portion.

In some examples, a textual content of a description section of the pending patent application may be analyzed to determine that the prospective amendment to the pending claim of step 1002 includes a limitation associated with a particular drawing of the pending patent application. For example, a Natural Language Processing (NLP) algorithm may be used to analyze the textual content of the description section to identify an association of a subject matter included in the pending claim with the particular drawing. In some examples, step 1008 may include an indication of the particular drawing in the at least one conceivable remark. For example, the indication may include a figure number. In some examples, it may be determined that the limitation associated with the particular drawing is further associated with a particular element of the particular drawing. Further, step 1008 may include an indication of the particular element in the at least one conceivable remark. For example, the indication may include a reference to the particular element and/or a textual description of the particular element. In some examples, a textual content of the description section of the pending patent application may be analyzed to determine that the limitation associated with the particular drawing is further associated with the particular element of the particular drawing. For example, a Natural Language Processing (NLP) algorithm may be used to analyze the textual content of the description section to identify an association of a subject matter included in the pending claim with the particular element of the particular drawing. In some examples, the particular drawing may be analyzed to determine that the limitation associated with the particular drawing is further associated with the particular element of the particular drawing. For example, a multimodal machine learning model may be trained using training examples to determine that limitations of claims are associated with elements of drawings based on the drawings. An example of such training example may include a sample limitation and a sample drawing, together with a label indicating that the sample limitation is associated with a sample element of the sample drawing. The trained multimodal machine learning model may be used to analyze the particular drawing to determine that the limitation associated with the particular drawing is further associated with the particular element of the particular drawing. In other examples, a convolution of at least part of the particular drawing may be calculated to obtain a result value. Further, the determination that the limitation associated with the particular drawing is further associated with the particular element of the particular drawing may be based on the result value. For example, when the result value is a first numerical value, it may be determined that the limitation associated with the particular drawing is further associated with a first element of the particular drawing, and when the result value is a second numerical value, it may be determined that the limitation associated with the particular drawing is further associated with a second element of the particular drawing.

FIG. 11 is a flowchart of an exemplary method 1100 for modifying description based on changes to claims. In this example, method 1100 may include accessing a textual content of a prospective claim of a prospective patent application (step 1102); accessing a textual content of a description section of the prospective patent application (step 1104); receiving an indication of a modification to the prospective claim (step 1106); based on the modification to the prospective claim, analyzing the textual content of the description section to select a portion of the description section associated with the modification to the prospective claim (step 1108); determining a suggested modification to the selected portion of the description section based on the modification to the prospective claim (step 1110); and presenting the suggested modification to an individual (step 1112). In other examples, method 1100 may include additional steps or fewer steps. In other examples, one or more steps of method 1100 may be executed in a different order and/or one or more groups of steps may be executed simultaneously.

In some examples, step 1102 may comprise accessing a textual content of a prospective claim of a prospective patent application. In some examples, accessing the textual content by step 1102 may comprise reading the textual content from memory, may comprise receiving the textual content from an external computing device (for example, via a digital communication device), may comprise receiving the textual content from a person (for example, via a user interface), may comprise accessing the textual content in an electronic document, and so forth.

In some examples, step 1104 may comprise accessing a textual content of a description section of the prospective patent application. In some examples, accessing the textual content by step 1104 may comprise reading the textual content from memory, may comprise receiving the textual content from an external computing device (for example, via a digital communication device), may comprise receiving the textual content from a person (for example, via a user interface), may comprise accessing the textual content in an electronic document, and so forth.

In some examples, step 1106 may comprise receiving an indication of a modification to the prospective claim (of step 1102). For example, receiving the indication by step 1106 may comprise reading the indication from memory, may comprise receiving the indication from an external computing device (for example, via a digital communication device), may comprise receiving the indication from a person (for example, via a user interface), may comprise determining the indication by monitoring an electronic document that includes the prospective claim, and so forth. In one example, the modification to the prospective claim may be a modification made by the individual. In one example, the modification to the prospective claim may be a modification made using a machine learning model. In one example, the modification to the prospective claim may be a modification triggered by the individual. In one example, the modification to the prospective claim may be a modification triggered by a modification to another claim.

In some examples, step 1108 may comprise, based on the modification to the prospective claim (of step 1106), analyzing the textual content of the description section accessed by step 1104 to select a portion of the description section associated with the modification to the prospective claim. In some examples, step 1108 may analyze the textual content of the description section and the modification to the prospective claim using a machine learning model to select the portion of the description section associated with the modification to the prospective claim. The machine learning model may be a machine learning model trained using training examples to select portions of textual descriptions based on modifications to claims. An example of such training example may include a sample description and a sample modification to a sample claim, together with a label indicating a selection of a sample portion of the sample description associated with the sample modification to the sample claim.

In some examples, step 1108 may identify a first mathematical object in a particular mathematical space, wherein the first mathematical object may correspond to a word in the modified prospective claim, for example using module 302. Further, step 1108 may identify a second mathematical object in the particular mathematical space, wherein the second mathematical object may correspond to a word in the textual content of the description section, for example using module 302. Further, step 1108 may base the selection of the portion of the description section associated with the modification to the prospective claim on the first mathematical object and the second mathematical object. For example, step 1108 may calculate a first function of the first mathematical object and the second mathematical object to obtain a first non-negative integer n, may calculate a second function of the first mathematical object and the second mathematical object to obtain a second non-negative integer m, and may select the portion of the description section between the n-th word and the m-th word.

In some examples, the prospective claim (of step 1102) may include a noun. Further, the modification to the prospective claim (of step 1106) may include an addition of an adjective to the prospective claim adjacent to the noun. Further, step 1108 may analyze the textual content of the description section to identify a segment of the description section including the noun, for example using a pattern recognition algorithm. Further, step 1108 may select the portion of the description section associated with the modification to the prospective claim based on the identified segment of the description section that includes the noun, wherein the selected portion of the description section may include the identified segment of the description section that includes the noun. For example, the selected portion of the description section may be the identified segment of the description section.

In some examples, the prospective claim (of step 1102) may include a verb. Further, the modification to the prospective claim (of step 1106) may include an addition of an adverb to the prospective claim adjacent to the verb. Further, step 1108 may analyze the textual content of the description section to identify a segment of the description section including the verb, for example using a pattern recognition algorithm. Further, step 1108 may select the portion of the description section associated with the modification to the prospective claim based on the identified segment of the description section, wherein the selected portion of the description section may include the identified segment of the description section. For example, the selected portion of the description section may be the identified segment of the description section.

In some examples, the prospective claim (of step 1102) may include a plurality of limitations. Further, the modification to the prospective claim (of step 1106) may include a modification to a particular limitation of the plurality of limitations. Further, step 1108 may analyze the textual content of the description section to identify a segment of the description section corresponding to the particular limitation. For example, a machine learning model may be trained using training examples to select portions of description sections corresponding to limitations. An example of such training example may include a sample limitation of a sample claim and a sample description section, together with a sample selection of a sample portion of the sample description section corresponding to the sample limitation. Step 1108 may use the machine learning model to analyze the textual content of the description section to identify a segment of the description section corresponding to the particular limitation. Further, step 1108 may select the portion of the description section associated with the modification to the prospective claim based on the identified segment of the description section, wherein the selected portion of the description section may include the identified segment of the description section. For example, the selected portion of the description section may be the identified segment of the description section.

In some examples, step 1110 may comprise determining a suggested modification to the portion of the description section selected by step 1108 based on the modification to the prospective claim (of step 1106). In some examples, the determining the suggested modification to the selected portion of the description section by step 1110 may comprise analyzing at least the selected portion of the description section and the modification to the prospective claim using a machine learning model to determine the suggested modification to the selected portion of the description section. The machine learning model may be a machine learning model trained using training examples to suggest modifications to textual descriptions based on modifications to claims. An example of such training example may include a sample modification to a sample claim and a sample portion of a sample description section, together with a suggested modification to the sample portion of the sample description section.

In some examples, step 1110 may identify a first mathematical object in a particular mathematical space, wherein the first mathematical object may correspond to a word in the modified prospective claim, for example using module 302. Further, step 1110 may identify a second mathematical object in the particular mathematical space, wherein the second mathematical object may correspond to a word in the textual content of the description section, for example using module 302. Further, step 1110 may calculate a function of the first mathematical object and the second mathematical object to obtain a third mathematical object in the particular mathematical space, wherein the third mathematical object may correspond to a particular word, and wherein the particular word may not be included in any one of the modified prospective claim or the description section, for example using module 304. Further, step 1110 may include an addition of the particular word to the selected portion of the description section in the suggested modification.

In some examples, a textual input in a natural language may be received from the individual, for example as described above. The textual input may be indicative of a desire of the individual to add a subject matter to the description section. Further, step 1110 may analyze the modification to the prospective claim and the textual input to determine the suggested modification to the selected portion of the description section, wherein the suggested modification may include an addition of the subject matter, wherein the suggested modification may include an addition of at least one phrase to the selected portion of the description section, and wherein the at least one phrase may not be included in any one of the modified prospective claim, the description section or the textual input. For example, step 1110 may use a LLM to analyze the modification to the prospective claim and the textual input to generate the suggested modification to the selected portion of the description section.

In some examples, the suggested modification determined by step 1110 may include an addition of at least one phrase to the selected portion of the description section, wherein the at least one phrase may not be included in any one of the modified prospective claim or the description section. In some examples, the prospective claim (of step 1102) may include a noun, the modification to the prospective claim (of step 1106) may include an addition of an adjective to the prospective claim adjacent to the noun, the portion of the description section selected by step 1108 may include the noun but not the adjective, and the suggested modification to the selected portion of the description section determined by step 1110 may include an addition of the adjective to the selected portion of the description section adjacent to the noun. In some examples, the prospective claim (of step 1102) may include a verb, the modification to the prospective claim (of step 1106) may include an addition of an adverb to the prospective claim adjacent to the verb, the portion of the description section selected by step 1108 may include the verb but not the adverb, and the suggested modification to the selected portion of the description section determined by step 1110 may include an addition of the adverb to the selected portion of the description section adjacent to the verb.

In some examples, step 1110 may receive an indication of a particular style (such as style 154), for example as described above in relation to style 154. Further, step 1110 may further base the determining the suggested modification to the selected portion of the description section on the particular style. For example, step 1110 may use a LLM to analyze a textual description of the style and the modification to the prospective claim to generate the suggested modification to the selected portion of the description section in the particular style.

In some examples, step 1112 may comprise presenting the suggested modification (determined by step 1110 or by step 1408) to an individual. For example, presenting the suggested modification to the individual may comprise presenting the suggested modification via a user interface, may comprise presenting the suggested modification in an electronic document, may comprise presenting the suggested modification visually, may comprise presenting the suggested modification audibly, may comprise presenting the suggested modification textually, and so forth. In some examples, the presentation of the suggested modification by step 1112 may enable the individual to alter the suggested modification. In some examples, the presentation of the suggested modification by step 1112 may enable the individual to reject the suggested modification.

Additionally or alternatively, step 1112 may present an indication of the portion of the description section selected by step 1108 to the individual. For example, the presented indication may include a page number and/or an indication of a column and/or a paragraph number and/or a line number indicative of the selected portion. In another example, the presented indication may include a citation of text included in the selected portion. In yet another example, the presented indication may include a graphical indication of the selected portion in a presentation of the description section (or a graphical indication of the selected portion in a presentation of a larger part of the description section that includes the selected portion).

In some examples, the modification to the prospective claim (of step 1106) may be analyzed to identify a limitation added to the prospective claim. For example, a Natural Language Processing (NLP) algorithm may be used to analyze the modification to the prospective claim to identify the limitation added. Further, the suggested modification to the selected portion of the description section determined by step 1110 may include an addition of a textual content supporting the limitation. The textual content supporting the limitation may include at least one phrase not included in the modified prospective claim. For example, step 1110 may use a LLM to analyze the limitation added to the prospective claim and the selected portion of the description section and generate the suggested modification to the selected portion that includes the addition of the textual content supporting the limitation.

In some examples, the modification to the prospective claim (of step 1106) may be analyzed to identify a limitation modified in the prospective claim. For example, a Natural Language Processing (NLP) algorithm may be used to analyze the modification to the prospective claim to identify the limitation modified in the prospective claim. Further, the suggested modification to the selected portion of the description section determined by step 1110 may include a modification of a textual content supporting the limitation. For example, step 1110 may use a LLM to analyze the limitation modified in the prospective claim and the selected portion of the description section and generate the suggested modification to the selected portion that includes the modification of the textual content supporting the limitation.

In some examples, step 1108 may be a byproduct of step 1110. For example, step 1110 may comprise determining a suggested modification to the description section based on the modification to the prospective claim (of step 1106), for example by applying any one of the techniques described above and having as an input the selected portion of the description section to be the entire description section. Further, the suggested modification may be limited to a specific segment of the description section even though step 1110 was free to modify the entire description section, for example due to the modification to the prospective claim being relevant to that specific segment and not to other parts of the description section. Further, the portion of the description section (of step 1108) may be the specific segment. In other examples, step 1108 may be excluded from method

1100 altogether. In this example, the suggested modification determined by step 1110 may not be limited to a specific segment of the description section.

FIG. 12 is a flowchart of an exemplary method 1200 for modifying description based on additions of claims. In this example, method 1200 may comprise accessing a textual content of a description section of a prospective patent application (step 1104); receiving an indication of an addition of an additional claim to the prospective patent application (step 1202); analyzing the additional claim to determine a suggested addition to the description section (step 1204); and presenting the suggested addition to an individual (step 1206). In other examples, method 1200 may include additional steps or fewer steps. In other examples, one or more steps of method 1200 may be executed in a different order and/or one or more groups of steps may be executed simultaneously.

In some examples, step 1202 may comprise receiving an indication of an addition of an additional claim to the prospective patent application. For example, receiving the indication by step 1202 may comprise reading the indication from memory, may comprise receiving the indication from an external computing device (for example, via a digital communication device), may comprise receiving the indication from a person (for example, via a user interface), may comprise determining the indication by monitoring an electronic document that includes the prospective patent application, and so forth. In one example, the addition of the additional claim may be an addition made by the individual. In one example, the addition of the additional claim may be an addition made using a machine learning model. In one example, the addition of the additional claim may be an addition triggered by the individual. In one example, the addition of the additional claim may be an addition triggered by a modification to another claim.

In some examples, step 1204 may comprise analyzing the additional claim (of step 1202) to determine a suggested addition to the description section (of step 1104). In one example, step 1204 may use a LLM to analyze the additional claim and to generate the suggested addition to the description section. In another example, step 1204 may use a machine learning model to analyze the additional claim to determine the suggested addition to the description section. The machine learning model may be a machine learning model trained using training examples to generate additions to description sections based on added claims. An example of such training example may include a sample added claim (and optionally, a sample description section), together with a sample addition to the sample description section corresponding to the sample added claim.

In some examples, step 1204 may identify a first mathematical object in a particular mathematical space, wherein the first mathematical object may correspond to a first word in the additional claim, for example using module 302. Further, step 1204 may identify a second mathematical object in the particular mathematical space, wherein the second mathematical object may correspond to a second word in the additional claim. Further, step 1204 may calculate a function of the first mathematical object and the second mathematical object to obtain a third mathematical object in the particular mathematical space, wherein the third mathematical object may correspond to a particular word, and wherein the particular word may not be included in any one of the additional claim or the description section, for example using module 304. Further, step 1204 may include the particular word in the suggested addition to the description section.

In some examples, step 1204 may further comprise analyzing the textual content of the description section accessed by step 1104 and the additional claim (of step 1202) to select a position in the description section for the suggested addition. For example, step 1204 may use a machine learning model to analyze the textual content of the description section and the additional claim to select the position in the description section for the suggested addition. The machine learning model may be a machine learning model trained using training examples to select positions for additions of texts in description sections based on claims corresponding to the additions. An example of such training example may include a sample description section and a sample claim associated with a sample additional text, together with a label indicating a sample selection of a sample position in the sample description section for the addition of the sample additional text.

In some examples, step 1204 may identify a first mathematical object in a particular mathematical space, wherein the first mathematical object may correspond to a word in the additional claim, for example using module 302. Further, step 1204 may identify a second mathematical object in the particular mathematical space, wherein the second mathematical object may correspond to a word in the description section, for example using module 302. Further, step 1204 may base the selection of the position in the description section for the suggested addition on the first mathematical object and the second mathematical object. For example, step 1204 may calculate a function of the first mathematical object and the second mathematical object to obtain a particular value, for example using module 304. Further, when the particular value is a first numerical value, step 1204 may select a first position in the description section for the suggested addition, and when the particular value is a second numerical value, step 1204 may select a second position in the description section for the suggested addition.

In some examples, step 1204 may comprise receive an indication of a particular style (such as style 154), for example as described above in relation to style 154. Further, step 1204 may base the determining the suggested addition to the description section on the particular style. For example, step 1204 may use a LLM to analyze a textual description of the style and the addition claim to generate the suggested addition to the description section in the particular style.

In some examples, step 1206 may comprise presenting the suggested addition determined by step 1204 to an individual. For example, presenting the suggested addition to the individual may comprise presenting the suggested addition via a user interface, may comprise presenting the suggested addition in an electronic document, may comprise presenting the suggested addition visually, may comprise presenting the suggested addition audibly, may comprise presenting the suggested addition textually, and so forth. In some examples, the presentation of the suggested addition by step 1206 may enable the individual to alter the suggested addition. In some examples, the presentation of the suggested addition by step 1206 may enable the individual to reject the suggested addition.

In some examples, method 1100 and method 1200 may act on the same prospective patent application, and therefore on the same description section. In such examples, the presentation of the suggested modification by step 1112 and the presentation of the suggested addition by step 1206 may include a single presentation that presents both the suggested modification and the suggested addition, or two separate presentations.

FIG. 13 is an illustration of example textual contents of claims, modified claims, description sections and modified description sections. In some examples, the textual content of claim 2 in 1302 may be accessed by step 1102. In some examples, a textual content of a description section 1304 may be accessed by step 1104 (only a part of the description section is shown in FIG. 13). Further, the textual content of claim 2 from 1302 may be modified to the textual content of claim 2 in 1306, and an indication of the modification may be received by step 1106. Further, step 1108 may analyze the textual content of description section 1304 based on the modification to claim 2 shown in 1306 to select portion 1304A of the textual content of description section 1304 associated with the modification to claim 2 shown in 1306. Further, step 1110 may determine suggested modification 1308 to the selected portion 1304A of the textual content of description section 1304 based on the modification to claim 2 shown in 1306. Further, step 1112 may present suggested modification 1308.

In some examples, a textual content of a description section 1304 may be accessed by step 1104 (only a part of the description section is shown in FIG. 13). Further, step 1202 may receive an indication of an addition of claim 3 shown in 1310. Further, step 1204 may analyze claim 3 shown in 1310 to determine a suggested addition to the description section. Further, step 1206 may present the suggested addition. In this example, step 1206 may present the suggested addition inserted into the textual content of a description section 1304 at a select position. In one example, step 1204 may further analyze the textual content of description section 1304 and additional claim 3 shown in 1310 to select the position in the description section for the suggested addition.

FIG. 14 is a flowchart of an exemplary method 1400 for modifying description based on changes to drawings. In this example, method 1400 may comprise accessing a drawing for a prospective patent application (step 1402); accessing a textual content of a description section of the prospective patent application (step 1104); receiving an indication of a modification to the drawing (step 1406); in response to and based on the modification to the drawing, analyzing the textual content of the description section to determine a suggested modification to the description section (step 1408); and presenting the suggested modification to an individual (step 1112). In other examples, method 1400 may include additional steps or fewer steps. In other examples, one or more steps of method 1400 may be executed in a different order and/or one or more groups of steps may be executed simultaneously.

In some examples, step 1402 may comprise accessing a drawing for example a drawing for a prospective patent application. In some examples, accessing the drawing by step 1402 may comprise reading a digital encoding of the drawing from memory, may comprise receiving a digital encoding of the drawing from an external computing device (for example, via a digital communication device), may comprise receiving the drawing from a person (for example, via a user interface enabling the person to generate the drawing), may comprise accessing the drawing in an electronic document, and so forth. In some examples, the drawing may be included in a single page, may be spread over at least two pages, may be spread over at least five pages, and so forth. In some examples, the drawing may include a portion of a figure, a single figure, at least two figured, at least five figures, and so forth.

In some examples, step 1406 may comprise receiving an indication of a modification to the drawing accessed by step 1402. For example, receiving the indication by step 1406 may comprise reading the indication from memory, may comprise receiving the indication from an external computing device (for example, via a digital communication device), may comprise receiving the indication from a person (for example, via a user interface), may comprise determining the indication by monitoring an electronic document that includes the drawing, and so forth. In one example, the modification to the drawing may be a modification made by the individual. In one example, the modification to the drawing may be a modification made using a machine learning model. In one example, the modification to the drawing may be a modification triggered by the individual. In one example, the modification to the drawing may be a modification triggered by a modification to another drawing. In one example, the modification to the drawing may be a modification triggered by a modification to a claim, for example using method 1600 and/or step 1608. In one example, the modification to the drawing may be a modification triggered by an historic modification to the description section (of step 1104), for example using method 1700 and/or step 1708 and/or method 2400 and/or step 2408.

In some examples, step 1408 may comprise, in response to and based on the modification to the drawing, analyzing the textual content of the description section accessed by step 1104 to determine a suggested modification to the description section. In some examples, step 1408 may analyze the textual content of the description section and the modification to the drawing using at least one machine learning model to determine the suggested modification to the description section. For example, the at least one machine learning model may be a multimodal machine learning model trained using training examples to suggest modifications to textual descriptions based on modification to drawings. An example of such training example may include a sample description section a sample modification to a sample drawing, together with a sample modification to the sample description section.

In some examples, step 1408 may identify a first mathematical object in a particular mathematical space, wherein the first mathematical object may correspond to a first word in the textual content of the description section, for example using module 302. Further, step 1408 may calculate a convolution of at least part of the modified drawing to determine a second mathematical object. Further, step 1408 may calculate a function of the first mathematical object and the second mathematical object to obtain a third mathematical object in the particular mathematical space, wherein the third mathematical object may correspond to a particular word, and wherein the particular word may not be included in the description section, for example using module 304. Further, step 1408 may include an addition of the particular word to the description section in the suggested modification.

In some examples, step 1408 may calculate a convolution of at least part of the modified drawing to determine a mathematical object. Further, step 1408 may select a particular word based on the mathematical object, wherein the particular word may not be included in the description section. For example, the injective function described in relation to module 302 may be used to determine the particular word corresponding to the mathematical object. Further, step 1408 may include an addition of the particular word to the description section in the suggested modification.

In some examples, step 1408 may calculate a convolution of at least part of the drawing to determine a first mathematical object in a particular mathematical space. Further, step 1408 may calculate a convolution of at least part of the modified drawing to determine a second mathematical object in the particular mathematical space. Further, step 1408 may calculate a function of the first mathematical object and the second mathematical object to obtain a third mathematical object in the particular mathematical space, wherein the third mathematical object may correspond to a particular word, and wherein the particular word may not be included in the description section, for example using module 304. Further, step 1408 may include an addition of the particular word to the description section in the suggested modification.

In some examples, a textual input in a natural language may be received from the individual, for example as described above. The textual input may be indicative of a desire of the individual to add a subject matter to the description section. Further, step 1408 may analyze the modification to the drawing and the textual input to determine the suggested modification to the description section, wherein the suggested modification may include an addition of at least one phrase to the description section, and wherein the at least one phrase may not be included in the textual input. For example, step 1408 may use a multimodal LLM to analyze the modification to the drawing and the textual input to generate the suggested modification to the selected portion of the description section.

In some examples, the modification to the drawing (of step 1406) may include an addition of an element to the drawing, and the suggested modification to the description section determined by step 1408 may include adding a description in a natural language of the element to the description section. For example, step 1408 may use a multimodal LLM to analyze the part of the drawing including the element and generate the description in the natural language of the element. In some examples, the modification to the drawing (of step 1406) may include a change of a reference sign in the drawing. Further, the suggested modification to the description section determined by step 1408 may include change of the reference sign in the description section. For example, the textual content of the description section may be analyzed to identify the reference sign in the description section, for example using a pattern recognition algorithm. Further, step 1408 may replace the identified reference sign in the description section with the changed reference sign. In some examples, the modification to the drawing (of step 1406) may include a change of a first reference sign in the drawing to match a second reference sign in the drawing. Further, the suggested modification to the description section determined by step 1408 may include combining a description associated with the first reference site and a description associated with the second reference site in the description section, for example by moving the two together, by using a LLM, and so forth.

In some examples, the modification to the drawing (of step 1406) may include a removal of an element from the drawing, and the suggested modification to the description section determined by step 1408 may include removing a reference to the element from the description section. For example, a multimodal machine learning model may be trained using training examples to identify portions of textual descriptions describing elements of drawings. An example of such training example may include a sample description section and a sample element of a sample drawing, together with a label indicating a sample portion of the sample description section describing the sample element. Step 1408 may use the trained machine learning model to identify a portion of the description section that includes the reference to the element, and may remove the identified portion. In some examples, the modification to the drawing (of step 1406) may include a change of an angle between two elements of the drawing, and the modification to the description section suggested by step 1408 may include changing text referring to the angle in the description section. For example, a regression model may be used to analyze the modification to the drawing to identify the change of the angle and the size of the angle after the change. Further, the textual content of the description section may be analyzed to identify the text referring to the angle in the description section, for example using the trained multimodal machine learning model. Further, the text referring to the angle in the description section may be analyzed to determine the suggested modification to the description section. For example, a LLM may be used to analyze the change to the angle and the identified portion of the description section that includes the text referring to the angle to generate the change to the text referring to the angle in the description section. In some examples, the modification to the drawing (of step 1406) may include a change to a size of a first element in the drawing that changes a proportion between the size of the first element and a size of a second element in the drawing. Further, the modification to the description section suggested by step 1408 may include changing text referring to the proportion between the first and second elements in the description section. For example, a regression model may be used to analyze the modification to the drawing to identify the change to the proportion. Further, the textual content of the description section may be analyzed to identify the text referring to the proportion, for example using the trained multimodal machine learning model. Further, the text referring to the proportion in the description section may be analyzed to determine the suggested modification to the description section. For example, a LLM may be used to analyze the change to the proportion and the identified portion of the description section that includes the text referring to the proportion to generate the change to the text referring to the proportion in the description section.

In some examples, the drawing accessed by step 1402 may include a first instance and a second instance of a first reference sign. Further, the modification to the drawing (of step 1406) may include a change of the second instance of the first reference sign in the drawing to a second reference sign and includes no change to the first instance of the first reference sign. Further, step 1408 may analyze the textual content of the description section to identify a first portion of the description section associated with the first instance of the first reference sign and a second portion of the description section associated with the second instance of the first reference sign. For example, a multimodal machine learning model may be trained using training examples to identify portions of textual descriptions associated with specific instances of reference signs in drawings. An example of such training example may include a sample description section, a sample drawing and an indication of a sample instance of a sample reference sign in the sample drawing, together with a label indicating a sample portion of the sample description section associated with the sample instance of the sample reference sign. Step 1408 may use the trained multimodal machine learning model to analyze the textual content of the description section to identify the first portion of the description section associated with the first instance of the first reference sign and/or the second portion of the description section associated with the second instance of the first reference sign. Further, step 1408 may include in the suggested modification to the description section a modification to the second portion of the description section and no modification to the first portion of the description section. For example, step 1408 may determine the modification to the second portion as described above. In some examples, the first instance of the first reference sign may be associated with a first figure, the second instance of the first reference sign may be associated with a second figure, the identification of the first portion may be based on the first figure, and the identification of the second portion may be based on the second figure. For example, when a particular instance of the first reference sign appears in proximity to a reference to the first figure in the description section, step 1408 may include a fragment of text including the particular instance in the first portion, and when the particular instance of the first reference sign appears in proximity to a reference to the second figure in the description section, step 1408 may include a fragment of text including the particular instance in the second portion. In some examples, the first instance of the first reference sign may be associated with an illustration of a first element, the second instance of the first reference sign may be associated with an illustration of a second element, the identification of the first portion may be based on the first element, and the identification of the second portion may be based on the second element. For example, when a particular instance of the first reference sign appears in proximity to a description of the first element in the description section, step 1408 may include a fragment of text including the particular instance in the first portion, and when the particular instance of the first reference sign appears in proximity to a description of the second element in the description section, step 1408 may include a fragment of text including the particular instance in the second portion.

In some examples, step 1408 may base the suggested modification to the description section on a particular change to the drawing. For example, as described above, the particular change may include an addition of an element of the drawing, a removal of an element of the drawing, a change of an angle between two elements of the drawing, a change to a size of an element of the drawing (for example, a change that causes a change to a proportion between the sizes of two elements of the drawing), and so forth. For example, step 1408 may use a LLM to analyze the description section and the particular change to generate the suggested modification to the description section. In some examples, step 1408 may compare the drawing and the modified drawing to identify the particular change. For example, a machine learning model may be trained using training examples to identify changes between drawings. An example of such training example may include a sample first drawing and a sample second drawing, together with a label indicating a sample change between the sample first drawing and the sample second drawing. Step 1408 may use the trained machine learning model to compare the drawing and the modified drawing to identify a particular change. In some examples, step 1408 may analyze a change log associated with the drawing to identify the particular change to the drawing. For example, the log may include a digital record corresponding to the particular change and/or including properties of the particular change. Step 1408 may parse the change log using a parser algorithm to identify the particular change.

In some examples, step 1408 may comprise receive an indication of a particular style (such as style 154), for example as described above in relation to style 154. Further, step 1408 may further base the determining the suggested modification to the description section on the particular style. For example, step 1408 may use a multimodal LLM to analyze a textual description of the style, the modification to the drawing and the textual content of the description section to generate the suggested modification to the description section in the particular style.

FIG. 15 is an illustration of example visual content of a drawing, a visual content of a modified version of the drawing, a portion of a description section and a modified portion of the description section. In this example, drawing 1502 may be accessed by step 1402. For example, drawing 1502 may illustrate two elements of similar sizes connected at a joint and creates a 60 degrees angle. Further, textual content 1504 of a description section may be accessed by step 1104 (only a part of the description section is shown in FIG. 15). For example, textual content 1504 may include ‘Two identical bars are connected to a circular joint and creates a 60 degrees angle. The bars may be made of wood or metal’. Further, the visual content of the drawing from 1502 may be modified to the visual content of the drawing in 1506, and an indication of the modification may be received by step 1406. For example, modified drawing 1506 may illustrate two elements of different sizes connected at a joint and creates a 90 degrees angle. Further, in response to the modification, step 1408 may suggest a modification to the description section to include the textual content shown in 1508 instead of the textual content shown in 1504. For example, modified textual content 1508 may include ‘Two bars of different sizes are connected to a circular joint and creates a 90 degrees angle. The bars may be made of wood or metal’.

FIG. 29 is a flowchart of an exemplary method 2900 for modifying drawings based on changes to prospective patent applications. In this example, method 2900 may comprise accessing a textual content of a prospective patent application (step 2902); accessing a visual content of a drawing for the prospective patent application (step 1604); receiving an indication of a modification to the textual content of the prospective patent application (Step 2906); based on the modification to the textual content, analyzing the visual content of the drawing to determine a suggested modification to the drawing (step 2908); and presenting the suggested modification to an individual (step 1610). In other examples, method 2900 may include additional steps or fewer steps. In other examples, one or more steps of method 2900 may be executed in a different order and/or one or more groups of steps may be executed simultaneously.

In some examples, step 2902 may comprise accessing a textual content of a prospective patent application. In some examples, accessing the textual content by step 2902 may comprise reading the textual content from memory, may comprise receiving the textual content from an external computing device (for example, via a digital communication device), may comprise receiving the textual content from a person (for example, via a user interface), may comprise accessing the textual content in an electronic document, and so forth.

In some examples, step 2906 may comprise receiving an indication of a modification to the textual content of the prospective patent application (of step 2902). For example, receiving the indication by step 2906 may comprise reading the indication from memory, may comprise receiving the indication from an external computing device (for example, via a digital communication device), may comprise receiving the indication from a person (for example, via a user interface), may comprise determining the indication by monitoring an electronic document that includes the textual content, and so forth. In one example, the modification to the textual content may be a modification made by the individual. In one example, the modification to the textual content may be a modification made using a machine learning model. In one example, the modification to the textual content may be a modification triggered by the individual. In one example, the modification to the textual content may be a modification triggered by a modification to another drawing.

In some examples, step 2908 may comprise, based on the modification to the textual content, analyzing a visual content of a drawing (such as the visual content of the drawing accessed by step 1604) to determine a suggested modification to the drawing. In one example, step 2908 may use step 2408 to analyze the visual content of the drawing to determine the suggested modification to the drawing. In some examples, step 2908 may analyze the modification to the textual content and/or the visual content of the drawing using a machine learning model to determine the suggested modification to the drawing. For example, the machine learning model may be the multimodal machine learning model described in relation to step 1608.

In some examples, step 2908 may identify a first mathematical object in a particular mathematical space, wherein the first mathematical object may correspond to a word in the modified textual content, for example using module 302. Further, step 2908 may calculate a convolution of at least part of the drawing to determine a second mathematical object. Further, step 2908 may base the suggested modification to the drawing on the first mathematical object and the second mathematical object. For example, step 2908 may calculate a function of the first mathematical object and the second mathematical object to obtain a particular value, for example using module 304. Further, when the particular value is a first numerical value, step 2908 may determine a first suggested modification to the drawing, and when the particular value is a second numerical value, step 2908 may determine a second suggested modification to the drawing.

In some examples, step 2908 may identify a first mathematical object in a particular mathematical space, wherein the first mathematical object may correspond to a word in the textual content, for example using module 302. Further, step 2908 may identify a second mathematical object in the particular mathematical space, wherein the second mathematical object may correspond to a word in the modified textual content, for example using module 302. Further, step 2908 may calculate a function of the first mathematical object and the second mathematical object to obtain a third mathematical object in the particular mathematical space, for example using module 304. Further, step 2908 may base the suggested modification to the drawing on the third mathematical object. For example, when the third mathematical object is in a first group of mathematical objects, step 2908 may determine a first suggested modification to the drawing, and when the third mathematical object is in a second group of mathematical objects, step 2908 may determine a second suggested modification to the drawing.

In some examples, step 2908 may comprise receive an indication of a particular style (such as style 154), for example as described above in relation to style 154. Further, step 2908 may further base the determining the suggested modification to the drawing on the particular style. For example, step 2908 may use a multimodal LLM to analyze a textual description of the style, the modification to the textual content and the visual content of the drawing to generate the suggested modification to the drawing in the particular style.

In some examples, the textual content accessed by step 2902 may include a noun, and the modified textual content may include the noun and an adjective adjacent to the noun, wherein the adjective may not be included in the textual content. Further, the drawing accessed by step 1604 may depict an element associated with the noun, and the suggested modification to the drawing determined by step 2908 may include a modification to the element based on the adjective. For example, the textual content accessed by step 2902 may include 'a bearing configured to support motion'. Further, the drawing accessed by step 1604 may include an illustration of a rotational bearing with a circular shape. Further, the modified textual content (of step 2906) may replace the above text with 'a rectangular bearing configured to support linear motion'. Further, the suggested modification to the drawing determined by step 2908 may include a modification of the illustration of the bearing in the drawing to an illustration of a linear bearing with a rectangular shape.

In some examples, the textual content accessed by step 2902 may include a verb, and the modified textual content may include the verb and an adverb adjacent to the verb, wherein the adverb may not be included in the textual content. Further, the drawing accessed by step 1604 may depict an element associated with the verb, and the suggested modification to the drawing determined by step 2908 may include a modification to the element based on the adverb. For example, the textual content accessed by step 2902 may include 'the virtual control moves outside of the first region'. Further, the drawing accessed by step 1604 may include an illustration of the first region, an illustration of the virtual control, and a straight arrow illustrating the path of movement of the virtual control from within to outside the first region. Further, the modified prospective claim (of step 2906) may replace the above text with 'the virtual control moves in a rounded path outside of the first region'. Further, the suggested modification to the drawing determined by step 2908 may include a replacement of the straight arrow with a rounded arrow.

In some examples, the textual content of the prospective patent application of method 2900 may be at least part of a prospective claim of the prospective patent application. Further, the modification to the textual content (of step 2906 and step 2908) may be a modification to the prospective claim. For example, step 2902 may use step 1102 to access the prospective claim of the prospective patent application, step 2906 may use step 1106 to receive an indication of a modification to the prospective claim, and step 2908 may use step 1608 to, based on the modification to the prospective claim, analyze the visual content of the drawing to determine a suggested modification to the drawing. In one example, the modification to the prospective claim may include an addition of a limitation to the prospective claim, the drawing may be inconsistent with the limitation, and the suggested modification to the drawing determined by step 2908 may include modifying the drawing to be consistent with the limitation (for example, as described below in relation to method 1600 and/or step 1608). In another example, the modification to the prospective claim may include an addition of a limitation to the prospective claim, the limitation may be associated with a component, the component may not be illustrated in the drawing, and the suggested modification to the drawing determined by step 2908 may include adding an illustration of the component to the drawing (for example, as described below in relation to method 1600 and/or step 1608). In yet another example, the modification to the prospective claim may include a removal of a particular limitation from the prospective claim, the particular limitation may be associated with a first component and a second component, the first component may not be associated with any other limitation of the prospective claim, the second component may be further associated with another limitation of the prospective claim, the drawing may include an illustration of the first component and an illustration of the second component, and the suggested modification to the drawing determined by step 2908 may include removing the illustration of the first component from the drawing while preserving the illustration of the second component in the drawing (for example, as described below in relation to method 1600 and/or step 1608). Further, an inpainting algorithm may be used to fill a void created by the removal of the illustration of the first component from the drawing (for example, as described below in relation to method 1600 and/or step 1608). In an additional example, the prospective claim may be a dependent claim, the dependent claim may refer to and further limits the particular claim, the modification to the prospective claim may include an addition of a limitation to the prospective claim, the drawing may be consistent with the limitation, and the suggested modification to the drawing determined by step 2908 may include modifying the drawing to be inconsistent with the limitation (for example, as described below in relation to method 1600 and/or step 1608). In yet another example, the prospective claim may be a dependent claim, the dependent claim may refer to and further limits the particular claim, the modification to the prospective claim may include an addition of a limitation to the prospective claim, a particular element of the drawing may be associated with the limitation, and the suggested modification to the drawing determined by step 2908 may include modifying the drawing to indicate that the particular element of the drawing is optional (for example, as described below in relation to method 1600 and/or step 1608).

In some examples, the textual content of the prospective patent application of method 2900 may be at least part of a description section for the prospective patent application. Further, the modification to the textual content (of step 2906 and step 2908) may be a modification to the description section. For example, step 2902 may use step 1104 to access the textual content of the description section, step 2906 may use step 1706 to receive an indication of a modification to the description section, and step 2908 may use step 1708 to, based on the modification to the description section, analyze the visual content of the drawing to determine a suggested modification to the drawing. In one example, the description section may describe a plurality of constraints associated with a particular element, the modification to the description section may include an addition of a description of an additional constraint associated with the particular element to the description section, the additional constraint may not be included in the plurality of constraints, the drawing may include an illustration of the particular element that may be inconsistent with the additional constraint, and the suggested modification to the drawing determined by step 2908 may include modifying the illustration of the particular element to be consistent with the additional constraint (for example, as described below in relation to method 1700 and/or step 1708). In another example, the description section may describe a plurality of components, the modification to the description section may include an addition of a description of an additional component to the description section, the additional component may not be included in the plurality of components, the additional component may not be illustrated in the drawing, and the suggested modification to the drawing determined by step 2908 may include adding an illustration of the additional component to the drawing (for example, as described below in relation to method 1700 and/or step 1708). In yet another example, the description section may describe a plurality of constraints, the modification to the description section may include a removal of a particular constraint from the description section, the particular constraint may be associated with a first component and a second component, the first component may not be associated with any other constraint of the plurality of constraints, the second component may be further associated with another constraint of the plurality of constraints, the drawing may include an illustration of the first component and an illustration of the second component, and the suggested modification to the drawing determined by step 2908 may include removing the illustration of the first component from the drawing while preserving the illustration of the second component in the drawing (for example, as described below in relation to method 1700 and/or step 1708).

In some examples, the textual content accessed by step 2902 may include at least part of a prospective claim of the prospective patent application and at least part of a description section for the prospective patent application. Further, the modification to the textual content of method 2900 may include a modification to the at least part of the prospective claim and a modification to the at least part of the description section. Further, the determination of the suggested modification to the drawing by step 2908 may be based on the modification to the at least part of the prospective claim and on the modification to the at least part of the description section. For example, the modification to the at least part of the prospective claim may include an addition of a limitation to the prospective claim, the limitation may be associated with a component, the component may not be illustrated in the drawing, the modification to the at least part of the description section may specify a characteristic of the component not specified in the modified prospective claim, and the suggested modification to the drawing determined by step 2908 may include adding an illustration of the component with the specified characteristic to the drawing. In one example, step 2908 may identify a first mathematical object in a particular mathematical space, wherein the first mathematical object may correspond to a word in the modified at least part of the prospective claim, for example using module 302. Further, step 2908 may identify a second mathematical object in the particular mathematical space, wherein the second mathematical object may correspond to a word in the modified at least part of the description section, for example using module 302. Further, step 2908 may calculate a function of the first mathematical object and the second mathematical object to obtain a third mathematical object in the particular mathematical space, for example using module 304. Further, step 2908 may base the suggested modification to the drawing on the third mathematical object. For example, when the third mathematical object is in a first group of mathematical objects, step 2908 may determine a first suggested modification to the drawing, and when the third mathematical object is in a second group of mathematical objects, step 2908 may determine a second suggested modification to the drawing.

FIG. 16 is a flowchart of an exemplary method 1600 for modifying drawings based on changes to claims. In this example, method 1600 may comprise accessing a textual content of a prospective claim of a prospective patent application (step 1102); accessing a visual content of a drawing for the prospective patent application (step 1604); receiving an indication of a modification to the prospective claim (step 1106); based on the modification to the prospective claim, analyzing the visual content of the drawing to determine a suggested modification to the drawing (step 1608); and presenting the suggested modification to an individual (step 1610). In other examples, method 1600 may include additional steps or fewer steps. In other examples, one or more steps of method 1600 may be executed in a different order and/or one or more groups of steps may be executed simultaneously.

In some examples, step 1604 may comprise accessing a visual content of a drawing for the prospective patent application, for example as described above in relation to step 1402.

In some examples, step 1608 may comprise, based on the modification to the prospective claim (of step 1106), analyzing a visual content of a drawing (such as the visual content of the drawing accessed by step 1604) to determine a suggested modification to the drawing. In one example, step 1608 may use step 2408 to analyze the visual content of the drawing to determine the suggested modification to the drawing, for example when the prospective claim is used as the textual content. In one example, step 1608 may analyze the modification to the prospective claim (of step 1106) and the visual content of the drawing accessed by step 1604 using a machine learning model to determine the suggested modification to the drawing. The machine learning model may be a multimodal machine learning model trained using training examples to suggest modifications to drawings based on modifications to textual contents. An example of such training example may include a sample drawing and a sample modification to a sample textual content (such as a sample modification to a sample claim, a sample modification to a sample description section, a sample modification to a sample narrative work of art), together with a modification to the sample drawing corresponding to the modification to the sample textual content.

In some examples, step 1608 may identify a first mathematical object in a particular mathematical space, wherein the first mathematical object may correspond to a word in the modified prospective claim, for example using module 302. Further, step 1608 may calculate a convolution of at least part of the drawing to determine a second mathematical object. Further, step 1608 may base the suggested modification to the drawing on the first mathematical object and the second mathematical object. For example, step 1608 may calculate a function of the first mathematical object and the second mathematical object to obtain a particular value, for example using module 304. Further, when the particular value is a first numerical value, step 1608 may determine a first suggested modification to the drawing, and when the particular value is a second numerical value, step 1608 may determine a second suggested modification to the drawing.

In some examples, step 1608 may identify a first mathematical object in a particular mathematical space, wherein the first mathematical object may correspond to a word in the prospective claim, for example using module 302. Further, step 1608 may identify a second mathematical object in the particular mathematical space, wherein the second mathematical object may correspond to a word in the modified prospective claim, for example using module 302. Further, step 1608 may calculate a function of the first mathematical object and the second mathematical object to obtain a third mathematical object in the particular mathematical space, for example using module 304. Further, step 1608 may base the suggested modification to the drawing on the third mathematical object. For example, when the third mathematical object is in a first group of mathematical objects, step 1608 may determine a first suggested modification to the drawing, and when the third mathematical object is in a second group of mathematical objects, step 1608 may determine a second suggested modification to the drawing.

In some examples, step 1608 may comprise receive an indication of a particular style (such as style 154), for example as described above in relation to style 154. Further, step 1608 may further base the determining the suggested modification to the drawing on the particular style. For example, step 1608 may use a multimodal LLM to analyze a textual description of the style, the modification to the prospective claim and the visual content of the drawing to generate the suggested modification to the drawing in the particular style.

In some examples, step 1610 may comprise presenting the suggested modification determined by step 1608 and/or by step 1708 and/or by step 2408 and/or step 2908 to an individual. For example, presenting the suggested modification to the individual may comprise presenting the suggested modification via a user interface, may comprise presenting the suggested modification in an electronic document, may comprise presenting the suggested modification visually, may comprise presenting the suggested modification graphically, and so forth. In some examples, the presentation of the suggested modification by step 1610 may enable the individual to alter the suggested modification, for example via a user interface, using a prompt, and so forth. In some examples, the presentation of the suggested modification by step 1610 may enable the individual to reject the suggested modification. In some examples, the presentation of the suggested modification by step 1610 may include a visual indication of at least one difference between the drawing and the modified drawing. In some examples, the presentation of the suggested modification by step 1610 may include a simultaneous presentation of the drawing and the modified drawing. In some examples, the presentation of the suggested modification by step 1610 may include a presentation of the modified drawing. In some examples, the presentation of the suggested modification by step 1610 may include a presentation of a textual description of the suggested modification (for example, a textual description of the suggested modification in a natural language). For example, step 1610 may use a multimodal LLM to generate the textual description.

In some examples, the suggested modification determined by step 1608 and/or by step 1708 and/or by step 2408 and/or step 2908 may be an overhaul of the drawing. In some examples, the suggested modification determined by step 1608 and/or by step 1708 and/or by step 2408 and/or step 2908 may be limited to a specific portion of the drawing. Further, the presentation of the suggested modification by step 1610 may include a visual indication of the specific portion.

In some examples, the modification to the prospective claim (of step 1106) may include an addition of a limitation to the prospective claim. Further, the limitation may be associated with a component. Further, the component may not be illustrated in the drawing accessed by step 1604. Further, the suggested modification to the drawing determined by step 1608 may include adding an illustration of the component to the drawing. For example, the prospective claim accessed by step 1102 may include 'a first element and a second element', the drawing accessed by step 1604 may illustrate the two elements disconnected, the modification to the prospective claim may add the limitation, 'wherein the first element and the second element are connected by a circular joint', and step 1608 may suggest a modification to the drawing to add an illustration of the circular joint and to reposition at least one of the elements so that the two elements are connected by the circular joint.

In some examples, the modification to the prospective claim (of step 1106) may include an addition of a limitation to the prospective claim. Further, the drawing accessed by step 1604 may be inconsistent with the limitation. Further, the suggested modification to the drawing determined by step 1608 may include modifying the drawing to be consistent with the limitation. For example, the prospective claim accessed by step 1102 may include 'a first element and a second element', the drawing accessed by step 1604 may illustrate the two elements with a 90 degrees angle between them, the modification to the prospective claim may add the limitation, 'wherein a degree between the first element and the second element is less than 75 degrees', and step 1608 may suggest a modification to the drawing to change the angle between the elements to be less than 75 degrees (for example, 60 degrees, 45 degrees, and so forth).

In some examples, the modification to the prospective claim (of step 1106) may include a removal of a particular limitation from the prospective claim. Further, the particular limitation may be associated with a first component and a second component. The first component may not be associated with any other limitation of the prospective claim. The second component may be further associated with another limitation of the prospective claim. Further, the drawing accessed by step 1604 may include an illustration of the first component and an illustration of the second component. Further, the suggested modification to the drawing determined by step 1608 may include removing the illustration of the first component from the drawing while preserving the illustration of the second component in the drawing. For example, the prospective claim accessed by step 1102 may include 'a chair, wherein the chair includes a backrest connected to a seat, and wherein the chair includes an armrest connected to the seat'. The drawing accessed by step 1604 may illustrate the chair including the backrest, the seat and the armrest. The modification to the prospective claim may remove the limitation, 'wherein the chair includes an armrest connected to the seat', that includes three components, a chair, an armrest and a seat. Both the chair and the seat are also specified in other limitation, while the armrest is not specified in any other limitation. Step 1608 may suggest a modification to the drawing to remove the illustration of the armrest while keeping the illustration of the chair including the backrest and the seat. In some examples, after step 1608 removes the illustration of the first component from the drawing, step 1608 may use an inpainting algorithm to fill the void created by the removal of the illustration of the first component.

In some examples, the prospective claim accessed by step 1102 may be a dependent claim. Further, the dependent claim may refer to and further limits the particular claim. Further, the modification to the prospective claim (of step 1106) may include an addition of a limitation to the prospective claim. In one example, the drawing may be consistent with the limitation, and the suggested modification to the drawing determined by step 1608 may include modifying the drawing to be inconsistent with the limitation. For example, the particular claim may include 'a first element and a second element', the drawing accessed by step 1604 may illustrate the two elements with a 60 degrees angle between them, the modification to the prospective claim may add the limitation, 'wherein a degree between the first element and the second element is less than 75 degrees', and step 1608 may suggest a modification to the drawing to change the angle between the elements to be more than 75 degrees (for example, 80 degrees, 90 degrees, and so forth).

In some examples, the prospective claim accessed by step 1102 may be a dependent claim. Further, the dependent claim may refer to and further limits a particular claim. Further, the modification to the prospective claim (of step 1106) may include an addition of a limitation to the prospective claim. In one example, a particular element of the drawing of step 1604 may be associated with the limitation, and the suggested modification to the drawing determined by step 1608 may include modifying the drawing to indicate that the particular element of the drawing is optional. For example, the suggested modification to the drawing may include modifying a solid line to a dashed line to indicate that the particular element of the drawing is optional.

In some examples, the prospective claim accessed by step 1102 may include a noun. Further, the modified prospective claim (of step 1106) may include the noun and an adjective adjacent to the noun, wherein the adjective may not be included in the prospective claim. In one example, the drawing accessed by step 1604 may depict an element associated with the noun. Further, the suggested modification to the drawing determined by step 1608 may include a modification to the element based on the adjective. For example, the prospective claim accessed by step 1102 may include 'a shaft configured to transmit power from the first element to the second element'. Further, the drawing accessed by step 1604 may include an illustration of a shaft with a circular cross section. Further, the modified prospective claim (of step 1106) may include 'a rectangular shaft configured to transmit power from the first element to the second element'. Further, the suggested modification to the drawing determined by step 1608 may include a modification of the illustration of the shaft in the drawing to an illustration of a shaft with a rectangular cross section.

In some examples, the prospective claim accessed by step 1102 may include a verb. Further, the modified prospective claim (of step 1106) may include the verb and an adverb adjacent to the verb, wherein the adverb may not be included in the prospective claim. In one example, the drawing accessed by step 1604 may depict an element associated with the verb. Further, the suggested modification to the drawing determined by step 1608 may include a modification to the element based on the adverb. For example, the prospective claim accessed by step 1102 may include 'the virtual control moves outside of the first region'. Further, the drawing accessed by step 1604 may include an illustration of the first region, an illustration of the virtual control, and a straight arrow illustrating the path of movement of the virtual control from within to outside the first region. Further, the modified prospective claim (of step 1106) may include 'the virtual control moves in a rounded path outside of the first region'. Further, the suggested modification to the drawing determined by step 1608 may include a replacement of the straight arrow with a rounded arrow.

FIG. 17 is a flowchart of an exemplary method 1700 for modifying drawings based on changes to descriptions. In this example, method 1700 may comprise accessing a textual content of a description section for a prospective patent application (step 1104); accessing a visual content of a drawing for the prospective patent application (step 1604); receiving an indication of a modification to the description section (step 1706); based on the modification to the description section, analyzing the visual content of the drawing to determine a suggested modification to the drawing (step 1708); and presenting the suggested modification to an individual (step 1610). In other examples, method 1700 may include additional steps or fewer steps. In other examples, one or more steps of method 1700 may be executed in a different order and/or one or more groups of steps may be executed simultaneously.

In some examples, step 1706 may comprise receiving an indication of a modification to the description section (of step 1104). For example, receiving the indication by step 1706 may comprise reading the indication from memory, may comprise receiving the indication from an external computing device (for example, via a digital communication device), may comprise receiving the indication from a person (for example, via a user interface), may comprise determining the indication by monitoring an electronic document that includes the description section, and so forth. In one example, the modification to the description section may be a modification made by the individual. In one example, the modification to the description section may be a modification made using a machine learning model. In one example, the modification to the description section may be a modification triggered by the individual. In one example, the modification to the description section may be a modification triggered by a modification to a claim of the prospective patent application. In one example, the modification to the description section may be a modification triggered by a modification to another drawing.

In some examples, step 1708 may comprise, based on the modification to the description section, analyzing a visual content of a drawing (such as the visual content of the drawing accessed by step 1604) to determine a suggested modification to the drawing. In one example, step 1708 may use step 2408 to analyze the visual content of the drawing to determine the suggested modification to the drawing, for example when the description section is used as the textual content. In some examples, step 1708 may analyze the modification to the description section and/or the visual content of the drawing using a machine learning model to determine the suggested modification to the drawing. For example, the machine learning model may be the multi-modal machine learning model described in relation to step 1608.

In some examples, step 1708 may identify a first mathematical object in a particular mathematical space, wherein the first mathematical object may correspond to a word in the modified description section, for example using module 302. Further, step 1708 may calculate a convolution of at least part of the drawing to determine a second mathematical object. Further, step 1708 may base the suggested modification to the drawing on the first mathematical object and the second mathematical object, for example as described above in relation to step 1608.

In some examples, step 1708 may identify a first mathematical object in a particular mathematical space, wherein the first mathematical object may correspond to a word in the description section, for example using module 302. Further, step 1708 may identify a second mathematical object in the particular mathematical space, wherein the second mathematical object may correspond to a word in the modified description section, for example using module 302. Further, step 1708 may calculate a function of the first mathematical object and the second mathematical object to obtain a third mathematical object in the particular mathematical space, for example using module 304. Further, step 1708 may base the suggested modification to the drawing on the third mathematical object, for example as described above in relation to step 1608.

In some examples, the description section accessed by step 1104 may describe a plurality of constraints associated with a particular element. Further, the modification to the description section (of step 1706) may include an addition of a description of an additional constraint associated with the particular element to the description section, wherein the additional constraint may not be included in the plurality of constraints. In one example, the drawing accessed by step 1604 may include an illustration of the particular element that is inconsistent with the additional constraint, and the suggested modification to the drawing determined by step 1708 may include modifying the illustration of the particular element to be consistent with the additional constraint. For example, the description section accessed by step 1104 may include 'The two parts may be connected by a flexible tube. The tube may be connected to the first part at the first aperture. The tube is connected to the first aperture by a gasket.' Further, the modification to the description section (of step 1706) may add the constraint 'The tube diameter at the side connected to the first part is larger than the tube diameter at the side connected to the second part.' Further, the drawing accessed by step 1604 may include an illustration of a tube that has the same diameter at both ends. Further, the suggested modification to the drawing determined by step 1708 may include modifying the illustration of the tube to have a larger diameter at the side connected to the first part.

In some examples, the description section accessed by step 1104 may describe a plurality of components. Further, the modification to the description section (of step 1706) may include an addition of a description of an additional component to the description section, wherein the additional component may not be included in the plurality of components, and wherein the additional component may not be illustrated in the drawing accessed by step 1604. Further, the suggested modification to the drawing determined by step 1708 may include adding an illustration of the additional component to the drawing. For example, the description section accessed by step 1104 may include 'The two parts may be connected by a flexible tube'. Further, the modification to the description section (of step 1706) may include an addition of 'The tube is connected to the first aperture by a gasket'. The drawing accessed by step 1604 may include no illustration of a gasket. Further, the suggested modification to the drawing determined by step 1708 may include adding an illustration of a gasket to the drawing.

In some examples, the description section accessed by step 1104 may describe a plurality of constraints. Further, the modification to the description section determined by step 1708 may include a removal of a particular constraint from the description section. The particular constraint may be associated with a first component and a second component, wherein the first component may not be associated with any other constraint of the plurality of constraints, and wherein the second component may be further associated with another constraint of the plurality of constraints. Further, the drawing accessed by step 1604 may include an illustration of the first component and an illustration of the second component. Further, the suggested modification to the drawing determined by step 1708 may include removing the illustration of the first component from the drawing while preserving the illustration of the second component in the drawing. For example, the description section accessed by step 1104 may include 'a table is provided, with four legs holding a top, and with stretchers connecting the legs in an H layout'. Further, the modification to the description section determined by step 1708 may remove the 'and with stretchers connecting the legs in an H layout' constraint from the description section. Further, the drawing accessed by step 1604 may include illustrations of the top, the legs and the stretchers. Further, the suggested modification to the drawing determined by step 1708 may remove illustrations of the stretchers from the drawing, while keeping illustrations of the legs and the top in the drawings.

In some examples, the description section accessed by step 1104 may include a noun. Further, the modified description section (of step 1706) may include the noun and an adjective adjacent to the noun, wherein the adjective may not be included in the description section. Further, the drawing accessed by step 1604 may depict an element associated with the noun. Further, the suggested modification to the drawing determined by step 1708 may include a modification to the element based on the adjective. For example, the description section accessed by step 1104 may include 'a bearing configured to support motion'. Further, the drawing accessed by step 1604 may include an illustration of a rotational bearing with a circular shape. Further, the modified description section (of step 1706) may replace the above text with 'a rectangular bearing configured to support linear motion'. Further, the suggested modification to the drawing determined by step 1708 may include a modification of the illustration of the bearing in the drawing to an illustration of a linear bearing with a rectangular shape.

In some examples, the description section accessed by step 1104 may include a verb. Further, the modified description section (of step 1706) may include the verb and an adverb adjacent to the verb, wherein the adverb may not be included in the description section. Further, the drawing accessed by step 1604 may depict an element associated with the verb. Further, the suggested modification to the drawing determined by step 1708 may include a modification to the element based on the adverb. For example, the description section accessed by step 1104 may include 'the virtual control moves outside of the first region'. Further, the drawing accessed by step 1604 may include an illustration of the first region, an illustration of the virtual control, and a straight arrow illustrating the path of movement of the virtual control from within to outside the first region. Further, the modified prospective claim (of step 1706) may replace the above text with 'the virtual control moves in a rounded path outside of the first region'. Further, the suggested modification to the drawing determined by step 1708 may include a replacement of the straight arrow with a rounded arrow.

In some examples, step 1708 may comprise receive an indication of a particular style (such as style 154), for example as described above in relation to style 154. Further, step 1708 may further base the suggested modification to the drawing on the particular style. For example, step 1708 may use a multimodal LLM to analyze a textual description of the style, the modification to the description section and the visual content of the drawing to generate the suggested modification to the drawing in the particular style.

In the example of FIG. 15, step 1104 may access textual content 1504 of a description (only a part of the description section is shown in FIG. 15), and step 1604 may access drawing 1502. As described above, textual content 1504 may include 'Two identical bars are connected to a circular joint and creates a 60 degrees angle. The bars may be made of wood or metal', and drawing 1502 may illustrate two elements of similar sizes connected at a joint and creates a 60 degrees angle. Further, the description section may be modified, for example by replacing the textual content shown in 1504 by the textual content shown in 1508, 'Two bars of different sizes are connected to a circular joint and creates a 90 degrees angle. The bars may be made of wood or metal', and step 1706 may receive an indication of the modification. Further, in response to the modification, step 1708 may suggest a modification to the visual content of drawing 1502, for example by suggesting to replace it with the drawing shown in 1506.

FIG. 18 is a flowchart of an exemplary method 1800 for analyzing claims and product descriptions. In this example, method 1800 may comprise accessing a first textual content, the first textual content includes a particular claim of a particular patent application (step 1802); analyzing the first textual content to break the particular claim to a plurality of elements (step 1804); accessing a second textual content, the second textual content includes a description of a product (step 1806); analyzing the first textual content and the second textual content to attempt to identify, for each element of the plurality of elements, an evidence of use corresponding to the respective element (step 1808); and, for each element of the plurality of elements, outputting an indication of the respective element and an indication of whether the attempt to identify the evidence of use corresponding to the respective element was successful (step 1810). In other examples, method 1800 may include additional steps or fewer steps. In other examples, one or more steps of method 1800 may be executed in a different order and/or one or more groups of steps may be executed simultaneously. In some examples, the product may be a prospective product. In some examples, the product may be a product already built and/or sold.

In some examples, step 1802 may comprise accessing a first textual content, wherein the first textual content may include a particular claim of a particular patent application, for example using step 402. In some examples, the particular patent application may be at least one of an issued or a granted patent. In some examples, the particular patent application may be a pending patent application. In some examples, the particular patent application may be a pending patent application, and the particular claim may be a possible claim after a possible amendment to a pending claim of the pending patent application. In some examples, the particular patent application may be a prospective patent application and the particular claim may be a prospective claim for the prospective patent application. For example, the prospective patent application may be a prospective continuation or a prospective divisional of a pending patent application.

In some examples, step 1804 may comprise analyzing the first textual content accessed by step 1802 to break the particular claim to a plurality of elements. In some examples, the analyzing the first textual content to break the particular claim to the plurality of elements by step 1804 may comprise using a machine learning model to analyze the first textual content to break the particular claim to the plurality of elements. The machine learning model may be a machine learning model trained using training examples to break claims into elements. An example of such training example may include a sample claim, together with a label indicating the elements included in the sample.

In some examples, step 1804 may identify a first mathematical object in a particular mathematical space, wherein the first mathematical object may correspond to a first word in the particular claim accessed by step 1802, for example using module 302. Further, step 1804 may identify a second mathematical object in the particular mathematical space, wherein the second mathematical object may correspond to a second word in the particular claim accessed by step 1802, for example using module 302. Further, step 1804 may identify a third mathematical object in the particular mathematical space, wherein the third mathematical object may correspond to a third word in the particular claim accessed by step 1802, for example using module 302. Further, step 1804 may base the breaking of the particular claim to the plurality of elements on the first mathematical object, the second mathematical object and the third mathematical object. For example, step 1804 may calculate a function of the first mathematical object and the second mathematical object to obtain a fourth mathematical object in the particular mathematical space, for example using module 304. Further, based on the fourth mathematical object, step 1804 may determine whether the first word and the second word are included in a same element of the plurality of elements (for example, determine that the first word and the second word are included in a same element). Further, step 1804 may calculate a function of the first mathematical object and the third mathematical object to obtain a fifth mathematical object in the particular mathematical space, for example using module 604. Further, based on the fifth mathematical object, step 1804 may determine whether the first word and the third word are included in a same element of the plurality of elements (for example, determine that the first word and the third word are included in different elements). Further, step 1804 may base the breaking of the particular claim to the plurality of elements on the determination that the first word and the second word are included in the same element and the determination that the first word and the third word are included in different elements of the plurality of elements.

In some examples, step 1806 may comprise accessing a second textual content, wherein the second textual content may include a description of a product, for example using step 802. In some examples, the second textual content may be or include at least part of a description section of a different patent application. In some examples, the second textual content may be or include at least part of a product requirements document associated with the product. In some examples, the second textual content may be or include at least part of a manual associated with the product. In some examples, the second textual content may be or include at least part of a marketing material associated with the product. In some examples, the second textual content may be or include a textual content in a natural language. In some examples, the second textual content may be or include a source code associated with the product.

In some examples, step 1808 may comprise analyzing the first textual content accessed by step 1802 and the second textual content accessed by step 1806 to attempt to identify, for each element of the plurality of elements (of step 1804), an evidence of use corresponding to the respective element. In some examples, step 1808 may comprise analyzing the first textual content accessed by step 1802 and the second textual content accessed by step 1806 to attempt to identify an evidence of use corresponding to a particular element of the plurality of elements. In some examples, analyzing the first textual content and the second textual content to attempt to identify the evidence of use corresponding to the particular element by step 1808 may comprise using a machine learning model to analyze the first textual content and the second textual content to attempt to identify the evidence of use corresponding to the particular element. The machine learning model may be a machine learning model trained using training examples to attempt to identify evidence of use corresponding to products and elements of claims based on textual descriptions of the products. An example of such training example may include a sample element of a sample claim and a sample textual description of a sample product, together with a label indicating whether an evidence of use of the sample element exists in the sample textual description and/or a label indicating the portion of the sample textual description including the evidence of use of the sample element and/or a sample textual description of the evidence of use of the sample element (for example, in a natural language).

In some examples, step 1808 may identify a first mathematical object in a particular mathematical space, wherein the first mathematical object may correspond to a word in the particular claim accessed by step 1802, for example using module 302. Further, step 1808 may identify a second mathematical object in the particular mathematical space, wherein the second mathematical object may correspond to a word in the second textual content accessed by step 1806, for example using module 302. Further, step 1808 may calculate a function of the first mathematical object and the second mathematical object to obtain a third mathematical object in the particular mathematical space, for example using module 304. Further, step 1808 may base the attempt to identify an evidence of use corresponding to a particular element of the plurality of element on the third mathematical object. In one example, the word in the particular claim may be a word in the particular element. In another example, the word in the particular claim may be a word of a specific element of the plurality of elements, wherein the specific element differs from the particular element. In some examples, step 1808 may calculate a convolution of at least part of a visual content associated with the product to determine a fourth mathematical object. Further, the third mathematical object may be a function of the first mathematical object, the second mathematical object and the fourth mathematical object. In some examples, when the third mathematical object is in a first group of mathematical objects, the attempt of step 1808 may be successful, and when the third mathematical object is in a second group of mathematical objects, the attempt of step 1808 may be a failure. In another example, when the third mathematical object is in a third group of mathematical objects, step 1808 may determine that a first portion of the second textual content includes an evidence of use corresponding to the particular element, and/or when the third mathematical object is in a fourth group of mathematical objects, step 1808 may determine that the first portion of the second textual content include no evidence of use corresponding to the particular element. In yet another example, step 1808 may use the third mathematical object as an input to a generative model to cause it to generate textual description of the evidence of use corresponding to the particular element.

In some examples, a visual content associated with the product may be accessed, for example as described above in relation to method 800. For example, the visual content may include an image of the product and/or a video of the product and/or illustration of the product. In one example, the visual content may be an image, a video and/or an illustration of at least part of the product (for example, of at least part of an internal part of the product, of at least part of the exterior surface of the product, and so forth). In one example, the visual content may be an illustration of a usage procedure associated with the product. In one example, the visual content may be an illustration of assembly instructions associated with the product. In one example, the visual content may be a video depicting usage of the product. In some examples, step 1808 may further base the attempt to identify an evidence of use corresponding to a particular element of the plurality of element on an analysis of the visual content. For example, step 1808 may further base the attempt on a convolution of at least part of the visual content, as described above. In one example, step 1808 may use a multimodal machine learning model to analyze the first textual content, the second textual content and the visual content to attempt to identify an evidence of use corresponding to the particular element. The multimodal machine learning model may be a multimodal machine learning model trained using training examples to attempt to identify evidence of use corresponding to products and elements of claims based on textual descriptions of the products and/or visual content associated with the products. An example of such training example may include a sample element of a sample claim and/or a sample textual description of a sample product and/or a sample visual content associated with the sample product, together with a label indicating whether an evidence of use of the sample element exists in the sample textual description and/or the sample textual content. Additionally or alternatively to said label, the training example may include a label indicating the portion of the sample textual description including the evidence of use of the sample element and/or a label indicating a region of the sample visual content including the evidence of use and/or a sample textual description of the evidence of use of the sample element (for example, in a natural language).

In some examples, a textual input in a natural language may be received from the individual, for example as described above. Further, step 1808 may base the attempt to identify an evidence of use corresponding to a particular element of the plurality of element on an analysis of the textual input. For example, step 1808 may use a LLM to analyze the first textual content, the second textual content and/or the textual input to attempt to identify an evidence of use corresponding to the particular element. In one example, the textual input may indicate of a desired level of evidence for the evidence of use corresponding to the particular element. In one example, the textual input may include an assumption that may be used in the attempt to identify the evidence of use corresponding to a particular element. In one example, the textual input may include a priori data that may be used in the attempt to identify the evidence of use corresponding to a particular element. In one example, the textual input may include an indication of a specific portion of the description of the product accessed by step 1806 to focus the analysis of step 1808 at the specific portion.

In some examples, the second textual content may be analyzed to identify a group of features of the product, for example using step 804. Further, step 1808 may analyze, based on the group of features of the product, the first textual content to attempt to identify the evidence of use corresponding to a particular element of the plurality of elements. For example, a machine learning model may be trained using training examples to attempt to identify evidence of use corresponding to products and elements of claims based on groups of features. An example of such training example may include a sample group of features and a sample element of a sample claim, together with a label indicating whether an evidence of use of the sample element exists and/or an indication of a sample feature of the sample group of features corresponding to the evidence of use. Additionally or alternatively to said label, the training example may include a sample textual description of the evidence of use of the sample element (for example, in a natural language).

In some examples, step 1810 may comprise, for each element of the plurality of elements (of step 1804), outputting an indication of the respective element and an indication of whether the attempt to identify the evidence of use corresponding to the respective element by step 1808 was successful. For example, outputting, by step 1810, of the indication of a particular element and of the indication of whether the attempt to identify the evidence of use corresponding to the particular element was successful may comprise storing a digital encoding of at least one of the two indications in memory, may comprise transmitting a digital encoding of at least one of the two indications to an external device (for example, using a digital communication device), may comprise associating the two indications with one another in a data-structure, may comprise generating or modifying an electronic document to include at least one of the two indications, may comprise presenting at least one of the two indications (for example, to an individual, via a user interface, visually, textually, graphically, audibly, and so forth), may comprise presenting the two indications in a row (or a column) of a table, may comprise presenting the two indications in a claim chart, and so forth. In some examples, the presentation of the at least one of the two indications to an individual may enable the individual to reject the indication and/or to alter the indication.

Additionally or alternatively, step 1810 may comprise outputting evidence of use corresponding to a particular element of the plurality of elements, for example outputting evidence of use determined as described above. In one example, step 1810 may output, for each element of the plurality of elements (of step 1804), evidence of use corresponding to a particular element of the plurality of elements. For example, outputting an evidence of use by step 1810 may comprise storing a digital encoding of the evidence of use in memory, may comprise transmitting a digital encoding of the evidence of use to an external device (for example, using a digital communication device), may comprise associating the evidence of use with at least one of the two indications in a data-structure, may comprise generating or modifying an electronic document to include the evidence of use, may comprise presenting the evidence of use (for example, to an individual, via a user interface, visually, textually, graphically, audibly, and so forth), may comprise presenting the evidence of use with at least one of the two indications in a row (or a column) of a table, may comprise presenting the evidence of use in a claim chart, and so forth. In some examples, the presentation of the evidence of use to an individual may enable the individual to reject the evidence of use and/or to alter the evidence of use.

In some examples, based on outcomes of the attempts of step 1808, step 1808 may further determine whether the product infringes the particular claim accessed by step 1802. In one example, when all the attempts of step 1808 are successful, step 1808 may determine that the product infringes the particular claim. In one example, when at least one of the attempts of step 1808 fails, step 1808 may avoid determining that the product infringes the particular claim. In one example, the particular claim may refer to and further limit a specific claim of the particular patent application, and the determination of whether the product infringes the particular claim by step 1808 may be further based on an analysis of the specific claim (for example, recursive analysis using method 1800). In one example, when all the attempts of step 1808 are successful and the analysis of the specific claim indicates that the product infringes the specific claim, step 1808 may determine that the product infringes the particular claim. In one example, the analysis of the specific claim does not indicate that the product infringes the specific claim, step 1808 may avoid determining that the product infringes the particular claim. In some examples, step 1810 may output an indication of whether the product infringes the particular claim, additionally or alternatively to the other outputs. For example, outputting the indication of whether the product infringes the particular claim by step 1810 may comprise storing a digital encoding of the indication in memory, may comprise transmitting a digital encoding of the indication to an external device (for example, using a digital communication device), may comprise generating or modifying an electronic document to include the indication, may comprise presenting the indication (for example, to an individual, via a user interface, visually, textually, graphically, audibly, and so forth), and so forth. In some examples, the presentation of the indication to an individual may enable the individual to reject the indication and/or to alter the indication.

In some examples, step 1808 may analyze the second textual content to identify a particular portion of the second textual content associated with a particular element of the plurality of elements. For example, the machine learning model described above in relation to step 1808 may be used to analyze the second textual content to identify the portion of the second textual content including the evidence of use of the particular element, thereby identifying the particular portion. Further, step 1810 may output an indication of the particular portion of the second textual content, additionally or alternatively to the other outputs. For example, outputting the indication of the particular portion of the second textual content by step 1810 may comprise storing a digital encoding of the indication in memory, may comprise transmitting a digital encoding of the indication to an external device (for example, using a digital communication device), may comprise generating or modifying an electronic document to include the indication, may comprise presenting the indication (for example, to an individual, via a user interface, visually, textually, graphically, audibly, and so forth), may comprise presenting a citation from the particular portion, and so forth. In some examples, the presentation of the indication to an individual may enable the individual to reject the indication and/or to alter the indication.

In some examples, step 1808 may analyze a visual content associated with the product of step 1806 to identify a particular portion of the visual content associated with a particular element of the plurality of elements of step 1804. For example, the machine learning model described above in relation to step 1808 may be used to analyze the visual content to identify the portion of the visual content including the evidence of use of the particular element, thereby identifying the particular portion. Further, step 1810 may output an indication of the particular portion of the visual content. For example, outputting the indication of the particular portion of the visual content by step 1810 may comprise storing a digital encoding of the indication in memory, may comprise transmitting a digital encoding of the indication to an external device (for example, using a digital communication device), may comprise generating or modifying an electronic document to include the indication, may comprise presenting the indication (for example, to an individual, via a user interface, visually, textually, graphically, audibly, and so forth), may comprise presenting an overlay over the visual content indicating the particular portion, and so forth. In some examples, the presentation of the indication to an individual may enable the individual to reject the indication and/or to alter the indication.

FIG. 19 is a flowchart of an exemplary method 1900 for maintaining consistency of textual contents. In this example, method 1900 may comprise accessing a textual content in a natural language (step 1902); receiving an indication of a modification to the textual content, the modification to the textual content includes a modification to a first portion of the textual content and no modification to any other portion of the textual content (step 1904); and analyzing the textual content to determine that the modification to the first portion caused an inconsistency between the modified first portion and a second portion of the textual content (step 1906). In one example, method 1900 may further comprise presenting an indication of the inconsistency (step 1908). In another example, method 1900 may further comprise generating an additional modification to the textual content, wherein the additional modification to the textual content cures the inconsistency (step 1910); and presenting the generated additional modification (step 1912). In yet another example, method 1900 may further comprise step 1908, step 1910 and step 1912. In other examples, method 1900 may include additional steps or fewer steps. In other examples, one or more steps of method 1900 may be executed in a different order and/or one or more groups of steps may be executed simultaneously. In one example, the textual content may be a textual content for a narrative work of art. In one example, at least one sentence may separate the first portion from the second portion. In one example, at least one paragraph may separate the first portion from the second portion. In one example, at least one chapter may separate the first portion from the second portion. In one example, the modification to the first portion (of step 1904) may be a modification triggered by an individual, and the presentation of the indication of the inconsistency by step 1908 may be a presentation of the indication of the inconsistency to the individual.

In some examples, step 1902 may comprise accessing a textual content in a natural language, for example as described above in relation to step 402.

In some examples, step 1904 may comprise receiving an indication of a modification to the textual content accessed by step 1902. The modification to the textual content may include a modification to a first portion of the textual content and no modification to any other portion of the textual content. For example, receiving the indication by step 1904 may comprise reading the indication from memory, may comprise receiving the indication from an external computing device (for example, via a digital communication device), may comprise receiving the indication from a person (for example, via a user interface), may comprise determining the indication by monitoring an electronic document that includes the textual content, and so forth. In some examples, the modification to the first portion may be a modification triggered by an individual. In some examples, the modification to the first portion may be a modification generated using a machine learning model (for example, by method 1900 in a recursive scheme).

In some examples, step 1906 may comprise analyzing the textual content accessed by step 1902 to determine that the modification to the first portion (of step 1904) caused an inconsistency between the modified first portion and a second portion of the textual content. In some examples, the analyzing the textual content to determine that the modification to the first portion caused the inconsistency between the modified first portion and the second portion by step 1906 may comprise using a machine learning model to analyze the textual content to determine that the modification to the first portion caused the inconsistency. The machine learning model may be a machine learning model trained using training examples to identify inconsistencies between different portions of textual contents. An example of such training example may include a sample textual content including a sample portion, together with a label indicative of an existence of an inconsistency between the sample portion and another portion of the textual content.

In some examples, step 1906 may identify a first mathematical object in a mathematical space, wherein the first mathematical object may correspond to a word of the modified first portion, for example using module 302. Further, step 1906 may identify a second mathematical object in the mathematical space, wherein the second mathematical object may correspond to a word of the second portion, for example using module 302. Further, step 1906 may base the determination that the modification to the first portion caused the inconsistency on the first mathematical object and the second mathematical object. For example, step 1906 may calculate a function of the first mathematical object and the second mathematical object to obtain a particular value, for example using module 304. Further, when the particular value is a first numerical value, step 1906 may determine that there is an inconsistency between the first portion and the second portion, and when the particular value is a second numerical value, step 1906 may determine that there is no inconsistency between the first portion and the second portion.

In some examples, the textual content accessed by step 1902 may be a textual content of a narrative work of art. Further, the inconsistency of step 1906 may be a continuity error. Some non-limiting examples of such narrative work of art may include a novel, a textual content of comics, a script, a screenplay, a teleplay, a stage-play, a radio-play or a libretto.

In some examples, the textual content accessed by step 1902 may describe a person. Further, the modified first portion may include a first characteristic of the person, and the second portion may include a second characteristic of the person. Further, the inconsistency (of step 1906) between the modified first portion and the second portion may be an inconsistency between the first characteristic of the person and the second characteristic of the person. For example, the modified first portion may indicate that the person is tall, while the second portion may indicate that the person is of short stature. In another example, the modified first portion may indicate that the person was born in California, while the second portion may indicate that the person was born in New York.

In some examples, the textual content accessed by step 1902 may describe an inanimate object. Further, the modified first portion may include a first characteristic of the inanimate object, and the second portion may include a second characteristic of the inanimate object. Further, the inconsistency (of step 1906) between the modified first portion and the second portion may be an inconsistency between the first characteristic of the inanimate object and the second characteristic of the inanimate object. For example, the modified first portion may indicate that the inanimate object is small and heavy, while the second portion may indicate that the inanimate object floats over water. In another example, the modified first portion may indicate that the inanimate object is owned by one person, while the second portion may indicate that the inanimate object is owned by another person.

In some examples, the textual content accessed by step 1902 may describe a place. Further, the modified first portion may include a first characteristic of the place, and the second portion may include a second characteristic of the place. Further, and the inconsistency (of step 1906) between the modified first portion and the second portion may be an inconsistency between the first characteristic of the place and the second characteristic of the place. For example, the modified first portion may indicate that the place is indoor, while the second portion may indicate that the place is outdoor. In another example, the modified first portion may indicate that twelve people drove together comfortably in an elevator, while the second portion may indicate that barely three people could fit in the elevator.

In some examples, step 1908 may comprise presenting an indication of the inconsistency (of step 1906). For example, the indication of the inconsistency may be a visual indication, a textual indication, a graphical indication, an audible indication, and so forth. For example, presenting the indication of the inconsistency may comprise presenting the indication via a user interface, may comprise presenting the indication in an electronic document (for example, in an electronic document that includes the textual content), may comprise presenting the indication to an individual, and so forth.

In some examples, step 1906 may analyze the textual content accessed by step 1902 to identify a fragment of at least part but not all of the textual content corresponding to the inconsistency. For example, step 1906 may use a LLM to analyze the textual content and identify the fragment. In one example, the fragment may be a fragment of at least part but not all of the modified first portion, may be a fragment of at least part but not all of the second portion, may be have no common part with any one of the first portion, the modified first portion or the second portion, and so forth. Further, step 1908 may include an indication of the identified fragment corresponding to the inconsistency in the presented indication of the inconsistency. For example, the indication of the fragment may be a visual indication, a textual indication, a graphical indication, an audible indication, and so forth. In some examples, step 1906 may analyze the modified first portion (of step 1904) to identify a fragment of at least part but not all of the modified first portion corresponding to the inconsistency. For example, step 1906 may use a LLM to analyze the modified first portion and identify the fragment. In some examples, step 1906 may analyze the second portion to identify a fragment of at least part but not all of the second portion corresponding to the inconsistency. For example, step 1906 may use a LLM to analyze the modified second portion and identify the fragment. In some examples, step 1906 may analyze the textual content to identify a fragment of the textual content associated with the inconsistency. For example, step 1906 may use a LLM to analyze the textual content and identify the fragment. In some examples, the modified first portion may be 'Martha loves Gary. It was a love at first sight, ever since they first met over 20 years ago', the second portion may be 'When Martha first met Gary, in New York, she was a young women seeking success in the big city', and a third portion may be 'Seeing Gary riding the horse on the rocky mountains made Martha fall in love with Gary'. An example of such fragment of the modified first portion may be 'Martha loves Gary. It was a love at first sight', an example of such fragment of the second portion may be 'When Martha first met Gary, in New York', and an example of such fragment that has no common part with any one of the first portion, the modified first portion or the second portion may be the entire third portion.

In some examples, step 1910 may comprise generating an additional modification to the textual content accessed by step 1902. The additional modification to the textual content may cure the inconsistency. In some examples, step 1910 may use a machine learning model to analyze at least part of the textual content to generate the additional modification to the textual content. The machine learning model may be a machine learning model trained using training examples to generate modifications to textual contents to cure inconsistencies. An example of such training example may include a sample textual content including a sample inconsistency, together with a sample modification to the sample textual content that cures the sample inconsistency. In some examples, the additional modification generated by step 1910 may include at least one phrase not included in the textual content (before or after the modification of step 1904).

In some examples, step 1910 may receive an indication of a particular style (such as style 154), for example as described above in relation to style 154. Further, step 1910 may base the generating the additional modification on the particular style. For example, step 1910 may use a LLM to generate the additional modification to the textual content in the particular style. In some examples, the additional modification may include an addition of a portion of a dialog associated with a specific character. Further, step 1910 may generate the portion of the dialog associated with the specific character based on a style associated with the character. For example, information related to the character may be accessed to determine the style associated with the character. In one example, the additional modification may further include an addition of a second portion, wherein the second portion may not be associated with the specific character. Further, step 1910 may generate the second portion on a second style different from the style associated with the character. For example, the second portion may be a portion of a dialog associated with a second character, and information related to the character may be accessed to determine the second style. In another example, the second portion may be a portion associated with a narrator, and the second style may be a style associated with the narrator.

In some examples, step 1910 may identify a first mathematical object in a mathematical space, wherein the first mathematical object may correspond to a word of the modified first portion, for example using module 302. Further, step 1910 may identify a second mathematical object in the mathematical space, the second mathematical object may correspond to a word of the second portion, for example using module 302. Further, step 1910 may calculate a function of the first mathematical object and the second mathematical object to obtain a third mathematical object in the mathematical space, wherein the third mathematical object may correspond to a particular word, the particular word is not included in the textual content, for example using module 304. Further, step 1910 may include in the generated additional modification an addition of the particular word to the textual content.

In some examples, step 1910 may identify a first mathematical object in a mathematical space, wherein the first mathematical object may correspond to a word of the modified first portion, for example using module 302. Further, step 1910 may identify a second mathematical object in the mathematical space, the second mathematical object may correspond to a word of the second portion, for example using module 302. Further, step 1910 may select a part of the textual content based on the first mathematical object and the second mathematical object. For example, step 1910 may calculate a first function of the first mathematical object and the second mathematical object to obtain a first non-negative integer n, may calculate a second function of the first mathematical object and the second mathematical object to obtain a second non-negative integer m, and may select the part of the textual content between the n-th word and the m-th word. For example, the selected part of the textual content may include at least part of the modified first portion, may include at least part of the second portion, may be included in the modified first portion, may be included in the second portion, may have no part in common with any one of the modified first portion or the second portion, and so forth. In some examples, step 1910 may include in the generated additional modification a removal of the selected part of the textual content from the textual content. In one example, the additional modification generated by step 1910 may further include replacing the selected part of the textual content with an alternative text.

In some examples, the additional modification to the textual content generated by step 1910 may be an alternative modification to the first portion. In one example, step 1910 may analyze the modified first portion (of step 1904) to generate the alternative modification to the first portion, for example using a LLM. In one example, the alternative modification to the first portion may include at least one detail added by the modification to the first portion.

In some examples, the additional modification to the textual content generated by step 1910 may be a modification to the second portion. In one example, step 1910 may analyze the second portion to generate the modification to the second portion, for example using a LLM. In one example, the modification to the second portion may remove at least one detail from the second portion inconsistent with at least one detail added by the modification to the first portion.

In some examples, the additional modification to the textual content generated by step 1910 may be a modification to a third portion of the textual content. The modification to the third portion may explain the inconsistency. The third portion may have no part in common with any one of the modified first portion or the second portion. In one example, the first portion may be associated with a first time period, the second portion may be associated with a second time period, and the modification to the third portion may describe in the natural language a change that occurred between the first time period and the second time period. For example, the first portion may indicate that a character lives in New York, the second portion may indicate that the character lives in Los Angeles, and the modification to the third portion may add a description of the character moving from New York to Los Angeles between the first time period and the second time period.

In some examples, step 1912 may comprise presenting the additional modification generated by step 1910. For example, presenting the additional modification may comprise presenting the additional modification via a user interface, may comprise presenting the additional modification in an electronic document (for example, in an electronic document that includes the textual content), may comprise presenting the additional modification visually, may comprise presenting the additional modification graphically, may comprise presenting the additional modification audibly, and so forth. In some examples, the presentation of the generated additional modification by step 1912 may enable an individual to reject the additional modification. In some examples, the presentation of the generated additional modification by step 1912 may enable an individual to alter the additional modification.

FIG. 20 is a flowchart of an exemplary method 2000 for generating dialogs for narrative works of art. In this example, method 2000 may comprise receiving a trigger for generating a textual content of a dialog between a first character and a second character for a narrative work of art (step 2002); receiving contextual information associated with the dialog (step 2004); receiving first information associated with the first character (step 2006); receiving second information associated with the second character (step 2008); analyzing the contextual information and the first information to generate a first portion of the dialog associated with the first character (step 2010); analyzing the contextual information, the second information and the first portion of the dialog to generate a second portion of the dialog associated with the second character (step 2012); and analyzing the contextual information, the first information, the first portion and the second portion to generate a third portion of the dialog associated with the first character (step 2014). In other examples, method 2000 may include additional steps or fewer steps. In other examples, one or more steps of method 2000 may be executed in a different order and/or one or more groups of steps may be executed simultaneously. In some examples, the textual content, the dialog, the first portion of the dialog, the second portion of the dialog and/or the third portion of the dialog may be or include text in a natural language. In some examples, the dialog may include an in-person communication between the first character and the second character. In some examples, the dialog may include a communication between the first character and the second character over a medium and/or using communication devices. In some examples, the first portion may precede the second portion in the dialog, and the second portion may precede the third portion in the dialog. In some examples, the third portion may precede the second portion in the dialog, and the second portion may precede the first portion in the dialog.

In some examples, step 2002 may comprise receiving a trigger for generating a textual content of a dialog between a first character and a second character for a narrative work of art. Some non-limiting examples of such narrative work of art may include a novel, a short story, textual content of comics, a script, a screenplay, a teleplay, a stage-play, a radio-play, a game script (such as a video game script) or a libretto. For example, the trigger may be received from a different process, may be received from an external computing device (for example, via a digital communication device), may be received from an individual (for example, via a user interface), may be determined by monitoring an electronic document that includes the narrative work of art and/or an electronic document that is associated with the narrative word of art (for example, based on a change to the electronic document), and so forth.

In some examples, step 2004 may comprise receiving contextual information associated with the dialog of step 2002. For example, receiving the contextual information by step 2004 or by step 2106 may comprise reading the contextual information from memory, may comprise receiving the contextual information from an external computing device (for example, via a digital communication device), may comprise receiving the contextual information from a person (for example, via a user interface), may comprise determining the contextual information (for example, by analyzing other portions of the narrative work of art, by analyzing information associated with the narrative work of art, by analyzing information associated with the first character and/or the second character and/or the dialog, etc.), and so forth. In some examples, the contextual information received by step 2004 or by step 2106 may be a mathematical object in a mathematical space. In some examples, step 2004 or step 2106 may analyze a particular portion of the narrative work of art (such as a portion of the narrative work of art preceding the dialog or the generated textual content, a portion of the narrative work of art succeeding the dialog or the generated textual content, and so forth) to determine the contextual information, for example using a LLM. In one example, the dialog or the generated textual content may not be included in the particular portion of the narrative work of art. In one example, step 2004 or step 2106 may identify a first mathematical object in a mathematical space, wherein the first mathematical object may correspond to a word of the other portions, for example using module 302. Further, step 2004 or the generated textual content may identify a second mathematical object in the mathematical space, the second mathematical object may correspond to another word of the other portions, for example using module 302. Further, step 2004 or the generated textual content may calculate a function of the first mathematical object and the second mathematical object to obtain a third mathematical object in the mathematical space. Further, the contextual information (of step 2004 or step 2106) may be, include or be based on the third mathematical object.

In some examples, step 2006 may comprise receiving first information associated with the first character of step 2002. In some examples, step 2008 may comprise receiving second information associated with the second character of step 2002. For example, receiving information associated with a character (for example, receiving the first information associated with the first character by step 2006, receiving the second information associated with the second character by step 2008, etc.) may comprise reading the information from memory, may comprise receiving the information from an external computing device (for example, via a digital communication device), may comprise receiving the information from a person (for example, via a user interface), may comprise determining the information (for example, by analyzing other portions of the narrative work of art related to the character, by analyzing other textual content associated with the character, by analyzing a visual content associated with a character, etc.), and so forth. In some examples, a particular portion of the narrative work of art may be analyzed (by step 2006 and/or step 2008) to determine at least one of the first information or the second information, for example using a LLM. In one example, the dialog may be not included in the particular portion of the narrative work of art. In some examples, the first information received by step 2006 may be a first mathematical object in a particular mathematical space, and/or the second information received by step 2008 may be a second mathematical object in the particular mathematical space.

In some examples, step 2010 may comprise analyzing the contextual information received by step 2004 and the first information received by step 2006 to generate a first portion of the dialog associated with the first character. In some examples, the analyzing the contextual information and the first information by step 2010 to generate the first portion of the dialog may comprise using a machine learning model to analyze the contextual information and the first information to generate the first portion of the dialog. The machine learning model may be a machine learning model trained using training examples to generate portions of dialogs associated with characters based on data. An example of such training example may include sample contextual data and/or sample data associated with a sample character and/or sample other portions of a sample dialog associated with the sample character and/or sample other portions of the sample dialog associated with a different character, together with a sample portion of the sample dialog associated with the sample character. In some examples, the analyzing the contextual information and the first information by step 2010 to generate the first portion of the dialog may comprise using a LLM to analyze the contextual information and the first information to generate the first portion of the dialog.

In some examples, step 2010 may identify a first mathematical object based on the first information received by step 2006, for example using module 306. Further, step 2010 may identify a second mathematical object based on the contextual information received by step 2004, for example using module 306. Further, step 2010 may calculate a function of the first mathematical object and the second mathematical object to obtain a third mathematical object, wherein the third mathematical object may correspond to a particular word, for example using module 304. Further, step 2010 may include the particular word in the first portion of the dialog.

In some examples, step 2012 may comprise analyzing the contextual information received by step 2004, the second information received by step 2008 and the first portion of the dialog generated by step 2010 to generate a second portion of the dialog associated with the second character. In some examples, the analyzing the contextual information, the second information and the first portion of the dialog to generate the second portion of the dialog by step 2012 may comprise using a machine learning model (such as the machine learning model described above in relation to step 2010) and/or a LLM to analyze the contextual information, the second information and the first portion of the dialog to generate the second portion of the dialog. In some examples, the analyzing the contextual information, the second information and the first portion of the dialog to generate the second portion of the dialog by step 2012 may comprise determining a second contextual information based on the contextual information and the first portion of the dialog (for example, as described below), and analyzing the second contextual information and the second information to generate the second portion of the dialog (for example, as described above in relation to step 2010). In some examples, step 2012 may analyze the contextual information and the first portion of the dialog to determine the second contextual information, for example using a machine learning model, using a LLM (for example, where both the contextual information and the second contextual information are textual), and so forth. Said machine learning model may be a model trained using training examples to update contextual data based on text in a natural language. An example of such training example may include a sample contextual data and a sample textual data in the natural language, together with a sample updated contextual data.

In some examples, step 2012 may identify a first mathematical object based on the second information received by step 2008, for example using module 306. Further, step 2012 may identify a second mathematical object based on the contextual information received by step 2004, for example using module 306. Further, step 2012 may identify a third mathematical object in a mathematical space, wherein the third mathematical object may correspond to a word of the first portion of the dialog, for example using module 302. Further, step 2012 may calculate a function of the first mathematical object, the second mathematical object and the third mathematical object to obtain a fourth mathematical object, wherein the fourth mathematical object may correspond to a particular word, and wherein the particular word may not be included in the first portion of the dialog, for example using module 304. Further, step 2012 may include the particular word in the second portion of the dialog.

In some examples, the generation of the second portion by step 2012 may be further based on the first information received by step 2006. In one example, the first information may be indicative of a back story of the first character, and the generation of the second portion may be further based on the back story of the first character. For example, step 2012 may include in the second portion a detail from the back story of the first character. In one example, the first information may be indicative of a physical trait of the first character, and the generation of the second portion may be further based on the physical trait. For example, step 2012 may include in the second portion a remark on the physical trait.

In some examples, step 2014 may comprise analyzing the contextual information received by step 2004, the first information received by step 2006, the first portion generated by step 2010 and the second portion generated by step 2012 to generate a third portion of the dialog associated with the first character. In some examples, the analyzing the contextual information, the first information, the first portion and the second portion to generate the third portion of the dialog by step 2014 may comprise using a machine learning model (such as the machine learning model described above in relation to step 2010) and/or a LLM to analyze the contextual information, the first information, the first portion and the second portion to generate the third portion of the dialog. In some examples, the analyzing the contextual information, the first information, the first portion and the second portion to generate the third portion of the dialog by step 2014 may comprise determining a second contextual information based on the contextual information, the first portion and the second portion (for example, as described below), and analyzing the second contextual information and the first information to generate the third portion of the dialog (for example, as described above in relation to step 2010). In some examples, step 2014 may analyze the contextual information, the first portion and the second portion to determine the second contextual information, for example using a machine learning model (for example, using the machine learning model described above in relation to step 2012), using a LLM (for example, where both the contextual information and the second contextual information are textual), and so forth. In another example, an updated contextual content may be determined based on the contextual information and the first portion of the dialog as described above in relation to step 2012, and step 2014 may determine the second contextual content based on the updated contextual information and the second portion, for example in a similar manner.

In some examples, step 2014 may identify a first mathematical object based on the first information received by step 2006, for example using module 306. Further, step 2014 may identify a second mathematical object based on the contextual information received by step 2004, for example using module 306. Further, step 2014 may identify a third mathematical object in a mathematical space, wherein the third mathematical object may correspond to a word of the first portion of the dialog, for example using module 302. Further, step 2014 may identify a fourth mathematical object in a mathematical space, wherein the fourth mathematical object may correspond to a word of the second portion of the dialog, for example using module 302. Further, step 2014 may calculate a function of the first mathematical object, the second mathematical object the third mathematical object and the fourth mathematical object to obtain a fifth mathematical object, wherein the fifth mathematical object may correspond to a particular word, and wherein the particular word may not be included in any one of the first portion of the dialog of the second portion of the dialog, for example using module 304. Further, step 2014 may include the particular word in the third portion of the dialog.

In some examples, the generation of at least one of the first portion by step 2010 or the third portion by step 2014 may be further based on the second information received by step 2008. In one example, the second information may be indicative of a back story of the second character, and the generation of at least one of the first portion or the third portion may be further based on the back story of the second character. For example, step 2010 may include in the first portion a detail from the back story of the second character. In one example, the second information may be indicative of a physical trait of the second character, and the generation of at least one of the first portion or the third portion may be further based on the physical trait. For example, step 2014 may include in the third portion a remark on the physical trait.

In some examples, the first information received by step 2006 may be indicative of a back story of the first character. In some examples, the generation of at least one of the first portion by step 2010 or the third portion by step 2014 may be further based on the back story of the first character. In some examples, the generation of the second portion by step 2012 may be further based on the back story of the first character. For example, the back story may be indicative of a weak-point of the first character, step 2012 may include in the second portion a trigger to the weak-point, and the step 2014 may include in the third portion a response to the trigger based on the weak-point. In another example, the back story may be indicative of a traumatic event the first character faced, and the step 2012 may include in the second portion a reference to the traumatic event. In some examples, the second information received by step 2008 may be indicative of a back story of the second character. In one example, the generation of the second portion by step 2012 may be further based on the back story of the second character. In another example, generation of at least one of the first portion by step 2010 or the third portion by step 2014 may be further based on the back story of the second character.

In some examples, the first information received by step 2006 may be indicative of a physical trait of the first character. In some examples, the generation of at least one of the first portion by step 2010 or the third portion by step 2014 may be further based on the physical trait of the first character. In some examples, the generation of the second portion by step 2012 may be further based on the physical trait of the first character. For example, the first information may indicate that the first character is of short stature, and step 2012 may include in the second portion a sarcastic remark about the compatibility of the first character to basketball ('it's not like a career as a professional basketball awaits you'). In another example, the first information may indicate that the first character is visually impaired, and step 2010 may include in the first portion a request for help with reading a sign. In some examples, the second information received by step 2008 may be indicative of a physical trait of the second character. In one example, the generation of the second portion by step 2012 may be further based on the physical trait of the second character. In another example, generation of at least one of the first portion by step 2010 or the third portion by step 2014 may be further based on the physical trait of the second character.

In some examples, the first information received by step 2006 may be indicative of a motivation of the first character. In some examples, the generation of at least one of the first portion by step 2010 or the third portion by step 2014 may be further based on the motivation of the first character. In some examples, the generation of the second portion by step 2012 may be further based on the motivation of the first character. For example, the first information may indicate that the first character seeks knowledge on a specific subject, and step 2010 may include in the first portion a question associated with the specific subject (such as, 'Do you have a book about gardening?') In another example, the first information may indicate a goal of the first character, and step 2012 may include in the second portion a suggestion made by the second character to help the first character achieving the goal in return to a thing desired by the second character (such as, 'I'll tell you were to find this lady, if you'll promise to take me with you on your trip'). In some examples, the second information received by step 2008 may be indicative of a motivation of the second character. In one example, the generation of the second portion by step 2012 may be further based on the motivation of the second character. In another example, the generation of at least one of the first portion by step 2010 or the third portion by step 2014 may be further based on the motivation of the second character.

In some examples, the first information received by step 2006 may be indicative of an emotional state of the first character. In some examples, the generation of at least one of the first portion by step 2010 or the third portion by step 2014 may be further based on the emotional state of the first character. In some examples, the generation of the second portion by step 2012 may be further based on the emotional state of the first character. For example, the first information may indicate that the first character is frustrated with her son, step 2010 may include in the first portion a phrase that expresses frustration (such as, 'how many time do I've to tell him?'), and step 2012 may include in the second portion a perspective and/or a reassurance (such as, 'It's just a phase, it will pass. You are doing everything right. I had the same problem with my son. All boys go through this phase'). In some examples, the second information received by step 2008 may be indicative of an emotional state of the second character. In some examples, the generation of the second portion by step 2012 may be further based on the emotional state of the second character. In some examples, the generation of at least one of the first portion by step 2010 or the third portion by step 2014 may be further based on the emotional state of the second character.

In some examples, the first information received by step 2006 may be indicative of a detail known to the first character. In some examples, the generation of at least one of the first portion by step 2010 or the third portion by step 2014 may be further based on the detail known to the first character. In some examples, the generation of the second portion by step 2012 may be further based on the detail known to the first character. For example, the first portion may include 'I found out what happened to my notebook', the second portion may include 'I was wondering about this notebook for hours, you must tell me', and the third portion may include 'the dog ate it'. In some examples, the second information received by step 2008 may be indicative of a detail known to the second character. In some examples, the generation of the second portion by step 2012 may be further based on the detail known to the second character. In some examples, the generation of at least one of the first portion by step 2010 or the third portion by step 2014 may be further based on the detail known to the second character.

In some examples, the first information received by step 2006 may be indicative of a detail unknown to the first character. In some examples, the generation of at least one of the first portion by step 2010 or the third portion by step 2014 may be further based on the detail unknown to the first character. In some examples, the generation of the second portion by step 2012 may be further based on the detail unknown to the first character. For example, the first information may indicate that the first character is unaware of the death of the second character's wife, the first portion may include 'How is your wife doing?' and the second portion may include 'Haven't you heard she died last year?' In some examples, the second information received by step 2008 may be indicative of a detail unknown to the second character. In some examples, the generation of the second portion by step 2012 may be further based on the detail unknown to the second character. In some examples, the generation of at least one of the first portion by step 2010 or the third portion by step 2014 may be further based on the detail unknown to the second character.

In some examples, the first information received by step 2006 may be indicative of the first character knowing that a detail is known to the second character. In some examples, the generation of at least one of the first portion by step 2010 or the third portion by step 2014 may be further based on the first character knowing that the detail is known to the second character. In some examples, the generation of the second portion by step 2012 may be further based on the first character knowing that the detail is known to the second character. For example, detail may be a time of a deadline, the first portion may include 'As you well know, I've to finish this tonight'. In another example, the detail may be that the first character is divorcing, and the second portion may include 'Now that you know that I know about your divorce, we can speak about it'. In some examples, the second information received by step 2008 may be indicative of the second character knowing that a detail is known to the first character. In some examples, the generation of the second portion by step 2012 may be further based on the second character knowing that the detail is known to the first character. In some examples, the generation of at least one of the first portion by step 2010 or the third portion by step 2014 may be further based on the second character knowing that the detail is known to the first character.

In some examples, the first information received by step 2006 may be indicative of the first character knowing that a detail is unknown to the second character. In some examples, the generation of at least one of the first portion by step 2010 or the third portion by step 2014 may be further based on the first character knowing that the detail is unknown to the second character. In some examples, the generation of the second portion by step 2012 may be further based on the first character knowing that the detail is unknown to the second character. For example, the detail may be that Joe won an award, the first portion may include 'You won't believe who won the award', and the second portion may include 'I can't wait to find out, you must tell me'. In another example, the first portion may include 'Let's talk about something else', the second portion may include 'Are you hiding something from me?' and the third portion may include, 'If you must know, Joe and I are separated'. In some examples, the second information received by step 2008 may be indicative of the second character knowing that a detail is unknown to the first character. In some examples, the generation of the second portion by step 2012 may be further based on the second character knowing that the detail is unknown to the first character. In some examples, the generation of at least one of the first portion by step 2010 or the third portion by step 2014 may be further based on the second character knowing that the detail is unknown to the first character.

In some examples, step 2010 may generate the first portion in a first style selected based on the first information received by step 2006 and step 2012 may generate the second portion in a second style selected based on the second information received by step 2008, for example as described below in relation to method 2100. Some non-limiting examples of such style may include language register, vocabulary, tendency to use selected phrases, tendency to reveal information, and so forth. In one example, the first style and the second style may differ. In one example, a style (such as the first style or the second style) may be style 154. In one example, information associated with a character and/or additional information (such as the contextual information received by step 2004, text from other portion of the narrative work of art) may be analyzed using a machine learning model to determine a style (for example, analyzing the first information to determine the first style, analyzing the second information to determine the second style, and so forth). The machine learning model may be a machine learning model trained using training examples to determine style from information. An example of such training example may include a sample information associated with a sample character and/or a sample additional information, together with a label indicating a sample style. In some examples, information associated with a character (such as the first information, the second information, etc.) may indicate a different style based on different context (such as emotional status, counterpart to the dialog, time, location, and so forth). For example, the information associated with the character may include a data-structure associating context with style. Further, the data-structure included in the first information may be accessed to obtain the first style, the data-structure included in the second information may be accessed to obtain the second style, and so forth. In one example, the first information may be accessed to obtain the third style different from the first style, and step 2014 may generate the third portion in the third style, for example as described below in relation to method 2100. In another example, step 2014 may generate the third portion in the first style.

In some examples, step 2010 may further comprise adding a first dialog tag to the first portion of the dialog to obtain a first textual content. The first dialog tag may be a phrase indicating the first character. For example, the first dialog tag may be 'Daniel said in a serious voice', the first portion may be 'We must talk', and the first textual content may be 'Daniel said in a serious voice, "We must talk"'. Further, step 2012 may further comprise adding a second dialog tag to the second portion of the dialog to obtain a second textual content. The second dialog tag may be a phrase indicating the second character. For example, the second dialog tag may be 'Daniel said urgently', the second portion may be 'I am already late', and the second textual content may be '"I am already late", Daniel said urgently'. Further, step 2014 may further generate a third textual content including the third portion of the dialog. In one example, the third textual content may be the third portion of the dialog. In one example, the third textual content may include a third dialog tag and the third portion of the dialog. Further, method 2000 may comprise concatenating the first textual content, the second textual content and the third textual content to generate the textual content of the dialog. In one example, adding the first dialog tag to the first portion of the dialog by step 2010 may include adding at least one quotation mark to the first portion of the dialog. In one example, adding the second dialog tag to the second portion of the dialog by step 2012 may include adding at least one quotation mark to the second portion of the dialog. In one example, the first dialog tag may include a name of the first character and/or the second dialog tag may include a name of the second character. In one example, the first dialog tag may include a first adverb and/or the second dialog tag may include a second adverb. In some examples, the generating the third textual content by step 2014 may comprise adding a third dialog tag to the third portion of the dialog to obtain the third textual content. The third dialog tag generated by step 2014 may be or include a phrase indicating the first character. In one example, adding the third dialog tag to the third portion of the dialog may include adding at least one quotation mark to the third portion of the dialog. In one example, the third dialog tag may include a pronoun, such as a pronoun indicating the first character (such as 'She', 'He', 'Her', and so forth).

In some examples, the receiving the trigger by step 2012 may include receiving a textual input from an individual indicative of a desire of the individual to generate the dialog between the first character and the second character. Further, the generation of at least one of the first portion by step 2010, the second portion by step 2012 or the third portion by step 2014 may be further based on an analysis of the textual input received from the individual. For example, a LLM may be used to analyze the textual input received from the individual and generate the at least one of the first portion by step 2010, the second portion by step 2012 or the third portion by step 2014. In another example, step 2004 may analyze the textual input received from the individual to determine the contextual information, for example using a LLM. For example, the textual input may include at least one contextual detail, and the contextual information may include or be based on the at least one contextual detail. In some examples, step 2006 and/or step 2008 may analyze the textual input received from the individual to determine at least one of the first information or the second information, for example using a LLM. For example, the textual input may include a first detail associated with the first character, and the first information may include or be based on the first detail. In another example, the textual input may include a second detail associated with the second character, and the first information may include or be based on the second detail.

In some examples, method 2000 may further comprise receiving third information indicative of a relation between the first character and the second character, and further basing the generation of at least one of the first portion, the second portion or the third portion on the relation between the first character and the second character. In one example, the third information may be included in the contextual information received by step 2004. In one example, the third information may indicate that the second character being the father of the first character, and based on that relationship step 2010 may include the word 'dad' in the first portion when the first character address the second character (for example, instead of the name of the second character). In one example, the third information may indicate that the second character is a litigant in a lawsuit and the first character is the presiding judge in the lawsuit, and based on that relationship step 2012 may generate the second portion in a formal language register. In one example, the third information may indicate that the two characters are childhood friends, the second portion may include an insult to the first character, and based on the relationship step 2014 may generate the third portion in a sarcastic tone (rather than a confrontational tone).

In some examples, the dialog of method 2000 may be occurring in a physical space. Further, the contextual information received by step 2004 may include an indication of the physical space. In some examples, the generation of at least one of the first portion, the second portion or the third portion may be further based on the physical space. In one example, the physical space may be a car owned by the second character, and step 2010 may generate the first portion to include a sarcastic remark about the condition of the car. In one example, the physical space may be an apparel store, and step 2012 may include in the second portion a remark that some shirt would look good on the first character. In one example, the physical space may be tight, and step 2014 may include in the third portion a claustrophobic remark.

In some examples, the dialog of method 2000 may be occurring in in a particular time. Further, the contextual information received by step 2004 may include an indication of the particular time. In one example, the generation of at least one of the first portion, the second portion or the third portion may be further based on the particular time. In one example, the particular time may be a time of day, for example a time of day corresponding to night hours, and step 2010 may include in the first portion a remark about the night sky. In one example, the particular time may be season, for example winter, and step 2012 may include in the second portion a remark about an unexpected worm weather. In one example, the particular time may be an historical era, and step 2014 may include in the third portion archaic words associated with the historical era. In one example, the particular time may be a future time period.

In some examples, the dialog of method 2000 may include communication between the first character and the second character through a medium. Further, the contextual information received by step 2004 may include an indication the medium. In one example, the generation of at least one of the first portion, the second portion or the third portion may be further based on the medium. Some non-limiting examples of such medium may include voice, voice messages, phone, text, mail, email, text messages, video, video messages, video call, and so forth. In one example, the medium may be a phone, and step 2012 may include in the second portion a remark about the line quality. In one example, the medium may be text messages, and step 2014 may include in the third portion a suggestion to move the discussion to another medium (such as phone, video, in person, and so forth).

In some examples, the contextual information received by step 2004 may include information based on a portion of the narrative work of art preceding the dialog. In one example, the contextual information received by step 2004 may include the portion of the narrative work of art preceding the dialog. In another example, step 2004 may analyze the portion of the narrative work of art preceding the dialog to generate the contextual information, for example using a LLM. In some examples, the generation of at least one of the first portion, the second portion or the third portion may be further based on the portion of the narrative work of art preceding the dialog. For example, the portion of the narrative work of art preceding the dialog may describe an event, and step 2010 may include in the first portion a mention of the event. In another example, the portion of the narrative work of art preceding the dialog may include an expositional fact, and step 2012 may avoid including in the second portion information that contradicts the expositional fact. In yet another example, the portion of the narrative work of art preceding the dialog may indicate at least one of the particular time and/or the physical space.

In some examples, the contextual information received by step 2004 may include information based on a portion of the narrative work of art succeeding the dialog. In one example, the contextual information received by step 2004 may include the portion of the narrative work of art succeeding the dialog. In another example, step 2004 may analyze the portion of the narrative work of art succeeding the dialog to generate the contextual information, for example using a LLM. In some examples, the generation of at least one of the first portion, the second portion or the third portion may be further based on the portion of the narrative work of art succeeding the dialog. For example, the portion of the narrative work of art succeeding the dialog may include an expositional fact, and step 2014 may avoid including in the third portion information that contradicts the expositional fact. In yet another example, the portion of the narrative work of art succeeding the dialog may indicate at least one of the particular time and/or the physical space.

In some examples, the contextual information received by step 2004 may include information based on at least one of a premise or a synopsis of the narrative work of art. In one example, the contextual information received by step 2004 may include the at least one of a premise or a synopsis. In another example, step 2004 may analyze the at least one of a premise or a synopsis to generate the contextual information, for example using a LLM. In some examples, the generation of at least one of the first portion, the second portion or the third portion may be further based the at least one of the premise or the synopsis. For example, the at least one of the premise or the synopsis may indicate a particular time and/or a physical space. In another example, the at least one of the premise or the synopsis may indicate a relation between the two characters. In yet another example, the at least one of the premise or the synopsis may indicate an event preceding the narrative work of art (for example, 'In a dystopian future, after a nuclear war'), and step 2010 may include in the first portion a mention of the event.

In some examples, the contextual information received by step 2004 may include information indicative of a third character witnessing the dialog but not taking part in the dialog. Further, the generation of at least one of the first portion, the second portion or the third portion may be further based on the third character. For example, the third character may be a person known to the first character, and step 2010 may include in the first portion details about the third character that the first character conveys to the second character. In another example, step 2012 may include in the second portion a hint of a fact (rather than the fact), for example to suggest that the second character wishes to keep the fact secret.

In some examples, the contextual information received by step 2004 may include information indicative of an event. In one example, the event may not involve any one of the first character or the second character. In one example, the event may involve at least one of the first character or the second character. In some examples, the generation of at least one of the first portion, the second portion or the third portion is further based on the event. In some examples, the event may precede the dialog. For example, step 2010 may include in the first portion a mention of the event. In some examples, the event may occur simultaneously with the dialog. For example, step 2012 may include in the second portion a surprise reaction to the event. In some examples, the dialog may precede the event. For example, step 2010 may include in the first portion a background information associated with the event. In another example, step 2012 may include in the second portion a text foreshadowing the event. In yet another example, step 2014 may include in the third portion a planning towards the event.

In some examples, method 2000 may further comprise receiving an indication that the dialog is intended to enhance a story of the narrative work of art in a particular way. For example, to develop a relationship between the first character and the second character in a particular direction, to reveal particular information, and so forth. In some examples, the generation of at least one of the first portion, the second portion or the third portion may be further based on the particular way, for example as described below. In one example, the indication that the dialog is intended to enhance the story of the narrative work of art in the particular way may be or include a text in a natural language indicating the particular way, and the text may be analyzed, for example using a LLM, to generate the at least one of the first portion, the second portion or the third portion based on the particular way.

In some examples, method 2000 may further comprise receiving an indication that the dialog is intended to develop a relationship between the first character and the second character in a particular direction. Some non-limiting examples of such particular direction may include deepening the relationship, deepening intimacy, increasing conflict, growing apart, moving towards commitment, breaking up, rekindling, drifting, evolving in a particular direction, and so forth. In some examples, the generation of at least one of the first portion, the second portion or the third portion may be further based on the particular direction. For example, the particular direction may be creating conflict, and the generated first, second and third portions may include a disagreement between the first and second characters. In one example, the indication that the dialog is intended to develop the relationship between the first character and the second character in the particular direction may include a text in a natural language indicating the particular direction, and the text may be analyzed, for example using a LLM, to generate the at least one of the first portion, the second portion or the third portion based on the particular direction.

In some examples, method 2000 may further comprise receiving an indication that the dialog is intended to reveal particular information. Some non-limited examples of such particular information may include information related to the first character, information related to the second character, information related to a third character not involved in the dialog, information not related to a character, and so forth. In some examples, the generation of at least one of the first portion, the second portion or the third portion may be further based on the particular information. For example, the particular information may be a biographic detail, and step 2010 may include in the first portion the biographic detail.

In some examples, method 2000 may further comprise presenting the generated first portion, the generated second portion and/or the generated third portion to an individual. For example, presenting the first, second and/or third portion to the individual may comprise presenting the first, second and/or third portion via a user interface, may comprise presenting the first, second and/or third portion in an electronic document (for example, in an electronic document including the narrative work of art), may comprise presenting the first, second and/or third portion visually, may comprise presenting the first, second and/or third portion audibly, and so forth. In some examples, the presentation of the first portion, the second portion and/or the third portion may enable the individual to modify at least one of the first portion, the second portion or the third portion. In one example, after the individual modifies the first portion, method 2000 may analyze the modified first portion to generate a modified second portion and a modified third portion (for example, as described above in relation to step 2012 and step 2014). In another example, after the individual modifies the second portion, method 2000 may analyze the modified second portion to generate a modified first portion (for example, using method 1900 and/or step 1910). In some examples, the presentation of the first portion, the second portion and/or the third portion may enable the individual to reject at least one of the first portion, the second portion or the third portion.

FIG. 21 is a flowchart of an exemplary method 2100 for generating text in a style of a persona for a narrative work of art. In this example, method 2100 may comprise receiving a trigger for generating a textual content in a style of a particular persona for a narrative work of art (step 2102); receiving style information indicative of the style of the particular persona (step 2104); receiving contextual information associated with the textual content (step 2106); analyzing the contextual information and the style information to generate the textual content (step 2108); and presenting the generated textual content to an individual (step 2110). In other examples, method 2100 may include additional steps or fewer steps. In other examples, one or more steps of method 2100 may be executed in a different order and/or one or more groups of steps may be executed simultaneously. In some examples, the particular persona may be a narrator of the narrative work of art. In some examples, the particular persona may be a character of the narrative work of art. In some examples, the particular persona may be an individual (for example, fictional, real, etc.) cited in the narrative work of art. In some examples, the textual content may be part of a dialog between the particular persona and another character of the narrative work of art. In some examples, the textual content may be part of a monolog of the particular persona.

In some examples, step 2102 may comprise receiving a trigger for generating a textual content in a style of a particular persona for a narrative work of art. Some non-limiting examples of such narrative work of art may include a novel, a short story, textual content of comics, a script, a screenplay, a teleplay, a stage-play, a radio-play, a game script (such as a video game script) or a libretto. For example, the trigger may be received from a different process, may be received from an external computing device (for example, via a digital communication device), may be received from an individual (for example, via a user interface), may be determined by monitoring an electronic document that includes the narrative work of art and/or an electronic document that is associated with the narrative word of art (for example, based on a change to the electronic document), and so forth.

In some examples, step 2104 may comprise receiving style information indicative of the style of the particular persona. In one example, the style of the particular persona may be style 154. For example, receiving the style information indicative of the style of the particular persona may comprise reading the style information from memory, may comprise receiving the style information from an external computing device (for example, via a digital communication device), may comprise receiving the style information from a person (for example, via a user interface), may comprise determining the style information (for example, by analyzing other portions of the narrative work of art related to the particular persona, by analyzing other textual content associated with the particular persona, by analyzing an audio content associated with a particular persona, etc.), and so forth. In some examples, step 2104 may analyze another textual content associated with the particular persona to determine the style information, for example using a LLM. In some examples, step 2104 may analyze a particular portion of the narrative work of art to determine the style information, for example using a LLM. In one example, the generated textual content may be not included in the particular portion of the narrative work of art. In some examples, the style information received by step 2104 may be a mathematical object in a particular mathematical space. In some examples, step 2106 may comprise receiving contextual information associated with the textual content, for example as described above in relation to step 2004.

In some examples, step 2108 may comprise analyzing the contextual information received by step 2106 and the style information received by step 2104 to generate the textual content. In one example, step 2108 may use a machine learning model to analyze the contextual information and the style information (and optionally additional information) to generate the textual content. The machine learning model may be a machine learning model trained using training examples to generate text based on context and style (and optionally additional information). An example of such training example may include a sample contextual information, a sample style information and optionally sample additional information, together with a sample textual content corresponding to the sample contextual information and the sample style information (and optionally to the sample additional information). For example, the additional information may include or be indicative of at least one of narrative voice, narrative tense, narrative technique, a way the narrator is presented in the narrative work of art, a characterization of the particular persona, a back story of the particular persona, a physical trait of the particular persona, a motivation of the particular persona, an emotional state of the particular persona, a detail known to the particular persona, a detail unknown to the particular persona, or a textual input (such as a textual input received from an individual). In some examples, the contextual information may be or include a first text, the style information may be or include a second text step 2108 may use a LLM to analyze the first text and the second text (and optionally a third text indicative of additional information) to generate the textual content.

In some examples, step 2108 may identify a first mathematical object based on the style information received by step 2104, for example using module 306. Further, step 2108 may identify a second mathematical object based on the contextual information received by step 2106, for example using module 306. Further, step 2108 may calculate a function of the first mathematical object and the second mathematical object to obtain a third mathematical object, for example using module 306. The third mathematical object may correspond to a particular word. Further, step 2108 may include the particular word in the generated textual content.

In some examples, the particular persona may be a narrator of the narrative work of art. Further, an indication of a narrative voice associated with the narrative work of art may be received. Some non-limiting examples of such narrative voice may include first person, second person, third person, third person limited, third person omniscient, and so forth. For example, the indication of the narrative voice may be read from memory, may be received from an external computing device (for example, via a digital communication device), may be received from a person (for example, via a user interface), may be determined (for example, by analyzing other portions of the narrative work of art), and so forth. In some examples, the generation of the textual content by step 2108 may be further based on the narrative voice associated with the narrative work of art, for example using the machine learning model described in relation to step 2108 or using a LLM as described above. In some examples, an indication of a narrative tense may be received. For example, the narrative tense may be a present or a past grammatical tense. In one example, the indication of the narrative tense may be read from memory, may be received from an external computing device (for example, via a digital communication device), may be received from a person (for example, via a user interface), may be determined (for example, by analyzing other portions of the narrative work of art), and so forth. In some examples, the generation of the textual content by step 2108 may be further based on the narrative tense, for example using the machine learning model described in relation to step 2108 or using a LLM as described above. In some examples, an indication of a narrative technique may be received. Some non-limiting examples of such narrative technique may include stream-of-consciousness, interior monologue, indirect discourse, and so forth. For example, the indication of the narrative technique may be read from memory, may be received from an external computing device (for example, via a digital communication device), may be received from a person (for example, via a user interface), may be determined (for example, by analyzing other portions of the narrative work of art), and so forth. In some examples, the generation of the textual content by step 2108 may be further based on the narrative technique, for example using the machine learning model described in relation to step 2108 or using a LLM as described above. In some examples, an indication of a way the narrator is presented in the narrative work of art may be received. Some non-limiting examples of such ways that narrators may be presented in narrative work of arts may include an intrusive narrator who interrupts the story to provide a commentary on some aspect of the story or on a more general topic, an unreliable narrator who does not understand the full import of a situation or one who makes incorrect conclusions and assumptions about events witnessed, or a naive narrator who does not have the sophistication to understand the full import of the story's events. For example, the indication of the way the narrator is presented in the narrative work of art may be read from memory, may be received from an external computing device (for example, via a digital communication device), may be received from a person (for example, via a user interface), may be determined (for example, by analyzing other portions of the narrative work of art), and so forth. In some examples, the generation of the textual content by step 2108 may be further based on the way the narrator is presented in the narrative work of art, for example using the machine learning model described in relation to step 2108 or using a LLM as described above.

In some examples, a characterization of the particular persona may be received. For example, the characterization may be read from memory, may be received from an external computing device (for example, via a digital communication device), may be received from a person (for example, via a user interface), may be determined (for example, by analyzing other portions of the narrative work of art, by analyzing other textual contents associated with the particular persona, etc.), and so forth. In some examples, the generation of the textual content by step 2108 may be further based on the characterization of the particular persona, for example using the machine learning model described in relation to step 2108 or using a LLM as described above. In some examples, the characterization of the particular persona may be indicative of a back story of the particular persona, and the generation of the textual content by step 2108 may be further based on the back story, for example using the machine learning model described in relation to step 2108 or using a LLM as described above. For example, the back story may indicate that the particular persona studied psychology, and the generated textual content may include a remark associating a thing in the narrative work of art to a psychological theory. In some examples, the characterization of the particular persona may be indicative of a physical trait of the particular persona, and the generation of the textual content by step 2108 may be further based on the physical trait, for example using the machine learning model described in relation to step 2108 or using a LLM as described above. For example, the physical trait may be having a mobility impairment, and the textual content generated by step 2108 may include 'as I hobbled across the room'. In some examples, the characterization of the particular persona may be indicative of a motivation of the particular persona, and the generation of the textual content by step 2108 may be further based on the motivation, for example using the machine learning model described in relation to step 2108 or using a LLM as described above. For example, the particular persona may be motivated by a desire for justice, and the textual content generated by step 2108 may include 'I can't believe he got away with this! We need to do something about it'. In some examples, the characterization of the particular persona may be indicative of an emotional state of the particular persona, and the generation of the textual content by step 2108 may be further based on the emotional state, for example using the machine learning model described in relation to step 2108 or using a LLM as described above. For example, the particular persona may be overwhelmed, and the textual content generated by step 2108 may include 'I don't know if I can handle this'. In some examples, the characterization of the particular persona may be indicative of a detail known to the particular persona, and the generation of the textual content by step 2108 may be further based on the detail known to the particular persona, for example using the machine learning model described in relation to step 2108 or using a LLM as described above. For example, the particular persona may know a detail, and the textual content generated by step 2108 may include, after another character share this detail, 'Yes, I know'. In some examples, the characterization of the particular persona may be indicative of a detail unknown to the particular persona, and the generation of the textual content by step 2108 may be further based on the detail unknown to the particular persona, for example using the machine learning model described in relation to step 2108 or using a LLM as described above. For example, the particular persona may be unaware that a second character is dating a third character, and the textual content generated by step 2108 may include the particular persona telling the second character something nasty about the third character.

In some examples, the contextual information received by step 2106 may be or include information based on a portion of the narrative work of art not including the generated textual content. Further, the generation of the textual content by step 2108 may be further based on an analysis of the portion of the narrative work of art. For example, step 2108 may use a LLM to analyze the portion and generate the textual content. For example, the portion of the narrative work of art may indicate a geographical location, and the textual content may mention the location or an establishment associated with the location (for example, the portion may indicate that the story takes place at Paris, and the textual content may include a reference to the view of the Eiffel tower). In some examples, the contextual information may include information based on at least one of a premise or a synopsis of the narrative work of art. Further, the generation of the textual content by step 2108 may be further based on the at least one of the premise or the synopsis. For example, step 2108 may use a LLM to analyze the at least one of the premise or the synopsis and generate the textual content. For example, the premise may indicate that the story takes place after a catastrophic event, and the textual content may include a reference to the catastrophic event. In another example, the synopsis may indicate a relationship between two characters, and the textual content may include a reference to the relationship.

In some examples, information indicative of an event may be received. Further, the generation of the textual content by step 2108 may be further based on the event. For example, the information indicative of the event may be or include a text indicative of the event, and step 2108 may use a LLM to analyze the text and generate the textual content. For example, the event may be an upcoming event, and the textual content may mention a preparation towards the event. In some examples, information indicative of a physical space may be received. Further, the generation of the textual content by step 2108 may be further based on the physical space. For example, the information indicative of the physical space may be or include a text indicative of the physical space, and step 2108 may use a LLM to analyze the text and generate the textual content. For example, the physical space may be a destination, and the textual content may mention arrangement of transportation to the destination. In another example, physical space may be tight, and the textual content may include a claustrophobic remark. In some examples, information indicative of a particular time may be received. In one example, the particular time may be a time of day. In one example, the particular time may be season. In one example, the particular time may be an historical era. In one example, the particular time may be a future time period. Further, the generation of the textual content by step 2108 may be further based on the particular time. For example, the information indicative of the particular time may be or include a text indicative of the particular time, and step 2108 may use a LLM to analyze the text and generate the textual content. For example, the particular time may be a rainy day, and the textual content may include a remark about the weather. In another example, the particular time may be a night hour, and the textual content may include a remark about the night sky. In some examples, an indication that the textual content is intended to enhance a story of the narrative work of art in a particular way may be received. Further, step 2108 may further base the generation of the textual content on the particular way. For example, the indication that the textual content is intended to enhance a story of the narrative work of art in the particular way may include text indicative of the particular way, and step 2108 may use a LLM to analyze the text and generate the textual content. For example, the particular way may be to reveal a particular detail, and the textual content may include the detail. In some examples, information indicative of a status of a relationship between two characters may be received. Further, step 2108 may further base the generation of the textual content on the status of the relationship between the two characters. For example, the information indicative of the status may include text indicative of the status, and step 2108 may use a LLM to analyze the text and generate the textual content. For example, the particular persona may be one of the two characters, the status of the relationship may be frenemies, and the textual content may include a passive aggressive sarcastic remark of the particular persona. In another example, the particular persona may not be one of the two characters, the status of the relationship may be lovers, and the textual content may include gossip about the relationship of the two characters. In some examples, an indication that the textual content is intended to develop a relationship between two characters may be received. Further, step 2108 may further base the generation of the textual content on the indication. For example, the indication that the textual content is intended to develop the relationship may include a text indicating the desired development, and step 2108 may use a LLM to analyze the text and generate the textual content. In one example, the particular persona may not be one of the two characters, and the textual content may reveal a common trait that the two characters share. In yet another example, particular persona may be one of the two characters, and the textual content may be part of a dialog between the two characters, and the textual content may form a bond between the two characters. In some examples, an indication that the textual content is intended to reveal particular information may be received. Some non-limited examples of such particular information may include information related to a character, information not related to a character, and so forth. Further, step 2108 may further base the generation of the textual content on the particular information. For example, the indication that the textual content is intended to reveal particular information may include a text indicative of the particular information, and step 2108 may use a LLM to analyze the text and generate the textual content. For example, the particular information may be an age of the particular persona or an age of another character. In another example, the particular information may be associated with a scenery. As described above, at least one of information indicative of an event, information indicative of a physical space, information indicative of a particular time, an indication that the textual content is intended to enhance a story of the narrative work of art in a particular way, information indicative of a status of a relationship between two characters, an indication that the textual content is intended to develop a relationship between two characters, or an indication that the textual content is intended to reveal particular information. In one example, the information and/or the indication may be read from memory, may be received may be received from an external computing device (for example, via a digital communication device), may be received from a person (for example, via a user interface), may be determined (for example, by analyzing other portions of the narrative work of art, by analyzing other textual contents associated with the narrative work of art, etc.), and so forth.

In some examples, the style information may be indicative of a language register, and the generation of the textual content by step 2108 may be further based on the language register. For example, step 2108 may use a LLM to generate the textual content in the language register. In some examples, the style information may be indicative of a vocabulary, and the generation of the textual content by step 2108 may be further based on the vocabulary. For example, step 2108 may include words from the vocabulary and/or may avoid including words not included in the vocabulary in the generated textual content. In some examples, the style information may be indicative of a tendency to use selected phrases, and the generation of the textual content by step 2108 may be further based on the selected phrases. For example, step 2108 may include at least one of the selected phrases in the generated textual content. In some examples, the style information may be indicative of a tendency to reveal information, and the generation of the textual content by step 2108 may be further based on the tendency to reveal information. For example, step 2108 may select which and/or how many details to include in the generated textual content based on the tendency to reveal information.

In some examples, step 2110 may comprise presenting the textual content generated by step 2108 to an individual. For example, presenting the textual content generated by step 2108 to the individual may comprise presenting the textual content via a user interface, may comprise presenting the textual content in an electronic document, may comprise presenting the textual content visually, may comprise presenting the textual content audibly, and so forth. In some examples, the presentation of the generated textual content to the individual by step 2110 may enable the individual to reject the generated textual content, for example via a user interface, via voice commands, using gestures, using a keyboard, using a pointing device, and so forth. In some examples, the presentation of the generated textual content to the individual by step 2110 may enable the individual to alter the generated textual content, for example via a user interface, via voice commands, using gestures, using a keyboard, using a pointing device, and so forth.

In some examples, step 2102 may comprise receiving a textual input from the individual indicative of a desire of the individual to generate the textual content, for example via a user interface, using a keyboard, using speech recognition, and so forth. Further, the generation of the textual content by step 2108 may be further based on an analysis of the textual input received from the individual, for example using the machine learning model described in relation to step 2108 or using a LLM as described above. The generated textual content may include at least one phrase not included in the textual input received from the individual. In some examples, step 2104 may analyze the textual input received from the individual to determine the style information. For example, the textual input received from the individual may be indicative of a characteristic of a style, and step 2104 may analyze the textual input to base the style information on the characteristic of the style, for example using a LLM. In some examples, step 2106 may analyze the textual input received from the individual to determine the contextual information. For example, the textual input received from the individual may be indicative of at least one contextual detail, and step 2106 may analyze the textual input to base the contextual information on the at least one contextual detail, for example using a LLM. In some examples, step 2108 may use a machine learning model (such as the machine learning model described above in relation to step 2108) to analyze the textual input, the contextual information and the style information to generate the textual content.

In some examples, a first mathematical object may be identified based on the style information received by step 2104, for example using module 306. Further, a second mathematical object may be identified based on the contextual information received by step 2106, for example using module 306. Further, a third mathematical object in a mathematical space may be identified, wherein the third mathematical object corresponds to a word of the textual input received from the individual, for example using module 302. Further, step 2108 may base the generation of the textual content on the first mathematical object, the second mathematical object and the third mathematical object. For example, step 2108 may calculate a function of the first mathematical object, the second mathematical object and the third mathematical object to obtain a fourth mathematical object, wherein the fourth mathematical object may correspond to a particular word, and wherein the particular word may not be included in the textual input, for example using module 304. Further, step 2108 may include the particular word in textual content.

In some examples, the textual input received from the individual may be indicative of a desire of the individual to include an allusion to a particular thing in the textual content. For example, the particular thing may be at least one of an object or a circumstance. Further, step 2108 may generate the allusion to the particular thing, for example using a LLM. Further, step 2108 may include the generated allusion in the textual content. In one example, the allusion to the particular thing may be selected based on the style information received by step 2104. In one example, the allusion to the particular thing may be selected based on the contextual information received by step 2106. In some examples, the textual input received from the individual may be indicative of a desire of the individual to foreshadow a particular thing. For example, the particular thing may be at least one of an event, a conflict, a resolution or a plot twist. Further, step 2108 may generate a text foreshadowing the particular thing, for example using a LLM. Further, step 2108 may include the generated text in the textual content. In some examples, the textual input received from the individual may be indicative of a desire of the individual to include a metaphor for a particular thing. For example, the particular thing may be at least one of an object, an event, an action, a relationship, an emotion or a concept. Further, step 2108 may generate the metaphor for the particular thing, for example using a LLM. Further, step 2108 may include the generated metaphor in the textual content. In one example, the metaphor for the particular thing may be selected based on the style information received by step 2104. In one example, the metaphor for the particular thing may be selected based on the contextual information received by step 2106. In some examples, the textual input received from the individual may be indicative of a desire of the individual to include a simile involving a particular thing. For example, the particular thing may be at least one of an object, an event, an action, a relationship, an emotion or a concept. Further, step 2108 may generate the simile involving the thing, for example using a LLM. Further, step 2108 may include the generated simile in the textual content. In some examples, the textual input received from the individual may be indicative of a desire of the individual to use irony, and the textual content generated by step 2108 may be ironic. In some examples, the textual input received from the individual may be indicative of a desire of the individual to personify a particular thing. For example, the particular thing may be at least one of an object, an animal, a force of nature or an abstract concept. Further, step 2108 may include a personification of the particular thing in the generated textual content. In some examples, the textual input received from the individual may be indicative of a desire of the individual to include a hyperbole. Further, step 2108 may generate the hyperbole, for example using a LLM. Further, step 2108 may include the generated hyperbole in the textual content. In some examples, the textual input received from the individual may be indicative of a desire of the individual to include a juxtaposition of a first thing and a second thing. Further, step 2108 may generate a text including the juxtaposition of the first thing and the second thing, for example using a LLM. Further, step 2108 may include the generated text in the textual content.

FIG. 22 is a flowchart of an exemplary method 2200 for including foreshadowing in a narrative work of art. In this example, method 2200 may comprise accessing a textual content in a natural language (step 1902); receiving an indication of a particular thing (step 2204); analyzing the textual content to select a location in the textual content for an advance hint of the particular thing (step 2206); modifying the textual content to include the advance hint of the particular thing at the selected location (step 2208); and presenting the modified textual content (step 2210). In other examples, method 2200 may include additional steps or fewer steps. In other examples, one or more steps of method 2200 may be executed in a different order and/or one or more groups of steps may be executed simultaneously. In some examples, the particular thing may be mentioned in the textual content in a location that succeed the selected location. In some examples, no mention of the particular thing may be included in the textual content (for example, a mention of the particular thing may be anticipated to be added to the textual content at a later stage in a location that succeed the selected location).

In some examples, step 2204 may comprise receiving an indication of a particular thing. For example, receiving the indication by step 2204 may comprise reading the indication from memory, may comprise receiving the indication from an external computing device (for example, via a digital communication device), may comprise receiving the indication from a person (for example, via a user interface), may comprise determining the indication by monitoring an electronic document that includes the textual content, may comprise determining the indication by analyzing a different input (such as textual input, visual input, etc.), and so forth. In one examples, the indication of the particular thing may be received from an individual, for example using a user interface, using a keyboard, using a pointing device, using a touch screen, using voice commands, using gestures, and so forth. In another example, the individual may provide textual input in a natural language indicative of the particular thing, and step 2204 may analyze the textual input, for example using a LLM, to determine the indication of the particular thing. In some examples, step 2204 may analyze the textual content accessed by step 2202, for example using a LLM, to generate the indication of the particular thing. In one example, a machine learning model may be trained using training examples to select particular things for foreshadowing from textual contents. An example of such training example may include a sample textual content, together with a label indicative of a sample thing in the sample textual content. Step 2204 may use the trained machine learning model to analyze the textual content accessed by step 2202 to generate the indication of the particular thing. In some examples, the indication of the particular thing received by step 2204 may include an indication of a portion of the textual content mentioning the particular thing. In some examples, the indication of the particular thing received by step 2204 may include a text in the natural language indicative of the particular thing, such as the textual input described above. In some examples, the indication of the particular thing received by step 2204 may include a text in a second natural language (different from the natural language of the textual input accessed by step 2202) indicative of the particular thing, such as the textual input described above.

In some examples, step 2206 may comprise analyzing the textual content to select a location in the textual content accessed by step 2202 for an advance hint of the particular thing of step 2204. In some examples, the analyzing the textual content to select the location in the textual content by step 2206 may comprise using a machine learning model to analyze the textual content to select the location in the textual content. The machine learning model may be a machine learning model trained using training examples to select locations in textual contents for advance hints of things. An example of such training example may include a sample textual content and a sample indication of a sample thing, together with a label indicating a sample location in the sample textual content for a sample advance hint to the sample thing. In some examples, the location selected by step 2206 may be a location between two words of the textual content. In some examples, the location selected by step 2206 may be a portion of the textual content. The portion may include at least one word, at least two words, at least ten words, at least one sentence, at least one paragraph, at least one chapter, and so forth.

In some examples, step 2206 may identify a first mathematical object based on the particular thing, for example using module 306. Further, step 2206 may identify a second mathematical object, wherein the second mathematical object may correspond to a word of the textual content accessed by step 2202, for example using module 302. Further, step 2206 may base the selection of the location in the textual content on the first mathematical object and the second mathematical object. For example, step 2206 may determine whether the location is after the word corresponding to the second mathematical object based on the first mathematical object and the second mathematical object. In another example, step 2206 may calculate a function of the first mathematical object and the second mathematical object to obtain a non-negative integer n, and may select the location after the n-th word of the textual content.

In some examples, step 2206 may receive an indication of a particular portion of the textual content, and may select the location in the particular portion. For example, the particular portion may be all text that precedes a particular location in the textual content, may be all text between two locations in the textual content, may be a continuous portion, may be a fragmented portion, and so forth. For example, an individual may indicate an particular portion the textual content accessed by step 2202, for example using a user interface, using a keyboard, using a pointing device, using a touch screen, using voice commands, using gestures, and so forth. In another example, the individual may provide textual input in a natural language indicative of a desire portion, and the textual input may be analyzed to select the particular portion. In yet another example, the textual content may be analyzed automatically, for example using a LLM, to select the particular portion.

In some examples, step 2208 may comprise modifying the textual content accessed by step 2202 to include the advance hint of the particular thing of step 2204 at the location selected by step 2206. In some examples, the modifying the textual content to include the advance hint by step 2208 may comprise using a machine learning model to analyze the textual content and information associated with the particular thing to modify the textual content to include the advance hint. The machine learning model may be a machine learning model trained using training examples to modify texts by adding hints to things at selected locations. An example of such training example may include a sample textual content, a sample location in the sample textual content and a sample indication of a sample thing, together with a sample modification to the sample textual content, the sample modification includes an addition of a sample hint to the sample thing at the sample location.

In some examples, step 2208 may identify a first mathematical object based on the particular thing, for example using module 306. Further, step 2208 may identify a second mathematical object, wherein the second mathematical object may correspond to a word of the textual content accessed by step 2202, for example using module 302. Further, step 2208 may calculate a function of the first mathematical object and the second mathematical object to obtain a third mathematical object, wherein the third mathematical object may correspond to a particular word, and wherein the particular word is not included in the textual content, for example using module 304. Further, step 2208 may include the particular word in the advance hint.

In some examples, the modifying the textual content accessed by step 2202 to include the advance hint by step 2208 may comprise generating text including the advance hint of the particular thing of step 2204, and adding the generated text to the textual content at the location selected by step 2206. For example, step 2208 may use a LLM to analyze textual data indicative of the particular thing and/or the textual content accessed by step 2202 to generate the text including the advance hint of the particular thing. In some examples, the modifying the textual content accessed by step 2202 to include the advance hint by step 2208 may comprise replacing at least one word of the textual content in the location selected by step 2206. In one example, the replacement may add the advance hint to the textual content. In another example, a text including the advance hint may be added to the textual content, and the replacement may adjust the textual content to the addition. For example, step 2208 may use a LLM to analyze textual data indicative of the particular thing and/or the textual content accessed by step 2202 to replace the at least one word of the textual content in the location selected by step 2206.

In some examples, an indication of a particular style may be received, for example as described above in relation to style 154, using step 2104, and so forth. For example, the particular style may be style 154. In another example, the indication of the particular style may be determined based on an analysis of at least part of the textual content, for example as described above. Further, step 2208 may base the modifying the textual content on the particular style. In one example, the advance hint may be in the particular style. In one example, step 2208 may generate the advance hint in the particular style, for example using a LLM. For example, when the particular style is a formal and polished language style, the advance hint may be 'Their stolen glances, laden with unspoken longing, hinted at a future where hearts entwined, destined to surrender to the enchantment of love's gentle embrace', and when the particular style is casual and colloquial language style, the advance hint may be 'Did you peep how they looked at each other? That's some next-level chemistry'.

In some examples, step 2210 may comprise presenting the modified textual content. For example, step 2210 may present the modified textual content to an individual. In one example, presenting the modified textual content by step 2210 may comprise presenting the modified textual content via a user interface, may comprise presenting the modified textual content in an electronic document, may comprise presenting the modified textual content visually, may comprise presenting the modified textual content audibly, and so forth. In some examples, the presentation of the modified textual content by step 2210 may enable an individual to reject the advance hint, for example via a user interface, via voice commands, using gestures, using a keyboard, using a pointing device, and so forth. In some examples, the presentation of the modified textual content by step 2210 may enable an individual to alter the advance hint, for example via a user interface, via voice commands, using gestures, using a keyboard, using a pointing device, and so forth. Additionally or alternatively, step 2210 may comprise presenting a visual indication of the selected location. For example, the visual indication may be presented via a user interface, may be presented in an electronic document that includes the textual content, and so forth.

In some examples, the presentation of the modified textual content by step 2210 may enable an individual to alter the location of the advance hint in the modified textual content. For example, the individual may indicate an alternative location for the advance hint in the textual content accessed by step 2202 and/or in the modified textual content created by step 2208, for example using a user interface, using a keyboard, using a pointing device, using a touch screen, using voice commands, using gestures, and so forth. In another example, the individual may provide textual input in a natural language indicative of a desire to alter the location of the advance hint in the modified textual content, and the textual input may be analyzed to select an alternative location for the advance hint. For example, the textual input may include 'let's wait with this hint to a later point in the story' or 'how about putting this just after the two characters meet'. In some examples, method 2200 may further comprise altering the advance hint based on the altering of the location, for example using a LLM. For example, when the advance hint is moved to an earlier point in the story, a specific detail associated with the advance hint may not yet be revealed in the story, and the advance hint may be altered to remove the specific detail or the reference to the specific detail from the advance hint.

In some examples, step 2206 may be a byproduct of step 2208. For example, step 2208 may comprise modifying the textual content accessed by step 2202 to include the advance hint of the particular thing of step 2204, for example by applying one of the techniques described above. Further, the modification to the textual content by step 2208 may be limited to a specific location in the textual content even though step 2208 was free to modify the entire textual content. Further, the location in the textual content (of step 2206) may be the specific location. In other examples, step 2206 may be excluded from method 2200 altogether. In this example, the modification to the textual content by step 2208 may not be limited to a specific location in the textual content.

In some examples, the particular thing of step 2204 may be two characters falling in love, the location for the advance hint selected by step 2206 may be a point in the story where the two characters are facing a challenge together, and the advance hint added by step 2208 may be 'Their gazes collided for a brief moment, and amidst the chaos, a flicker of something more than friendship passed between them'. In some examples, the particular thing of step 2204 may be a character dying, the location for the advance hint selected by step 2206 may be a moment of foreboding in the story, and the advance hint added by step 2208 may be 'As the wind whispered through the trees, her shadow grew fainter, as if it were preparing to merge with the eternal darkness'.

FIG. 23 is a flowchart of an exemplary method 2300 for facilitating visual formatting of text through natural language. In this example, method 2300 may comprise accessing a textual content in a natural language (step 1902); presenting the textual content to an individual in an initial visual format (step 2304); receiving from the individual a selection of a first portion of the textual content (step 2306); receiving from the individual a first textual input in the natural language (step 2604); analyzing the first textual input to select a first visual format (step 2810); receiving from the individual a second textual input in the natural language (step 2812); analyzing the second textual input to select a second portion of the textual content (step 2314), wherein the second portion includes at least one word not included in the second textual input, and wherein the second textual input includes at least one word not included in the second portion; analyzing the second textual input to select a second visual format (step 2816); and altering the presentation of the textual content (step 2318), wherein in the altered presentation the first portion is presented in the first visual format, the second portion is presented in the second visual format, and a third portion of the textual content is presented in the initial visual format. In other examples, method 2300 may include additional steps or fewer steps. In other examples, one or more steps of method 2300 may be executed in a different order and/or one or more groups of steps may be executed simultaneously.

In some examples, a visual format (such as the initial visual format of step 2804, the initial visual format of step 2304, the first visual format selected by step 2810, the second visual format selected by step 2816, etc.) may include one or more of a typeface, a font size, a text style (such as regular, bold, italic, underline, strikethrough, and so forth), a text position (such as subscript, superscript, default, and so forth), letter spacing, line spacing, a foreground color, a background color, a foreground texture, a background texture, a foreground pattern, a background pattern, and so forth. In some examples, the initial visual format of step 2304, the first visual format selected by step 2810, and the second visual format selected by step 2816 may differ in at least one of these characteristics. In some examples, the initial visual format of step 2804, the first visual format selected by step 2810, and the second visual format selected by step 2816 may differ in at least one of these characteristics. In some examples, the initial visual format of step 2804, the first visual format selected by step 2810, and the second visual format selected by step 2816 may differ in at least one of color, typeface or size. In some examples, when relating to data records (for example, in the context of method 2800), a visual format (such as the initial visual format of step 2804, the first visual format selected by step 2810, the second visual format selected by step 2816, etc.) may include a conditional formatting rule for determining a visual format of a data record based on values included in the data record. For example, at least one of the first visual format or the second visual format includes a conditional formatting rule for determining a visual format of a data record based on a numerical value included in the data record. In some examples, the initial visual format of step 2804, the first visual format selected by step 2810, and the second visual format selected by step 2816 may differ in at least the rule.

In some examples, step 2304 may comprise presenting a textual content (such as the textual content accessed by step 1902) to an individual in an initial visual format. For example, presenting the textual content to the individual by step 2304 may comprise presenting the textual content via a user interface, may comprise presenting the textual content in an electronic document (for example, the same electronic document described above in relation to step 402), may comprise presenting the textual content visually, may comprise presenting the textual content graphically, may comprise presenting the textual content textually, and so forth.

In some examples, step 2306 may comprise receiving from an individual (such as the individual of step 2304) a selection of a first portion of a textual content (such as the textual content accessed by step 1902). In some examples, the first portion may include a single word, may include at least two words, may include at least five words, may include at least ten words, may include a single sentence, may include at least two sentences, may include a single paragraph, may include at least two paragraphs, may include at least ten paragraphs, and so forth. In some example, step 2306 may receive from the individual the selection of the first portion of the textual content through a pointing device. In some example, step 2306 may receive from the individual the selection of the first portion of the textual content through usage of arrow keys of a keyboard. In some example, step 2306 may receive from the individual the selection of the first portion of the textual content through a user interface. In some examples, step 2306 may analyze a textual input (such as the first textual input received by step 2604) to select a portion of a textual content (for example, to select the first portion of the textual content accessed by step 1902), for example as described below in relation to step 2314. In some examples, step 2306 may receive from the individual a selection of a specific portion of the textual content through a pointing device, and may analyze the first textual input to select a sub-portion of the specific portion (for example as described below in relation to step 2314, using the specific portion as a textual content), thereby selecting the first portion. For example, the first portion may include at least part but not all of the specific portion.

In some examples, step 2314 may comprise analyzing a textual input (such as the second textual input received by step 2812) to select a portion of a textual content (for example, to select a second portion of the textual content accessed by step 1902). The selected portion may include at least one word not included in the textual input. For example, the second portion selected by step 2314 may include at least one word not included in the second textual input received by step 2812. The textual input may include at least one word not included in the selected portion. For example, the second textual input received by step 2812 may include at least one word not included in the second portion selected by step 2314. For example, step 2314 may use a LLM to analyze the textual input to select the portion of the textual content. In another example, step 2314 may use a machine learning model to analyze the second textual input to select the second portion of the textual content. The machine learning model may be a machine learning model trained using training examples to select portions of textual contents based on textual inputs. An example of such training example may include a sample textual input and a sample textual content, together with a label indicative of a sample selection of a portion of the sample textual content.

In some examples, step 2314 may identify a first mathematical object in a mathematical space, wherein the first mathematical object may correspond to a word of the first textual input, for example using module 302. Further, step 2314 may identify a second mathematical object in the mathematical space, wherein the second mathematical object may correspond to a word of the second textual input, for example using module 302. Further, step 2314 may use the first mathematical object and the second mathematical object to select the second portion of the textual content. For example, step 2314 may calculate a function of the first mathematical object and the second mathematical object to obtain a third mathematical object, for example using module 304. Further, step 2314 may use the third mathematical object to select the second portion of the textual content. For example, when the third mathematical object includes a particular numerical value, step 2314 may include a particular word of the textual content in the second portion. In another example, when the third mathematical object includes a specific numerical value, step 2314 may avoid including a specific word of the textual content in the second portion.

In some examples, the selection of the second portion by step 2314 may be further based on a particular word of the textual content not included in the second portion. For example, step 2314 may use a LLM to analyze the second textual input and/or a part of the textual content including the particular word to select the second portion. For example, the second textual input may include 'Highlight the characters younger than Frank', and the particular word may be indicative of Frank's age.

In some examples, the second textual input received by step 2812 may include an adjective, and the selection of the second portion by step 2314 may be based on the adjective. For example, when the second textual input includes 'Show the daily summary in a bigger font', step 2314 may select a second portion that includes the daily summary, and when the second textual input includes 'Show the weekly summary in a bigger font', step 2314 may select a second portion that includes the weekly summary. In one example, the second textual input may be analyzed to identify the particular word, for example using a LLM. In one example, the particular word may be included in the first portion of step 2306. In one example, the particular word may not be included in the first portion of step 2306.

In some examples, the second textual input received by step 2812 may include an adverb, and the selection of the second portion by step 2314 may be based on the adverb. For example, when the second textual input includes 'Show a portion where punctuation marks are correctly used in bold', step 2314 may select a second portion in which the punctuation marks are correctly used, and when the second textual input includes 'Show a portion where punctuation marks are wrongly used in bold', step 2314 may select a second portion in which punctuation marks are wrongly used.

In some examples, the second textual input received by step 2812 may include a conjunction, and the selection of the second portion by step 2314 may be based on the conjunction. For example, when the second textual input includes 'Emphasize the portion describing the brother and the sister', step 2314 may select a second portion that describes both the brother and the sister, and when the second textual input includes 'Emphasize the portion describing the brother or the sister', step 2314 may select a second portion that describes both the brother or the sister.

In some examples, the second textual input received by step 2812 may include a determiner, and the selection of the second portion by step 2314 may be based on the determiner. For example, when the second textual input includes 'Highlight sections that meet all criteria', step 2314 may select a second portion that meets all criteria, and when the second textual input includes 'Highlight sections that meet at least half of the criteria', step 2314 may select a second portion that meets at least half of the criteria.

In some examples, the second textual input received by step 2812 may include a noun, and the selection of the second portion by step 2314 may be based on the noun. For example, when the second textual input includes 'Mark the portion describing the cat in yellow', step 2314 may select a second portion that describes the cat, and when the second textual input includes 'Mark the portion describing the mouse in yellow', step 2314 may select a second portion that described the mouse.

In some examples, the second textual input received by step 2812 may include a preposition, and the selection of the second portion by step 2314 may be based on the preposition. For example, when the second textual input includes 'Emphasize the portion describing what happened during the concert', step 2314 may select a second portion that described what happened during the concert, and when the second textual input includes 'Emphasize the portion describing what happened after the concert', step 2314 may select a second portion that described what happened after the concert.

In some examples, the second textual input received by step 2812 may include a pronoun, and the selection of the second portion by step 2314 may be based on the pronoun. For example, when the second textual input includes 'Highlight the portion describing the altar boy and the father', step 2314 may select a second portion describing the altar boy and the priest, and when the second textual input includes 'Highlight the portion describing the altar boy and his father', step 2314 may select a second portion describing the altar boy and his parental father.

In some examples, the second textual input received by step 2812 may include a verb, and the selection of the second portion by step 2314 may be based on the verb. For example, when the second textual input includes 'Highlight the portion in which John is running', step 2314 may select a second portion may include a description of John running, and when the second textual input includes 'Highlight the portion in which John is walking', step 2314 may select a second portion may include a description of John walking.

In some examples, step 2318 may comprise altering the presentation (of step 2304) of the textual content. In the altered presentation, the first portion (of step 2306) may be presented in the first visual format selected by step 2810, the second portion (selected by step 2314) may be presented in the second visual format selected by step 2816, and a third portion of the textual content may be presented in the initial visual format of step 2304. In some examples, altering the presentation of the textual content by step 2318 may comprise replacing the presentation of step 2304 with a new presentation, wherein in the new presentation the first portion may be presented in the first visual format, the second portion may be presented in the second visual format, and the third portion may be presented in the initial visual format. The new presentation may be presented by step 2318 as described above in relation to step 2304. In some examples, altering the presentation of the textual content by step 2318 may comprise modifying a data-structure that configures the presentation. For example, the data-structure may associate different sections of the presentation with different visual formats, and step 2318 may alter the data-structure to associate the sections of the presentation displaying the first portion with the first visual format, and/or may alter the data-structure to associate the sections of the presentation displaying the second portion with the second visual format. In some examples, step 2318 may generate digital control signals for altering the presentation.

In some examples, method 2300 may further comprise, after altering the presentation of the textual content, receiving from an individual (such as the individual of step 2304 and/or step 2604 and/or step 2812) a third textual input in a natural language (such as the natural language of step 1902 and/or step 2604 and/or step 2812, a different natural language, and so forth), for example as described above in relation to step 2604. Further, the third textual input may be analyzed to select a third visual format, for example as described in relation to step 2816. Further, the third textual input to select a fourth portion of the textual content, for example as described above in relation to step 2314. In one non-limiting example, the fourth portion may include at least some but not all of the first portion and/or the fourth portion may include at least some but not all of the second portion and/or the fourth portion may include at least some but not all of the third portion. Further, the presentation (of step 2304 and step 2318) of the textual content may be modified, wherein in the modified presentation all parts of the first portion not included in the fourth portion may be presented in the first visual format, all parts of the second portion not included in the fourth portion may be presented in the second visual format, all parts of the third portion not included in the fourth portion may be presented in the initial visual format, and the fourth portion may be presented in the third visual format.

FIG. 24 is a flowchart of an exemplary method 2400 for modifying drawings based on changes to textual contents. In this example, method 2400 may comprise accessing a textual content in a natural language (step 1902); accessing a visual content of a drawing associated with the textual content (step 2404); receiving an indication of a modification to the textual content (step 2406); based on the modification to the textual content, analyzing the visual content of the drawing to determine a suggested modification to the drawing (step 2408); and presenting the suggested modification to an individual (step 1610). In other examples, method 2400 may include additional steps or fewer steps. In other examples, one or more steps of method 2400 may be executed in a different order and/or one or more groups of steps may be executed simultaneously.

In one example, the textual content accessed by step 1902 may be a textual content of a description section for a prospective patent application, and the drawing of step 2404 may be a drawing for the prospective patent application. In one example, the textual content accessed by step 1902 may be a textual content of a narrative work of art. Some non-limiting examples of such narrative work of art may include a novel, a textual content of comics, a script, a screenplay, a teleplay, a stage-play, a radio-play or a libretto.

In some examples, step 2404 may comprise accessing a visual content of a drawing, for example a visual content of a drawing associated with the textual content accessed by step 1902, for example as described above in relation to step 1402.

In some examples, step 2406 may comprise receiving an indication of a modification to a textual content, for example to the textual content accessed by step 1902. For example, receiving the indication by step 2406 may comprise reading the indication from memory, may comprise receiving the indication from an external computing device (for example, via a digital communication device), may comprise receiving the indication from a person (for example, via a user interface), may comprise determining the indication by monitoring an electronic document that includes the textual content, and so forth. In one example, the modification to the textual content may be a modification made by the individual. In one example, the modification to the textual content may be a modification made using a machine learning model. In one example, the modification to the textual content may be a modification triggered by the individual. In one example, the modification to the textual content may be a modification triggered by a modification to another drawing.

In some examples, step 2408 may comprise, based on the modification to the textual content (of step 2406), analyzing the visual content of the drawing accessed by step 2404 to determine a suggested modification to the drawing. In some examples, step 2408 may analyzing the modification to the textual content and the visual content of the drawing using a machine learning model to determine the suggested modification to the drawing. For example, the machine learning model may be the multimodal machine learning model described in relation to step 1608.

In some examples, step 2408 may identify a first mathematical object in a particular mathematical space, wherein the first mathematical object may correspond to a word in the modified textual content, for example using module 302. Further, step 2408 may calculate a convolution of at least part of the drawing to determine a second mathematical object. Further, step 2408 may base the suggested modification to the drawing on the first mathematical object and the second mathematical object, for example as described above in relation to step 1608.

In some examples, step 2408 may identify a first mathematical object in a particular mathematical space, wherein the first mathematical object may correspond to a word in the textual content, for example using module 302. Further, step 2408 may identify a second mathematical object in the particular mathematical space, wherein the second mathematical object may correspond to a word in the modified textual content, for example using module 302. Further, step 2408 may calculate a function of the first mathematical object and the second mathematical object to obtain a third mathematical object in the particular mathematical space, for example using module 304. Further, step 2408 may base the suggested modification to the drawing on the third mathematical object, for example as described above in relation to step 1608.

In some examples, the textual content accessed by step 1902 may describe a plurality of characteristics associated with a particular element. Further, the modification (of step 2406) to the textual content may include an addition of a description of an additional characteristic associated with the particular element to the textual content. The additional characteristic may not be included in the plurality of characteristics. The drawing of step 2404 may include an illustration of the particular element that is inconsistent with the additional characteristic. Further, the suggested modification (of step 2408) to the drawing may include modifying the illustration of the particular element to be consistent with the additional characteristic. In one example, the particular element may be a person. For example, the textual content may include 'a young man in a suit ran towards me', the modified textual content may include 'a young man in a suit and a brimmed hat ran towards me while waving his hands', the drawing may depict a young man in a suit without a hat, running without waving his hands. Further, the suggested modification to the drawing may include an addition of a hat and a modification to the positions of the hands to show that the hands are waving. In one example, the textual content may be a textual content of a narrative work of art, and the particular element may be a character of the narrative work of art. In one example, the particular element may be an inanimate object.

In some examples, the textual content accessed by step 1902 may describe a plurality of elements. Further, the modification (of step 2406) to the textual content may include an addition of a description of an additional element to the textual content. The additional element may not be included in the plurality of elements. The additional element may not be illustrated in the drawing of step 2404. Further, the suggested modification (of step 2408) to the drawing may include adding an illustration of the additional element to the drawing. For example, the textual content may include 'the dog chased the cat', the modified textual content may include 'the dog chased the cat to the tree', the drawing may depict the dog and the cat with no tree, and the suggested modification may include an addition of a tree on the path of the cat.

In some examples, the textual content accessed by step 1902 may describe a plurality of characteristics. Further, the modification (of step 2406) to the textual content may include a removal of a particular characteristic from the textual content. The particular characteristic may be associated with a first element and a second element, the first element may not be associated with any other characteristic of the plurality of characteristics, and the second element may be further associated with another characteristic of the plurality of characteristics. The drawing of step 2404 may include an illustration of the first element and an illustration of the second element. Further, the suggested modification (of step 2408) to the drawing may include removing the illustration of the first element from the drawing while preserving the illustration of the second element in the drawing. For example, the textual content may include 'The child stands between the man and the woman, holding the man's hand', the modified textual content may include 'The child holding the man's hand'. The drawing may depict the child, the man and the woman, and the suggested modification may include a removal of the woman from the drawing.

In some examples, the textual content accessed by step 1902 may include a description of a first element, a description of a second element and a description of a third element. Further, the drawing of step 2404 may depict the first element but not the second and third elements. Further, the modification (of step 2406) to the textual content may include a modification to the description of the second element and a modification to the description of the third element. Further, step 2408 may analyze the modified description of the second element to determine to include an addition of a depiction of the second element in the suggested modification to the drawing. Further, step 2408 may analyze the modified description of the third element to determine not to include an addition of a depiction of the third element in the suggested modification to the drawing. In one example, a machine learning model may be trained using training examples to determine whether to add a depiction of an element to a drawing based on a modified textual description of the element. An example of such training example may include a sample modified textual description of a sample element, together with a label indicating whether or not to add a depiction of the sample element to a drawing. Step 2408 may use the trained machine learning model to analyze a modified descriptions of an element (such as the second and third elements) to determine whether to include an addition of a depiction of the element in the suggested modification.

In some examples, the textual content accessed by step 1902 may include a description of a first element, a description of a second element and a description of a third element. Further, the drawing of step 2404 may depict the first element, the second element and the third element. Further, the modification (of step 2406) to the textual content may include a modification to the description of the second element and a modification to the description of the third element. Further, step 2408 may analyze the modified description of the second element to determine to include a removal of the depiction of the second element from the suggested modification to the drawing. Further, step 2408 may analyze the modified description of the third element to determine not to include a removal of the depiction of the third element from the suggested modification to the drawing. In one example, a machine learning model may be trained using training examples to determine whether to remove a depiction of an element from a drawing based on a modified textual description of the element. An example of such training example may include a sample modified textual description of a sample element, together with a label indicating whether or not to remove a depiction of the sample element from a drawing. Step 2408 may use the trained machine learning model to analyze a modified descriptions of an element (such as the second and third elements) to determine whether to include a removal of a depiction of the element in the suggested modification.

In some examples, the textual content accessed by step 1902 may include a noun. Further, the modified textual content of step 2406 may include the noun and an adjective adjacent to the noun. The adjective may not be included in the textual content. Further, the drawing of step 2404 may depict an element associated with the noun. Further, and the suggested modification (of step 2408) to the drawing may include a modification to the element based on the adjective. For example, the textual content may include 'Jane holds an apple', the drawing may depicts Jane holding a red apple, the modified textual content may include 'Jane holds a green apple', and the suggested modification may include changing the apple color in the drawing from red to green.

In some examples, the textual content accessed by step 1902 may include a verb. Further, the modified textual content of step 2406 may include the verb and an adverb adjacent to the verb. The adverb may not be included in the textual content. Further, the drawing of step 2404 may depict an element associated with the verb. Further, the suggested modification (of step 2408) to the drawing may include a modification to the element based on the adverb. For example, the textual content may include 'A lion stands on a rocky cliff', the drawing may depicts a somber lion with his head down on a rocky cliff, the modified textual content may include 'A lion stands proudly on a rocky cliff', and the suggested modification may include changing the lion from a somber lion to a proud lion looking upwards.

In some examples, step 2408 may comprise receive an indication of a particular style (such as style 154), for example as described above in relation to style 154. Further, step 2408 may further base the suggested modification to the drawing on the particular style. For example, step 2408 may use a multimodal LLM to analyze a textual description of the style, the modification to the textual content and the visual content of the drawing to generate the suggested modification to the drawing in the particular style.

Figure 25:
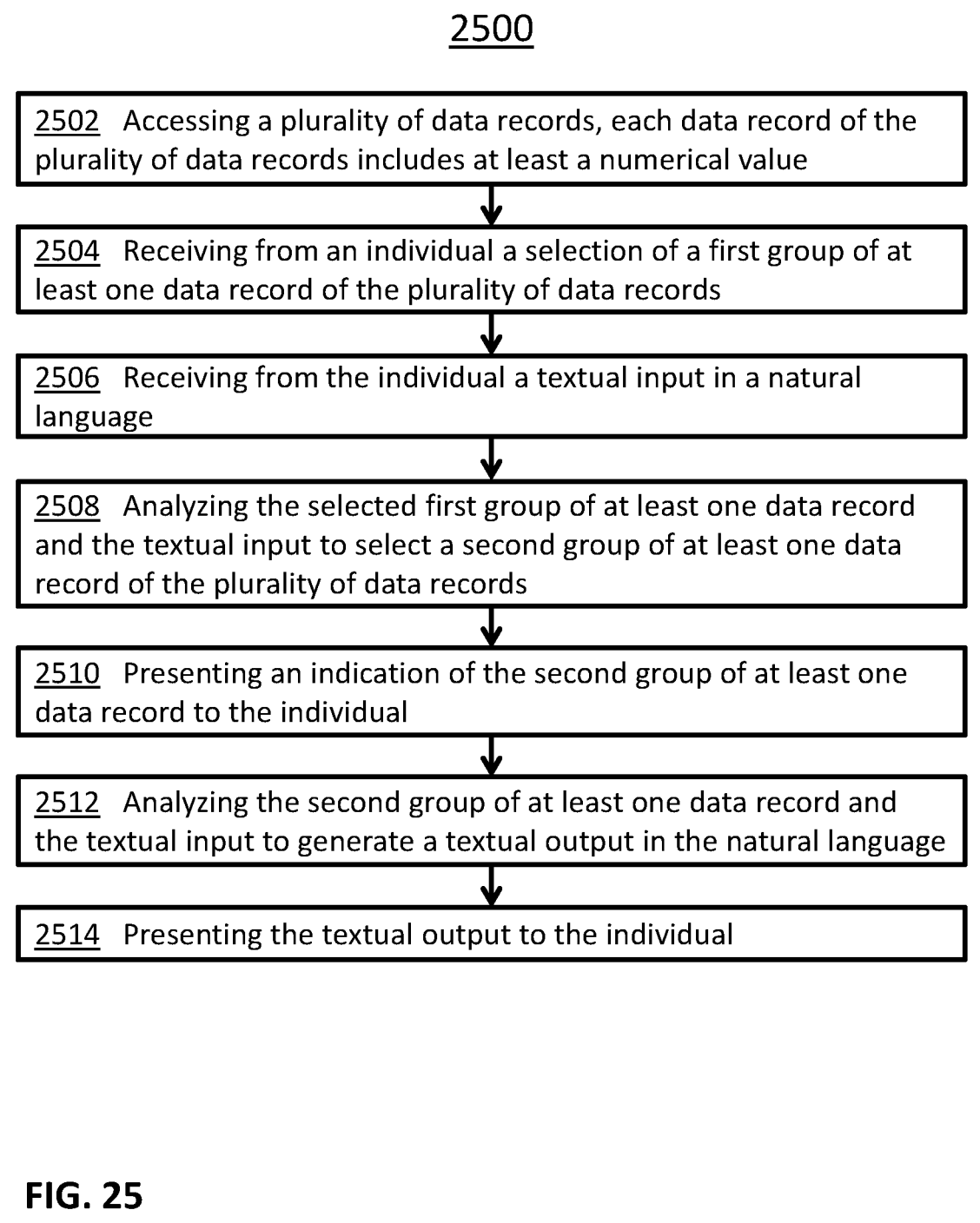

FIG. 25 is a flowchart of an exemplary method 2500 for analyzing data records through natural language. In this example, method 2500 may comprise: accessing a plurality of data records (step 2502), each data record of the plurality of data records includes at least a respective numerical value; receiving from an individual a selection of a first group of at least one data record of the plurality of data records (step 2504); receiving from the individual a textual input in a natural language (step 2506); analyzing the selected first group of at least one data record and the textual input to select a second group of at least one data record of the plurality of data records (step 2508); presenting an indication of the second group of at least one data record to the individual (step 2510); analyzing the second group of at least one data record and the textual input to generate a textual output in the natural language (step 2512); and presenting the textual output to the individual (step 2514). In other examples, method 2500 may include additional steps or fewer steps. In other examples, one or more steps of method 2500 may be executed in a different order and/or one or more groups of steps may be executed simultaneously.

In some examples, step 2502 may comprise accessing a plurality of data records. In one example, each data record of the plurality of data records may include at least a respective numerical value. In one example, the numerical value included in a particular data record of the plurality of data records may be a function of at least one other data record of the plurality of data records, and may be automatically updated when any one of the at least one other data record are modified. In one example, accessing the plurality of data records by step 2502 may comprise reading the plurality of data records from memory, may comprise receiving the plurality of data records from an external computing device (for example, via a digital communication device), may comprise receiving the plurality of data records from a person (for example, via a user interface), may comprise accessing the plurality of data records in an electronic document (such as a datasheet, an electronic form including fields, and so forth), may comprise accessing the plurality of data records in a database, may comprise accessing the plurality of data records in a data structure, and so forth. In one example, each data record of the plurality of data records may be or include a respective cell in a datasheet. In one example, each data record of the plurality of data records may be at least one of a respective row or a respective column in a table (such as a table in a datasheet, a table in an electronic document, a table in a form, and so forth). In one example, each data record of the plurality of data records may be a respective data record in a database. In one example, each data record of the plurality of data records may be or include a respective field in an electronic form.

In some examples, step 2504 may comprise receiving from an individual a selection of a first group of at least one data record of a plurality of data records (such as the plurality of data records accessed by step 2502). In some examples, the first group of at least one data record may include a single data record, may include at least two data records, may include at least five data records, may include at least ten data records, and so forth. In some examples, step 2504 may receive from the individual the selection of the first group of at least one data record of the plurality of data records through a pointing device. In some examples, step 2504 may receive from the individual the selection of the first group of at least one data record of the plurality of data records through usage of arrow keys of a keyboard. In some examples, step 2504 may receive from the individual the selection of the first group of at least one data record of the plurality of data records through a user interface. In some examples, step 2504 may analyze a textual input (such as a textual input in a natural language, the textual input received by step 2506, the first textual input received by step 2604, etc.) to select the first group of at least one data record of the plurality of data records, for example as described below in relation to step 2508. In some examples, step 2504 may receive from the individual a selection of a specific group of at least one data record of the plurality of data records through a pointing device, and may analyze a textual input (such as a textual input in a natural language, the textual input received by step 2506, the first textual input received by step 2604, etc.) to select a subgroup of the specific group, thereby selecting the first group, for example as described below in relation to step 2508. In one example, the first group may include at least one but not all data records of the specific group.

In some examples, step 2506 may comprise receiving from an individual (such as the individual of step 2504, the individual of method 2600, and so forth) a textual input in a natural language. For example, receiving the textual input from the individual by step 2506 may comprise reading the textual input received from the individual from memory, may comprise receiving the textual input via an external computing device (for example, via a digital communication device), may comprise receiving the textual input via a user interface, may comprise accessing an electronic document that includes the textual input received from the individual, and so forth. In one example, step 2506 may receive the textual input from the individual via at least one of a keyboard, a touchscreen or a virtual keyboard (for example, using a gesture recognition algorithm). In one example, step 2506 may receive audio data captured using an audio sensor, the audio data may include speech produced by the individual, and step 2506 may analyze the audio data using speech recognition algorithm to identify the textual input.

In some examples, step 2508 may comprise analyzing a first group of at least one data record (such as a group of at least one data record selected by an individual, the selected first group of at least one data record of step 2504, etc.) and a textual input (such as a textual input received from an individual, the textual input received by step 2506, etc.) to select a second group of at least one data record of a specific group of records (such as the plurality of data records accessed by step 2502). In some examples, the second group of at least one data record may include a single data record, may include at least two data records, may include at least five data records, may include at least ten data records, and so forth. In one example, the first group (of step 2504) may be a subgroup of the second group selected by step 2508. In one example, the second group selected by step 2508 may be a subgroup of the first group (of step 2504). In one example, the first group (of step 2504) and the second group selected by step 2508 may include at least one data record in common. In one example, the first group (of step 2504) and the second group selected by step 2508 may include no data record in common. In some examples, all data records of the first group (of step 2504) may be included in a first table, and all data records of the second group selected by step 2508 may be included in a second table. In one example, the second table may differ from the first table. In another example, the second table and the first table may be the same table. Some non-limiting examples of such tables may include tables in a datasheet, tables in an electronic document, tables in a form, and so forth. In some examples, step 2508 may use a machine learning model to analyze the textual input and the group of at least one data record (such as a group of at least one data record selected by an individual, the selected first group of at least one data record of step 2504, etc.) to select the second group of at least one data record. For example, the machine learning model may be a machine learning model trained using training examples to select data records based on text and other data records. An example of such training example may include a sample text and a sample group of data records, together with a label indicating a desired selection of another sample group of data records.

In some examples, step 2508 may identify a first mathematical object in a mathematical space, wherein the first mathematical object may correspond to a first word of the textual input, for example using module 302. In one example, step 2508 may base the selection of the second group of at least one data record on the first mathematical object and the numerical values included in the first group of at least one data record. For example, step 2508 may select a region of the mathematical space based on the numerical values included in the first group, and when the first mathematical object is in the selected region, step 2508 may include a particular data record in the second group. In one example, step 2508 may calculate a function of the first mathematical object and a numerical value included in the first group of at least one data record to obtain a second mathematical object (for example using step 304), and may base the selection of the second group of at least one data record on the second mathematical object. For example, when the second mathematical object is in a first region of the mathematical space, step 2508 may include a particular data record in the second group. In another example, when the second mathematical object is in a second region of the mathematical space, step 2508 may avoid including a particular data record in the second group. In some examples, step 2508 may calculate a function of the numerical values included in the first group of at least one data record to obtain a mathematical object (for example, using module 304), and may base the selection of the second group of at least one data record on the textual input and the mathematical object. For example, step 2508 may use a LLM to analyze the textual input and a textual representation of the mathematical object to determine whether to include a particular data record in the second group.

In some examples, each data record of the plurality of data records accessed by step 2502 may include respective temporal data. In one example, step 2508 may select a temporal constraint based on the temporal data included in the selected first group of at least one data record. Further, the selection of the second group of at least one data record by step 2508 may be based on the temporal constraint and the temporal data included in the plurality of data records. For example, when the temporal data included in a particular data record satisfies a first condition based on the temporal constraint, step 2508 may include the particular data record in the second group. In another example, when the temporal data included in a specific data record satisfies a second condition based on the temporal constraint, step 2508 may avoid including the specific data record in the second group.

In some examples, step 2508 may analyze the textual input to identify a particular data record of the plurality of data records accessed by step 2502. The particular data record may not be included in any one of the first group or the second group. For example, step 2508 may analyze the textual input using a LLM to identify the particular data record. In some examples, step 2508 may further base the selection of the group of at least one data record (such as the second group) on the particular data record. For example, when the numerical value included in the particular data record is a first value, step 2508 may include a specific data record in the group, and when the numerical value included in the particular data record is a second value, step 2508 may avoid including the specific data record in the group.

In some examples, the textual input received by step 2506 may include an adjective, and the selection of the second group by step 2508 and/or step 2708 may be based on the adjective. In some examples, the first textual input received by step 2604 may include an adjective, and the selection of the second group by step 2814 may be based on the adjective. For example, the first group may indicate a group of employees, when the textual input includes 'the daily sales numbers of these employee', step 2508 and/or step 2708 and/or step 2814 may select the second group to include the daily sales numbers of the group of employees, and when the textual input includes 'the monthly sales numbers of these employee', step 2508 and/or step 2708 and/or step 2814 may select the second group to include the monthly sales numbers of the group of employees.

In some examples, the textual input received by step 2506 may include an adverb, and the selection of the second group by step 2508 and/or step 2708 may be based on the adverb. In some examples, the first textual input received by step 2604 may include an adverb, and the selection of the second group by step 2814 may be based on the adverb. For example, the first group may indicate sales by employees, when the textual input includes 'What are the salaries of the employees who have never sold a car?' step 2508 and/or step 2708 and/or step 2814 may select the second group to include the salaries of employees that never sold a car, and when the textual input includes 'What are the salaries of the employees who have seldom sold a car?' step 2508 and/or step 2708 and/or step 2814 may select the second group to include the salaries of employees that sold less than one car a month.

In some examples, the textual input received by step 2506 may include a conjunction, and the selection of the second group by step 2508 and/or step 2708 may be based on the conjunction. In some examples, the first textual input received by step 2604 may include a conjunction, and the selection of the second group by step 2814 may be based on the conjunction. For example, the first group may include attendance information and homework assignment completion information, when the textual input includes 'Show the scores of the students that have not completed all the homework assignments but attended all the classes', step 2508 and/or step 2708 and/or step 2814 may select the second group to include the scores of the student that have not completed all the homework assignments but attended all the classes, and when the textual input includes 'Show the scores of the students that have not completed all the homework assignments nor attended all the classes', step 2508 and/or step 2708 and/or step 2814 may select the second group to include the scores of the student that have not completed all the homework assignments and have not attended all the classes.

In some examples, the textual input received by step 2506 may include a determiner, and the selection of the second group by step 2508 and/or step 2708 may be based on the determiner. In some examples, the first textual input received by step 2604 may include a determiner, and the selection of the second group by step 2814 may be based on the determiner. For example, the first group may include attendance information, when the textual input includes 'Show the grades of the students who attended all of the classes', step 2508 and/or step 2708 and/or step 2814 may select the second group to include the grades of the students who attended all of the classes, and when the textual input includes 'Show the grades of the students who attended at least half of the classes', step 2508 and/or step 2708 and/or step 2814 may select the second group to include the grades of the students who attended at least half of the classes.

In some examples, the textual input received by step 2506 may include a noun, and the selection of the second group by step 2508 and/or step 2708 may be based on the noun. In some examples, the first textual input received by step 2604 may include a noun, and the selection of the second group by step 2814 may be based on the noun. For example, the first group may indicate candidates, when the textual input includes 'Show the heights of these candidates', step 2508 and/or step 2708 and/or step 2814 may select the second group to include the heights of these candidates, and when the textual input includes 'Show the weights of these candidates', step 2508 and/or step 2708 and/or step 2814 may select the second group to include the weights of these candidates.

In some examples, the textual input received by step 2506 may include a preposition, and the selection of the second group by step 2508 and/or step 2708 may be based on the preposition. In some examples, the first textual input received by step 2604 may include a preposition, and the selection of the second group by step 2814 may be based on the preposition. For example, the first group may include grades of students of a class, when the textual input includes 'Show the names of the students with a score average above the class average', step 2508 and/or step 2708 and/or step 2814 may select the second group to include names of the students with a score average above the class average, and when the textual input includes 'Show the names of the students with a score average below the class average', step 2508 and/or step 2708 and/or step 2814 may select the second group to include names of the students with a score average below the class average.

In some examples, the textual input received by step 2506 may include a pronoun, and the selection of the second group by step 2508 and/or step 2708 may be based on the pronoun. In some examples, the first textual input received by step 2604 may include a pronoun, and the selection of the second group by step 2814 may be based on the pronoun. For example, the first group may include heights of altar boys, when the textual input includes 'Show the heights of their fathers', step 2508 and/or step 2708 and/or step 2814 may select the second group to include the heights of the fathers of the altar boys, and when the textual input includes 'Show the heights of the fathers', step 2508 and/or step 2708 and/or step 2814 may select the second group to include the heights of the priests.

In some examples, the textual input received by step 2506 may include a verb, and the selection of the second group by step 2508 and/or step 2708 may be based on the verb. In some examples, the first textual input received by step 2604 may include a verb, and the selection of the second group by step 2814 may be based on the verb. For example, the first group may indicate a particular participant, when the textual input includes 'Show the monthly incomes in the last year for this participant, omitting the highest monthly income', the second group may not include the highest monthly income of the particular participant, and when the textual input includes 'Show the monthly incomes in the last year for this participant, highlighting the highest monthly income', the second group may include the highest monthly income of the particular participant.

In some examples, step 2510 may comprise presenting an indication of a group of at least one data record (such as the second group of at least one data record selected by step 2508, the particular record identified by step 2606, and so forth) to an individual (such as the individual of step 2504 and/or step 2506, the individual of method 2600, and so forth). For example, presenting the indication of the group of at least one data record to the individual by step 2510 may comprise presenting the indication via a user interface, may comprise presenting the indication in an electronic document (for example, the same electronic document described above in relation to step 2502), may comprise presenting the indication visually, may comprise presenting the indication audibly, may comprise presenting the indication graphically, may comprise presenting the indication textually, and so forth.

In some examples, step 2512 may include analyzing a group of at least one data record (such as the second group of at least one data record selected by step 2508, the particular data record identified by step 2606, a single data record, at least two data records, and so forth) and a textual input (such as the textual input received by step 2506, the first textual input received by step 2604, and so forth) to generate a textual output in a natural language (such as the natural language of step 2506, a different natural language, and so forth). In some examples, step 2512 may use a LLM to analyze the group of at least one data record (such as the second group of at least one data record selected by step 2508) and the textual input to generate the textual output in the natural language. In some examples, the textual input received by step 2506 may include a question in the natural language, and the textual output generated by step 2512 may include an answer in the natural language to the question. In some examples, the textual input received by step 2506 may include an indication of a possible problem, and the textual output generated by step 2512 may include an analysis in the natural language associated with the possible problem. In some examples, the textual output generated by step 2512 may include a recommendation in the natural language to perform a particular action related to the second group of at least one data record. In some examples, the textual output generated by step 2512 may include a statistical measure based on the second group of at least one data record (such as mean, median, mode, and so forth). In some examples, the textual output generated by step 2512 may include a comparison of the first group of at least one data record and the second group of at least one data record. In some examples, step 2512 may use a machine learning model to analyze the textual input and the group of at least one data record (such as the second group of at least one data record selected by step 2508) to generate the textual output. For example, the machine learning model may be a machine learning model trained using training examples to generate text based on other texts and/or data records. An example of such training example may include a sample textual input and a sample data record, together with a label indicative of a sample textual output.

In some examples, step 2512 may identify a first mathematical object in a mathematical space, wherein the first mathematical object corresponds to a first word of the textual input, for example using module 302. Further, step 2512 may calculate a function of the first mathematical object and a numerical value included in the group of at least one data record (such as the second group) to obtain a second mathematical object in the mathematical space, wherein the second mathematical object may correspond to a second word, for example using module 304. Further, step 2512 may include the second word in the textual output.

In some examples, step 2512 may calculate a function of the numerical values included in the group of at least one data record (such as the second group) to obtain a mathematical object, for example using module 304. Further, step 2512 may base the generation of the textual output in the natural language on the mathematical object. In one example, step 2512 may use a LLM to analyze the textual input and a textual representation of the mathematical object to generate the textual output. In one example, the mathematical object may correspond to a particular word, and the step 2512 may include the particular word in the textual output. In one example, the group of at least one data record (such as the second group) may be arranged in at least one of a series or an array, and the function of the numerical values may be a convolution of the numerical values included in the group of at least one data record.

In some examples, step 2512 may analyze the textual input to identify a particular data record of the plurality of data records, for example as described above in relation to step 2508. The particular data record may not be included in any one of the first group or the second group. In one example, step 2512 may further base the generation of the textual output in the natural language on the particular data record. For example, step 2512 may calculate a function of the numerical value included in the particular data record and the numerical values included in the second group of at least one data record to obtain a mathematical object. Further, step 2512 may base the generation of the textual output in the natural language on the mathematical object. In one example, the mathematical object may correspond to a particular word, and step 2512 may include the particular word in the textual output.

In some examples, step 2512 may analyze the first group of at least one data record, the second group of at least one data record and the textual input to generate the textual output. In one example, the textual output may include a comparison of the first group and the second group. For example, the textual input may include 'Compare these figures to the ones from the previous month', the second group may include the figured from the previous month, and the textual output may include a comparison of the two groups, such as a comparison of the average and/or median of the two groups, or in another example 'The current month show a 1.1% growth over the last month'.

In some examples, an indication of a third group of at least one data record of the plurality of data records accessed by step 2502 may be received. In one example, the indication of the third group may be received as described above in relation to step 2504. In one example, the selected first group of at least one data record (of step 2504) and the textual input received by step 2506 may be analyzed to select the third group of at least one data record of the plurality of data records, for example as described above in relation to step 2508 and the second group. In some examples, step 2512 may analyze the textual input received by step 2506, the second group of at least one data record selected by step 2508 and the third group of at least one data record to generate the textual output in the natural language. The textual output may include a comparison of the second group with the third group. For example, the first group may identify a group of sales representatives, the textual input may include 'Compare the sales figures of these representatives for June and July', the second group may include sales figures for June, the third group may include sales figures for July, and the textual output may include 'July average was lower than June average by $2K'. In some examples, step 2512 may calculate a particular function of the numerical values included in the second group of at least one data record to obtain a first mathematical object in a mathematical space, for example using module 304. Further, step 2512 may calculate the particular function of the numerical values included in the third group of at least one data record to obtain a second mathematical object in the mathematical space, for example using module 304. Further, step 2512 may include a comparison of the first mathematical object with the second mathematical object in the textual output. For example, the first group may identify a plurality of people and their ages, the textual input may include 'For these people, compare the average salary for the age group 20-30 with the average salary for the age group 30-40', the second group may include salaries corresponding to people of the plurality of people in the 20-30 age group, the third group may include salaries corresponding to people of the plurality of people in the 30-40 age group, and the textual output may include 'The average salary of the 30-40 age group is 18% higher than the average salary of the 20-30'.

In some examples, each data record of the second group selected by step 2508 may further include respective temporal data. Further, the textual output generated by step 2512 may be further based on the temporal data. For example, the second group may include a date of payment for each one of a plurality of payments, and the textual output may be 'The payments were wired between June 3rd and July 21st'.

In some examples, the textual input received by step 2506 may include an adjective, and the generation of the textual output by step 2512 may be based on the adjective. For example, the first group may indicate a group of people, the second group may include salaries of these people, when the textual input includes 'What is the average salary of these people?' the textual output may indicate the average salary, and when the textual input includes 'What is the median salary of these people?' the textual output may indicate the median salary.

In some examples, the textual input received by step 2506 may include a conjunction, and the generation of the textual output by step 2512 may be based on the conjunction. For example, the first group may indicate a group of students, the second group may include raw grades of the students, when the textual input includes 'What is the average score if we give a five point's bonus to all students that completed all the homework assignments and attended all the classes?' the textual output may indicate the average after giving students that completed all homework and attended all classes a bonus, and when the textual input includes 'What is the average score if we give a five point's bonus to all students that completed all the homework assignments or attended all the classes?' the textual output may indicate the average after giving students that completed all homework or attended all classes a bonus.

In some examples, the textual input received by step 2506 may include a determiner, and the generation of the textual output by step 2512 may be based on the determiner. For example, the first group may indicate a group of students, the second group may include raw grades of the students, when the textual input includes 'Calculate the average when students who attended all of the classes gets a bonus of 5 points', the textual output may indicate the average after giving students that attended all of the classes a bonus, and when the textual input includes 'Calculate the average when students who attended at least half of the classes gets a bonus of 5 points', the textual output may indicate the average after giving students that attended at least half of the classes a bonus.

In some examples, the textual input received by step 2506 may include a noun, and the generation of the textual output by step 2512 may be based on the noun. For example, the first group may indicate a group of individuals, the second group may include the heights of the individuals, when the textual input includes 'What is the average height in meters?' the textual output may include the height in meters, and when the textual input includes 'What is the average height in inches?' the textual output may include the height in inches.

In some examples, the textual input received by step 2506 may include a preposition, and the generation of the textual output by step 2512 may be based on the preposition. For example, data records of the second group may include the numerical values 18, 1, 16, 11, 2, 12 and 3 in that order, when the textual input includes 'What is the data record corresponding to the largest difference from the data record above it, and what is that difference?' the textual output may include 'This data record is 16 and the difference is 15', and 'What is the data record corresponding to the largest difference from the data record below it, and what is that difference?' the textual output may include 'This data record is 18 and the difference is 17'.

In some examples, the textual input received by step 2506 may include a pronoun, and the generation of the textual output by step 2512 may be based on the pronoun. For example, the first group may include indicators of individuals and their yearly average score, the second group may include scores of the individuals in a specific test, when the textual input includes 'How many of them scored above their yearly average?' the textual output may indicate how many individuals got a score that is above their yearly average score, and when the textual input includes 'How many of them scored above our yearly average?' the textual output may indicate how many individuals got a score that is above the school yearly average score.

In some examples, the textual input received by step 2506 may include a verb, and the generation of the textual output by step 2512 may be based on the verb. For example, the first group may indicate a group of employees, the second group may include salaries of the employees, when the textual input includes 'Count the salaries that are above average', the textual output may include an indication of the number of employees that receive a salary that is above the average, and when the textual input includes 'Sum the salaries that are above average', the textual output may include an indication of the total salaries of employees that receive a salary that is above the average.

In some examples, step 2512 may select a mathematical function based on a word included in the textual input received by step 2506 (such as based on an adjective included in the textual input, based on a conjunction included in the textual input, based on a determiner included in the textual input, based on a noun included in the textual input, based on a preposition included in the textual input, based on a pronoun included in the textual input, based on a verb included in the textual input, and so forth). For example, step 2512 may use an LLM to select the mathematical function based on the word. In another example, step 2512 may use a machine learning model to select the mathematical function based on the word. The machine learning model may be a machine learning model trained using training examples to select mathematical functions based on words. An example of such training example may include a sample word, together with a label indicating a sample selection of a sample mathematical function. In some examples, step 2512 may calculate the selected mathematical function of the second group of at least one data record to obtain a particular numerical value. Further, step 2512 may base the generation of the textual output on the particular numerical value. For example, the textual output may include an indication of the particular numerical value.

In some examples, step 2514 may comprise presenting a textual output (such as the textual output generated by step 2512, the first textual output generated by step 2610, the second textual output generated by step 2618, and so forth) to an individual (such as the individual of step 2504 and/or step 2506 and/or step 2510, the individual of method 2600, and so forth). For example, presenting the textual output to the individual by step 2514 may comprise presenting the textual output via a user interface, may comprise presenting the textual output an electronic document (for example, the same electronic document described above in relation to step 2502), may comprise presenting the textual output visually, may comprise presenting the textual output audibly, may comprise presenting the textual output graphically, may comprise presenting the textual output textually, and so forth.

In some examples, the presentation of the indication of the second group to the individual by step 2510 may enable the individual to alter the selection of the second group, for example via a user interface. In some examples, based on the alteration to the selection of the second group, a second textual output in the natural language may be generated, for example as described above in relation to step 2512. Further, the second textual output to the individual may be presented, for example as described above in relation to step 2514.

In some examples, method 2500 may further comprise: after presenting the textual output to the individual, receiving from the individual a second textual input in the natural language (for example, as described above in relation to step 2506 and the textual input); analyzing the second group of at least one data record and the second textual input to generate a second textual output in the natural language (for example, as described above in relation to step 2512 and the textual input); and presenting the second textual output to the individual (for example, as described above in relation to step 2514).

Figure 26:
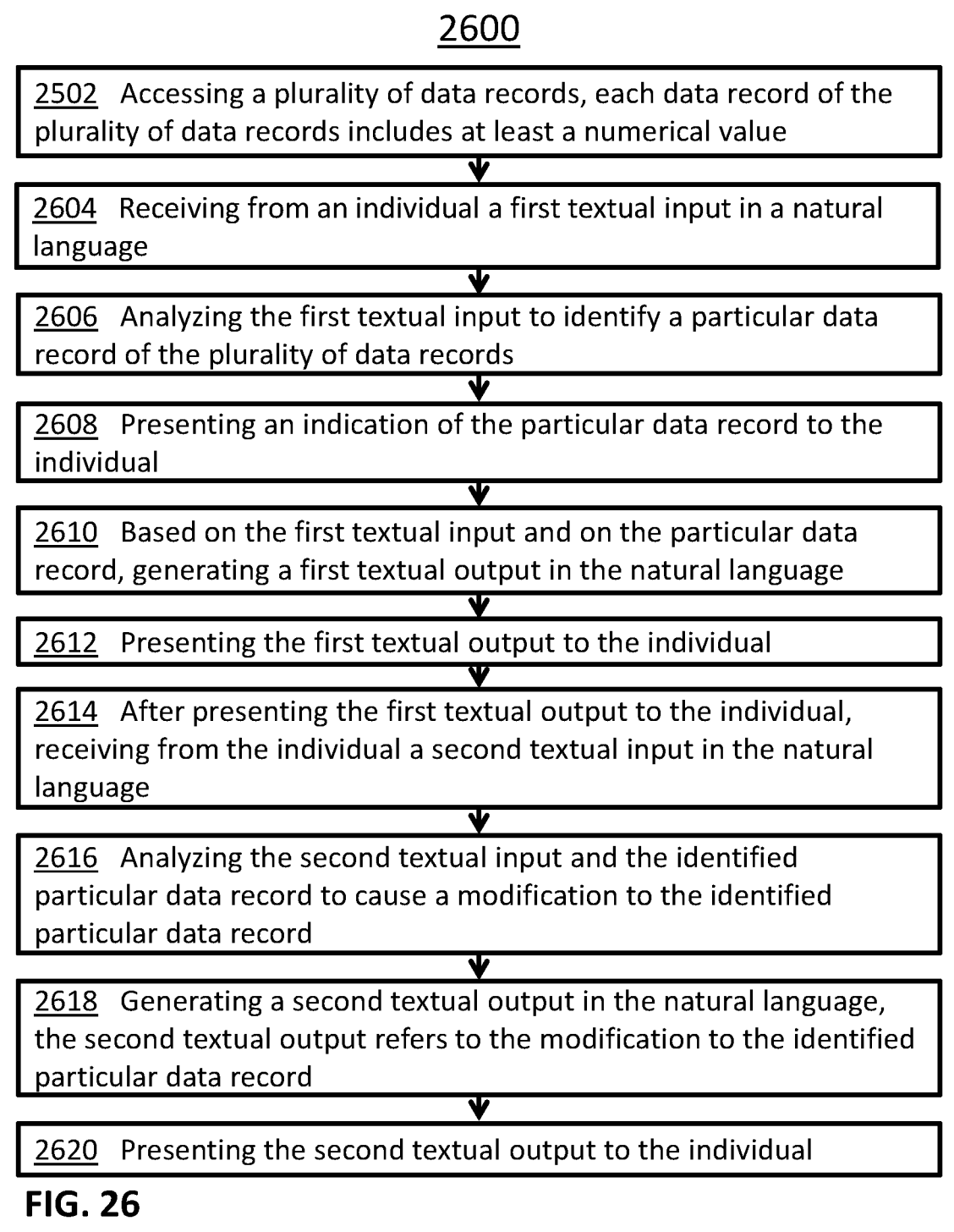

FIG. 26 is a flowchart of an exemplary method 2600 for modifying data records through natural language. In this example, method 2600 may comprise: accessing a plurality of data records (step 2502), each data record of the plurality of data records includes at least a respective numerical value; receiving from an individual a first textual input in a natural language (step 2604); analyzing the first textual input to identify a particular data record of the plurality of data records (step 2606); presenting an indication of the particular data record to the individual (step 2608); based on the first textual input and on the particular data record, generating a first textual output in the natural language (step 2610); presenting the first textual output to the individual (step 2612); after presenting the first textual output to the individual, receiving from the individual a second textual input in the natural language (step 2614); analyzing the second textual input and the identified particular data record to cause a modification to the identified particular data record (step 2616); generating a second textual output in the natural language (step 2618), the second textual output refers to the modification to the identified particular data record; and presenting the second textual output to the individual (step 2620). In other examples, method 2600 may include additional steps or fewer steps. In other examples, one or more steps of method 2600 may be executed in a different order and/or one or more groups of steps may be executed simultaneously.

In some examples, the first textual input received by step 2604 may include a question in the natural language, and the first textual output generated by step 2610 may include an answer in the natural language to the question. For example, the first textual input may include 'Is there any salary below the minimum wage?' the particular data record identified by step 2606 may include a salary that is below the minimum wage, and the first textual output may include 'After the recent update, John's salary is below the minimum wage'. In some examples, the second textual input received by step 2614 may be indicative of a desire of the individual to cause the modification to the identified particular data record. For example, the second textual input may include 'Let's update John's salary so that it's not below the minimum wage'.

In some examples, the first textual output generated by step 2610 may be indicative of a problem associated with the particular data record, and the second textual input received by step 2614 may be indicative of a desire of the individual to fix the problem. For example, the first textual input may include 'Please check the salaries data for this month for problems', the particular data record identified by step 2606 may include John's salary, the first textual output may include 'John salary is below the minimum wage', and the second textual input may include 'Let's update John's salary so that it's not below the minimum wage'.

In some examples, the first textual input received by step 2604 may be indicative of a problem, the first textual output generated by step 2610 may include a suggestion in the natural language of a possible step to overcome the problem, the second textual input received by step 2614 may be indicative of the individual accepting the suggestion, and the modification to the identified particular data record by step 2616 may correspond to the possible step. For example, the first textual input may include 'John complained that his salary is below the minimum wage', the particular data record identified by step 2606 may include John's salary, the first textual output may include 'He is right, we could increase it', the second textual input may include 'Let's do it', and the modification to the identified particular data record by step 2616 may include adjusting John's salary so it's aligned with the minimum wage.

In some examples, the first textual input received by step 2604 may be indicative of a problem, the first textual output generated by step 2610 may include a suggestion in the natural language of a possible step to overcome the problem, the second textual input received by step 2614 may be indicative of the individual rejecting the suggestion, and the modification to the identified particular data record by step 2616 may correspond to a different step to overcome the problem. For example, the first textual input may include 'Our expenses are too high, we must cut something', the particular data record identified by step 2606 may include John's salary and daily working hours, the first textual output may include 'We may let go of John to help cut costs', the second textual input may include 'I don't want to terminate anyone employment, let's cut something else', and the modification to the identified particular data record by step 2616 may include reducing John's daily working hours and salary.

In some examples, step 2604 may comprise receiving from an individual a first textual input in a natural language, for example using step 2506. In some examples, step 2608 may comprise presenting an indication of a particular data record (such as the particular record identified by step 2606) to an individual (such as the individual of step 2604), for example using step 2510. In some examples, step 2612 may comprise presenting a textual output (such as the first textual output generated by step 2610) to an individual (such as the individual of step 2604 and/or step 2608), for example using step 2514. In some examples, step 2614 may comprise, for example after step 2612 presents the first textual output to the individual, receiving from an individual (such as the individual of step 2604 and/or step 2608 and/or step 2612) a second textual input in a natural language (for example, in the natural language of step 2604 and/or step 2610), for example using step 2506. In some examples, step 2620 may comprise presenting a textual output (such as the second textual output generated by step 2618) to an individual (such as the individual of step 2604 and/or step 2608 and/or step 2612 and/or step 2614), for example using step 2514.

In some examples, step 2606 may comprise analyzing a textual input (such as the first textual input received by step 2604) to identify a particular data record of the plurality of data records accessed by step 2502. For example, step 2606 may use a LLM to analyze the textual input and identify the particular data record. In another example, step 2606 may use a machine learning model to analyze a textual input (such as the first textual input received by step 2604) to identify the particular data record. The machine learning model may be a machine learning model trained using training examples to identify data records based on text. An example of such training example may include a sample group of sample data records and a sample textual input, together with a label indicative of a sample selection of a sample data record of the sample group.

In some examples, step 2606 may identify a first mathematical object in a mathematical space, wherein the first mathematical object may correspond to a first word included in the first textual input, for example using module 302. Further, step 2606 may identify a second mathematical object in the mathematical space, wherein the second mathematical object may correspond to a second word included in the first textual input, for example using module 302. Further, step 2606 may calculate a function of the first mathematical object and the second mathematical object to obtain a third mathematical object in the mathematical space. Further, step 2606 may base the identification of the particular data record on the third mathematical object. For example, when the third mathematical object is a first numerical value, step 2606 may identify a first data record as the particular data record, and when the third mathematical object is a second numerical value, step 2606 may identify a second data record as the particular data record. The second data record may differ from the first data record.

In some examples, step 2606 may receive from an individual (such as the individual of step 2604 and/or step 2608 and/or step 2612 and/or step 2614) a selection of at least one data record of the plurality of data records through a pointing device. Further, step 2606 may analyze the at least one data record and a textual input (such as the first textual input received by step 2604) to identify the particular data record, for example as described above in relation to step 2508. In one example, the at least one data record may be at least two data records, and step 2606 may analyze the at least one data record and the first textual input to select the particular data record of the at least two data records. In another example, the particular data record may not be included in the at least one data record.

In some examples, step 2610 may comprise, based on a textual input (such as the first textual input received by step 2604) and/or on one or more data records (for example, on the particular data record identified by step 2606), generating a first textual output in a natural language (for example, in the natural language of step 2604 and/or step 2614), for example using step 2512. In some examples, step 2610 may use a LLM to analyze the textual input and a textual representation of the one or more data records to generate the first textual output. In some examples, step 2610 may use a machine learning model (for example, the machine learning model described above in relation to step 2512) to analyze the first textual input and the particular data record to generate the first textual output in the natural language.

In some examples, step 2610 may identify a first mathematical object in a mathematical space, wherein the first mathematical object may correspond to a word included in the first textual input, for example using module 302. Further, step 2610 may calculate a function of the first mathematical object and the numerical value included in the particular data record to obtain a second mathematical object in the mathematical space, wherein the second mathematical object correspond to a particular word, for example using module 304. In one example, the particular word may not be included in the first textual input. Further, step 2610 may include the particular word in the first textual output.

In some examples, the particular data record identified by step 2606 may further include temporal data. Further, the first textual output generated by step 2610 may be further based on the temporal data. For example, the first textual input may include 'What was John's last salary?' the particular data record may include information related to John's last salary, including amount and date of payment, and the second textual may include 'John's last salary was $6,500, paid on April 3rd'.

In some examples, the first textual input received by step 2604 may include an adjective. In one example, the identification of the particular data record by step 2606 may be based on the adjective. In one example, the generating of the first textual output by step 2610 may be based on the adjective. For example, when the first textual input includes 'What is the average daily precipitation?' step 2606 may identify a record that includes the average daily precipitation, and when the first textual input includes 'What is the average monthly precipitation?' step 2606 may identify a record that includes the average monthly precipitation. In another example, when the first textual input includes 'What is the decimal representation of it?' step 2610 may include 'The average precipitation is 3 in a decimal representation', and when the first textual input includes 'What is the binary representation of it?' step 2610 may include 'The average precipitation is 11 in a binary representation'.

In some examples, the first textual input received by step 2604 may include an adverb. In one example, the identification of the particular data record by step 2606 may be based on the adverb. In one example, the generating of the first textual output by step 2610 may be based on the adverb. For example, when the first textual input includes 'Show me an employee who have never sold a car', step 2606 may identify a record corresponding to an employee that never sold a car, and when the first textual input includes 'Show me an employee who have seldom sold a car', step 2606 may identify a record corresponding to an employee that sold less than one car month in average. In another example, when the first textual input includes 'Is that expected to improve soon?' the first textual output may include 'There are no open leads, so it's not likely to change anytime soon', and when the first textual input includes 'Is that expected to improve later?' the first textual output may include 'It is common for new sales persons to improve after 10 months, so it may improve in 6 months'.

In some examples, the first textual input received by step 2604 may include a conjunction. In one example, the identification of the particular data record by step 2606 may be based on the conjunction. In one example, the generating of the first textual output by step 2610 may be based on the conjunction. For example, when the first textual input includes 'Show me a student that completed all the homework assignments and attended all the classes', step 2606 may identify a record corresponding to a student that completed all homework assignments and attended all the classes, and when the first textual input includes 'Show me a student that completed all the homework assignments or attended all the classes', step 2606 may identify a record corresponding to a student that completed all homework assignments or attended all the classes. In another example, the first textual input may include either 'Is August sales figure higher than June's figure and the July's figure?' or 'Is August sales figure higher than June's figure or the July's figure?' and the first textual output may include an answer to the question.

In some examples, the first textual input received by step 2604 may include a determiner. In one example, the identification of the particular data record by step 2606 may be based on the determiner. In one example, the generating of the first textual output by step 2610 may be based on the determiner. For example, when the first textual input includes 'Show me a student who attended all the classes', step 2606 may identify a record corresponding to a student that attended all classes, and when the first textual input includes 'Show me a student who attended at least half the classes', step 2606 may identify a record corresponding to a student that attended two thirds of the classes. For example, the first textual input may include either 'Have this student completed all of the homework assignments?' or 'Have this student completed at least half of the homework assignments?' and the first textual output may include an answer to the question.

In some examples, the first textual input received by step 2604 may include a noun. In some examples, the identification of the particular data record by step 2606 may be based on the noun. In one example, the generating of the first textual output by step 2610 may be based on the noun. For example, when the first textual input includes 'What is the height of this candidate?' step 2606 may identify a record including the height of the candidate, and when the first textual input includes 'What is the weight of this candidate?' step 2606 may identify a record including the weight of the candidate. Further, the first textual output may specify either the candidate's height or the candidate's weight, based on the noun.

In some examples, the first textual input received by step 2604 may include a preposition. In one example, the identification of the particular data record by step 2606 may be based on the preposition. In one example, the generating of the first textual output by step 2610 may be based on the preposition. For example, when the first textual input includes 'Show me a student with a score average above 80', step 2606 may identify a record corresponding to a student with an average score of 86, and when the first textual input includes 'Show me a student with a score average below 80', step 2606 may identify a record corresponding to a student with an average score of 62. In another example, the first textual input may include either 'How much money have this student spent since June 3rd?' or 'How much money have this student spent until June 3rd?' and the textual output may include an answer to the question.

In some examples, the first textual input received by step 2604 may include a pronoun. In one example, the identification of the particular data record by step 2606 may be based on the pronoun. In one example, the generating of the first textual output by step 2610 may be based on the pronoun. For example, when the first textual input includes 'Show me an altar boy that is higher than the father', step 2606 may identify a record corresponding to an altar boy that is higher than the priest, and when the first textual input includes 'Show me an altar boy that is higher than his father', step 2606 may identify a record corresponding to an altar boy that is higher than his parental father. In another example, when the first textual input includes 'What is the age difference between this altar boy and the father?' the first textual output may indicate the age difference between the altar boy and the priest, and when the first textual input includes 'What is the age difference between this altar boy and his father?' the first textual output may indicate the age difference between the altar boy and his parental father.

In some examples, the first textual input received by step 2604 may include a verb. In one example, the identification of the particular data record by step 2606 may be based on the verb. In one example, the generating of the first textual output by step 2610 may be based on the verb. For example, when the first textual input includes 'Show me a candidate that omitted this detail', step 2606 may identify a record corresponding to a candidate that omitted said detail in a form, and when the first textual input includes 'Show me a candidate that highlighted this detail', step 2606 may identify a record corresponding to a candidate that highlighted said detail in the form. In another example, when the first textual input includes 'Average the last three salaries of this candidate', the first textual output may include the average of the last three salaries, and when the first textual input includes 'Sum the last three salaries of this candidate', the first textual output may include the sum of the last three salaries.

In some examples, step 2616 may comprise analyzing a textual input (such as the second textual input received by step 2614) and a particular data record (such as the particular data record identified by step 2606) to cause a modification to the particular data record. In one example, the modification may include a modification to at least one field included in the particular data record. In one example, the modification may include a modification to all fields included in the particular data record. In one example, the modification may include a modification to a numerical value included in the particular data record. In one example, the modification may include a modification to temporal data included in the particular data record. In one example, the modification may include a modification to textual data included in the particular data record. In some examples, step 2616 may use a LLM to analyze the textual input and a textual representation of the particular data record to cause a modification to the particular data record. In some examples, step 2616 may use a machine learning model to analyze the textual input (for example, the second textual input received by step 2614) and the particular data record (for example, the particular data record identified by step 2606) to determine the modification to the identified particular data record. The machine learning model may be a machine learning model trained using training examples to determine modifications to data records based on text and/or additional information. An example of such training example may include a sample textual input, a sample data record and (optionally) sample additional information, together with a label indicating a sample modification to the sample data record. In some examples, the modification to the identified particular data record by step 2616 may be based on the first textual input. For example, step 2616 may include the first textual input as an additional information when using the machine learning model.

In some examples, step 2616 may identify a first mathematical object in a mathematical space, wherein the first mathematical object may correspond to a word included in the second textual input, for example using module 302. Further, step 2616 may calculate a function of the first mathematical object and the numerical value included in the particular data record to obtain a numerical result value, for example using module 2614. Further, step 2616 may replace the numerical value included in the identified particular data record with the numerical result value.

In some examples, the second textual input received by step 2614 may be indicative of at least one data record of the plurality of data records, wherein the particular data record is not included in the at least one data record. In one example, step 2616 may analyze the second textual input to identify the at least one data record, for example using step 2606. In some examples, the modification to the particular data record by step 2616 may be based on the at least one data record. For example, step 2616 may calculate a function of the numerical value included in the particular data record and the numerical values included in the at least one data record to obtain a specific numerical value, for example using module 304. Further, step 2616 may modify the numerical value included in the particular data record to the specific numerical value. In another example, step 2616 may use a LLM to analyze a textual representation of the particular data record and a textual representation of the at least one data record to determine the modification to the particular data record. In yet another example, step 2616 may use the machine learning model to analyze the particular data record and at least one data record to determine the modification to the particular data record, by including the at least one data record as an additional information.

In some examples, the second textual input received by step 2614 may include an adjective, and the modification to the identified particular data record of step 2616 may be based on the adjective. For example, when the second textual input includes 'Replace this with it's decimal logarithm', step 2616 may replace the numerical value of the particular data record with its decimal logarithm, and when the second textual input includes 'Replace this with its binary logarithm', step 2616 may replace the numerical value with its binary logarithm.

In some examples, the second textual input received by step 2614 may include an adverb, and the modification to the identified particular data record of step 2616 may be based on the adverb. For example, when the second textual input includes 'Change the expected budget assuming that we never get fined', step 2616 may update the budget in the particular data record to account for no expenses on fine, and when the second textual input includes 'Change the expected budget assuming that we seldom get fined', step 2616 may update the budget in the particular data record to account for one fine a month.

In some examples, the second textual input received by step 2614 may include a conjunction, and the modification to the identified particular data record of step 2616 may be based on the conjunction. For example, the second textual input may include either 'Add to this the last month number' or 'Add to this the next month number', and step 2616 may add to the numerical value of the particular data record either the last month number or the next month number based on the conjunction.

In some examples, the second textual input received by step 2614 may include a determiner, and the modification to the identified particular data record of step 2616 may be based on the determiner. For example, when the second textual input includes 'Change this to account for all of the students', step 2616 may modify the total tuition to include the tuition of all students, and when the second textual input includes 'Change this to account for another one of the students', step 2616 may modify the total tuition to include the tuition of one other student.

In some examples, the second textual input received by step 2614 may include a noun, and the modification to the identified particular data record of step 2616 may be based on the noun. For example, the second textual input may include either 'Add to this the money of the brother' or 'Add to this the money of the sister', and step 2616 may add to the numerical value of the particular data record either the money of the brother or the sister based on the noun.

In some examples, the second textual input received by step 2614 may include a preposition, and the modification to the identified particular data record of step 2616 may be based on the preposition. For example, the second textual input may include either 'Add to this the money we have spent since June 3rd' or 'Add to this the money we have spent until June 3rd', and step 2616 may add to the numerical value of the particular data record the money spent either since or until June 3rd, based on the preposition.

In some examples, the second textual input received by step 2614 may include a pronoun, and the modification to the identified particular data record of step 2616 may be based on the pronoun. For example, the numerical value of the particular data record may include the budget for an altar boy, the second textual input may include either 'Add to the cost of the altar boy the budget for the father' or 'Add to the cost of the altar boy budget for his father', and step 2616 may add to the numerical value of the particular data record the budget for either the priest or the parental father of the altar boy, based on the pronoun.

In some examples, the second textual input received by step 2614 may include a verb, and the modification to the identified particular data record of step 2616 may be based on the verb. For example, the second textual input may include either 'Add 5' or 'Subtract 5', and step 2616 may update the numerical value of the particular data record by either adding or subtracting 5, based on the verb.

In some examples, step 2618 may comprise generating a second textual output in a natural language (for example, in the natural language of step 2604 and/or step 2610 and/or step 2614). The second textual output may refer to the modification to the particular data record caused by step 2616. For example, the second textual output may include an indication of the particular data record identified by step 2606, may include an indication of a value included in the particular data record before the modification, may include an indication of a value included in the particular data record after the modification, may include an indication of a difference in the particular data record caused by the modification, may include an indication to a reason for the modification, and so forth. For example, the second textual output may include 'This billing record originally showed a charge of $350 for the procedure, excluding VAT. To account for VAT, I added $35, bringing the total to $385'. In some examples, step 2618 may use a LLM to generate the second textual output, for example by analyzing at least one of the second textual input received by step 2614, a textual representation of the particular data record identified by step 2606 (before and/or after the modification caused by step 2616), or the first textual input received by step 2604. In some examples, step 2618 may use a machine learning model to generate the second textual output in the natural language. For example, step 2618 may use a machine learning model to generate the second textual output by analyzing at least one of the second textual input received by step 2614, a textual representation of the particular data record identified by step 2606 (before and/or after the modification caused by step 2616), or the first textual input received by step 2604. The machine learning model may be a machine learning model trained using training examples to generate output text based on input text and/or input data. An example of such training example may include a sample textual input and/or a sample data record, together with a sample textual output.

In some examples, step 2618 may identify a first mathematical object in a mathematical space, wherein the first mathematical object may correspond to a first word included in the second textual input received by step 2614, for example using module 302. Further, step 2618 may calculate a function of the first mathematical object and at least one of the numerical value included in the particular data record or the numerical value included in the modified particular data record to obtain a second mathematical object in the mathematical space, wherein the second mathematical object may correspond to a second word, for example using module 304. Further, step 2618 may include the second word in the second textual output.

In one example, the generation of the second textual output by step 2618 may be based on an analysis of the second textual input received by step 2614. For example, the second textual input may include 'Let's give 10% on this', the modification to the particular data record may include updating the record based on a 7% discount, and the second textual output may include 'You suggested giving a 10% discount. However, this is above the limit set by our company policy, so I gave the maximal possible discount of 7%.' In one example, the generation of the second textual output by step 2618 may be based on an analysis of the first textual input received by step 2604. For example, the first textual input may include 'I want to set a new company wide minimum hourly wage of $30', the particular data record may include John's hourly wage which is $28, the second textual input may include 'Let's fix that', the modification to the particular data record may increase John's hourly wage to $30, and the second textual output may include 'We've increased John's salary, and now the company wide minimum hourly wage is $30'. In one example, the generation of the second textual output by step 2618 may be based on the numerical value included in the particular data record and/or the numerical value included in the modified particular data record. For example, the second textual output may include 'We gave John's a salary increase of $2 an hour, from $28 to $30'.

In some examples, method 2600 may further comprise, after causing the modification to the identified particular data record (by step 2616) and presenting the second textual output to the individual (by step 2620), receiving from the individual a third textual input in the natural language, for example using step 2506, and analyzing the third textual input to cause an additional modification to the identified particular data record, for example as described above in relation to step 2616. For example, the second textual input may include 'Let's give John a bonus', the modification to the particular data record may include giving John a bonus of $1,000, the second textual output may include 'We've updated John's next salary to include a $1,000 bonus', the third textual input may include 'That's too much, let's cut that by a half', and the additional modification to the particular data record may include updating John's bonus in the next salary to $500.

In some examples, the first textual input received by step 2604 may include 'Show me John's salary. How does it compare to others?' The particular data record identified by step 2606 may include John's salary. The first textual output generated by step 2610 may include 'John's salary is below the average salary. In fact, it's in the lower decile'. The second textual input received by step 2614 may include 'Let's give John a raise so that he is in the second decile'. The modification to the particular data record by step 2616 may include an update to John's salary that put it in the second decile. The second textual output generated by step 2618 may include 'We gave John a raise of $500 and he is now in the second decile'.

Figure 27:
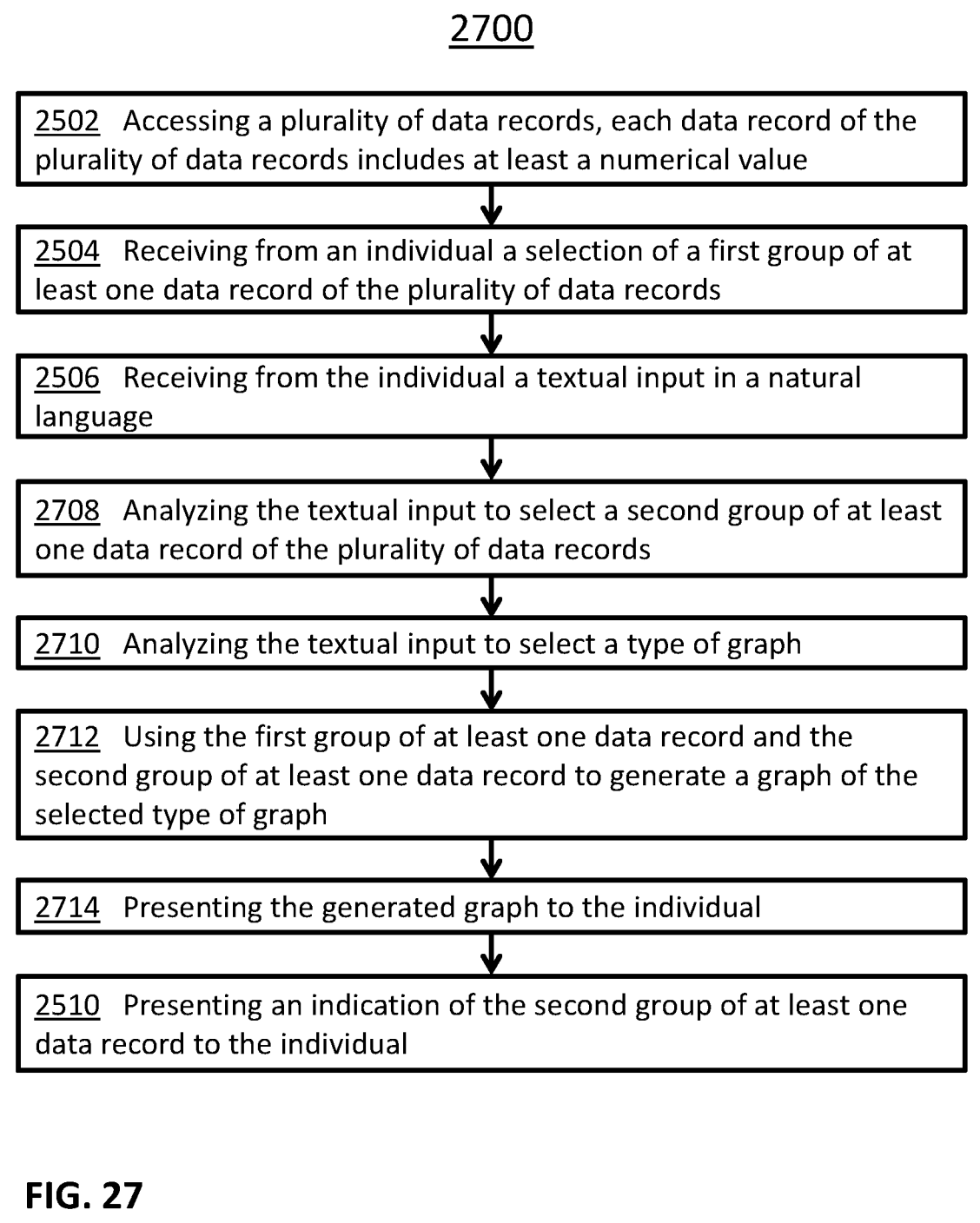

FIG. 27 is a flowchart of an exemplary method 2700 for facilitating generation of graphs based on data records through natural language, consistent with some embodiments of the present disclosure. In this example, method 2700 may comprise: accessing a plurality of data records (step 2502), each data record of the plurality of data records includes at least a respective numerical value; receiving from an individual a selection of a first group of at least one data record of the plurality of data records (step 2504); receiving from the individual a textual input in a natural language (step 2506); analyzing the textual input to select a second group of at least one data record of the plurality of data records (step 2708); analyzing the textual input to select a type of graph (step 2710); using the first group of at least one data record and the second group of at least one data record to generate a graph of the selected type of graph (step 2712); presenting the generated graph to the individual (step 2714); and presenting an indication of the second group of at least one data record to the individual (step 2510). Some non-limiting examples of such type of graph may include a line graph, a bar chart, a pie chart, a histogram, a scatter plot or an area chart. In other examples, method 2700 may include additional steps or fewer steps. In other examples, one or more steps of method 2700 may be executed in a different order and/or one or more groups of steps may be executed simultaneously. For example, presenting the indication of the second group by step 2510 may occur before, after or simultaneously with the presenting the generated graph by step 2714.

In some examples, step 2708 may comprise analyzing a textual input (such as the textual input received by step 2506, the second textual input received by step 2604, and so forth) to select a second group of at least one data record of the plurality of data records accessed by step 2502. For example, step 2708 may use a LLM to analyze the textual input to select the second group of at least one data record. In another example, step 2708 may use a machine learning model to analyze the textual input to select the second group of at least one data record of the plurality of data records. The machine learning model may be the machine learning model described in relation to step 2606. In some examples, step 2708 may comprise analyzing a textual input (such as the textual input received by step 2506) and the first group of at least one data record of step 2504 to select the second group of at least one data record of the plurality of data records accessed by step 2502, for example using step 2508. In one example, the first group (of step 2504) may be a subgroup of the second group selected by step 2708. In one example, the second group selected by step 2708 may be a subgroup of the first group (of step 2504). In one example, the first group (of step 2504) and the second group selected by step 2708 may include at least one data record in common. In one example, the first group (of step 2504) and the second group selected by step 2708 may include no data record in common. In some examples, all data records of the first group (of step 2504) may be included in a first table, and all data records of the second group selected by step 2708 may be included in a second table. In one example, the second table may differ from the first table. In another example, the second table and the first table may be the same table. Some non-limiting examples of such tables may include tables in a datasheet, tables in an electronic document, tables in a form, and so forth.

In some examples, step 2708 may identify a first mathematical object in a mathematical space, wherein the first mathematical object may correspond to a first word of the textual input, for example using module 302. Further, step 2708 may identify a second mathematical object in the mathematical space, wherein the second mathematical object may correspond to a second word of the textual input, for example using module 302. Further, step 2708 may calculate a function of the first mathematical object and the second mathematical object to obtain a third mathematical object in the mathematical space, for example using module 304. Further, step 2708 may base the selection of the second group of at least one data record on the third mathematical object. For example, when the third mathematical object includes a first numerical value, step 2708 may include a specific data record in the second group. In another example, when the third mathematical object includes a second numerical value, step 2708 may avoid including a specific data record in the second group.

In some examples, step 2710 may comprise analyzing a textual input (such as the textual input received by step 2506) to select a type of graph. In one example, the type of graph selected by step 2710 may be at least one of a line graph, a bar chart, a pie chart, a histogram, a scatter plot or an area chart. In one example, step 2710 may use a LLM to analyze the textual input and select the type of graph. In another example, step 2710 may use a machine learning model to analyze the textual input to select the type of graph. The machine learning model may be a machine learning model trained using training examples to select types of graphs based on text and/or additional information. An example of such training example may include a sample textual input and/or additional information, together with a label indicative of a sample selection of a sample type of graph. In some examples, step 2710 may analyze the textual input and/or the first group of at least one data record of step 2504 and/or the second group of at least one data record selected by step 2708 (for example, the textual input and at least one of the first group of at least one data record or the second group of at least one data record) to select the type of graph, for example using the machine learning model using the first group of at least one data record and/or the second group of at least one data record as additional information.

In some examples, step 2710 may identify a first mathematical object in a mathematical space, wherein the first mathematical object may correspond to a first word of the textual input, for example using module 302. Further, step 2710 may identify a second mathematical object in the mathematical space, wherein the second mathematical object may correspond to a second word of the textual input, for example using module 302. Further, step 2710 may calculate a function of the first mathematical object and the second mathematical object to obtain a third mathematical object in the mathematical space, for example using module 304. Further, step 2710 may base the selection of the type of graph on the third mathematical object. For example, when the third mathematical object includes a first numerical value, step 2710 may select a first type of graph, and when the third mathematical object includes a second numerical value, step 2710 may select a second type of graph. The second type of graph may differ from the first type of graph.

In some examples, the textual input received by step 2506 may include an adjective, and the selection of the type of graph by step 2710 may be based on the adjective. For example, when the textual input includes 'Show that in a plot with vertical gridlines', step 2710 may select a type of graph that includes vertical gridlines, and when the textual input includes 'Show that in a plot with horizontal gridlines', step 2710 may select a type of graph that includes horizontal gridlines.

In some examples, the textual input received by step 2506 may include an adverb, and the selection of the type of graph by step 2710 may be based on the adverb. For example, the textual input may include either 'Show that in a plot where the data-point pops up when the mouse hovers over it' or 'Show that in a plot where the data-point pops down when the mouse hovers over it', and step 2710 may select a type of graph that includes a corresponding animation of data-points popping either up or down.

In some examples, the textual input received by step 2506 may include a conjunction, and the selection of the type of graph by step 2710 may be based on the conjunction. For example, when the textual input includes 'Show the education level versus income level for each participant', step 2710 may select a scatter plot type of graph to show the education level versus income level, and when the textual input includes 'Show the education level and income level for each participant', step 2710 may select a bar graph to show both the education level and income level on a common axis.

In some examples, the textual input received by step 2506 may include a noun, and the selection of the type of graph by step 2710 may be based on the noun. For example, when the textual input includes 'Show the data in a scatter-plot', step 2710 may select a scatter-plot type of graph, and when the textual input includes 'Show the data in a line-graph', step 2710 may select a line-graph type of graph.

In some examples, the textual input received by step 2506 may include a preposition, and the selection of the type of graph by step 2710 may be based on the preposition. For example, when the textual input includes 'Show the previous month incomes as bars above the bars of the current month incomes', step 2710 may select a stacked bar chart type of graph, and when the textual input includes 'Show the previous month incomes as bars near the bars of the current month incomes', step 2710 may select a clustered bar chart type of graph.

In some examples, the textual input received by step 2506 may include a pronoun, and the selection of the type of graph by step 2710 may be based on the pronoun. For example, when the textual input includes 'Show the data in the same format I used last time', step 2710 may select one type of graph, and when the textual input includes 'Show the data in the same format she used last time', step 2710 may select a different type of graph.

In some examples, the textual input received by step 2506 may include a verb, and the selection of the type of graph by step 2710 may be based on the verb. For example, when the textual input includes 'Compare the incomes in the last three months for each participant', step 2710 may select a clustered bar chart type of graph the show the incomes of each participant next to each other, and when the textual input includes 'Sum the incomes in the last three months for each participant', step 2710 may select a stacked bar chart type of graph to show the total income as well as the breakdown to the different months for each participant.

In some examples, step 2712 may comprise using a first group of at least one data record (such as the first group of at least one data record of step 2504) and a second group of at least one data record (such as the second group of at least one data record selected by step 2708) to generate a graph of the type of graph selected by step 2710. In one example, step 2712 may use a template associated with the type of graph, the first group and the second group to generate the graph. In one example, step 2712 may analyze the textual input received by step 2506 to generate at least one element of the generated graph or the entire graph. In one example, step 2712 may use a machine learning model to analyze the textual input to generate at least one element of the generated graph or the entire graph. In one example, the machine learning model may be a generative machine learning model that analyze the textual input and generates the at least one element of the generated graph or the entire graph. The generative machine learning model may be a generative machine learning model trained using training examples to generate elements of graphs or graphs based on text. An example of such training example may include a sample textual input, together with a sample element of a sample graph or an entire sample graph. In another example, the machine learning model may determine parameters (such as size, color, font, location, content, etc.) of the at least one element of the generated graph or of the entire graph. Further, step 2712 may use the determined parameters to generate the at least one element of the generated graph or of the entire graph (for example, using a template). The machine learning model may be a machine learning model trained using training examples to determine parameters based on text. An example of such training example may include a sample textual input, together with a label indicative of sample values for sample parameters.

In some examples, step 2712 may analyze at least one of the textual input received by step 2506, the first group of at least one data record of step 2504 or the second group of at least one data record selected by step 2708 to determine textual content for inclusion in the generated graph. The textual content may not be included in any one of the textual input, the first group of at least one data record or the second group of at least one data record. For example, the textual content may be a title of the graph, a name of an axis, a textual content for a legend, and so forth. For example, step 2712 may use a LLM to analyze at least one of the textual input, a textual representation of the first group of at least one data record or a textual representation of the second group of at least one data record and generate the textual content.

In some examples, step 2712 may identify a first mathematical object in a mathematical space, wherein the first mathematical object may correspond to a first word of the textual input, for example using module 302. Further, step 2712 may identify a second mathematical object in the mathematical space, wherein the second mathematical object may correspond to a second word of the textual input, for example using module 302. Further, step 2712 may calculate a function of the first mathematical object and the second mathematical object to obtain a third mathematical object in the mathematical space, for example using module 304. Further, step 2712 may select an element for inclusion in the generated graph based on the third mathematical object. For example, when the third mathematical object includes a first numerical value, a particular element may be included in the generated graph. In another example, when the third mathematical object includes a second numerical value, the particular element may be excluded from the generated graph. In yet another example, the element may include textual content, the third mathematical object may correspond to a particular word (for example, as described in relation to module 304), wherein the particular word is not included in in any one of the textual input or the plurality of data records, and the particular word is included in the element.

In some examples, method 2700 may further comprise receiving an indication of a third group of at least one data record of the plurality of data records accessed by step 2502, for example as described above. In some examples, method 2700 may further comprise analyzing a textual input (such as the textual input received by step 2506) to select a third group of at least one data record of the plurality of data records accessed by step 2502, for example as described above in relation to step 2708 and the second group. In some examples, step 2712 may use the first group of at least one data record (of step 2504), the second group of at least one data record selected by step 2708 and the third group of at least one data record to generate the graph of the type of graph selected by step 2710. In one example, the generated graph may be a three-dimensional graph. In one example, the first group may be associated with a first axis of the generated graph, the second group may be associated with a second axis of the generated graph, and the third group may be associated with a third axis of the generated graph. The second axis may differ from the first axis, and the third axis may differ from the first axis and the second axis. In one example, the first group of at least one data record may be associated with a first axis of the generated graph, while the second group of at least one data record and the third group of at least one data record may be associated with a second axis of the generated graph. The second axis may differ from the first axis. In one example, the second group of at least one data record may be associated with a first axis of the generated graph, while the first group of at least one data record and the third group of at least one data record may be associated with a second axis of the generated graph. The second axis may differ from the first axis.

In some examples, step 2710 may analyze a textual input (such as the textual input received by step 2506) to select a color for at least one element of a graph (such as the graph generated by step 2712). Further, the graph generated by step 2712 may include the at least one element in the selected color. For example, step 2710 may use a LLM to analyze the textual input and select the color. Some non-limiting examples of such element may include a textual element, a graphical element, at least a portion of a legend, a series, a data-point, an axis, a gridline, a frame, a background, and so forth. In one example, the textual input may not include a direct indication of the color (such as a color name). In one example, the textual input may include 'Highlight the data for June and July', and in response the generated graph may include bars for different months, where the bars of June and July are in red, while other based are in a different color.

In some examples, step 2710 may analyze a textual input (such as the textual input received by step 2506) to select at least one element for inclusion in a graph (such as the graph generated by step 2712). Further, the graph generated by step 2712 may include the selected at least one element. For example, step 2710 may use a LLM to analyze the textual input and select the at least one element. Some non-limiting examples of such element may include a textual element, a graphical element, at least a portion of a legend, a series, a data-point, an axis, a gridline, a frame, a background, and so forth. In one example, the textual input may include 'I need to be able to determine precise values from the graph', and in response the at least one element may include, for each data-point, a data-label next to the data-point that shows the precise value of the data-point.

In some examples, step 2710 may analyze a textual input (such as the textual input received by step 2506) to determine a gridlines property for a graph (such as the graph generated by step 2712). Further, the graph generated by step 2712 may include gridlines based on the determined gridlines property. For example, step 2710 may use a LLM to analyze the textual input and determine the gridlines property. Some non-limiting examples of such gridlines property may include visual property of the lines forming the gridlines (such as color, width, dash type, etc.), whether to include vertical gridlines in the generated graph, whether to include horizontal gridlines in the generated graph, positions for the gridlines in the generated graph, and so forth. In one example, the textual input may include 'I need to be able to determine the x-value of the data-points, but I want to avoid clutter', and in response the generated graph may include dashed vertical gridlines and no horizontal gridlines.

In some examples, step 2710 may analyze a textual input (such as the textual input received by step 2506) to select a scale for at least one axis of a graph (such as the graph generated by step 2712). Further, the graph generated by step 2712 may include the axis with the selected scale. For example, step 2710 may use a LLM to analyze the textual input and select the scale. In one example, the textual input may include 'Avoid clutter in the x-axis', and in response the scale of the x-axis may be thousands instead of hundreds.

In some examples, step 2710 may analyze a textual input (such as the textual input received by step 2506) to select a range for at least one axis of a graph (such as the graph generated by step 2712). Further, the graph generated by step 2712 may include the axis with the selected range. For example, step 2710 may use a LLM to analyze the textual input and select the range. In one example, the textual input may include 'We need some margins in the x-axis around the data points', and in response the range of the x-axis may be larger than the range required to show the data-points.

In some examples, step 2710 may analyze a textual input (such as the textual input received by step 2506) to select a crossing point between two axes of a graph (such as the graph generated by step 2712). Further, the graph generated by step 2712 may include the two axes crossing at the selected crossing point. For example, step 2710 may use a LLM to analyze the textual input and select the crossing point. In one example, the textual input may include 'Let's zoom on the area of these data points', and in response the crossing point may be closer to a region including the data-points than a default crossing point (for example, when all said data-points have $82<x<83$ and $51<y<52$, step 2710 may select a $x=82$, $y=51$ crossing point rather than a $x=0$, $y=0$ crossing point).

In some examples, step 2710 may analyze a textual input (such as the textual input received by step 2506) to select a layout for a graph (such as the graph generated by step 2712). Further, the graph generated by step 2712 may be based on the selected layout. For example, step 2710 may use a LLM to analyze the textual input and select the layout. In one example, the textual input may include 'I want viewers to notice the legend before they examine the graph', and in response the legend may be positioned to the left of the graph rather than to its right.

In some examples, step 2710 may analyze a textual input (such as the textual input received by step 2506) to determine whether to associate the first group with a horizontal axis of the generated graph and the second group with a vertical axis of the generated graph (or vice versa). Further, the graph generated by step 2712 may associate the groups to the axes based on the determination. For example, step 2710 may use a LLM to analyze the textual input and make the determination. In one example, the first group may include heights, the second group may include weights, when the textual input includes 'Show heights as a function of weights', the first group may be associated with the vertical axis and the second group may be associated with the horizontal axis in the graph, and when the textual input includes 'Show weights as a function of heights', the second group may be associated with the vertical axis and the first group may be associated with the horizontal axis in the graph.

In some examples, step 2710 may analyze a textual input (such as the textual input received by step 2506) to generate a textual content for inclusion in the generated graph. The textual content may include at least one word not included in any one of the textual input or the plurality of data records accessed by step 2502. Further, the graph generated by step 2712 may include the generated textual content, for example, in a title of the graph, in a name of an axis, in a legend, and so forth. For example, step 2710 may use a LLM to analyze the textual input and generate the textual content. In one example, the generated textual content may be in the natural language of the textual input. In one example, step 2710 may analyze the textual input to select a second natural language (the second natural language may differ from the natural language of the textual input), and the generated textual content may be a textual content in the second natural language. In one example, the textual input may include 'Let's use texts that will be clear to our target audience in Paris' in English, and in response, the textual contents in the graph may be in French. In another example, the textual input may include 'Let's use texts that will be appealing to potential buyers', and in response the title of the graph 'How new cars protects the environment'.

In some examples, step 2714 may comprise presenting a graph (such as the graph generated by step 2712) to an individual (such as the individual of step 2504 and/or step 2506). For example, presenting the graph to the individual by step 2714 may comprise presenting the graph via a user interface, may comprise presenting the graph in an electronic document (for example, the same electronic document described above in relation to step 2502), may comprise presenting the graph visually, may comprise generating digital data encoding the graph that enables the presentation of the graph (for example, in memory, in a file, and so forth), and so forth. In some examples, the presentation of the generated graph to the individual by step 2714 may enable the individual to reject the graph generated by step 2712, for example via a user interface. In some examples, the presentation of the generated graph to the individual by step 2714 may enable the individual to regenerate (for example, using additional input, using a different random seed, etc.) the graph generated by step 2712, for example via a user interface. In some examples, the presentation of the generated graph to the individual by step 2714 may enable the individual to alter at least one aspect of the graph generated by step 2712, for example via a user interface.

In some examples, the presentation of the indication of the second group to the individual by step 2510 may enable the individual to alter the selection of the second group, for example as described above. Further, based on the alteration to the selection of the second group, the graph generated by step 2712 may be altered, for example using step 2712 with the altered second group instead of the second group selected by step 2708 to regenerate the graph.

In some examples, method 2700 may further comprise analyze a textual input (such as the textual input received by step 2506) to generate a textual output in a natural language (for example, in the natural language of step 2506, in a different natural language, and so forth). In one example, the textual output may refer to a graph (such as the graph generated by step 2712). In another example, the textual output refers to an element of a graph (such as the graph generated by step 2712). Further, method 2700 may comprise presenting the textual output to an individual (such as the individual of step 2504 and/or step 2506), for example as described above in relation to step 2514. In one example, the textual output refers to an element of the graph, and method 2700 may further comprise presenting a visual indication of the element of the generated graph, such as an arrow, a bounding box around the element, and so forth. In one example, a LLM may be used to analyze the textual input and generate the textual output. In another example, a machine learning model may be used to analyze the textual input and generate the textual output. The machine learning model may be a machine learning trained using training example to generate textual outputs that refer to graphs (or elements of the graphs) based on textual inputs. An example to such training example may include a sample textual input, together with a sample textual output that refers to at least one of a sample graph associated to the sample textual input or a sample element of the sample graph. In one example, the textual input may include 'What is the optimal temperature for yeast fermentation?' the graph may plot the fermentation rate versus the temperature, the textual output may include 'Here is a graph of the fermentation rate versus the temperature. The highest data-point, with the highest fermentation rate and therefore the optimal temperature, is 92 degrees Fahrenheit', and a visual indication of the data-point may be presented.

In some examples, after presenting the generated graph to the individual (by step 2714) and presenting the indication of the second group of at least one data record to the individual (by step 2510), method 2700 may further comprise receiving from the individual a second textual input in a natural language (for example, in the natural language of step 2506), for example as described above in relation to step 2506. In one example, method 2700 may further comprise analyzing the second textual input to cause a modification of the generated graph. For example, the second textual input may include 'Let's focus on the main cluster of points and ignore the outliers', and in response the range of the axes of the graph may be modified. In one example, a LLM may be used to analyze the second textual input and determine the modification.

In some examples, the textual input received by step 2506 may include a question in the natural language, and the graph generated by step 2712 may include information associated with an answer to the question. In some examples, method 2700 may further comprise analyzing the textual input and the second group of at least one data record to generate a textual answer in the natural language to the question, wherein the textual answer may include a reference to at least one of the generated graph or an element of the generated graph, and presenting the textual answer to the individual. For example, the textual answer including the reference may be generated as described above in relation to the textual output. In one example, the first group (of step 2506) may include bone densities for a group of subjects, the textual input may include 'Is there a correlation between the heights and the bone densities?' the second group selected by step 2708 may include heights for the group of subjects, the type of graph selected by step 2710 may be scatter plot (based on the question included in the textual input, step 2710 may select a type of graph that clearly show correlations, and may therefore select scatter plot), step 2712 may generate a scatter plot of the bone densities versus the heights and may include in the graph a trend line and a textual content showing the correlation coefficient, step 2714 may present the generated graph, and step 2510 may present an indication of the second group. Further, a textual answer may be generated, such as 'The Pearson correlation coefficient is negative (−0.62), indicating that there is some inverse correlation between the two in this group'.

In some examples, method 2700 may further comprise receiving an indication of a third group of at least one data record of the plurality of data records accessed by step 2502, for example as described above. In some examples, method 2700 may further comprise analyzing a textual input (such as the textual input received by step 2506) to select a third group of at least one data record of the plurality of data records accessed by step 2502, for example as described above in relation to step 2708 and the second group. In some examples, method 2700 may further comprise using the first group of at least one data record and the third group of at least one data record to generate a second graph of the selected type of graph, for example as described above in relation to step 2712. In one example, method 2700 may further comprise presenting the second graph to the individual, for example as described above in relation to step 2714.

In some examples, first group of at least one data record (of step 2504) may include heights for a group of people. Further, the textual input received by step 2506 may include 'Show the connection between the heights of these people to their weights'. Further, the second group of at least one data record selected by step 2708 may comprise the weights for the group of people. Further, step 2510 may present an indication of the second group. Further, the type of graph selected by step 2710 may be a scatter graph (based on the textual input, step 2710 may select a type of graph that clearly show connections between different variables, and may therefore select scatter plot). Further, step 2712 may generate a scatter plot with a horizontal axis corresponding to heights and a vertical axis corresponding to weights, including, for each person of the group of people, a datapoint located in the scatter plot based on the height and weight of the person. Further, step 2714 may present the generated scatter plot.

Figure 28:
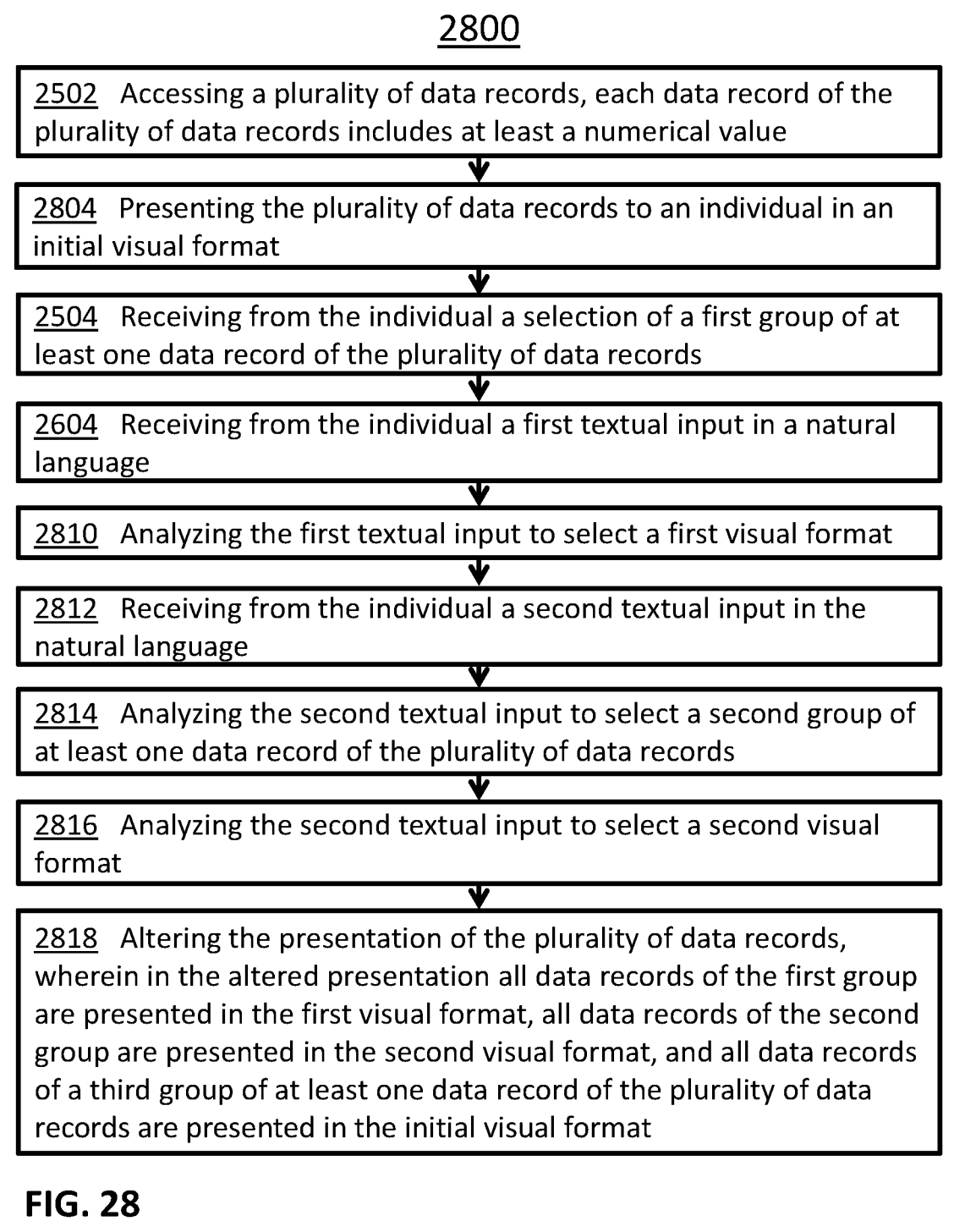

FIG. 28 is a flowchart of an exemplary method 2800 for facilitating visual formatting of data records through natural language. In this example, method 2800 may comprise: accessing a plurality of data records (step 2502), each data record of the plurality of data records includes at least a respective numerical value; presenting the plurality of data records to an individual in an initial visual format (step 2804); receiving from the individual a selection of a first group of at least one data record of the plurality of data records (step 2504); receiving from the individual a first textual input in a natural language (step 2604); analyzing the first textual input to select a first visual format (step 2810); receiving from the individual a second textual input in the natural language (step 2812); analyzing the second textual input to select a second group of at least one data record of the plurality of data records (2814); analyzing the second textual input to select a second visual format (step 2816); and altering the presentation of the plurality of data records (step 2818), wherein in the altered presentation all data records of the first group are presented in the first visual format, all data records of the second group are presented in the second visual format, and all data records of a third group of at least one data record of the plurality of data records are presented in the initial visual format. In other examples, method 2800 may include additional steps or fewer steps. In other examples, one or more steps of method 2800 may be executed in a different order and/or one or more groups of steps may be executed simultaneously.

In some examples, step 2804 may comprise presenting a plurality of data records (such as the plurality of data records accessed by step 2502) to an individual in an initial visual format. For example, presenting the plurality of data records to the individual by step 2804 may comprise presenting the plurality of data records via a user interface, may comprise presenting the plurality of data records in an electronic document (for example, the same electronic document described above in relation to step 2502), may comprise presenting the plurality of data records visually, may comprise presenting the plurality of data records graphically, may comprise presenting the plurality of data records textually, and so forth.

In some examples, a textual input (such as the first textual input received by step 2604, the second textual input received by step 2812, and so forth) may be analyzed to select a visual format (such as the first visual format of step 2810, the second visual format of step 2816, and so forth). For example, step 2810 may comprise analyzing a textual input (such as the first textual input received by step 2604) to select a first visual format. The first visual format selected by step 2810 may differ from the initial visual format (of step 2804 and/or step 2304) and the second visual format (selected by step 2816). In another example, step 2816 may comprise analyzing a textual input (such as the second textual input received by step 2812) to select a second visual format. The second visual format selected by step 2816 may differ from the initial visual format (of step 2804 and/or step 2304) and the first visual format (selected by step 2810). For example, the textual input may be analyzed using a LLM to select the visual format. In another example, the textual input may be analyzed using a machine learning model to select the visual format. For example, step 2810 may use a machine learning model to analyze the first textual input received by step 2604 and select the first visual format. In another example, step 2816 may use a machine learning model to analyze the second textual input received by step 2812 to select the second visual format. The machine learning model may be a machine learning model trained using training examples to select visual formats based on textual inputs. An example of such training example may include a sample textual input, together with a label indicative of a sample selection of a visual format.

In one example, the first textual input received by step 2604 may include an adjective, the selection of the first visual format by step 2810 may be based on the adjective. In another example, the second textual input received by step 2812 may include an adjective, and the selection of the second visual format by step 2816 may be based on the adjective. For example, when the second textual input includes 'Show this in a darker color', the second visual format may include a darker font color compared to the font color of the initial visual format, and when the second textual input includes 'Show this in a brighter color', the second visual format may include a brighter font color compared to the font color of the initial visual format.

In one example, the first textual input received by step 2604 may include an adverb, the selection of the first visual format by step 2810 may be based on the adverb. In another example, the second textual input received by step 2812 may include an adverb, and the selection of the second visual format by step 2816 may be based on the adverb. For example, when the second textual input includes 'Slightly highlight these records', the second visual format may include a slight change from the initial visual format to slightly highlight the second group, and when the second textual input includes 'Strongly highlight these records', the second visual format may include a more significant change from the initial visual format to highlight the second group.

In one example, the first textual input received by step 2604 may include a conjunction, the selection of the first visual format by step 2810 may be based on the conjunction. In another example, the second textual input received by step 2812 may include a conjunction, and the selection of the second visual format by step 2816 may be based on the conjunction. For example, when the second textual input includes 'Please use font size and color to highlight these records', the second visual format may differ from the initial visual format in both font size and color to highlight the second group, and when the second textual input includes 'Please use font size or color to highlight these records', the second visual format may differ in either font size or color to highlight the second group.

In one example, the first textual input received by step 2604 may include a determiner, the selection of the first visual format by step 2810 may be based on the determiner. In another example, the second textual input received by step 2812 may include a determiner, and the selection of the second visual format by step 2816 may be based on the determiner. For example, the second textual input may include either 'Use a percent format with two decimal places after the decimal point' or 'Use a percent format with three decimal places after the decimal point', and the second visual format may include either two or three decimal places after the decimal point based on the determiner.

In one example, the first textual input received by step 2604 may include a noun, the selection of the first visual format by step 2810 may be based on the noun. In another example, the second textual input received by step 2812 may include a noun, and the selection of the second visual format by step 2816 may be based on the noun. For example, when the second textual input includes 'Add a strikethrough to these records', the second visual format may include a strikethrough, and when the second textual input includes 'Add an underline to these records', the second visual format may include an underline.

In one example, the first textual input received by step 2604 may include a preposition, the selection of the first visual format by step 2810 may be based on the preposition. In another example, the second textual input received by step 2812 may include a preposition, and the selection of the second visual format by step 2816 may be based on the preposition. For example, when the second textual input includes 'Add a line around the numbers', the second visual format may include a line around numbers, and when the second textual input includes 'Add a line below the numbers', the second visual format may include an underline below numbers.

In one example, the first textual input received by step 2604 may include a pronoun, the selection of the first visual format by step 2810 may be based on the pronoun. In another example, the second textual input received by step 2812 may include a pronoun, and the selection of the second visual format by step 2816 may be based on the pronoun. For example, when the second textual input includes 'Please use her favorite font', the second visual format may include Jake's favorite font, and when the second textual input includes 'Please use his favorite font', the second visual format may include Jane's favorite font.

In one example, the first textual input received by step 2604 may include a verb, the selection of the first visual format by step 2810 may be based on the verb. In another example, the second textual input received by step 2812 may include a verb, and the selection of the second visual format by step 2816 may be based on the verb. For example, when the second textual input includes 'Emphasize these data records', the second visual format may differ from the initial visual format in a way that emphasize the second group, and when the second textual input includes 'Deemphasize these data records', the second visual format may differ from the initial visual format in a way that deemphasize the second group.

In some examples, each record of the plurality of data records accessed by step 2502 may include an annual income of a different household. Further, step 2804 may present said plurality of data records in an initial visual format of black plain text over a white background. Further, step 2504 may receive from an individual a selection of a first group of data records corresponding to households in a specific geographical region via a user interface. Further, the first textual input received by step 2604 may include 'Let's highlight these', and the first visual format selected by step 2810 may include black bold text over a yellow background. Further, the second textual input received by step 2812 may include 'Find another group of households that are not in this geographical region and has the same average salary as this group, and highlight them in a different color'. Further, step 2814 may select a second group of data records corresponding to households that are not in the specific geographical region and has the same average salary as the first group. Further, the second visual format selected by step 2816 may include black bold text over a green background. Further, step 2818 may alter the presentation based on the select groups and the selected visual formats.

In some examples, step 2810 may identify a first mathematical object in a mathematical space, wherein the first mathematical object corresponds to a first word of the first textual input, for example using module 302. Further, step 2810 may identify a second mathematical object in a mathematical space, wherein the second mathematical object may correspond to a second word of the first textual input, for example using module 302. Further, step 2810 may calculate a function of the first mathematical object and the second mathematical object to obtain a third mathematical object in the mathematical space, for example using module 304. Further, step 2810 may use the third mathematical object to select the first visual format. For example, when the third mathematical object includes a first numerical value, step 2810 may select the first visual format to be one visual format, and when the third mathematical object includes a second numerical value, step 2810 may select the first visual format to be a different visual format.

In some examples, step 2816 may identify a first mathematical object in a mathematical space, wherein the first mathematical object may correspond to a word of the first textual input received by step 2604, for example using module 302. Further, step 2816 may identify a second mathematical object in the mathematical space, wherein the second mathematical object may correspond to a word of the second textual input received by step 2812, for example using module 302. Further, step 2816 may calculate a function of the first mathematical object and the second mathematical object to obtain a third mathematical object in the mathematical space, for example using module 304. Further, step 2816 may use the third mathematical object to select the second visual format. For example, when the third mathematical object includes a first numerical value, step 2816 may select the second visual format to be one visual format, and when the third mathematical object includes a second numerical value, step 2816 may select the second visual format to be a different visual format.

In some examples, when relating to data records (for example, in the context of method 2800), the selection of the first visual format by step 2810 may be further based on the numerical values included in the first group of at least one data record (of step 2504). For example, step 2810 may use a LLM to analyze the first textual input received by step 2604 and a textual presentation of the numerical values included in the first group to select the first visual format. In some examples, when relating to data records (for example, in the context of method 2800), the selection of the second visual format by step 2816 may be further based on the numerical values included in the second group of at least one data record. For example, step 2810 may use a LLM to analyze the second textual input received by step 2812 and a textual presentation of the numerical values included in the second group to select the second visual format.

In some examples, when relating to textual contents (for example, in the context of method 2300), the selection of the first visual format by step 2810 may be further based on at least one word included in the first portion (of step 2306). For example, step 2810 may use a LLM to analyze the first textual input received by step 2604 and the at least one word to select the first visual format. In some examples, when relating to textual contents (for example, in the context of method 2300), the selection of the second visual format by step 2816 may be further based on at least one word included in the second portion (selected by step 2314). For example, step 2810 may use a LLM to analyze the second textual input received by step 2812 and the at least one word to select the second visual format. In some examples, when relating to textual contents (for example, in the context of method 2300), the selection of the first visual format by step 2810 may be further based on a particular word of the textual content (accessed by step 1902) not included in any one of the first portion (of step 2306), the second portion (selected by step 2314) or the first textual input (received by step 2604). For example, step 2810 may use a LLM to analyze the first textual input received by step 2604 and the particular word to select the first visual format. In one example, step 2810 may analyze the first textual input to identify the particular word. For example, step 2810 may use a LLM to analyze the first textual input and at least part of the textual content to identify the particular word. In some examples, when relating to textual contents (for example, in the context of method 2300), the selection of the second visual format by step 2819 may be further based on a particular word of the textual content (accessed by step 1902) not included in any one of the first portion (of step 2306), the second portion (selected by step 2314) or the second textual input (received by step 2812). For example, step 2810 may use a LLM to analyze the second textual input received by step 2812 and the particular word to select the second visual format. In one example, step 2810 may analyze the second textual input to identify the particular word. For example, step 2810 may use a LLM to analyze the second textual input and at least part of the textual content to identify the particular word.

In some examples, the selection of the first visual format by step 2810 may be further based on the initial visual format of step 2804. For example, the first textual input may include 'Make the font of these records more prominent', and in response the first visual format may include a larger font size compared to the initial visual format. In some examples, the selection of the second visual format by step 2816 may be further based on the initial visual format of step 2804. For example, the first textual input may include 'Make the font of these records more prominent', and in response the first visual format may include a larger font size compared to the initial visual format. For example, the second textual input may include 'Make the font of these records less prominent', and in response the second visual format may include a smaller font size and a less intense text color compared to the initial visual format. In some examples, the selection of the first visual format by step 2810 may be further based on the second visual format selected by step 2816 and the initial visual format of step 2804. For example, the first textual input may include 'Let's differentiate this group', the background color in the initial visual format may be white, the background color in the second visual format may be yellow, and step 2810 may select a background color different than white or yellow, such as green. In some examples, the selection of the second visual format by step 2816 may be further based on the first visual format selected by step 2810 and the initial visual format of step 2804. For example, the second textual input may include 'This group is the complete opposite than the other group', the first visual format may include a larger font size compared to the initial visual format, and to visualize the relationship, the second visual format may include a smaller font size compared to the initial visual format.

In some examples, the selection of the first visual format by step 2810 may be further based on the numerical value included in a particular data record of the plurality of data records accessed by step 2502. The particular data record may not be included in the first group (of step 2504). In one example, step 2810 may use a LLM to analyze the first textual input received by step 2604 and/or a textual representation of the numerical value included in the particular data record select the first visual format. In some examples, the first visual format selected by step 2810 may be a conditional formatting for determining a visual format of a data record based on the numerical value included in a particular data record of the plurality of data records accessed by step 2502. The particular data record may not be included in the first group (of step 2504). In some examples, step 2810 may analyze the first textual input to identify the particular data record, for example as described above in relation to step 2508.

In some examples, the selection of the second visual format by step 2816 may be further based on the numerical value included in a particular data record of the plurality of data records. The particular data record may not be included in the second group 2814. In one example, step 2816 may use a LLM to analyze the second textual input received by step 2812 and/or a textual representation of the numerical value included in the particular data record select the second visual format. In some examples, the second visual format selected by step 2816 may be a conditional formatting for determining a visual format of a data record based on the numerical value included in a particular data record of the plurality of data records accessed by step 2502. The particular data record may not be included in the second group 2814. In some examples, step 2816 may analyze the second textual input to identify the particular data record, for example as described above in relation to step 2508.

In some examples, step 2812 may comprise receiving from an individual (such as the individual of step 2804 and/or step 2504 and/or step 2604 and/or step 2304) a second textual input in a natural language (such as the natural language of step 2604, a different natural language, and so forth), for example as described above in relation to step 2614. In some examples, step 2814 may comprise analyzing a textual input (such as the second textual input received by step 2812) to select a second group of at least one data record of the plurality of data records accessed by step 2502, for example using step 2708. In some examples, all data records of the first group (of step 2504) may be included in a first table, and all data records of the second group (selected by step 2814) may be included in a second table. The second table may differ from the first table.

In some examples, step 2814 may identify a first mathematical object in a mathematical space, wherein the first mathematical object may correspond to a word of the first textual input received by step 2604, for example using module 302. Further, step 2814 may identify a second mathematical object in the mathematical space, wherein the second mathematical object corresponds to a word of the second textual input, for example using module 302. Further, step 2814 may use the first mathematical object and the second mathematical object to select the second group of at least one data record of the plurality of data records. For example, step 2814 may calculate a function of the first mathematical object and the second mathematical object to obtain a third mathematical object in the mathematical space, for example using module 304. Further, step 2814 may base the selection of the second group of at least one data record on the third mathematical object. For example, when the third mathematical object includes a first numerical value, step 2814 may include a specific data record in the second group. In another example, when the third mathematical object includes a second numerical value, step 2814 may avoid including a specific data record in the second group. In some examples, the selection of the second group of at least one data record by step 2814 may be further based on the numerical value included in a particular data record of the plurality of data records accessed by step 2502, for example as described above in relation to step 2508. The particular data record may not be included in the second group. In some examples, step 2814 may analyze the second textual input received by step 2812 to identify the particular data record, for example as described above in relation to step 2508.

In some examples, step 2818 may comprise altering the presentation of the plurality of data records of step 2804. In the altered presentation all data records of the first group (of step 2504) may be presented in the first visual format selected by step 2810, all data records of the second group (selected by step 2814) may be presented in the second visual format selected by step 2816, and all data records of a third group of at least one data record of the plurality of data records may be presented in the initial visual format of step 2804. In some examples, altering the presentation of the plurality of data records by step 2818 may comprise replacing the presentation of step 2804 with a new presentation, wherein in the new presentation all data records of the first group (of step 2504) may be presented in the first visual format selected by step 2810, all data records of the second group (selected by step 2814) may be presented in the second visual format selected by step 2816, and all data records of the third group of at least one data record may be presented in the initial visual format of step 2804. The new presentation may be presented by step 2818 as described above in relation to step 2804. In some examples, altering the presentation of the plurality of data records by step 2818 may comprise modifying a data-structure that configures the presentation. For example, the data-structure may associate different portions of the presentation with different visual formats, and step 2818 may alter the data-structure to associate the portions of the presentation displaying the data records of the first group (of step 2504) with the first visual format selected by step 2810, and/or may alter the data-structure to associate the portions of the presentation displaying the data records of the second group (selected by step 2814) with the second visual format selected by step 2816. In some examples, step 2818 may generate digital control signals for altering the presentation.

In some examples, method 2800 and/or method 2300 may further comprise generating a textual output in a natural language (such as the natural language of step 2604 and/or step 2812, a different natural language, and so forth), wherein the textual output may refer to the first visual format and/or the second visual format, and presenting the textual output to the individual, for example using step 2514. In one example, generating the textual output that refers to the first visual format and/or the second visual format may include using a LLM to generate the textual output. In one example, generating the textual output that refers to the first visual format and/or the second visual format may include using a template and inserting text referring to the visual formats to the template in predesignated places.

In some examples, method 2800 may further comprise, after altering the presentation of the plurality of data records (by step 2818), receiving from an individual (such as the individual of step 2804 and/or step 2504 and/or step 2604 and/or step 2812) a third textual input in a natural language (such as the natural language of step 2604 and/or step 2812, a different natural language, and so forth), for example as described above in relation to step 2604. Further, the third textual input may be analyzed to select a third visual format, for example as described above in relation to step 2816. Further, the third textual input may be analyzed to select a subgroup of the second group of at least one data record, for example as described above in relation to step 2814. Further, the presentation of the plurality of data records (of step 2804 and/or step 2818) may be modified, wherein in the modified presentation all data records of the first group may be presented in the first visual format, all data records of the subgroup of the second group may be presented in the third visual format, all data records of the second group not included in the subgroup may be presented in the second visual format, and all data records of the third group may be presented in the initial visual format.

In some examples, method 2800 may further comprise, after altering the presentation of the plurality of data records (by step 2818), receiving from an individual (such as the individual of step 2804 and/or step 2504 and/or step 2604 and/or step 2812) a third textual input in a natural language (such as the natural language of step 2604 and/or step 2812, a different natural language, and so forth), for example as described above in relation to step 2604. Further, the third textual input may be analyzed to select a third visual format, for example as described above in relation to step 2816. Further, the third textual input may be analyzed to select a fourth group of at least one data record of the plurality of data records, for example as described above in relation to step 2814. In one non-limiting example, the fourth group may include at least one but not all data records of the first group and/or at least one but not all data records of the second group and/or at least one but not all data records of the third group. Further, the presentation of the plurality of data records (of step 2804 and/or step 2818) may be modified, wherein in the modified presentation all data records of the first group not included in the fourth group may be presented in the first visual format, all data records of the second group not included in the fourth group may be presented in the second visual format, all data records of the third group not included in the fourth group may be presented in the initial visual format, and all data records of the fourth group may be presented in the third visual format.

It will also be understood that the system according to the invention may be a suitably programmed computer, the computer including at least a processing unit and a memory unit. For example, the computer program can be loaded onto the memory unit and can be executed by the processing unit. Likewise, the invention contemplates a computer program being readable by a computer for executing the method of the invention. The invention further contemplates a machine-readable memory tangibly embodying a program of instructions executable by the machine for executing the method of the invention.

What is claimed is:

1. A non-transitory computer readable medium storing computer implementable instructions that when executed by at least one processor cause the at least one processor to perform operations for facilitating generation of graphs based on data records through natural language, the operations comprising:

accessing a plurality of data records, each data record of the plurality of data records includes at least a respective numerical value;

receiving from an individual a selection of a first group of at least one data record of the plurality of data records;

receiving from the individual an input in a natural language;

analyzing the input to select a second group of at least one data record of the plurality of data records;

analyzing the input to select a type of graph;

in response to a zoom intent identified in the input, selecting a crossing point between two axes by automatically determining a coordinate for the crossing point that is closer to a region containing the first group and the second group than a default crossing point;

using the first group of at least one data record and the second group of at least one data record to generate a graph of the selected type of graph;

presenting the generated graph to the individual based on the selected crossing point; and presenting an indication of the second group of at least one data record to the individual.

2. The non-transitory computer readable medium of claim 1, wherein the input includes a question in the natural language, and the operations further comprise generating an answer in the natural language to the question that refers to a specific element of the generated graph and automatically presenting a visual indication of the specific element within the generated graph.

3. The non-transitory computer readable medium of claim 1, wherein the operations further comprise analyzing the input to select a color for at least one element of the generated graph indicated in the input, wherein the selected color is different from a color of other elements of the generated graph to highlight the at least one element indicated in the input.

4. The non-transitory computer readable medium of claim 1, wherein the operations further comprise analyzing the input to determine a gridlines property for the generated graph, wherein in response to the input being indicative of a desire to avoid clutter, the gridlines property includes horizontal or vertical gridlines but not both.

5. The non-transitory computer readable medium of claim 1, wherein the operations further comprise analyzing the input to select a scale for at least one axis of the generated graph, wherein selecting the scale includes automatically determining the scale for the at least one axis to satisfy an intent to avoid clutter as identified in the input.

6. The non-transitory computer readable medium of claim 1, wherein the operations further comprise analyzing the input to select a range for at least one axis of the generated graph, wherein in response to a margin intent identified in the input, the range is selected to be larger than a minimal range required to show data-points.

7. The non-transitory computer readable medium of claim 1, wherein the automatically determining the coordinate for the crossing point comprises identifying a minimum numerical value and a maximum numerical value for at least one of the two axes for at least one of the first group or the second group to define the region.

8. The non-transitory computer readable medium of claim 1, wherein the operations further comprise analyzing the input to select a layout for the generated graph, wherein the selecting the layout includes determining a position of a legend relative to a plot area of the generated graph to satisfy an intent for a particular viewing order identified in the input.

9. The non-transitory computer readable medium of claim 1, wherein the operations further comprise analyzing the input to determine whether to associate the first group with a horizontal axis of the generated graph and the second group with a vertical axis of the generated graph, wherein the association is determined by identifying in the input an intended relationship between the first group and the second group.

10. The non-transitory computer readable medium of claim 1, wherein the operations further comprise:

analyzing the input to generate an output in the natural language, the output refers to an element of the generated graph;

presenting the output to the individual; and presenting a visual indication of the element within the generated graph.

11. The non-transitory computer readable medium of claim 1, wherein the operations further comprise:

after presenting the generated graph to the individual and presenting the indication of the second group of at least one data record to the individual, receiving from the individual a second input in the natural language; and analyzing the second input to cause a modification of the generated graph, wherein in response to an intent to ignore outliers identified in the second input, the modification comprises automatically modifying a range of at least one axis of the generated graph to exclude at least one data record determined to be an outlier.

12. The non-transitory computer readable medium of claim 1, wherein the operations further comprise:

identifying a first mathematical object in a mathematical space, the first mathematical object corresponds to a first word of the input;

identifying a second mathematical object in the mathematical space, the second mathematical object corresponds to a second word of the input;

calculating a function of the first mathematical object and the second mathematical object to obtain a third mathematical object in the mathematical space; and basing the selection of the type of graph on the third mathematical object.

13. The non-transitory computer readable medium of claim 1, wherein the operations further comprise using a machine learning model to analyze the input to select the second group of at least one data record of the plurality of data records.

14. The non-transitory computer readable medium of claim 1, wherein the operations further comprise analyzing the input and the first group of at least one data record to select the second group of at least one data record of the plurality of data records, wherein selecting the second group includes identifying an omission intent in the input to exclude at least one data record from the second group based on a statistical analysis.

15. The non-transitory computer readable medium of claim 1, wherein the operations further comprise analyzing the input and at least one of the first group of at least one data record or the second group of at least one data record to select the type of graph.

16. The non-transitory computer readable medium of claim 1, wherein the operations further comprise:

analyzing the input to select a third group of at least one data record of the plurality of data records; and using the first group of at least one data record, the second group of at least one data record and the third group of at least one data record to generate the graph of the selected type of graph, wherein the generated graph is a three-dimensional graph, the first group is associated with a first axis of the three-dimensional graph, the second group is associated with a second axis of the three-dimensional graph, and the third group is associated with a third axis of the three-dimensional graph.

17. The non-transitory computer readable medium of claim 1, wherein the input includes an adjective indicative of a temporal granularity for the respective numerical values of the second group, and the selection of the second group is based on the adjective indicative of the temporal granularity.

18. The non-transitory computer readable medium of claim 1, wherein the input includes a conjunction, and the selection of the type of graph is based on the conjunction, wherein the selecting the type of graph includes selecting a bar graph when the conjunction indicates an intent to present the first group and the second group on a common axis.

19. The non-transitory computer readable medium of claim 1, wherein the operations further comprise analyzing the input to identify an intent for data point precision, and in response, generating the graph to include a respective data-label associated with each data-point of the graph, wherein the respective data-label indicates a respective precise numerical value for the data-point.

20. A system for facilitating generation of graphs based on data records through natural language, the system comprising;

at least one processing unit configured to perform operations, the operations comprise:

accessing a plurality of data records, each data record of the plurality of data records includes at least a respective numerical value;

receiving from an individual a selection of a first group of at least one data record of the plurality of data records;

receiving from the individual an input in a natural language;

analyzing the input to select a second group of at least one data record of the plurality of data records;

analyzing the input to select a type of graph;

in response to a zoom intent identified in the input, selecting a crossing point between two axes by automatically determining a coordinate for the crossing point that is closer to a region containing the first group and the second group than a default crossing point;

using the first group of at least one data record and the second group of at least one data record to generate a graph of the selected type of graph;

presenting the generated graph to the individual based on the selected crossing point; and presenting an indication of the second group of at least one data record to the individual.

21. A method for facilitating generation of graphs based on data records through natural language, the method comprising:

accessing a plurality of data records, each data record of the plurality of data records includes at least a respective numerical value;

receiving from an individual a selection of a first group of at least one data record of the plurality of data records;

receiving from the individual an input in a natural language;

analyzing the input to select a second group of at least one data record of the plurality of data records;

analyzing the input to select a type of graph;

in response to a zoom intent identified in the input, selecting a crossing point between two axes by automatically determining a coordinate for the crossing point that is closer to a region containing the first group and the second group than a default crossing point;

using the first group of at least one data record and the second group of at least one data record to generate a graph of the selected type of graph;

presenting the generated graph to the individual based on the selected crossing point; and presenting an indication of the second group of at least one data record to the individual.

* * * * *